US012160074B2

(12) United States Patent
King et al.

(10) Patent No.: US 12,160,074 B2
(45) Date of Patent: Dec. 3, 2024

(54) IN-WALL POWER ADAPTER HAVING A SWITCH AND A RECESS ADAPTED TO RECEIVE A CONTROL MODULE

(71) Applicant: Smart Power Partners LLC, Wheaton, IL (US)

(72) Inventors: John J. King, Wheaton, IL (US); Stephen DeLano, Milton, MA (US); Tyler J Miller, Dickerson, MD (US); Tho Nguyen, Ashburn, VA (US); Benjamin F. Feldman, Reston, VA (US); Thomas E. Musman, Woodbridge, VA (US)

(73) Assignee: Smart Power Partners LLC, Wheaton, IL (US)

( * ) Notice: Subject to any disclaimer, the term of this patent is extended or adjusted under 35 U.S.C. 154(b) by 0 days.

(21) Appl. No.: 17/976,838

(22) Filed: Oct. 30, 2022

(65) Prior Publication Data

US 2023/0138366 A1 May 4, 2023

Related U.S. Application Data

(60) Provisional application No. 63/414,022, filed on Oct. 7, 2022, provisional application No. 63/397,853, filed (Continued)

(51) Int. Cl.
*H01R 33/945* (2006.01)
*H01H 47/00* (2006.01)

(Continued)

(52) U.S. Cl.
CPC ........... *H01R 33/945* (2013.01); *H01R 13/73* (2013.01); *H01R 31/065* (2013.01); *H01R 33/90* (2013.01);

(Continued)

(58) Field of Classification Search
CPC .... H01R 33/945; H01R 31/065; H01R 33/90; H01R 33/96; H01H 47/00; H02G 3/086
See application file for complete search history.

(56) References Cited

U.S. PATENT DOCUMENTS 2,997,691 A 8/1961 Stoll
3,588,489 A 6/1971 Gaines (Continued)

FOREIGN PATENT DOCUMENTS

AU 2019203136 5/2019
AU 2019100956 10/2019

(Continued)

OTHER PUBLICATIONS

Leviton Voice Dimmer with Amazon Alexa Built-in. published Mar. 2020.

(Continued)

*Primary Examiner* — Renee S Luebke
*Assistant Examiner* — Paul D Baillargeon

(57) ABSTRACT

An in-wall power adapter adapted to receive a voltage is described. The in-wall power adapter may comprise a first plurality of contact elements comprising a first contact element adapted to receive a line voltage signal, a second contact element adapted to receive a neutral voltage, a third contact element adapted to receive a ground voltage, and a fourth contact element adapted to receive a communication signal; a recess adapted to receive a control module; a switch having a first terminal coupled to receive the line voltage; and a second plurality of contact elements associated with the recess and comprising a fifth contact element adapted to receive the communication signal.

20 Claims, 78 Drawing Sheets

Related U.S. Application Data on Aug. 14, 2022, provisional application No. 63/351,397, filed on Jun. 12, 2022, provisional application No. 63/295,808, filed on Dec. 31, 2021, provisional application No. 63/275,584, filed on Nov. 4, 2021, provisional application No. 63/275,420, filed on Nov. 3, 2021.

(51) Int. Cl.

| | |
|---|---|
| ***H01R 13/73*** | (2006.01) |
| ***H01R 31/06*** | (2006.01) |
| ***H01R 33/90*** | (2006.01) |
| ***H01R 33/96*** | (2006.01) |
| ***H02B 1/04*** | (2006.01) |
| ***H02B 1/056*** | (2006.01) |
| ***H02B 3/00*** | (2006.01) |
| ***H02M 1/00*** | (2006.01) |
| ***H02M 1/10*** | (2006.01) |
| ***H02M 1/36*** | (2007.01) |

(52) U.S. Cl.

CPC ............. *H01R 33/96* (2013.01); *H02B 1/043* (2013.01); *H02B 1/0565* (2013.01); *H02B 3/00* (2013.01); *H02M 1/0006* (2021.05); *H02M 1/0045* (2021.05); *H02M 1/10* (2013.01); *H02M 1/36* (2013.01); *H01H 47/00* (2013.01)

(56) References Cited

U.S. PATENT DOCUMENTS 3,609,647 A 9/1971 Castellano
3,663,865 A 5/1972 Stanback
3,879,101 A 4/1975 McKissic
3,895,225 A 7/1975 Prior
4,117,258 A 9/1978 Shanker
4,165,443 A 8/1979 Figart et al.
4,166,934 A 9/1979 Marrero
4,485,282 A 11/1984 Lee
4,522,455 A 6/1985 Johnson
4,546,418 A 10/1985 Baggio et al.
4,546,419 A 10/1985 Johnson
4,636,914 A 1/1987 Belli
4,780,088 A 10/1988 Means
4,839,477 A 6/1989 Orosz et al.
4,893,062 A 1/1990 D'Aleo et al.
5,064,386 A 11/1991 Dale et al.
5,164,609 A 11/1992 Poppe et al.
5,207,317 A 5/1993 Bryde et al.
5,229,925 A 7/1993 Spencer et al.
5,264,761 A 11/1993 Johnson
5,357,170 A 10/1994 Luchaco et al.
5,397,929 A 3/1995 Hogarth et al.
5,399,806 A 3/1995 Olson
5,471,012 A 11/1995 Opel
5,473,517 A 12/1995 Blackman
5,486,725 A 1/1996 Keizer et al.
5,550,342 A 8/1996 Danek et al.
5,574,256 A 11/1996 Cottone
5,637,930 A 6/1997 Rowen et al.
5,675,194 A 10/1997 Domigan
5,735,710 A 4/1998 Blaauboer et al.
5,735,714 A 4/1998 Orlando et al.
5,813,873 A 9/1998 McBain et al.
5,844,763 A 12/1998 Grace et al.
5,915,984 A 6/1999 Rupert et al.
5,957,564 A 9/1999 Bruce et al.
5,990,635 A 11/1999 Ference et al.
6,000,807 A 12/1999 Moreland
6,005,308 A 12/1999 Bryde et al.
6,010,228 A 1/2000 Blackman et al.
6,011,755 A 1/2000 Mulhall et al.
6,045,232 A 4/2000 Buckmaster
6,064,448 A 5/2000 Feng
6,082,894 A 7/2000 Batko et al.
6,087,588 A 7/2000 Soules
6,154,774 A 11/2000 Furlong et al.
6,169,377 B1 1/2001 Bryde et al.
6,211,581 B1 4/2001 Farrant
6,218,787 B1 4/2001 Murcko et al.
6,309,248 B1 10/2001 King
6,349,981 B1 2/2002 King
6,376,770 B1 4/2002 Hyde
6,423,900 B1 7/2002 Soules
6,424,096 B1 7/2002 Lowe et al.
6,530,806 B2 3/2003 Nelson
6,540,536 B1 4/2003 Young
6,540,554 B2 4/2003 McCarthy
6,545,587 B1 4/2003 Hatakeyama et al.
6,547,588 B1 4/2003 Hsu et al.
6,553,433 B1 4/2003 Chang
6,616,005 B1 9/2003 Pereira et al.
6,617,511 B2 9/2003 Schultz et al.
6,630,800 B2 10/2003 Weng
6,660,948 B2 12/2003 Clegg et al.
6,664,468 B2 12/2003 Jarasse et al.
6,666,712 B1 12/2003 Kramer
6,755,676 B2 6/2004 Milan
6,767,245 B2 7/2004 King
6,794,575 B1 9/2004 McBain et al.
6,797,900 B2 9/2004 Hoffman
6,798,341 B1 9/2004 Eckel et al.
6,805,469 B1 10/2004 Barton
6,843,680 B2 1/2005 Gorman
6,870,099 B1 3/2005 Schultz et al.
6,884,111 B2 4/2005 Gorman
6,894,221 B2 5/2005 Gorman
6,909,921 B1 6/2005 Bilger
6,940,016 B1 9/2005 Cornett et al.
6,945,815 B1 9/2005 Mullally
6,962,505 B1 11/2005 Savicki, Jr. et al.
6,965,801 B2 11/2005 Hall
6,989,489 B1 1/2006 Savicki, Jr.
7,045,975 B2 5/2006 Evans
7,081,009 B2 7/2006 Gorman
7,139,716 B1 11/2006 Gaziz
7,160,147 B1 1/2007 Stephan
7,161,313 B2 1/2007 Piepgras et al.
7,192,289 B2 3/2007 Kowalski
7,202,613 B2 4/2007 Morgan et al.
7,202,789 B1 4/2007 Stilp
7,223,122 B2 5/2007 Mori
7,232,336 B1 6/2007 Evans
7,257,465 B2 8/2007 Perez et al.
7,273,392 B2 9/2007 Fields
7,285,721 B1 10/2007 Savicki, Jr.
7,360,912 B1 4/2008 Savicki, Jr.
7,365,964 B2 4/2008 Donahue
7,367,121 B1 5/2008 Gorman
7,391,297 B2 6/2008 Cash et al.
7,400,239 B2 7/2008 Kiko et al.
7,480,534 B2 1/2009 Bray et al.
7,549,893 B1 6/2009 Walker et al.
7,576,285 B1 8/2009 Savicki, Jr.
7,614,893 B2 11/2009 Khodorkovsky et al.
7,641,491 B2 1/2010 Altonen et al.
7,649,472 B1 1/2010 Paterno
7,687,940 B2 3/2010 Mosebrook et al.
7,734,038 B2 6/2010 Martich et al.
7,767,905 B2 8/2010 Meyer
7,772,717 B2 8/2010 Kitamura et al.
7,791,282 B2 9/2010 Yu et al.
7,815,332 B1 10/2010 Smith
7,818,906 B2 10/2010 Hansen et al.
7,851,704 B2 12/2010 Fitch et al.
7,862,350 B2 1/2011 Richter et al.
7,873,062 B2 1/2011 Binder
7,906,873 B1 3/2011 Roosli et al.
7,964,989 B1 6/2011 Puschnigg et al.
7,976,338 B1 7/2011 Webster et al.
7,994,654 B2 8/2011 Lee et al.
7,998,312 B2 8/2011 Nishida et al.

(56) References Cited

U.S. PATENT DOCUMENTS 8,011,937 B2 9/2011 Oddsen et al.
8,052,485 B2 11/2011 Lee et al.
8,058,552 B2 11/2011 Kruse et al.
8,067,906 B2 11/2011 Null
8,160,838 B2 4/2012 Ramin et al.
8,221,158 B2 7/2012 Liao
8,232,745 B2 7/2012 Chemel et al.
8,238,755 B2 8/2012 Yamamoto et al.
8,243,918 B2 8/2012 Hazani et al.
8,267,719 B1 9/2012 Benoit et al.
8,339,054 B2 12/2012 Yu et al.
8,344,667 B1 1/2013 King
8,360,810 B2 1/2013 Binder
8,384,241 B2 2/2013 Chen et al.
8,445,826 B2 5/2013 Verfuerth
8,471,480 B2 6/2013 Kinderman et al.
8,496,342 B2 7/2013 Misener
8,558,129 B2 10/2013 Elliott et al.
8,602,799 B2 12/2013 Ganta et al.
8,629,617 B2 1/2014 Richards et al.
8,658,893 B1 2/2014 Shotey et al.
8,668,347 B2 3/2014 Ebeling
8,710,770 B2 4/2014 Woytowitz
8,758,031 B2 6/2014 Cheng et al.
8,872,438 B2 10/2014 Zhou et al.
8,886,785 B2 11/2014 Apte et al.
8,963,437 B2 2/2015 Wu
8,965,411 B1 2/2015 Busch_Sorensen et al.
9,007,186 B1 4/2015 Krummey et al.
9,024,800 B2 5/2015 Altonen et al.
9,030,789 B2 5/2015 Benoit et al.
9,035,572 B1 5/2015 Dolan
9,095,053 B2 7/2015 Trolese et al.
9,112,319 B2 8/2015 Liao et al.
9,167,660 B2 10/2015 Birch et al.
9,184,590 B2 11/2015 Testani
9,214,773 B2 12/2015 Misener
9,293,376 B2 3/2016 Su et al.
9,312,673 B2 4/2016 Byrne et al.
9,320,162 B2 4/2016 Kawamura et al.
9,325,132 B2 4/2016 Hsu
9,351,353 B2 5/2016 Recker et al.
9,368,025 B2 6/2016 Carmen
9,368,982 B2 6/2016 Jansen et al.
9,380,685 B2 6/2016 Shet et al.
9,386,668 B2 7/2016 Knapp et al.
9,389,769 B1 7/2016 O'Keeffe
9,419,435 B2 8/2016 Testani
9,437,978 B2 9/2016 Green
9,451,745 B1 9/2016 O'Shaughnessy et al.
9,490,086 B2 11/2016 Lagree et al.
9,520,671 B2 12/2016 Misener
9,537,266 B1 1/2017 Leach
9,544,975 B2 1/2017 Giltaca et al.
9,581,342 B2 2/2017 Daniels et al.
9,589,461 B1 3/2017 Byrne et al.
9,603,223 B2 3/2017 Patel et al.
9,607,786 B2 3/2017 Haines et al.
9,608,418 B1 3/2017 Elberbaum
9,620,945 B2 4/2017 Rohmer et al.
9,633,584 B2 4/2017 Underwood
9,635,773 B1 4/2017 Marshall
9,640,962 B2 5/2017 Hernandez Ramirez et al.
9,680,656 B2 6/2017 Rivera
9,681,513 B2 6/2017 Dadashnialehi et al.
9,692,236 B2 6/2017 Wootton et al.
9,693,428 B2 6/2017 Wagner et al.
9,699,863 B2 7/2017 Weightman et al.
9,769,420 B1 9/2017 Moses
9,781,245 B2 10/2017 Miller
9,782,509 B2 10/2017 Murahari et al.
9,793,697 B1 10/2017 Colao et al.
9,799,469 B2 10/2017 Bailey et al.
9,826,604 B2 11/2017 Karc et al.
9,762,056 B1 12/2017 Miller et al.
9,837,753 B1 12/2017 Chen
9,837,813 B2 12/2017 Newell et al.
9,842,584 B1 12/2017 Hart et al.
9,866,990 B2 1/2018 Cairns et al.
9,964,447 B2 5/2018 Fadell et al.
10,048,653 B2 8/2018 Ostrovsky et al.
10,050,393 B1 8/2018 Calabrese
10,062,533 B2 8/2018 Qureshi et al.
10,063,002 B2 8/2018 Richardson et al.
10,069,235 B2 9/2018 Blase et al.
10,070,539 B2 9/2018 Gates et al.
10,078,786 B2 9/2018 Richardson et al.
10,084,272 B1 9/2018 Hayes et al.
10,096,951 B1 10/2018 Hodge
10,136,292 B2 11/2018 Bosua et al.
10,153,113 B2 12/2018 Richardson et al.
10,161,806 B2 12/2018 Lermann
10,175,996 B2 1/2019 Byrne et al.
10,188,300 B2 1/2019 Tanaka
10,193,285 B1 1/2019 Satyanarayanan et al.
10,225,005 B1 3/2019 Elberbaum
10,249,998 B2 4/2019 Irons et al.
10,381,792 B2 4/2019 Hsu et al.
10,349,536 B2 * 7/2019 Li ........................ H01R 13/665
10,359,298 B2 7/2019 Quady et al.
10,375,803 B2 8/2019 Dimberg et al.
10,412,206 B1 9/2019 Liang et al.
10,418,813 B1 * 9/2019 King ........................ G06F 3/165
10,425,236 B2 9/2019 Bryne et al.
10,431,940 B1 10/2019 Walma, Jr.
10,554,059 B1 2/2020 Hemingway et al.
10,587,147 B2 3/2020 Carmen, Jr.
10,621,113 B2 4/2020 Bryne et al.
10,667,347 B2 5/2020 Fadell et al.
10,699,131 B2 6/2020 Richardson et al.
10,700,477 B1 6/2020 Richardson et al.
10,716,194 B2 7/2020 Chema et al.
10,720,764 B2 7/2020 Misener et al.
10,726,835 B2 7/2020 Chua et al.
10,727,731 B1 * 7/2020 King .................. H01R 13/6675
10,741,984 B2 8/2020 Chin
10,917,956 B1 * 2/2021 King ........................ G06F 3/016
10,938,168 B2 * 3/2021 King ...................... H05B 47/19
10,944,220 B1 3/2021 Richardson et al.
10,958,020 B1 * 3/2021 King .................... H01R 31/065
10,958,026 B1 * 3/2021 King ..................... G01J 5/0205
10,965,068 B1 * 3/2021 King ...................... H05B 47/19
10,996,645 B1 * 5/2021 King ......................... H02J 3/14
11,005,247 B1 5/2021 Booyse et al.
11,043,768 B1 * 6/2021 King ...................... H01R 13/17
11,050,340 B2 6/2021 King
11,121,513 B2 9/2021 Chien
11,189,948 B1 * 11/2021 King ........................ H02G 3/14
11,189,975 B1 11/2021 Baldwin
11,190,918 B1 11/2021 Lingle et al.
11,201,444 B1 * 12/2021 King ....................... H04L 12/10
11,219,108 B1 * 1/2022 King ...................... H01H 47/00
11,264,769 B1 * 3/2022 King ...................... H02G 3/083
11,456,584 B1 9/2022 Taylor et al.
11,460,874 B1 * 10/2022 King ....................... G05F 1/625
11,521,472 B1 12/2022 Rintz et al.
11,564,320 B1 1/2023 Zaharchuk et al.
11,579,640 B1 * 2/2023 King ......................... H02J 3/00
11,580,826 B2 2/2023 Volkerink et al.
11,715,917 B1 8/2023 Baldwin et al.
2002/0052138 A1 5/2002 Janik
2002/0086567 A1 7/2002 Cash
2003/0021104 A1 1/2003 Tsao
2004/0009700 A1 1/2004 Patel
2004/0051485 A1 3/2004 Chansky et al.
2004/0075401 A1 4/2004 Segan et al.
2004/0077212 A1 4/2004 Pulizzi
2004/0177986 A1 9/2004 Gorman
2004/0218379 A1 11/2004 Barton
2004/0218411 A1 11/2004 Luu et al.
2005/0040772 A1 2/2005 Guzman et al.
2005/0055106 A1 3/2005 Beutler et al.
2005/0075741 A1 4/2005 Altmann et al.
2005/0104533 A1 5/2005 Barthelmess

(56) References Cited

U.S. PATENT DOCUMENTS

2005/0122718 A1 6/2005 Kazar et al.
2005/0125083 A1 6/2005 Kiko
2005/0136972 A1 6/2005 Smith et al.
2005/0194243 A1 9/2005 Prineppi
2005/0252753 A1 11/2005 Leo
2005/0275981 A1 12/2005 Power et al.
2006/0025012 A1 2/2006 Fields
2006/0065510 A1 3/2006 Kiko et al.
2006/0066151 A1 3/2006 Hatemata
2006/0066510 A1 3/2006 Takahashi
2006/0262462 A1 11/2006 Barton
2007/0072476 A1 3/2007 Milan
2007/0099491 A1 5/2007 Pyrros
2007/0197262 A1 8/2007 Smith et al.
2007/0216318 A1 9/2007 Altonen et al.
2007/0217404 A1 9/2007 Kawamata
2007/0247366 A1 10/2007 Smith et al.
2008/0012423 A1 1/2008 Mimran
2008/0020632 A1 1/2008 Gorman
2008/0079568 A1 4/2008 Primous et al.
2008/0093100 A1 4/2008 Bhakta
2008/0104533 A1 5/2008 List
2008/0111501 A1 5/2008 Dobbins et al.
2008/0156510 A1 7/2008 Yan
2009/0039706 A1 2/2009 Kotlyar et al.
2009/0045817 A1 2/2009 Savicki, Jr. et al.
2009/0058707 A1 3/2009 Craze et al.
2009/0103228 A1 4/2009 Elderbaum
2009/0107693 A1 4/2009 Meyer
2009/0194311 A1 4/2009 Merrill
2009/0137163 A1 5/2009 Schoettle
2009/0180261 A1 7/2009 Angelides et al.
2009/0189542 A1 7/2009 Wu et al.
2009/0247006 A1 10/2009 Thompson
2009/0251127 A1 10/2009 Kim
2009/0261661 A1 10/2009 Finneran
2009/0278479 A1 11/2009 Platner et al.
2010/0006648 A1 1/2010 Grant et al.
2010/0026194 A1 2/2010 Paton
2010/0066484 A1 3/2010 Hanwright et al.
2010/0070100 A1 3/2010 Finlinson et al.
2010/0084996 A1 4/2010 Van De Sluis et al.
2010/0130053 A1 5/2010 Ziobro
2010/0201267 A1 8/2010 Bourquin et al.
2010/0308735 A1 12/2010 Liu et al.
2011/0021040 A1 1/2011 Garb et al.
2011/0031819 A1 2/2011 Gunwall
2011/0035029 A1 2/2011 Manni et al.
2011/0043034 A1 2/2011 Pien
2011/0124350 A1 5/2011 Sukovic
2011/0140548 A1 6/2011 Hakkarainen et al.
2011/0148309 A1 6/2011 Reid et al.
2011/0178650 A1 7/2011 Picco
2011/0211425 A1 9/2011 Liu
2011/0287665 A1 11/2011 Chien
2012/0021623 A1 1/2012 Gorman
2012/0025717 A1 2/2012 Klusmann et al.
2012/0049639 A1 3/2012 Besore et al.
2012/0060044 A1 3/2012 Jonsson
2012/0063486 A1 3/2012 Yamawaku et al.
2012/0066168 A1 3/2012 Fadell et al.
2012/0088399 A1 4/2012 Perritt
2012/0088493 A1 4/2012 Chen et al.
2012/0094511 A1 4/2012 Sil
2012/0112666 A1 5/2012 Bennette
2012/0139348 A1 6/2012 DuBose
2012/0161973 A1 6/2012 Hsu
2012/0195045 A1 8/2012 King
2012/0239773 A1 9/2012 Blustein et al.
2012/0274219 A1 11/2012 Woytowitz et al.
2012/0286940 A1 11/2012 Carmen et al.
2012/0292174 A1 11/2012 Mah et al.
2012/0302219 A1 11/2012 Vang
2012/0318657 A1 12/2012 Hoffknecht et al.
2013/0010018 A1 1/2013 Economy
2013/0026947 A1 1/2013 Economy et al.
2013/0026953 A1 1/2013 Woytowitz
2013/0040471 A1 2/2013 Gervais
2013/0040489 A1 2/2013 Fang
2013/0045624 A1 2/2013 Snyder
2013/0063042 A1 3/2013 Bora et al.
2013/0147367 A1 3/2013 Cowburn
2013/0155723 A1 6/2013 Coleman
2013/0196535 A1 8/2013 Utz
2013/0226354 A9 8/2013 Ruff et al.
2013/0234534 A1 9/2013 Lin
2013/0240235 A1 9/2013 Higashihama et al.
2013/0257315 A1 10/2013 Restrepo et al.
2013/0260613 A1 10/2013 Misener
2013/0264997 A1 10/2013 Lee et al.
2013/0267116 A1 10/2013 Tin
2013/0270097 A1 10/2013 Cheng
2014/0006660 A1 1/2014 Frei et al.
2014/0028287 A1 1/2014 Brookes
2014/0070959 A1 3/2014 Bhargava et al.
2014/0090865 A1 4/2014 Potucek et al.
2014/0126118 A1 5/2014 Ewing et al.
2014/0166447 A1 6/2014 Thea et al.
2014/0180487 A1 6/2014 Bull
2014/0239843 A1 8/2014 Hoang
2014/0244040 A1 8/2014 Alberth, Jr. et al.
2014/0265883 A1 9/2014 Mortun
2014/0266287 A1 9/2014 Reeder, III
2014/0273618 A1 9/2014 King
2014/0285095 A1 9/2014 Chemel et al.
2014/0308853 A1 10/2014 Colahan et al.
2014/0320312 A1 10/2014 Sager et al.
2014/0334648 A1 11/2014 Wang
2014/0368977 A1 12/2014 Lenny
2015/0035476 A1 2/2015 Frid et al.
2015/0115728 A1 4/2015 Yamamoto et al.
2015/0115801 A1 4/2015 King
2015/0136437 A1 5/2015 Hitchman
2015/0163867 A1 6/2015 Recker et al.
2015/0168931 A1 6/2015 Jin
2015/0189726 A1 7/2015 Spira
2015/0214708 A1 7/2015 Segnit
2015/0228426 A1 8/2015 Romano et al.
2015/0229026 A1 8/2015 Lindmark
2015/0249337 A1 9/2015 Raneri et al.
2015/0253364 A1 9/2015 Hieda et al.
2015/0255932 A1 9/2015 Dicks et al.
2015/0256355 A1 9/2015 Pera et al.
2015/0256665 A1 9/2015 Pera et al.
2015/0295438 A1 10/2015 Herr et al.
2015/0303724 A1 10/2015 Lin et al.
2015/0334676 A1 11/2015 Hart et al.
2015/0351187 A1 12/2015 McBryde et al.
2015/0357133 A1 12/2015 Keirstead et al.
2015/0366039 A1 12/2015 Noori et al.
2015/0373796 A1 12/2015 Bahrehmand
2015/0382436 A1 12/2015 Kelly et al.
2016/0006202 A1 1/2016 Dupuis et al.
2016/0007288 A1 1/2016 Samardzija et al.
2016/0036819 A1 2/2016 Zehavi et al.
2016/0041573 A1 2/2016 Chen et al.
2016/0044447 A1 2/2016 Tetreault et al.
2016/0050695 A1 2/2016 Bichot et al.
2016/0066130 A1 3/2016 Bosua et al.
2016/0125733 A1 5/2016 Sallas et al.
2016/0126031 A1 5/2016 Wootton et al.
2016/0126950 A1 5/2016 Lucantonio
2016/0172808 A1 6/2016 Lauby et al.
2016/0209899 A1 7/2016 Brantner et al.
2016/0212832 A1 7/2016 King
2016/0219728 A1 7/2016 Balyan
2016/0233707 A1 8/2016 Kidakarn
2016/0233605 A1 9/2016 Hernandez Ramirez et al.
2016/0255697 A1 9/2016 Bhide
2016/0255702 A1 9/2016 Thompson
2016/0276946 A1 9/2016 Fuchs et al.
2016/0322754 A1 11/2016 Green
2016/0323972 A1 11/2016 Bora et al.
2016/0337801 A1 11/2016 Houri

(56) References Cited

U.S. PATENT DOCUMENTS

2017/0023963 A1 1/2017 Davis et al.
2017/0025845 A1 1/2017 Platise
2017/0025854 A1 1/2017 Willis et al.
2017/0033566 A1 2/2017 Jursch
2017/0033942 A1 2/2017 Koeninger
2017/0054315 A1 2/2017 Chien
2017/0063008 A1 3/2017 Goyal et al.
2017/0070090 A1 3/2017 Miller
2017/0093105 A1 3/2017 Belinksky et al.
2017/0105176 A1 4/2017 Finnegan et al.
2017/0108236 A1 4/2017 Guan et al.
2017/0148443 A1 5/2017 Hadier et al.
2017/0149180 A1 5/2017 Siegler
2017/0162985 A1 6/2017 Randall et al.
2017/0188442 A1 6/2017 King
2017/0221654 A1 8/2017 Danowski et al.
2017/0223807 A1 8/2017 Recker et al.
2017/0229937 A1 8/2017 Pedersen
2017/0236766 A1 8/2017 Read et al.
2017/0237198 A1 8/2017 Sathyanarayana et al.
2017/0238401 A1 8/2017 Sadwick et al.
2017/0250550 A1 8/2017 Miftakhov et al.
2017/0257096 A1 9/2017 Lark et al.
2017/0257930 A1 9/2017 Lark et al.
2017/0271921 A1 9/2017 Lombardi et al.
2017/0273203 A1 9/2017 Iaconis
2017/0295623 A1 10/2017 Pennycooke
2017/0295624 A1 10/2017 Lark et al.
2017/0295625 A1 10/2017 Lark et al.
2017/0295630 A1 10/2017 Lark et al.
2017/0295631 A1 10/2017 Lark et al.
2017/0310049 A1 10/2017 Derousse
2017/0328777 A1 11/2017 Zeckendorf et al.
2018/0012710 A1 1/2018 Lark et al.
2018/0013428 A1 1/2018 Lark
2018/0014381 A1 1/2018 Lark
2018/0014384 A1 1/2018 Charlton
2018/0014388 A1 1/2018 Pennycooke et al.
2018/0014390 A1 1/2018 Aylward et al.
2018/0014391 A1 1/2018 Lark et al.
2018/0014392 A1 1/2018 Charlton et al.
2018/0014393 A1 1/2018 Cheung et al.
2018/0048710 A1 2/2018 Altin
2018/0070424 A1 3/2018 Lark et al.
2018/0070429 A1 3/2018 Lark
2018/0070430 A1 3/2018 Edwards et al.
2018/0070431 A1 3/2018 Charlton et al.
2018/0107187 A1 4/2018 Singh
2018/0109999 A1 4/2018 Finnegan
2018/0168900 A1 6/2018 McNeely et al.
2018/0175600 A1 6/2018 Holloway
2018/0210538 A1 7/2018 Aimone
2018/0233006 A1 8/2018 Koniarek et al.
2018/0302235 A1 10/2018 Cregg et al.
2018/0316189 A1 11/2018 Mozayeny
2018/0337495 A1 11/2018 Martinez
2018/0356964 A1 12/2018 Morris
2018/0359873 A1 12/2018 Shemirani
2018/0375313 A1 12/2018 Misener et al.
2018/0375342 A1 12/2018 Sultenfuss et al.
2019/0027876 A1 1/2019 Murahari et al.
2019/0069419 A1 2/2019 Li
2019/0081445 A1 3/2019 Kuhn et al.
2019/0171413 A1 6/2019 Beatty et al.
2019/0199545 A1 6/2019 Ard et al.
2019/0229478 A1 7/2019 Iaconis et al.
2019/0252814 A1 8/2019 Richardson et al.
2019/0282016 A1 9/2019 Long et al.
2019/0386468 A1 12/2019 Ewing et al.
2020/0006023 A1 1/2020 Qureshi et al.
2020/0006886 A1 1/2020 Chen
2020/0006948 A1 1/2020 Wootton et al.
2020/0036141 A1 1/2020 Smith et al.
2020/0044381 A1 2/2020 Stremlau et al.
2020/0143667 A1 5/2020 Zimmer
2020/0144007 A1 5/2020 Shivell
2020/0194980 A1 6/2020 Roosli et al.
2020/0195015 A1 6/2020 Chien
2020/0203905 A1 6/2020 Parks
2020/0220292 A1 7/2020 Audy
2020/0228954 A1 7/2020 Bosua et al.
2020/0249785 A1 8/2020 Anadasu
2020/0328586 A1 10/2020 Ericksen et al.
2021/0048910 A1 2/2021 Anadasu et al.
2021/0104855 A1 4/2021 Bayard et al.
2021/0164227 A1 6/2021 Zhou et al.
2021/0173364 A1 6/2021 Telefus et al.
2021/0184443 A1 6/2021 Rohmer
2021/0212185 A1 7/2021 Diesel et al.
2021/0263111 A1 8/2021 Magno
2021/0285258 A1 9/2021 Leigh
2021/0288434 A1 9/2021 Ramsey et al.
2021/0305759 A1 9/2021 Bhakta et al.
2021/0313733 A1 10/2021 Martin et al.
2021/0344182 A1 11/2021 Fernandez
2021/0211121 A1 12/2021 Petry
2021/0391803 A1 12/2021 Martinez et al.
2021/0399574 A1 12/2021 Wiggins et al.
2022/0037861 A1 2/2022 McKimmey
2022/0045464 A1 2/2022 Leahy
2022/0115189 A1 4/2022 Gumina et al.
2022/0131540 A1 4/2022 Veskovic
2022/0149571 A1 5/2022 Codreanu et al.
2022/0171355 A1 6/2022 Jahan et al.
2022/0199344 A1 6/2022 Yang
2022/0201825 A1 6/2022 Cohen et al.
2022/0209821 A1 6/2022 Eriksen et al.
2022/0232689 A1 7/2022 Shurte et al.
2022/0247408 A1 8/2022 Bacchin et al.
2022/0279665 A1 9/2022 McDonald
2022/0297558 A1 9/2022 Daoura et al.
2022/0313370 A1 10/2022 Morgan et al.
2022/0320808 A1 10/2022 Armstrong
2022/0337049 A1 10/2022 Brower et al.
2022/0342373 A1 10/2022 Ho et al.
2022/0344883 A1 10/2022 Misener et al.
2022/0385063 A1 12/2022 Protzman et al.
2022/0408169 A1 12/2022 Ebeling et al.
2023/0034501 A1 2/2023 Pinkowski et al.
2023/0036482 A1 2/2023 Altonen et al.
2023/0070789 A1 3/2023 Kearney et al.
2023/0075542 A1 3/2023 Padro et al.
2023/0125152 A1 4/2023 Eriksen et al.
2023/0209756 A1 6/2023 Brower et al.
2023/0231410 A1 7/2023 Nakada et al.
2023/0236554 A1 7/2023 Godfrey et al.
2023/0297048 A1 9/2023 Larson

FOREIGN PATENT DOCUMENTS

CN 104934796 9/2015
DE 102011054357 4/2013
IN 1960CHE2012 11/2013
IN 201914042059 4/2020
JP 2014053239 3/2014
KR 100801042 11/2006
KR 101174730 8/2012
KR 10-1790779 11/2017
KR 20170068580 11/2017
KR 101995664 2/2019
WO 09832208 7/1998
WO 2002052703 7/2002
WO 2005078871 8/2005
WO 2013012170 1/2013
WO 2014047634 3/2014
WO 2017178680 4/2017
WO 2018219748 6/2018
WO 2020144669 7/2020
WO 2020146046 7/2020
WO 2021056100 4/2021
WO 2022046860 3/2022
WO 2022266230 12/2022

(56) References Cited

FOREIGN PATENT DOCUMENTS

OTHER PUBLICATIONS

Deako Switch Brochure, published 2015.
Amazon Echo Flex Sales Brochure, published 2019.
U.S. Appl. No. 15/645,699, filed Jul. 10, 2017.
My Q Chamberlain Smart Light Switch Brochure, published 2017.
Ecobee Switch Brochure, Lighting that's so Smart, It's Brilliant, published 2019.
U.S. Appl. No. 15/645,618, filed Jul. 10, 2017.
Lutron Installation Instructions for Receptacles for Dimming Use, published 2007.
Intermatic Ascend Timer Installation and Operation Manual, published 2018.
Decora Universal Dimmer Frequently Asked Questions, published 2017.
Lutron Maestro CL PRO Dimmer, P/N 0301946 Rev A, 2019.
Leviton Decora 3-Way Dimmer and Universal Matching Remote (DDR00R-DLZ) Installation Instructions, 2019.
Leviton Decora Slide Dimmer, Cat. No. IPL06 Installation Instructions, published 2011.
Leviton Decora Smart Second Generation Dimmer, Cat. No. D26HD Getting Started Guide, published 2021.
Leviton Single Pole, 3-Way Slide Dimmer,Cat. No. 6674-P Install Instructions, published 2011.
Leviton Decora Single Pole and 3-Way LED Dimmer Cat. No. DDM06-1L Installation Instructions, 2020.
Lutron Caseta Wireless Advanced Instruction Guide, Mar. 2020.
Leviton Decora Single Pole and 3 Way Wide View Motion Activated Light Control, Cat. No. IPS15, IPV15 published 2012.
Jasco GE Enbrighten Smart Switch P/N 46201, date 2019.
Meross Smart Wi-Fi Dimmer/3-Way P/N MSS 570MA and 570AD date 2020.
Feit Smart Wi-Fi Dimmer P/N DIM/WIFI, date 2022.
Jasco GE Enbrighten Zigbee Smart Dimmer P/N 46203, date 2019.
Leviton Motion Sensor Remote P/N IPVOR, date 2017.
Jasco GE Enbrighten Add-On Switch P/N 46199, date 2019.
Leviton Decore Matching Remote P/N DOOR-DL, date 2019.
Deako_Backplate and Simple Switch Instruction Guide, published 2020.
Backplate_Wiring_Instructions_Deako_Support, published 2018.
Smart_Dimmer_Guides_Deako_Support, published 2018.
Smart_Switch_Guides_Deako_Support, published 2018.
Motion_Sensor_Timer_Guide_Deako_support, published 2018.
Scene_Controller_Guides_Deako_Support, published 2018.
Philips Hue Wall Switch Module, Personal Wireless Lighting, Mar. 2021.
Anchor by Panasonic, Vision Product Brochure, 2013.
PowerTech Smart Wall CES 2020 Innovation Awards, 2019.
Himel Click Series Catalog, 2016.
Himel Click Series 2 Gang Socket brochure, 2016.
U.S. Appl. No. 16/805,717, entitled "A Power Switch Having a Voice Activated User Interface," filed Feb. 29, 2020 and having a priority date of Nov. 28, 2016.
Brinks Home Office 441074B Timer, published Mar. 2010.
Control4 Squared Wired Configurable Keypad V2, published 2016.
Decora Wired Keypad Data Sheet Control C4-KCB, published 2014.
Legrand AlphaRex 3 The New Generation, published May 2016.
Legrand Pass & Seymour Specification Grade Self-test GFCIs, published Dec. 2015.
Legrand Pass & Seymour Tamper-Resistant Duplex Outlet with Nightlight, published May 2014.
Legrand Time Switches and Modular Control Devices, published May 2016.
Leviton Renu Color Change Instructions, published 2010.
Lutron Energi TriPak, published Nov. 2014.
WiFi Smart Plug, Mini Outlets Smart Socket No Hub Required Timing Function Control Your Electric Devices from Anywhere, published 2017.
WiFi Smart Power Strip, Conico Smart Surge Protector with 4 USB Ports and 4 Smart AC Plugs, published 2017.
GE Smart Digital Timer, published Jul. 2010.
GE Digital Time Switch, published Nov. 24, 2009.
SmartLink-INSTEON Smarthome, published Aug. 27, 2008.
Schlage LiNK RP200 Light Module User Manual, published Mar. 2009.
Brinks 44-1074 Timer User Manual, published 2010.
Swidget outlet WiFi-USB Charger, published Jul. 2017.
Swidget Switch First Modular Dimmable Wall Switch, published Jul. 2019.
Intermatic SS8 User Manual, published Sep. 13, 2002.
Intermatic EJ500C User Manual, published Aug. 3, 2004.
Lutron Caseta Discover the Power of Smart Lighting, published Nov. 2017.
Sylvania Model SA135, published 2010.
GE SunSmart Digital Timer published 2010.
A System for Smart-Home Control of Appliances Based on Timer and Speech Interaction, Jan. 2006.
GE Touchsmart In-Wall Digital Timer, published 2014.
Noon home Lighting System, published Oct. 2017.
Leviton Split Duplex Receptacle, published 2017.
Leviton Plug-in Outlet with Z-Wave Technology, published 2017.
Heath/Zenith Motion Sensor Light Control, published 2012.
Leviton Load Center Brochure, published 2019.
Sylvania SA 170 User Manual, published Aug. 17, 2005.
GE Wireless Lighting Control 45631 Keypad Controller User Manual, published Apr. 2010.
Decora Preset Slide & Rotary Controls, published 2014.
PCT Communication in Cases for which No Other Form is Applicable, PCT/US2022/048393, Dec. 13, 2023.
PCT US 2022/0448393 International Search Report, Written Opinion and cited References, Feb. 17, 2023.
Wikipedia contributors "Junction box." The Free Encyclopedia. Wikipedia. The Free Encyclopedia, Apr. 17, 2024. Web. Apr. 26, 2024. (Year:2024).

* cited by examiner

IN-WALL POWER ADAPTER HAVING A SWITCH AND A RECESS ADAPTED TO RECEIVE A CONTROL MODULE

PRIORITY

Applicant claims priority to U.S. Application 63/414,022, filed Oct. 7, 2022, U.S. Application 63/397,853, filed Aug. 14, 2022, U.S. Application 63/351,397, filed Jun. 12, 2022, U.S. Application 63/295,808, filed Dec. 31, 2021, U.S. Application 63/275,584, filed Nov. 4, 2021, U.S. Application 63/275,420, filed Nov. 3, 2021, the entire applications of which are incorporated herein by reference.

TECHNICAL FIELD

An embodiment of the present invention relates generally to power adapters, and methods of implementing power adapters and control modules.

BACKGROUND

Power adapters, such as switches which control the application of power to a load (e.g., a light or other appliance), are an important part of any residential or commercial building and can provide beneficial control of a load attached to the power adapter, such as timing control, motion detection, and dimming for example. As power adapters continue to advance, additional functionality may be available to a user. However, replacing a power adapter can come with significant expense. In addition to the cost of the replacement power adapter, it may be necessary to pay for the professional installation of the replacement power adapter, such as in the case of an in-wall power adapter that is coupled to wires of a junction box in a wall of a building, such as a residential building or a commercial building, as will be described in reference to FIG. 1. For many homeowners who attempt to replace a power adapter rather than have an electrician replace the power adapter, the homeowner may face a risk of shock or other bodily harm during the installation process, or improperly install a power adapter that may pose a risk to a user of the power adapter in the future.

In the case of new construction, and particularly a new residential construction, a purchaser (or a builder in the case of a home that is built without input from a purchaser of the home) may not know where the different types of power adapters should be initially placed. Further, it may not be until after living in the home for a period of time that a homeowner may have a better idea where certain types of power adapters should be placed. The homeowner would then have to change some power adapters, and therefore incur additional time and effort (or incur additional time and cost if the homeowner relies upon an electrician) to change the power adapters. Such a need to change power adapters may be particularly frustrating for the homeowner, who, having spent money in the purchase of the new home and spent considerable time during the planning and move-in process, may now have to spend additional money and time to fix a problem. That is, a homeowner may not appreciate the additional cost and time to make improvements to a home that they may have already invested considerable money and time in planning. While the homeowner may decide to delay any changes of power adapters in their home to avoid the additional cost and time, such a delay may lead to dissatisfaction with their homebuilder or the purchase of their new home.

In addition to the inconvenience of having to change switches and outlets with ones that have different features, homeowners want to have a variety of options available to them. However, such a variety may result in manufacturers or distributors having to maintain a large inventory of devices. Such an inventory can be costly to the manufacturer, the distributors, and even home builders. Such costs can lead to reduced options in the market, and dissatisfied homeowners. That is, many homeowners may not be able to install devices that they wish to install.

Further, 3-way power control arrangements, 4-way power control arrangements, or other multi-switch power control arrangements are commonly used in both residential and commercial buildings. Multi-switching arrangements, such as 3-way or 4-way switching arrangements, provide additional challenges in terms of inventory for manufacturers, distributors and builders, and flexibility for homeowners to install different features in switch locations. In a 3-way or 4-way power control arrangement, it is necessary for a switch in any location of the 3-way or 4-way power control arrangement to control the application of power to a load. Conventional switches in 3-way power control arrangement may be the same devices that are designed for 3-way switching. However, the use of the same type of switch in a 3-way switching arrangement may limit the functionality of the 3-way switching arrangement. In a 4-way switching arrangement, a dedicated 4-way switch used as the middle switch in the arrangement may be different than the 3-way switches used in the other locations. However, the dedicated 4-way switching device having a double pole, double throw switch may have limited capability.

In multi-switch power control arrangements having different types of switches that communicate over a traveler line between the switches, different switches may be required, which may restrict the functionality of the switches in the power control arrangement. For example, in a 3-way power control arrangement, different types of switches may be implemented on the load side and the line side of the 3-way power control arrangement, where one of the switches may operate as a master switch for example. Such an arrangement requires the stocking of different types of switching devices and the placement of the correct type of the switching devices during construction of the commercial or residential facility, with little flexibility for the user of the device.

Accordingly, circuits, devices, arrangements and methods that enable a user such as a homeowner or other building owner to easily and efficiently implement different power adapters are beneficial.

SUMMARY

An in-wall power adapter adapted to receive a voltage is described. The in-wall power adapter may comprise a first plurality of contact elements comprising a first contact element adapted to receive a line voltage signal, a second contact element adapted to receive a neutral voltage, a third contact element adapted to receive a ground voltage, and a fourth contact element adapted to receive a communication signal; a recess adapted to receive a control module; a switch having a first terminal coupled to receive the line voltage; and a second plurality of contact elements associated with the recess and comprising a fifth contact element adapted to receive the communication signal.

Another in-wall power adapter adapted to receive a voltage may comprise a first plurality of contact elements comprising a first contact element adapted to receive a line voltage, a second contact element adapted to receive a neutral voltage, a third contact element adapted to receive a ground voltage, and a fourth contact element adapted to a load; a recess adapted to receive a control module; a second plurality of contact elements associated with the recess and comprising a fifth contact element coupled to the first contact element, a sixth contact element coupled to the second contact element; and a switch having a first terminal coupled to receive a second voltage by way of a seventh contact element of the second plurality of contact elements and a second terminal coupled to provide the second voltage to a seventh contact element of the second plurality of contact elements.

A method of implementing an in-wall power adapter is described. The method comprised providing a first plurality of contact elements comprising a first contact element adapted to receive a line voltage signal, a second contact element adapted to receive a neutral voltage, a third contact element adapted to receive a ground voltage, and a fourth contact element adapted to receive a communication signal; providing a recess adapted to receive a control module; coupling a first terminal of a switch to the line voltage; and providing a second plurality of contact elements associated with the recess and comprising a fifth contact element adapted to receive the communication signal.

BRIEF DESCRIPTION OF THE DRAWINGS

FIG. 120 is a block diagram of a 3-way switching arrangement having a dimmer circuit on a load side power adapter.

FIG. 121 is an expanded view showing a power adapter arrangement having a standard outlet control module and a wall plate.

FIG. 122 is an expanded view of a standard outlet control module.

FIG. 123 is an expanded view showing the back of a standard outlet control module of FIG. 122 where a latch of the standard outlet control module is separated from the housing module.

FIG. 124 is an expanded view showing the back of the standard outlet control module of FIGS. 122 and 123.

FIG. 125 is an expanded view showing a power adapter having an outlet.

FIG. 126 is an expanded view showing a power adapter arrangement having a switch and a cover and a wall plate.

FIG. 127 is a rear view of the cover of FIG. 126.

FIG. 128 is a front perspective view of the power adapter having a switch of FIG. 126.

FIG. 129 is an expanded view of the power adapter of FIG. 129.

FIG. 130 is an expanded view of the contact arrangement 12910 of FIG. 129.

FIG. 131 is an expanded view another power adapter having a switch and a cover.

Figure 131:
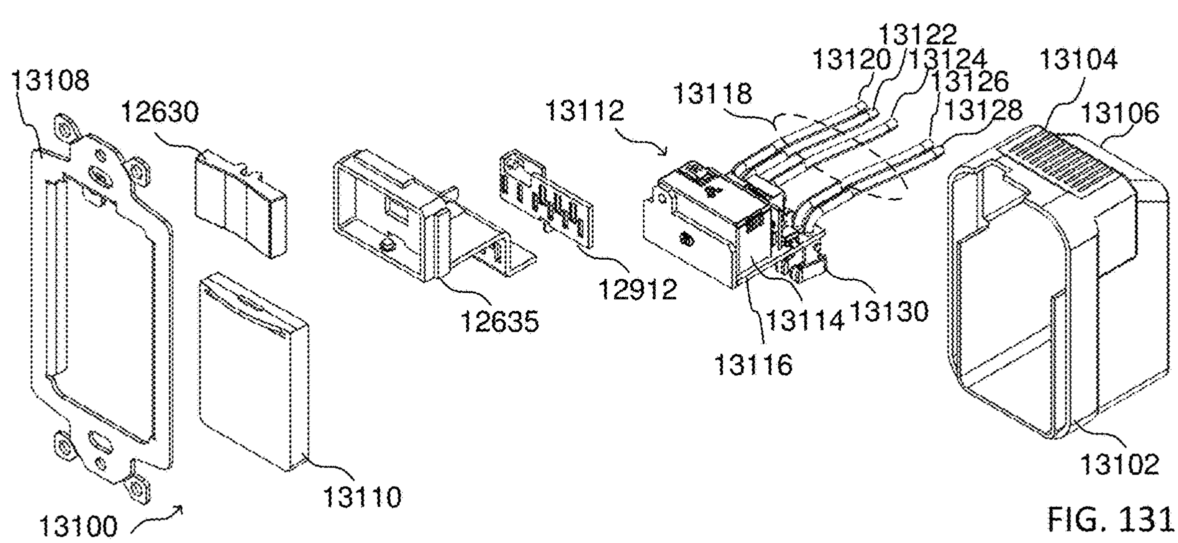
Figure 132:
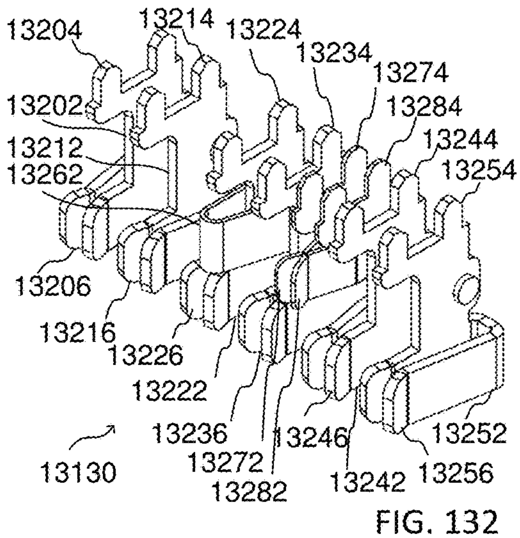

FIG. 132 is a perspective view showing the connector arrangement 13130 of the power adapter of FIG. 131.

Figure 133:
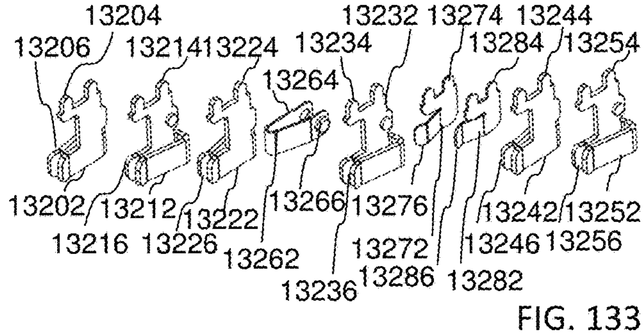

FIG. 133 is an expanded view showing the connector arrangement 13130 of FIG. 132.

Figure 134:
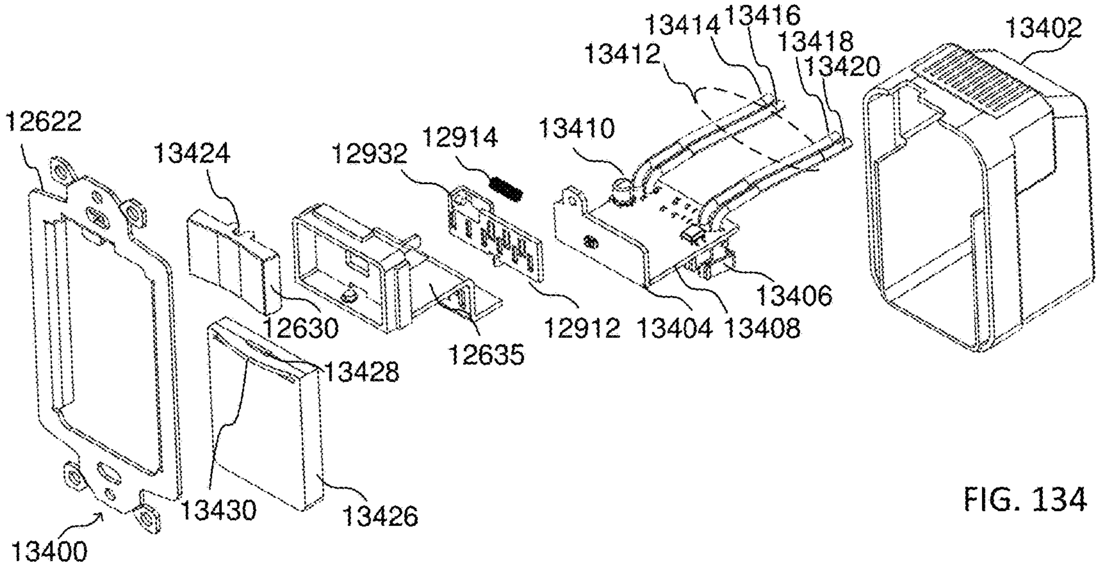

FIG. 134 is an expanded view showing another power adapter arrangement having a cover.

Figure 135:
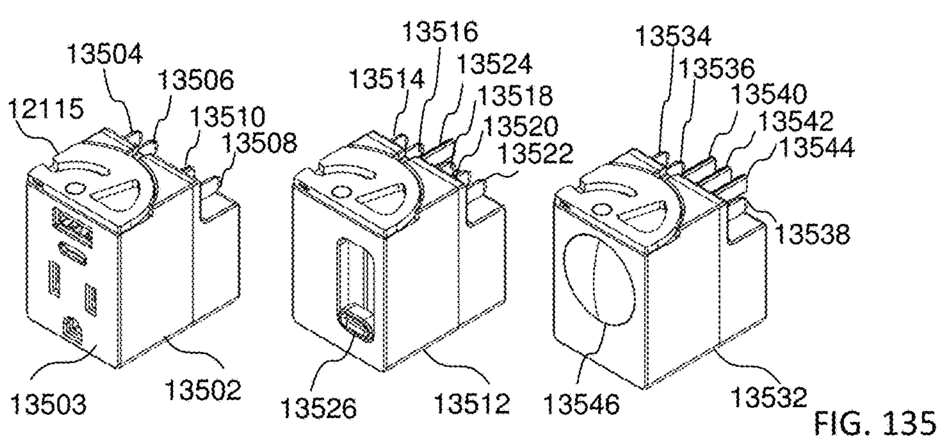

FIG. 135 is a perspective view of the front of 3 different types of control modules having different contact arrangements.

Figure 136:
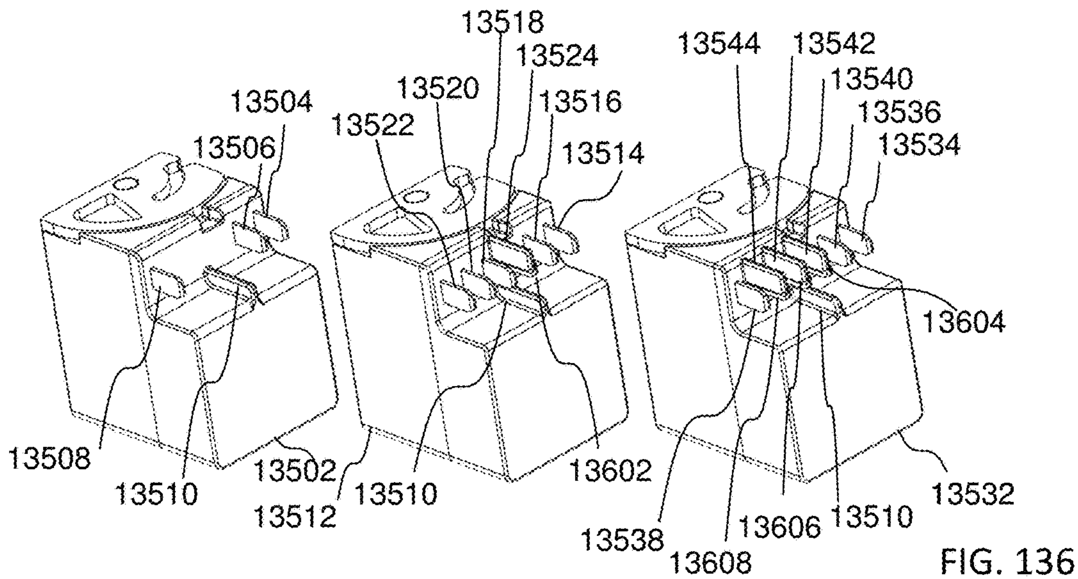

FIG. 136 is a perspective view of the back of the 3 different types of control modules of FIG. 135.

Figure 137:
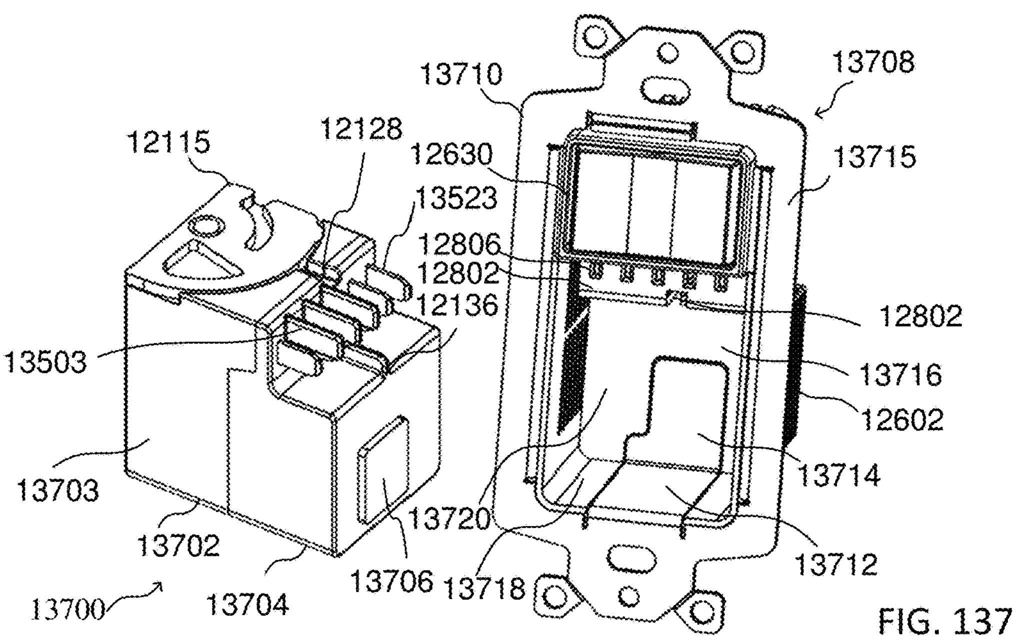

FIG. 137 is a perspective view of a power adapter arrangements having a thermal connection between the power adapter and the control module.

Figure 138:
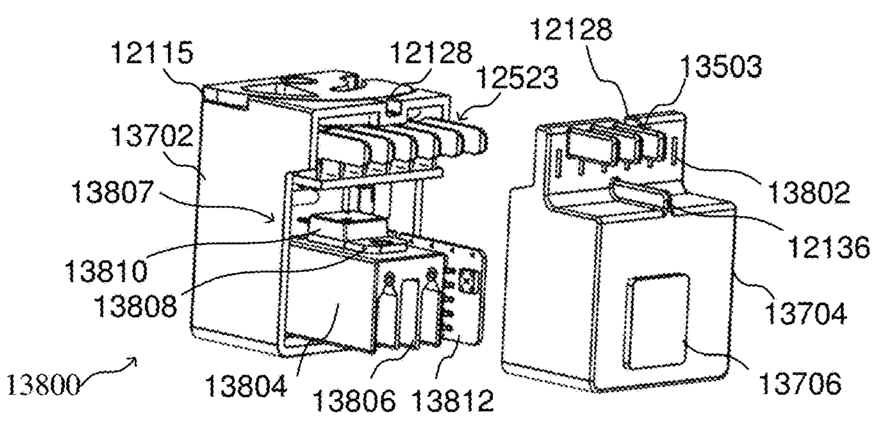

FIG. 138 is an expanded view of the control module 13702 as shown from the rear of the control module.

Figure 139:
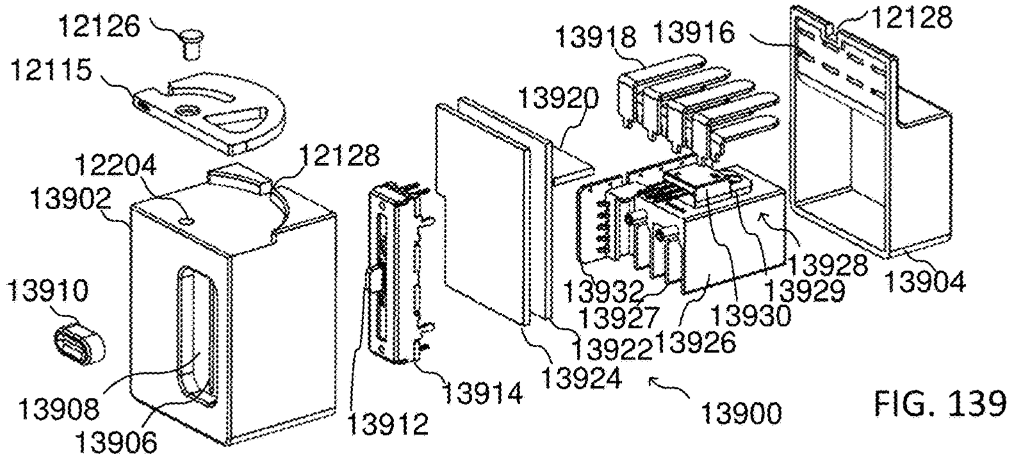

FIG. 139 is an expanded view of another control module 13900 from the front.

Figure 140:
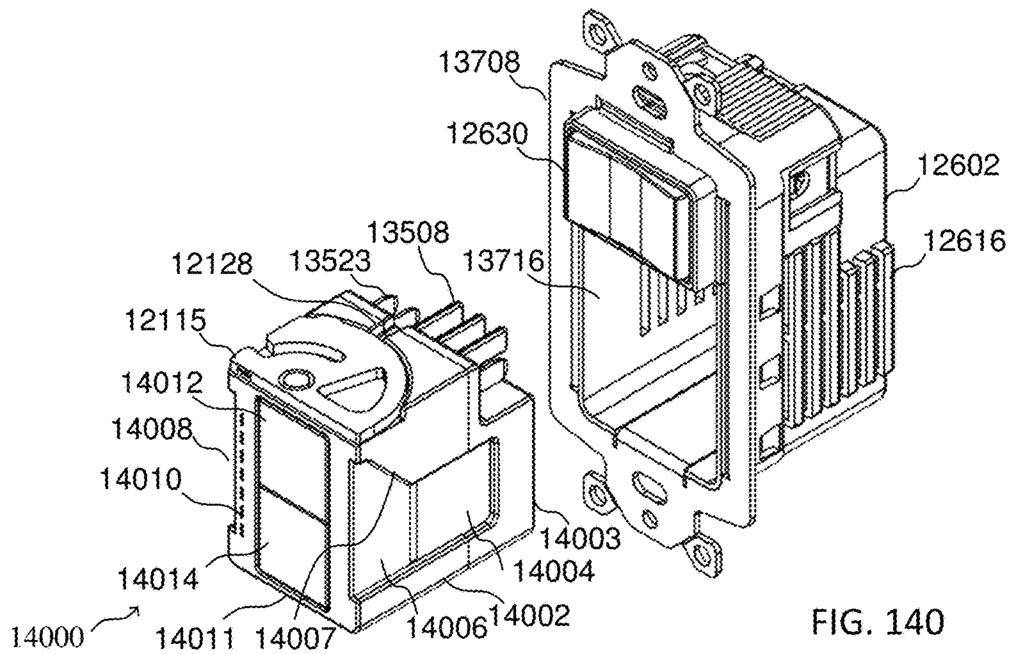

FIG. 140 is a perspective view of a power adapter arrangement having a control module that allows venting of heat to the front face.

Figure 141:
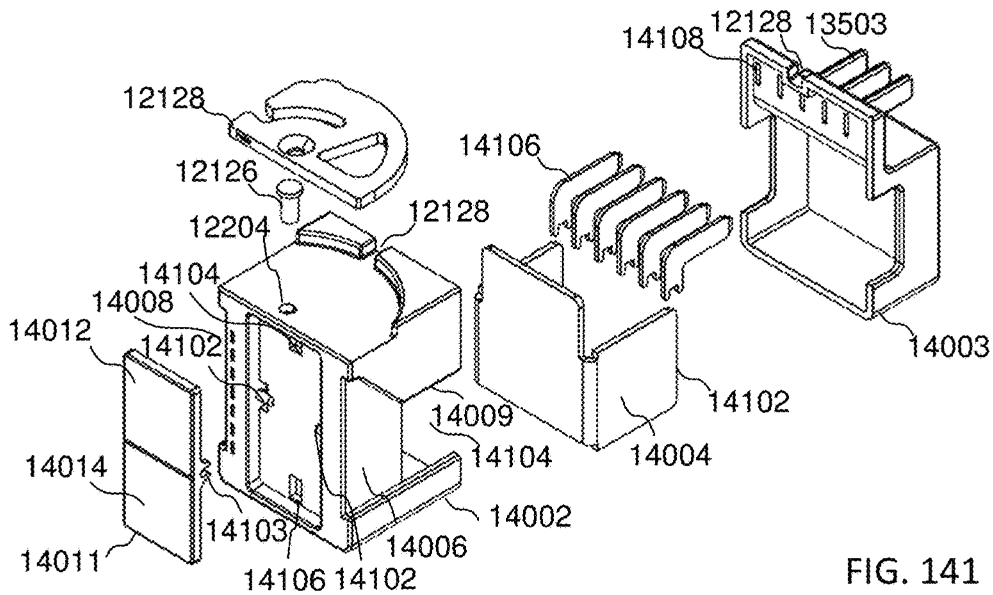

FIG. 141 is an expanded view of the control module 14002.

Figure 142:
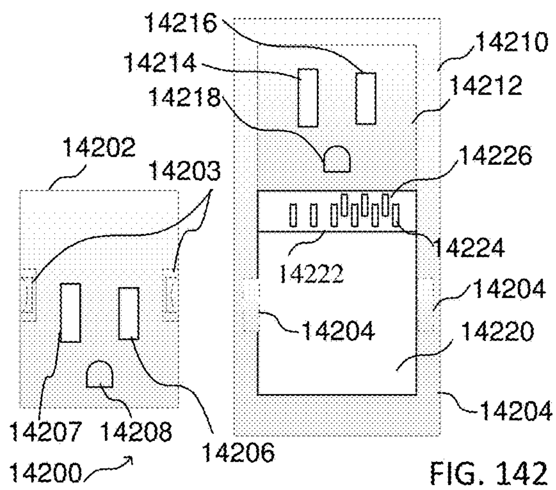

FIG. 142 is a front perspective view of a power adapter arrangement comprising a power adapter having an outlet and a control module having an outlet.

Figure 143:
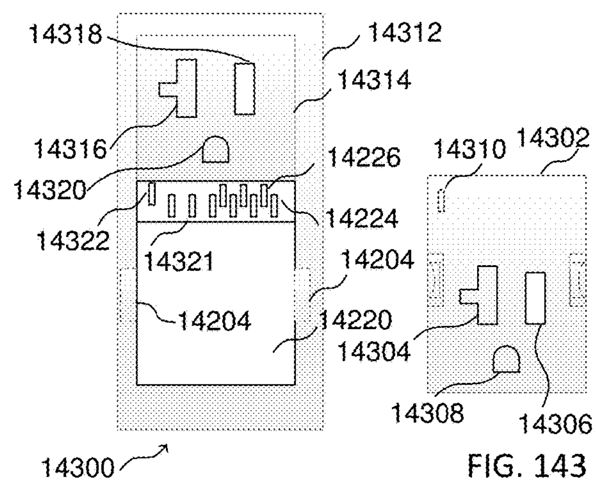

FIG. 143 is a front perspective view of a power adapter arrangement comprising a power adapter having a 20 ampere outlet.

Figure 144:
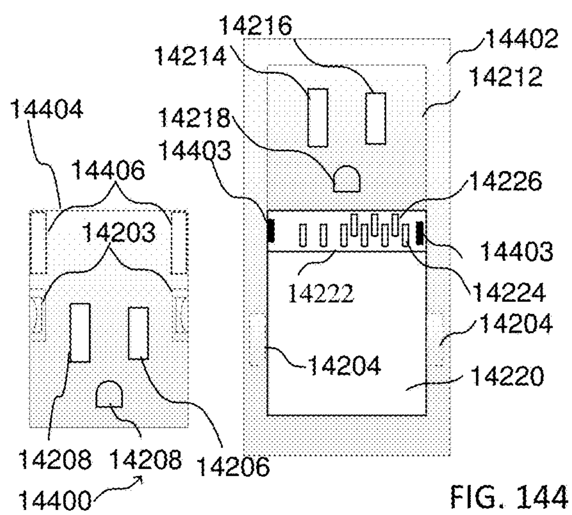

FIG. 144 is a front perspective view of power adapter arrangement having a keying function.

Figure 145:
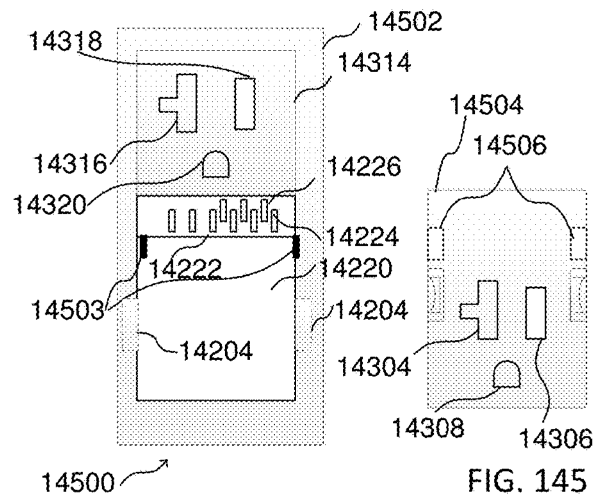

FIG. 145 is a front perspective view of a power adapter arrangement including a power adapter having a 20 ampere outlet and having a keying function.

Figure 146:
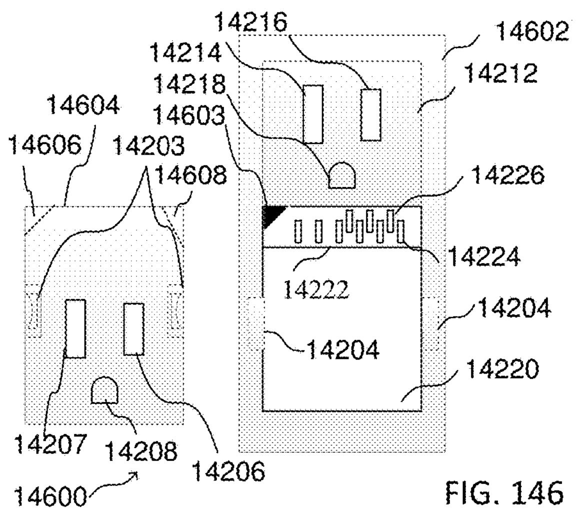

FIG. 146 is a front perspective view of another power adapter arrangement having a keying function.

Figure 147:
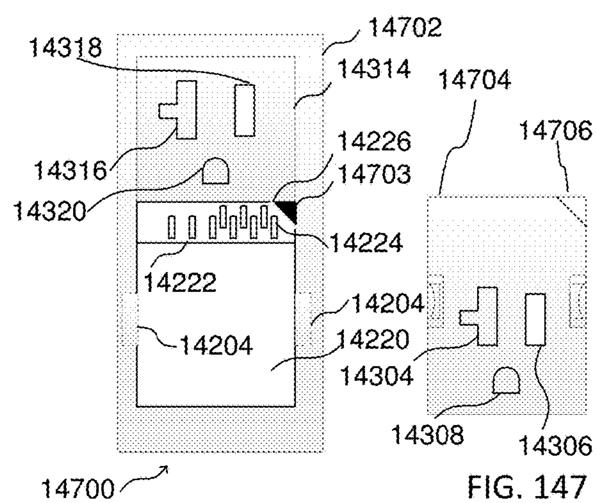

FIG. 147 is a front perspective view of another power adapter arrangement including a power adapter having a 20 ampere outlet and having a keying function.

Figure 148:
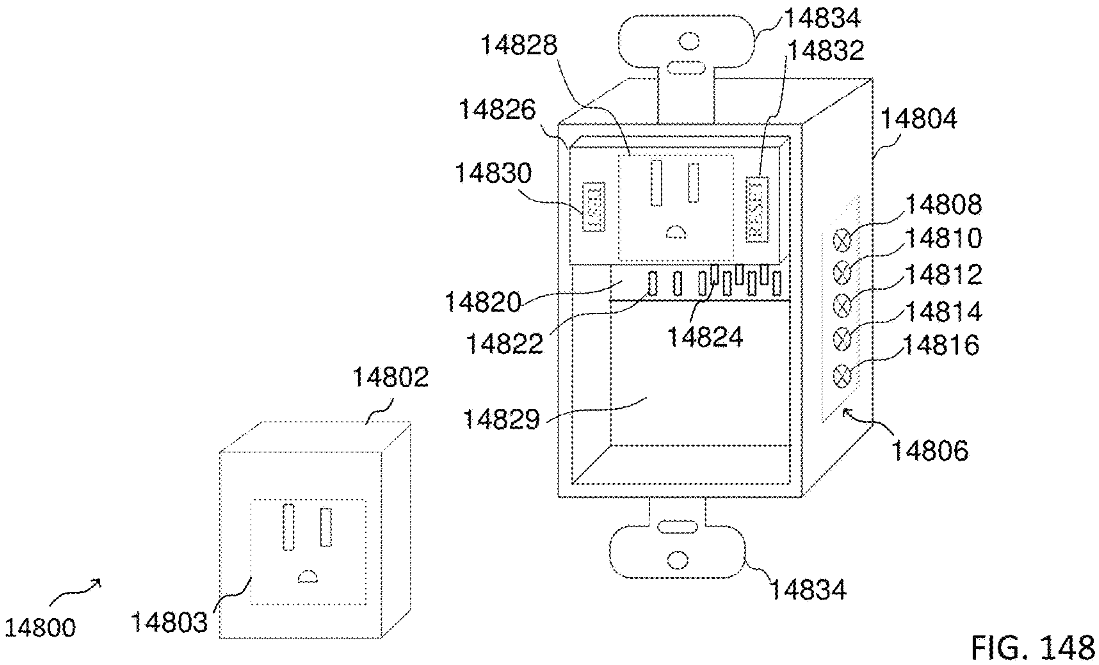

FIG. 148 is a perspective view of a power adapter arrangement having a ground fault circuit interrupter (GFCI) circuit in the power adapter.

Figure 149:
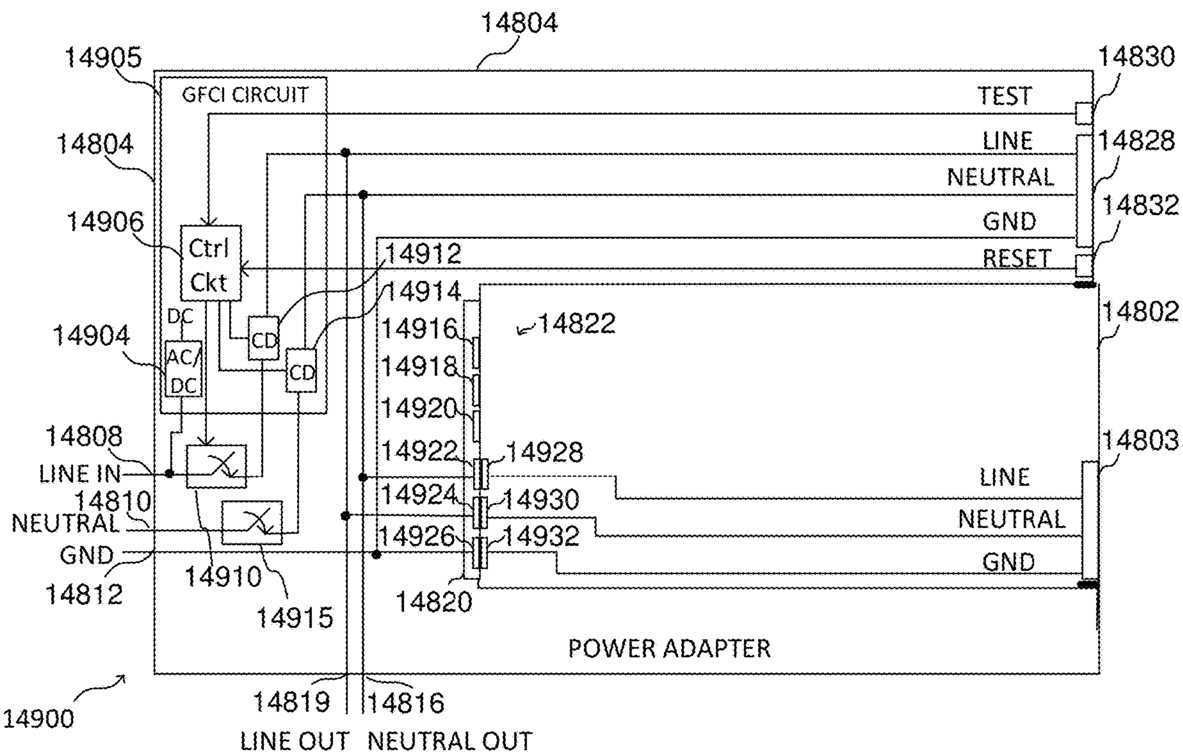

FIG. 149 is a block diagram of the power adapter arrangement of FIG. 148.

Figure 150:
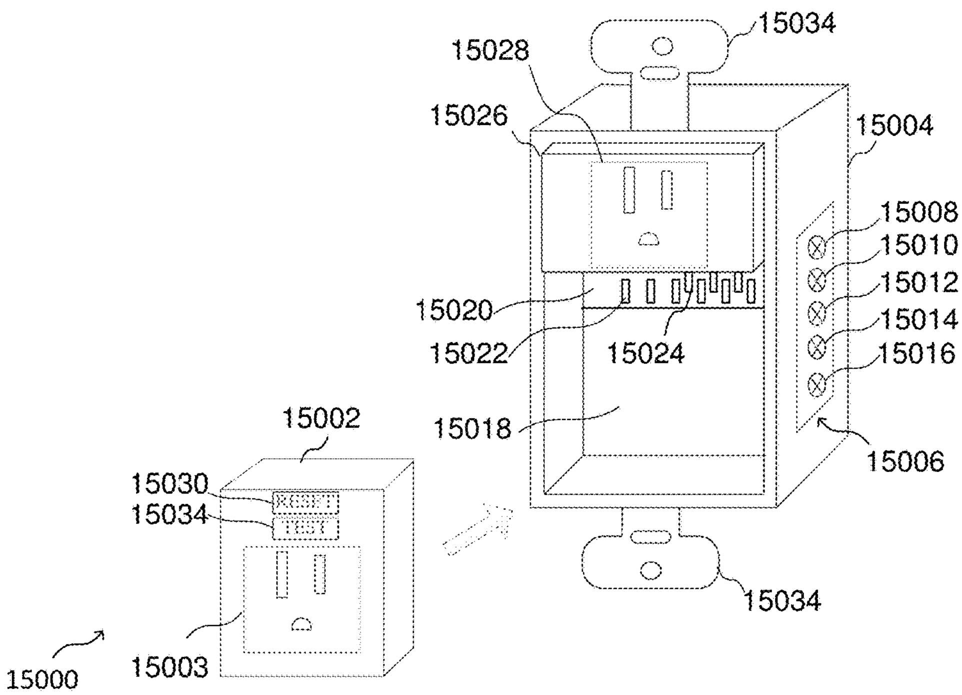

FIG. 150 is a perspective view of a power adapter arrangement having a control module that comprises a GFCI circuit.

Figure 151:
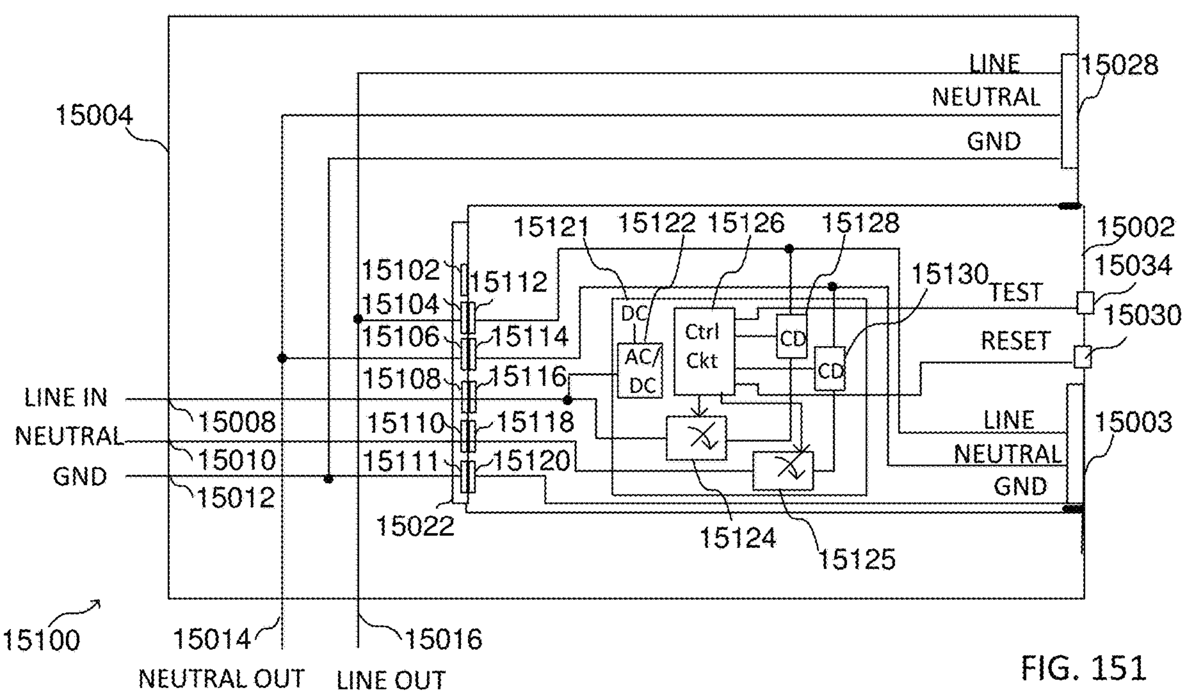

FIG. 151 is a block diagram of the power adapter arrangement of FIG. 150.

Figure 152:
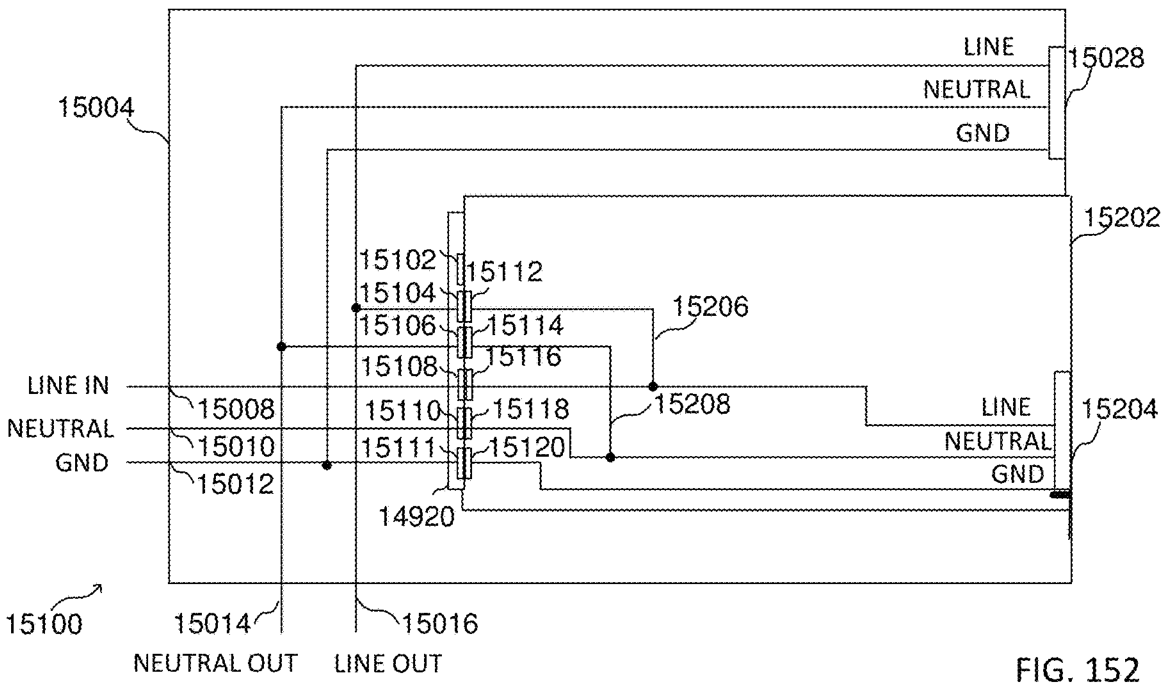

FIG. 152 is a block diagram of a power adapter arrangement having a standard outlet in the power adapter of FIG. 150.

Figure 153:
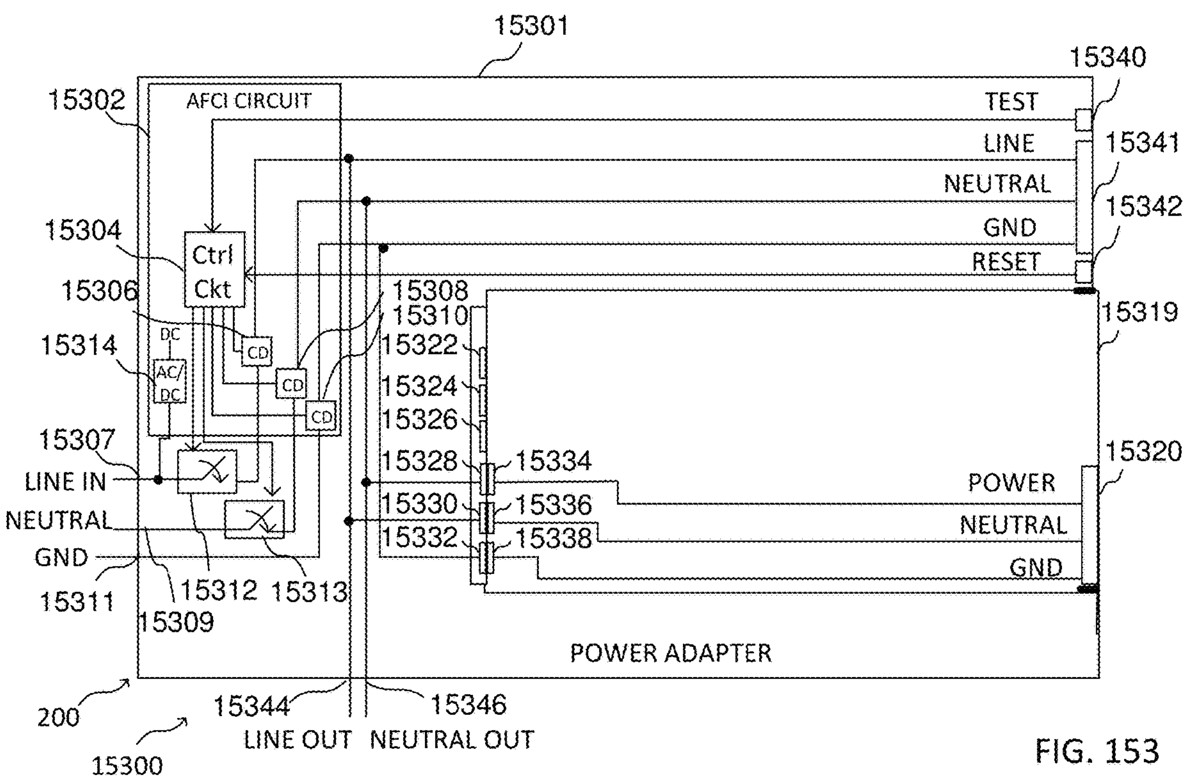

FIG. 153 is a block diagram of a power adapter arrangement having an arc fault interrupter circuit (AFCI).

Figure 154:
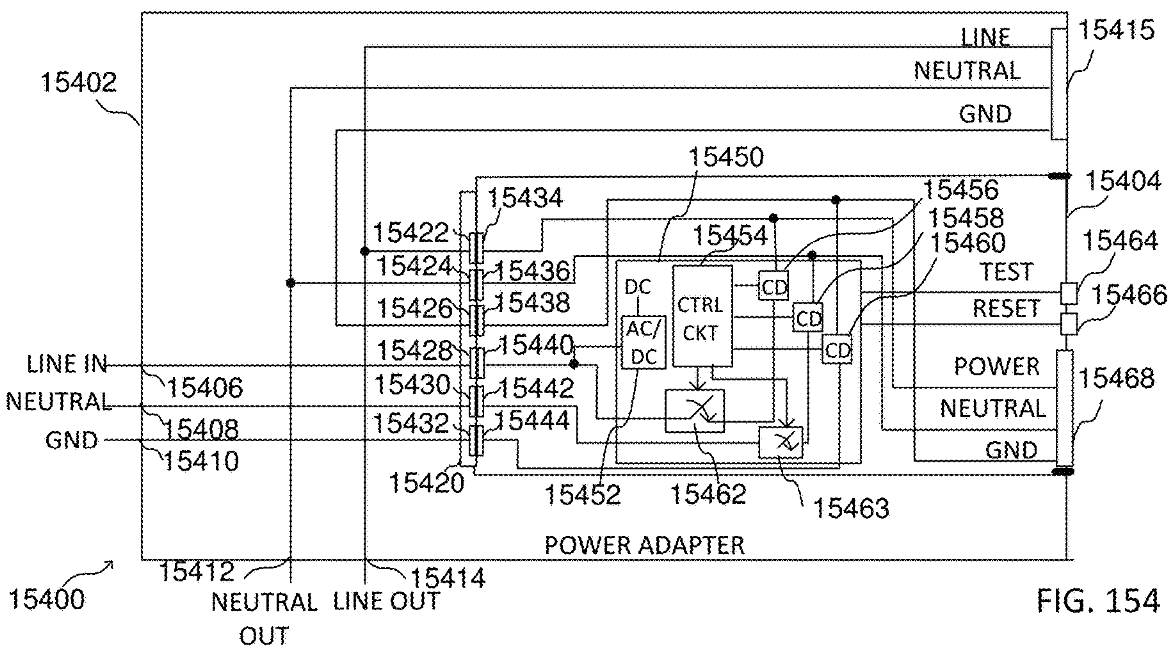

FIG. 154 is a bock diagram of a power adapter arrangement where the control module has an arc fault interrupter circuit.

Figure 155:
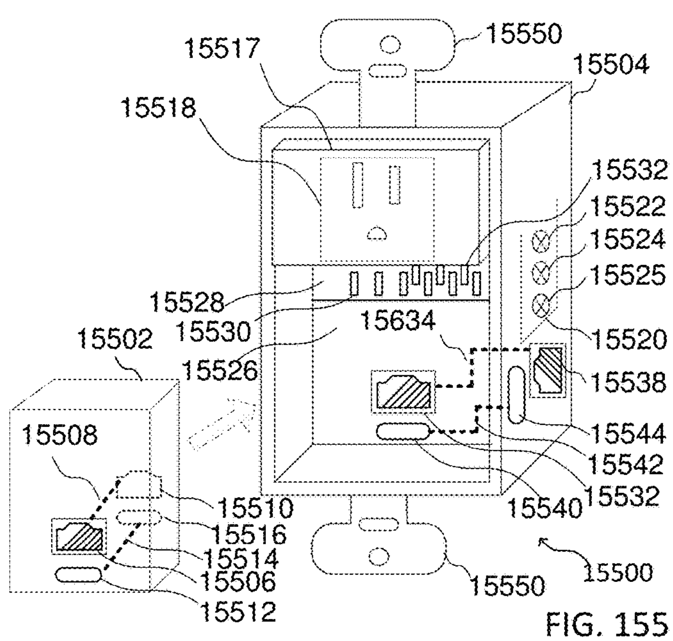

FIG. 155 is a perspective view of a power adapter arrangement having a control module having a data connection.

Figure 156:
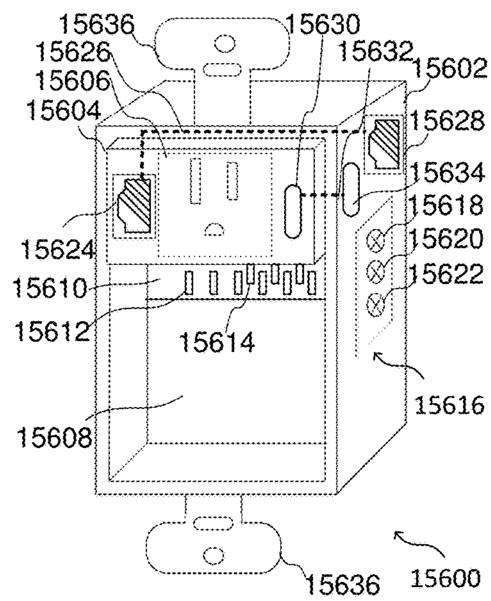

FIG. 156 is a perspective view of a power adapter having a power adapter comprising a data connection.

Figure 157:
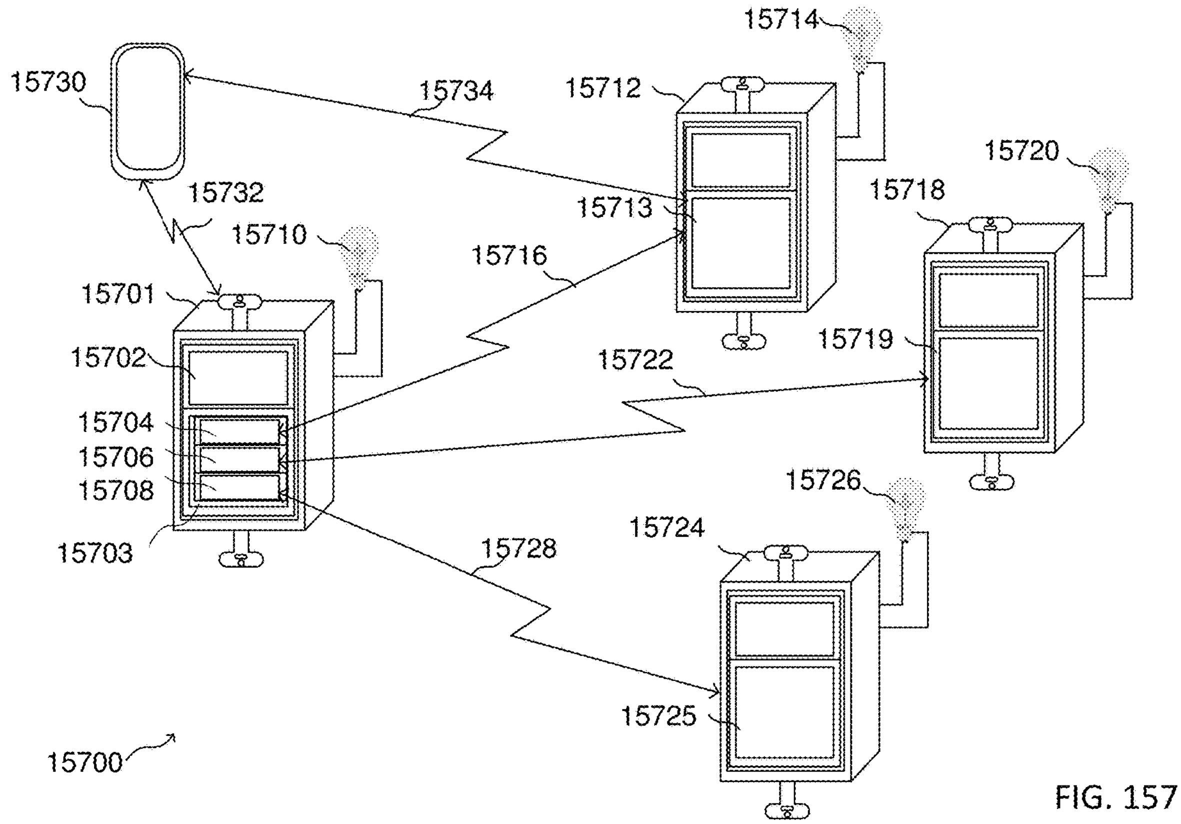

FIG. 157 is a perspective view of control module having a plurality of actuators for controlling a plurality of circuits.

Figure 158:
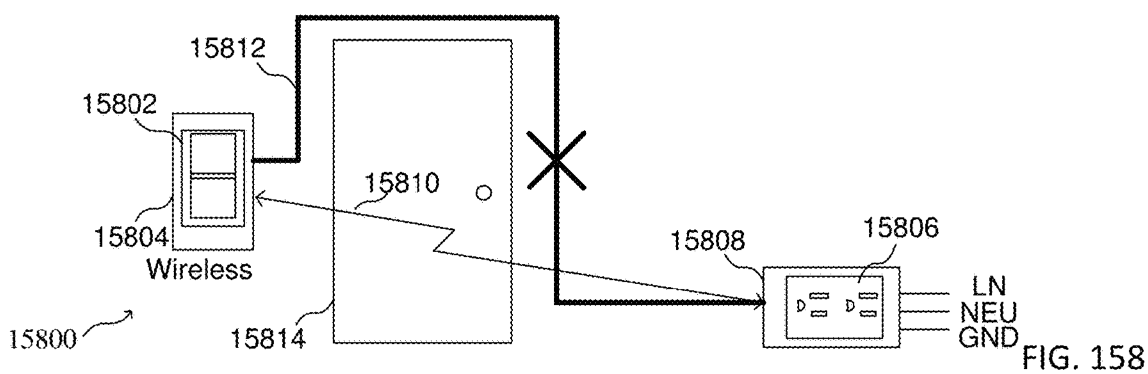

FIG. 158 is a plan view showing an elimination of wiring associated with a switched outlet.

Figure 159:
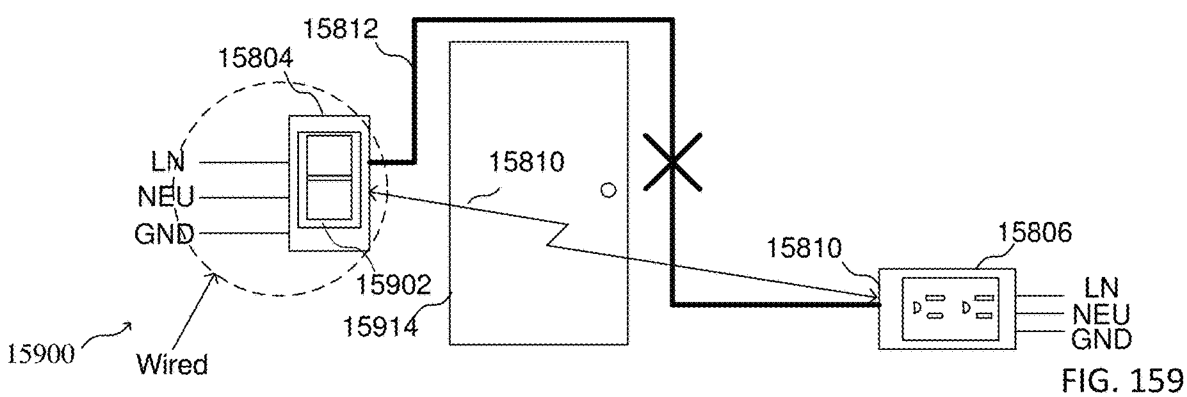

FIG. 159 is another plan view of showing an elimination of wiring associated with a switched outlet.

Figure 160:
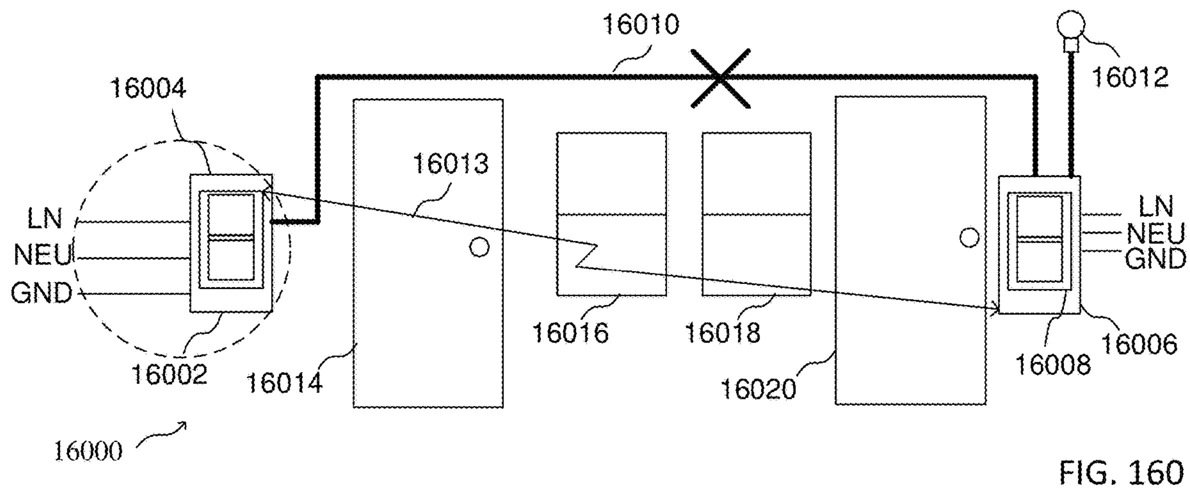

FIG. 160 is a plan view of showing an elimination of wiring associated with a 3-way switch.

Figure 161:
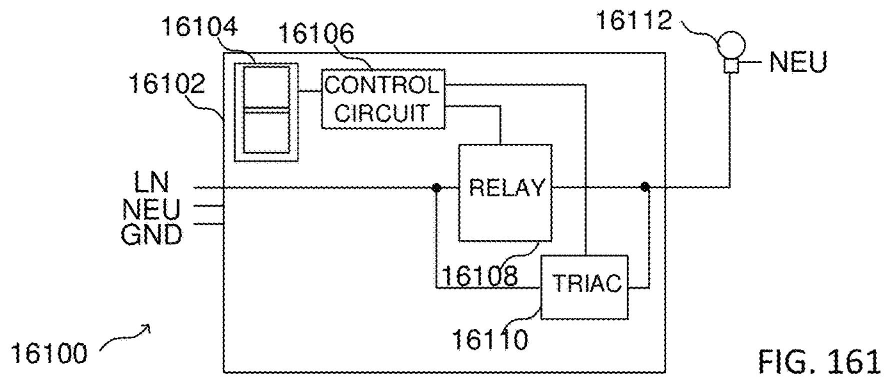

FIG. 161 is a block diagram of dimmer having an extended dimming range. (TAKE OUT?)

Figure 162:
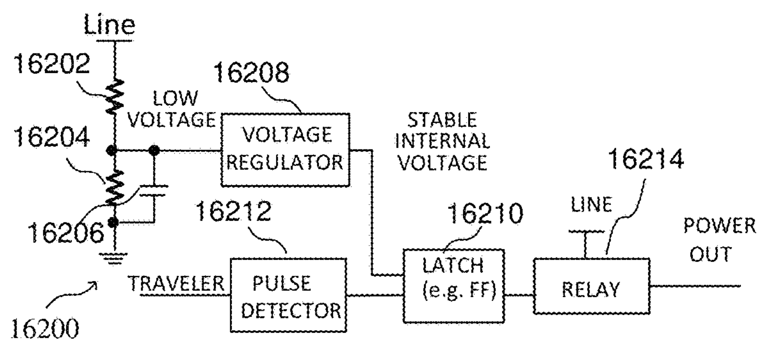

FIG. 162 is a block diagram of a receiver circuit that could be used in power adapter having a switch.

Figure 163:
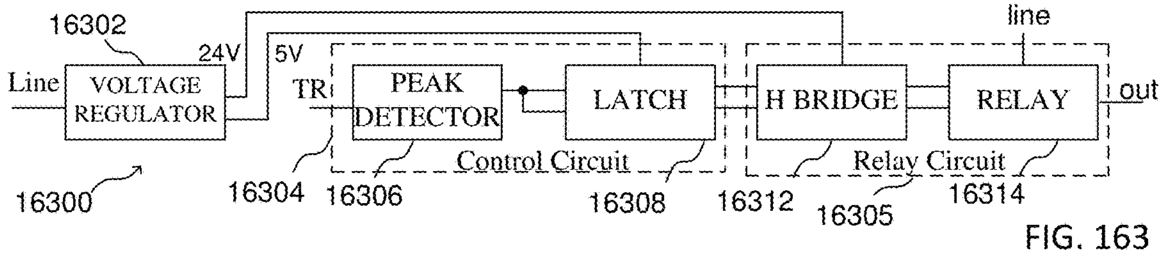

FIG. 163 is another block diagram of a receiver circuit that could be implemented in power adapter having a switch.

Figure 164:
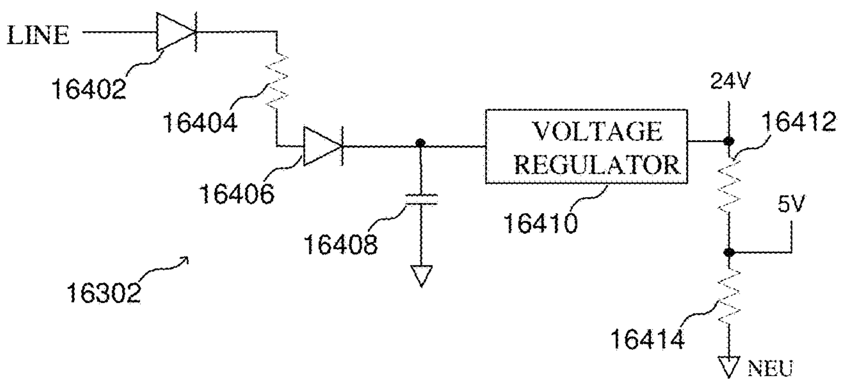

FIG. 164 is a block diagram of a voltage regulator that could be implemented in a power adapter having a switch.

Figure 165:
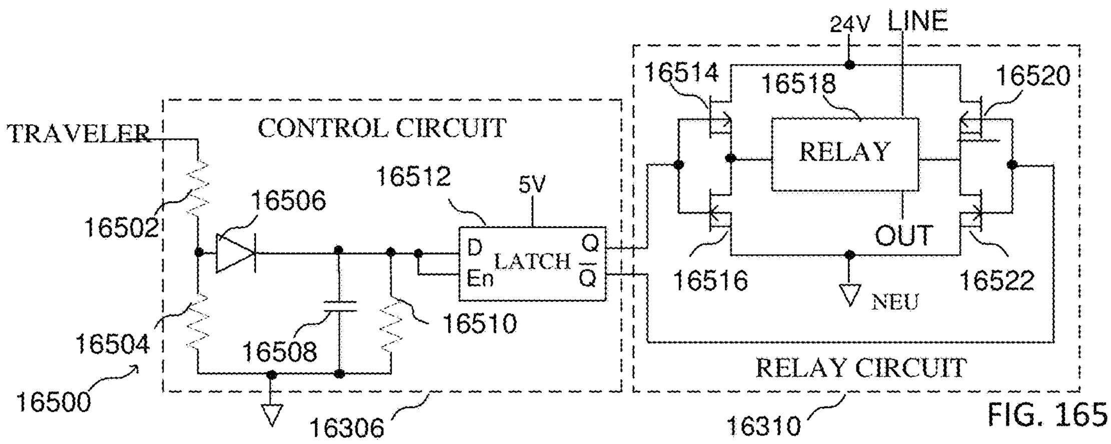

FIG. 165 is a block diagram of a control circuit and a relay circuit that could be implemented in a power adapter having a switch.

Figure 166:
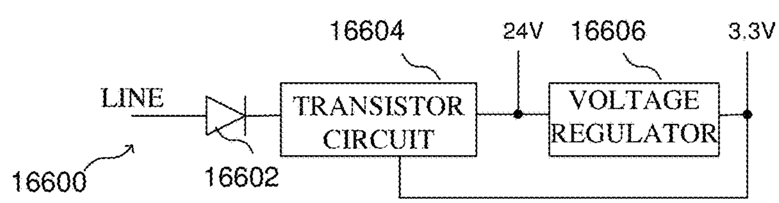

FIG. 166 is a block diagram of a power supply circuit.

Figure 167:
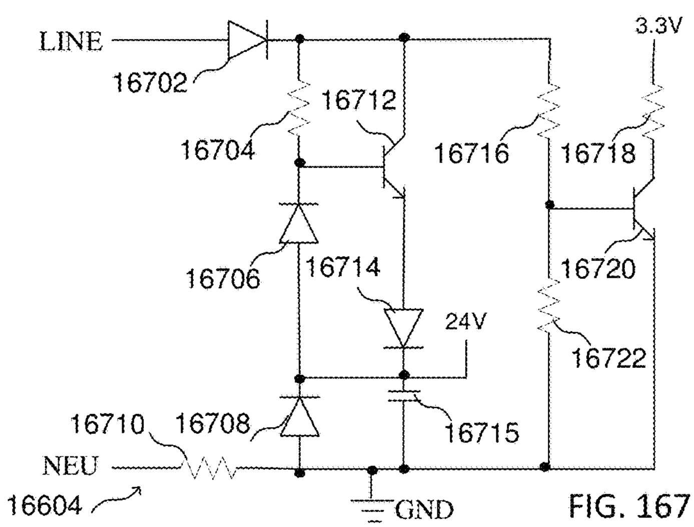

FIG. 167 is a circuit diagram of the transistor circuit and voltage regulator of FIG. 166.

Figure 168:
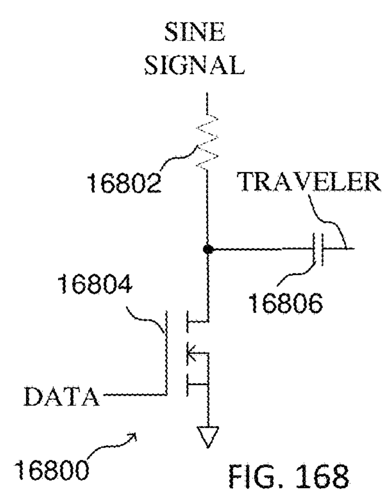

FIG. 168 is a block diagram of a transmitter circuit.

Figure 169:
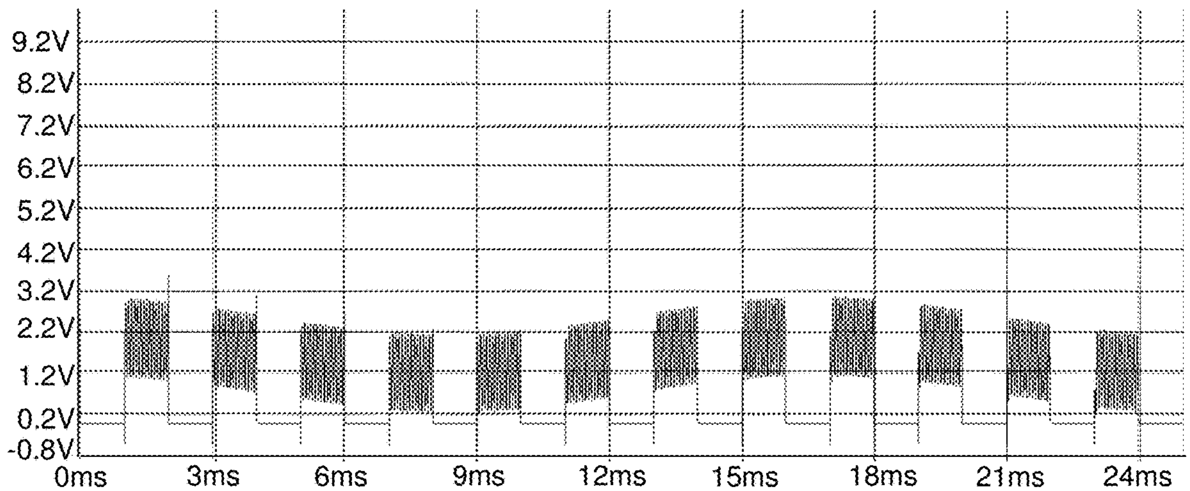

FIG. 169 is a timing diagram showing a signal transmitted by the transmitter circuit of FIG. 168.

Figure 170:
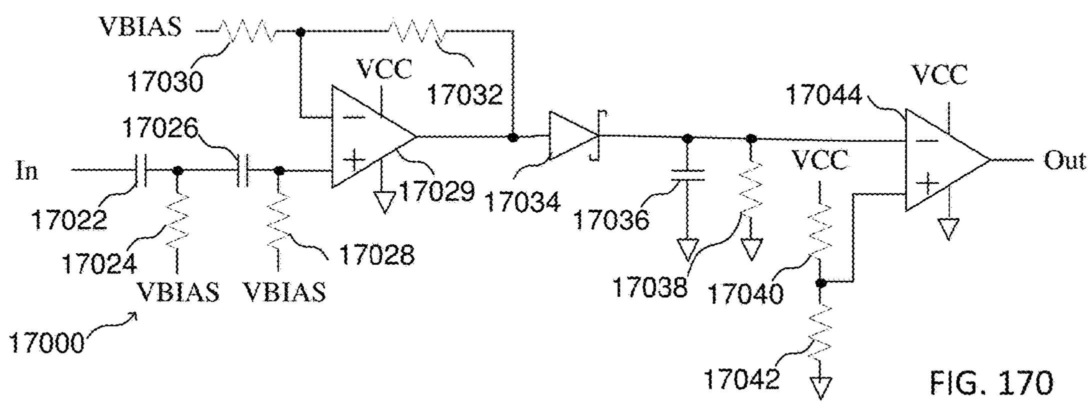

FIG. 170 is a block diagram of a receiver circuit for receiving a signal.

Figure 171:
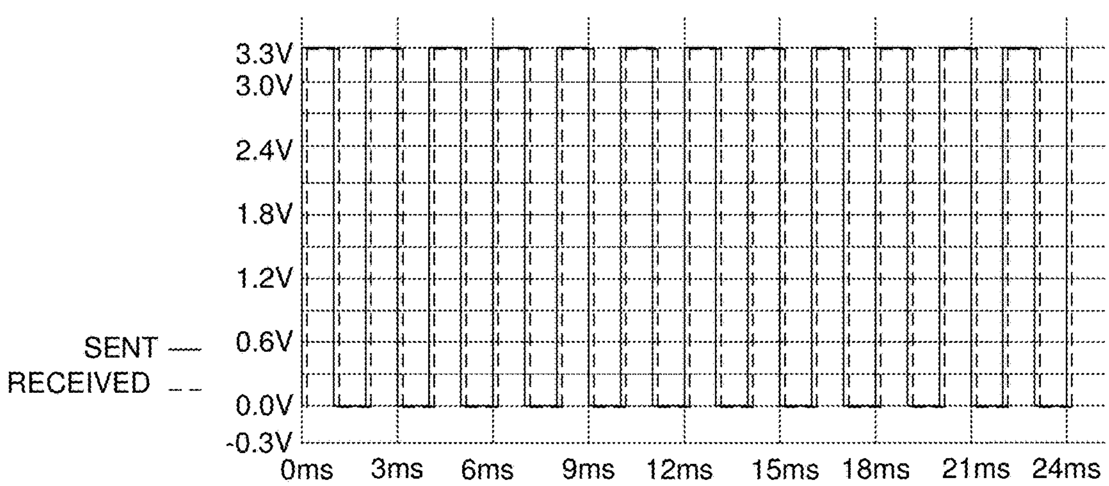

FIG. 171 is a timing diagram showing a signal received by the receiver circuit of FIG. 170.

Figure 172:
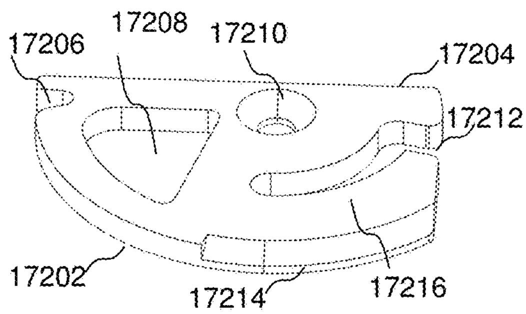

FIG. 172 is a perspective view of a latch element.

Figure 173:
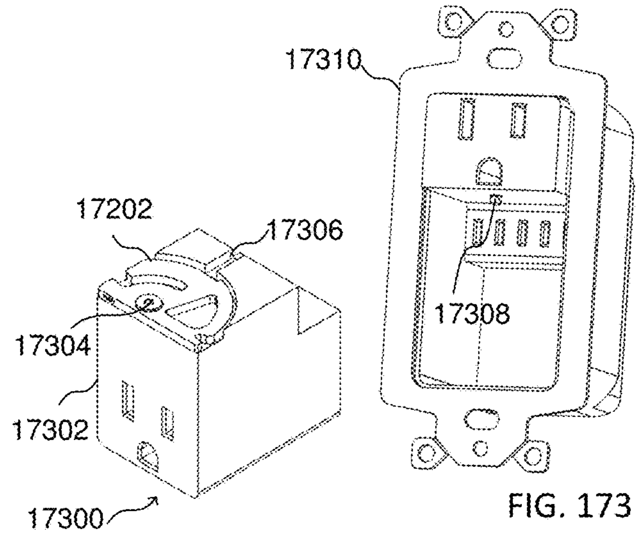

FIG. 173 is a perspective view of power adapter arrangement having the latch element of FIG. 172.

Figure 174:
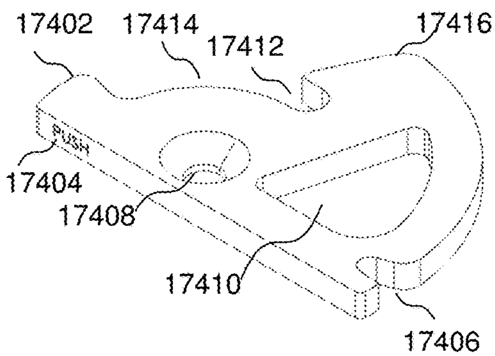

FIG. 174 is a perspective view of a latch element.

Figure 175:
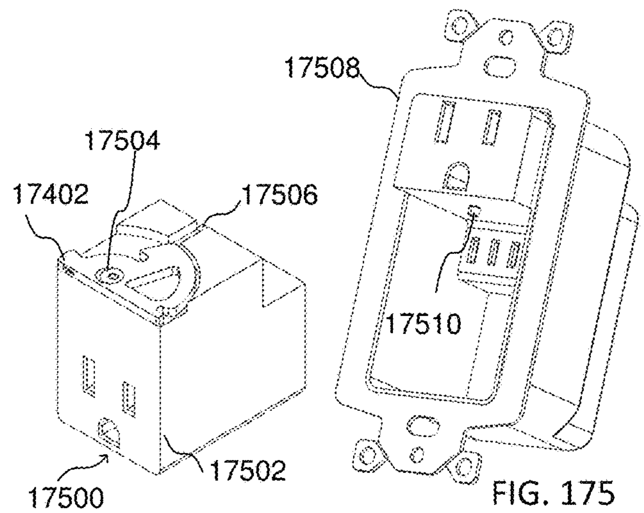

FIG. 175 is a perspective view of power adapter arrangement having the latch element of FIG. 174.

Figure 176:
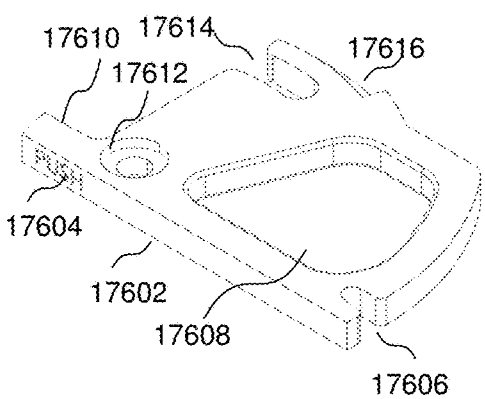

FIG. 176 is a perspective view of a latch element.

Figure 177:
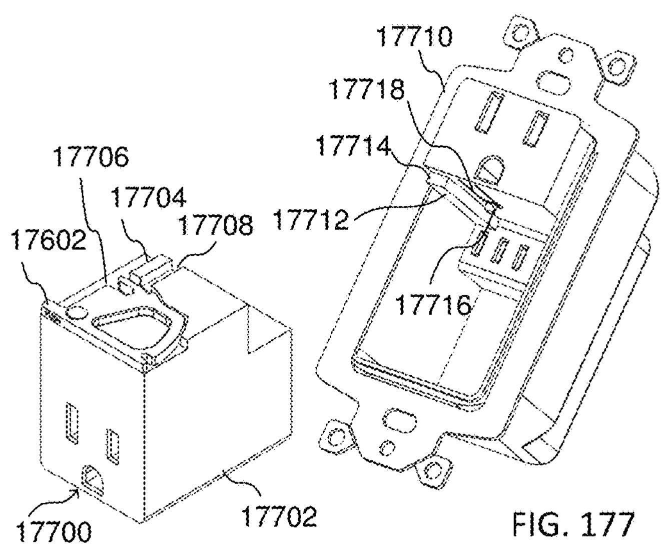

FIG. 177 is a perspective view of power adapter arrangement having the latch element of FIG. 176.

Figure 178:
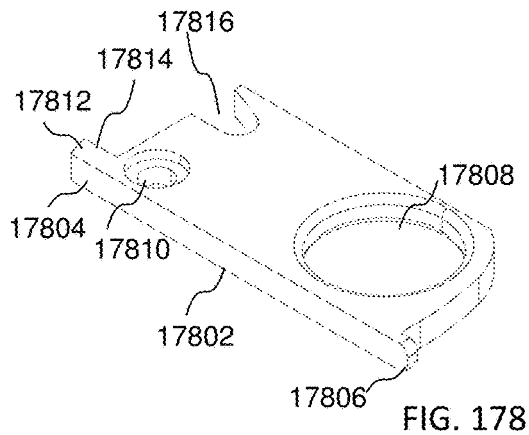

FIG. 178 is a perspective view of a latch element.

Figure 179:
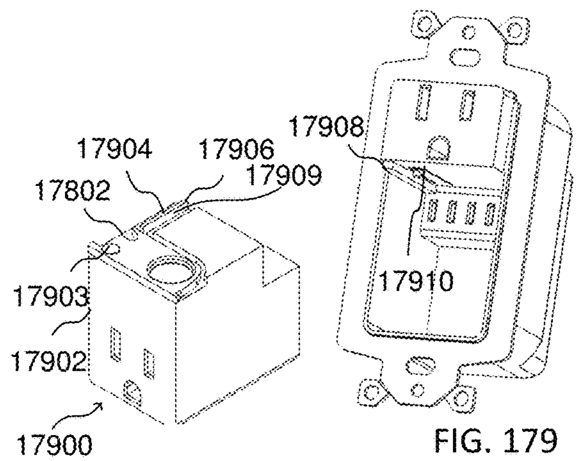

FIG. 179 is a perspective view of power adapter arrangement having the latch element of FIG. 178.

Figure 180:
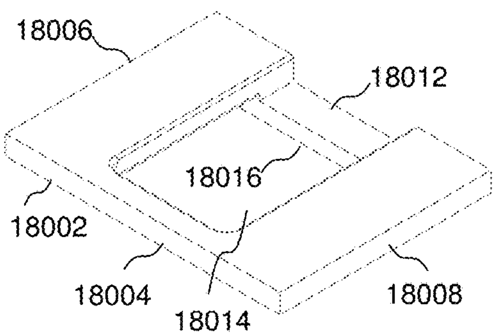

FIG. 180 is a perspective view of a latch element.

Figure 181:
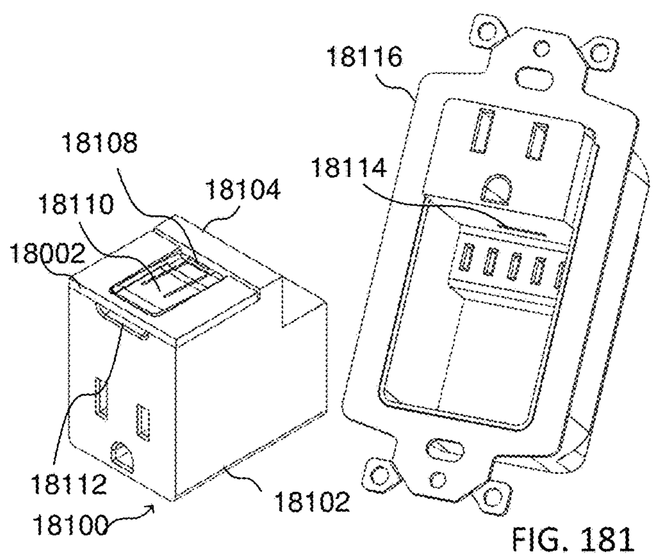

FIG. 181 is a perspective view of power adapter arrangement having the latch element of FIG. 180.

Figure 182:
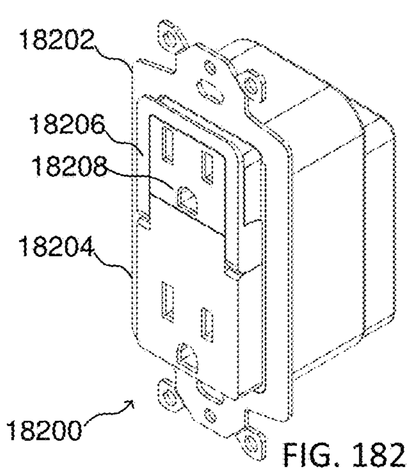

FIG. 182 is a perspective view of a power adapter arrangement.

Figure 183:
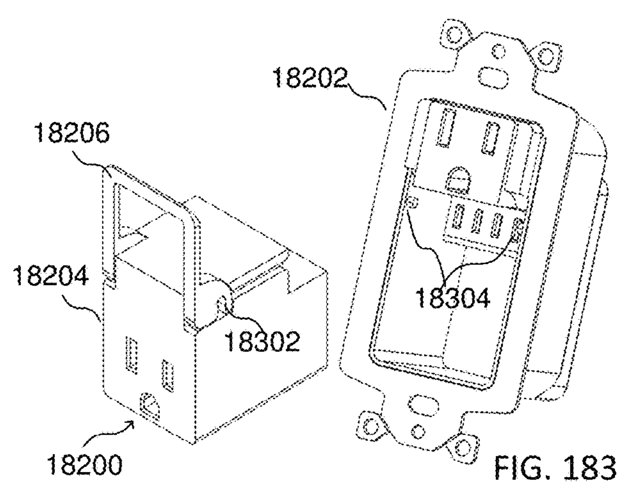

FIG. 183 is a perspective view showing a control module separated from a power adapter of the power adapter arrangement of FIG. 182.

Figure 184:
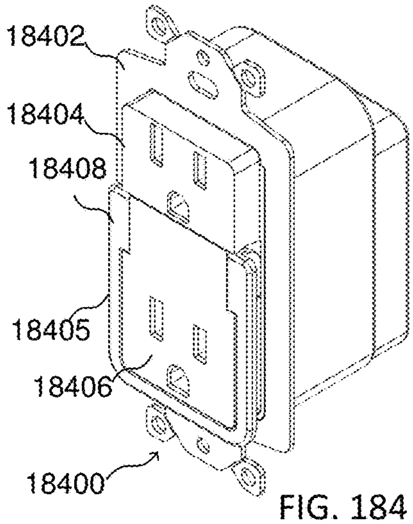

FIG. 184 is a perspective view of a power adapter arrangement.

Figure 185:
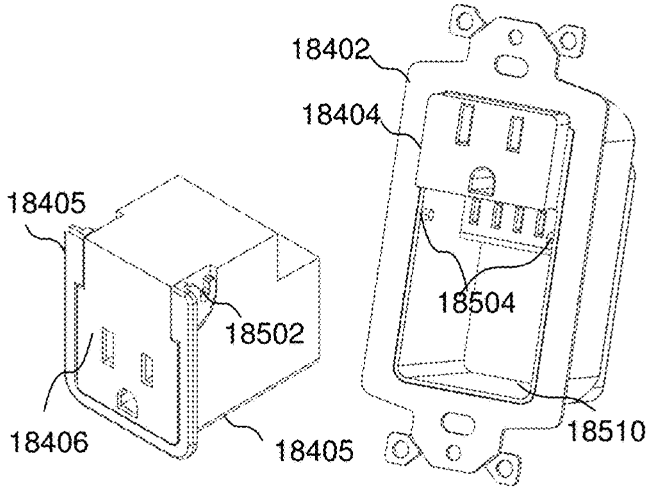

FIG. 185 is a perspective view showing a control module separated from a power adapter of the power adapter arrangement of FIG. 184.

Figure 186:
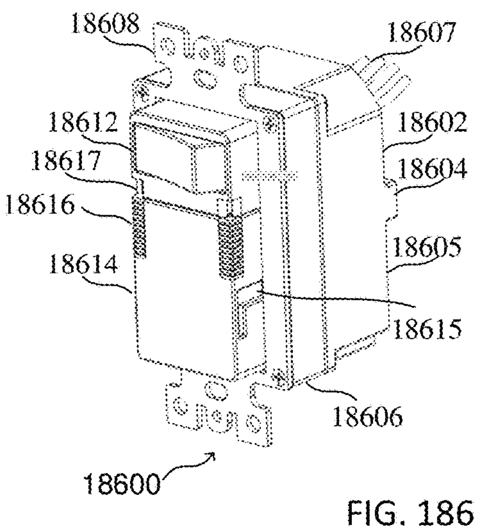

FIG. 186 is a perspective view of a power adapter arrangement comprising a power adapter having a projection for receiving contact element of the power adapter.

Figure 187:
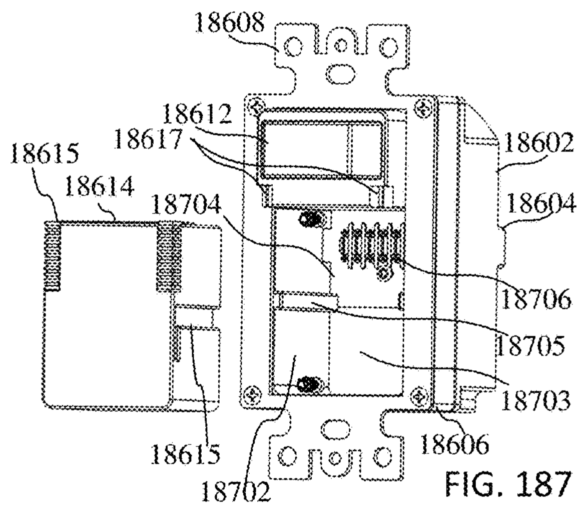

FIG. 187 is another perspective view of the power adapter arrangement of FIG. 186.

Figure 188:
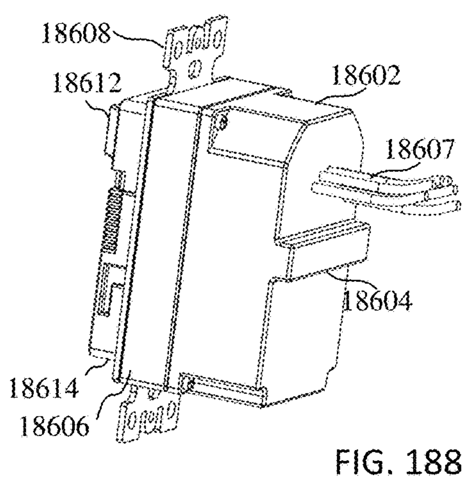

FIG. 188 is a perspective view showing the rear of the power adapter arrangement of FIG. 186.

Figure 189:
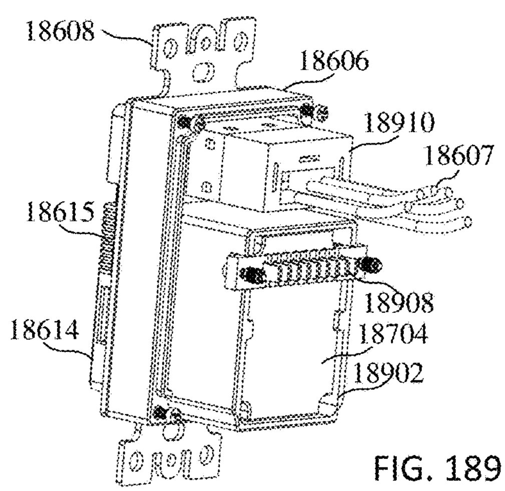

FIG. 189 is a perspective view showing the rear of the power adapter arrangement of FIG. 186 with the rear housing removed.

Figure 190:
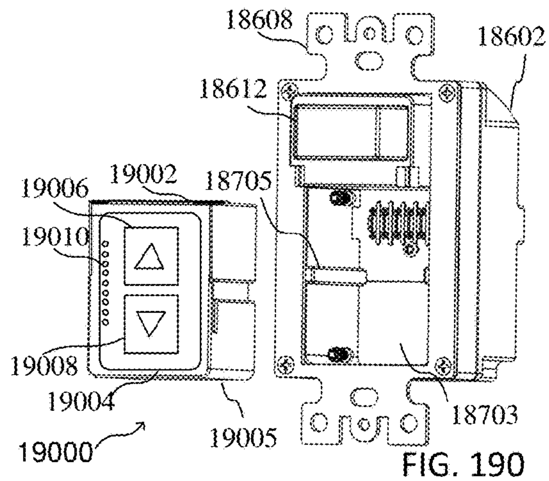

FIG. 190 is a perspective view of a power adapter arrangement having a control module with a removable control element.

Figure 191:
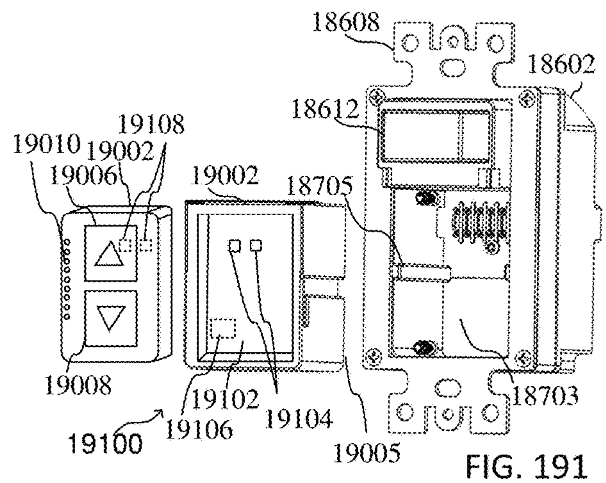

FIG. 191 is a perspective view of a power adapter arrangement having a control module with a removable control element removed from a main body portion of the control module.

Figure 192:
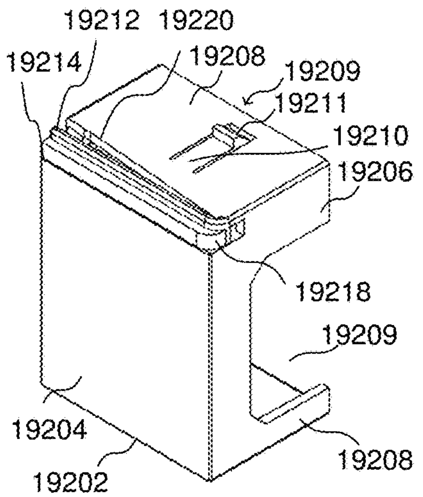

FIG. 192 is a perspective view of a cover having a spring-loaded latch element.

Figure 193:
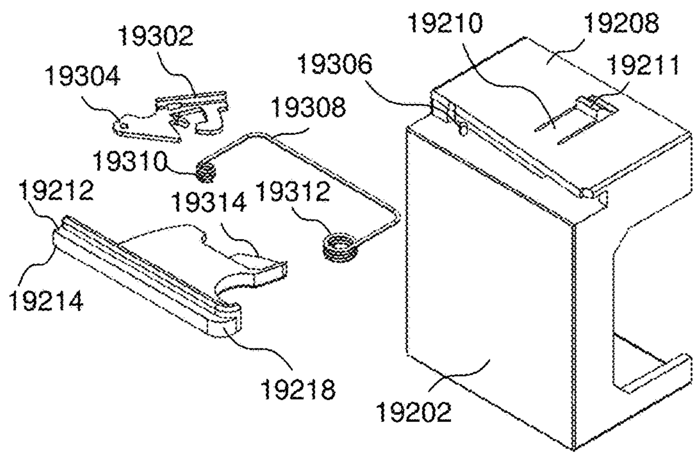

FIG. 193 is a perspective view showing components of the cover of FIG. 192.

Figure 194:
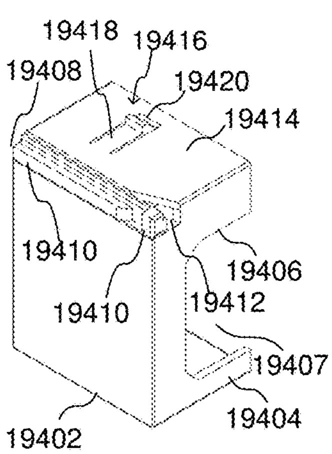

FIG. 194 is a perspective view of another cover having another latch element.

Figure 195:
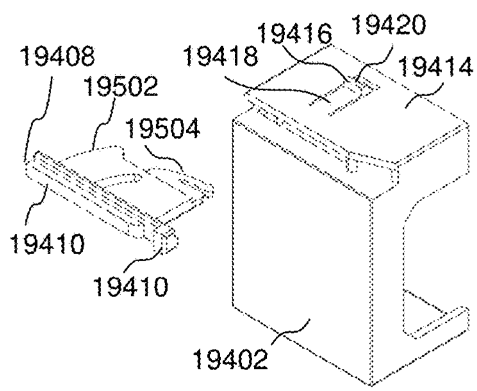

FIG. 195 is a perspective view showing the components of the cover of FIG. 194.

Figure 196:
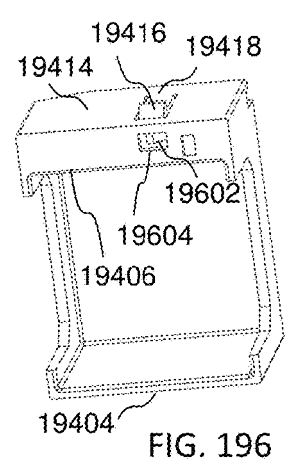

FIG. 196 is a perspective view showing the inside of the cover of FIG. 194.

Figure 197:
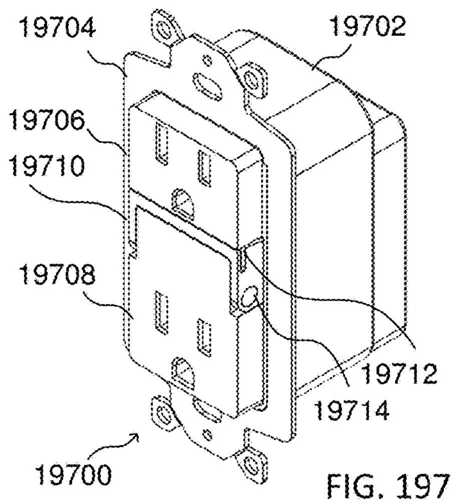

FIG. 197 is a perspective view of a power adapter arrangement having a rotating latch element.

Figure 198:
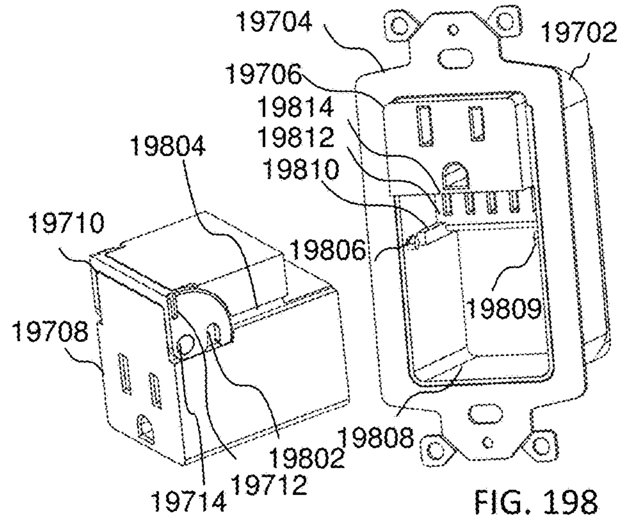

FIG. 198 is a perspective view of the power adapter arrangement of FIG. 197 having the control module removed.

Figure 199:
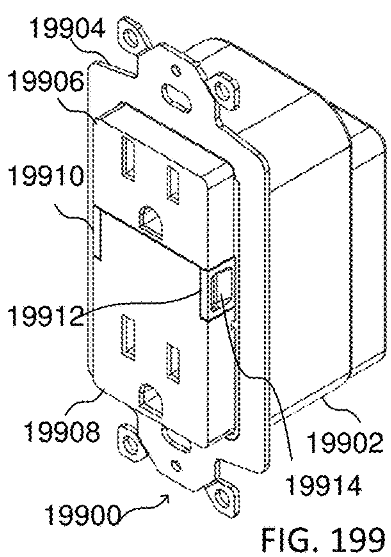

FIG. 199 is a perspective view of a power adapter arrangement having a sliding latch elements.

Figure 200:
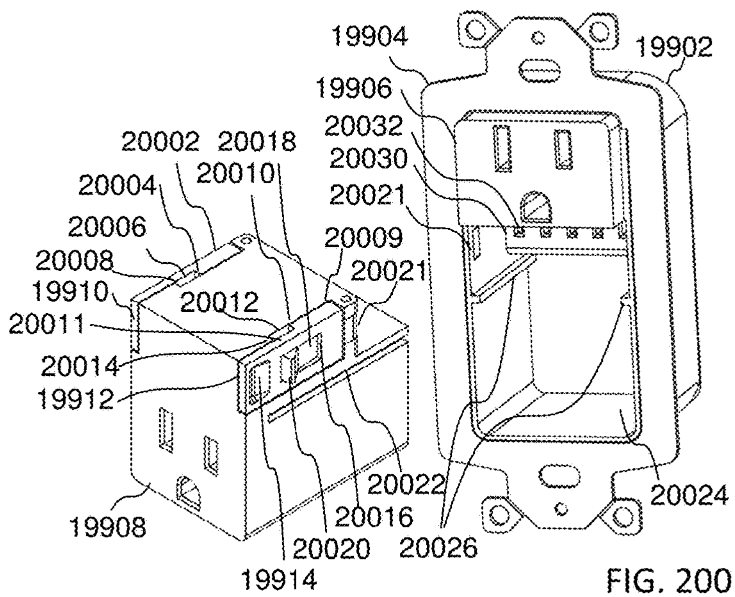

FIG. 200 is a perspective view of the power adapter arrangement of FIG. 199 having the control module removed.

Figure 201:
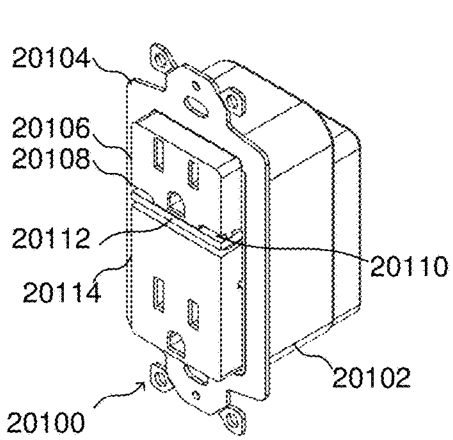

FIG. 201 is a perspective view of a power adapter arrangement having a spring-loaded latch element.

Figure 202:
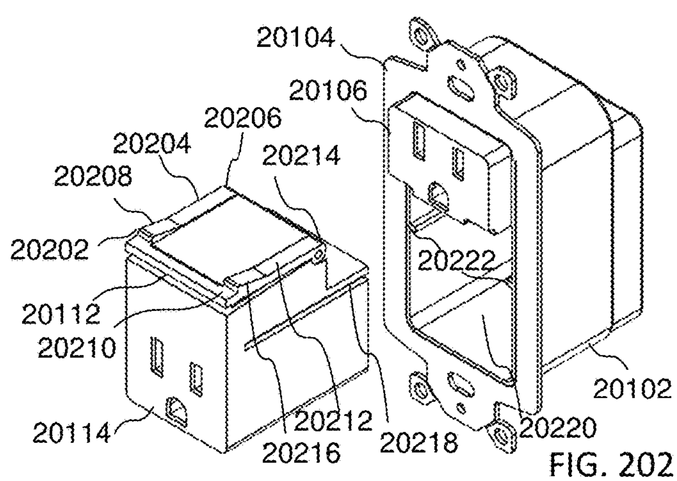

FIG. 202 is a perspective view of the power adapter arrangement of FIG. 201 having the control module removed.

Figure 203:
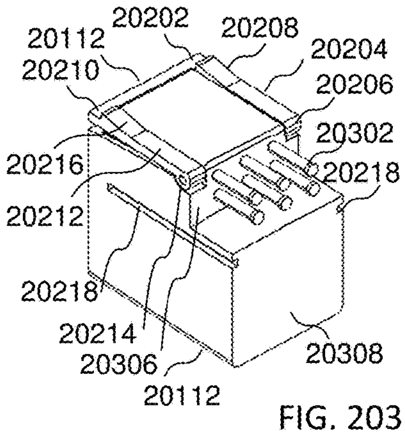

FIG. 203 is a perspective view of the back of the control module of FIG. 201.

Figure 204:
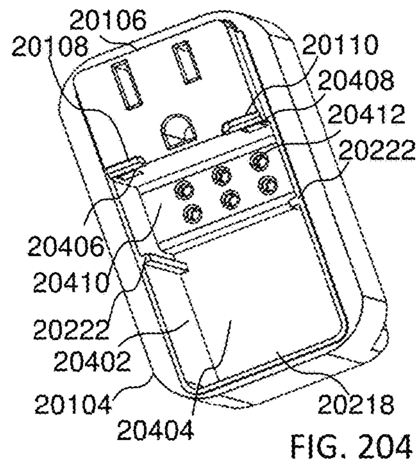

FIG. 204 is a perspective view of the power adapter of FIG. 201.

Figure 205:
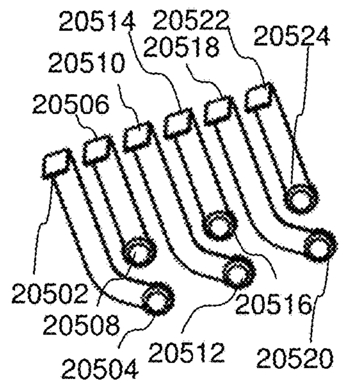
Figure 210:
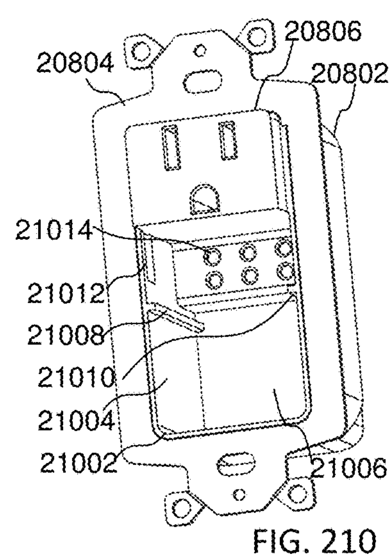

FIG. 205 is a perspective view of connectors of the power adapter of FIG. 210.

Figure 206:
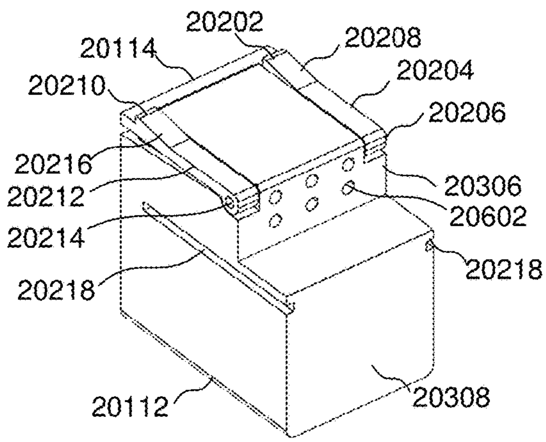

FIG. 206 is a perspective view of back of a control module having contact pads.

Figure 207:
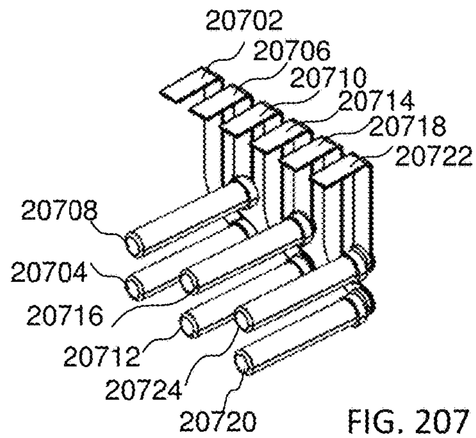

FIG. 207 is a perspective view of contact elements of a power adapter that are adapted to make an electrical connection to the contact pads of FIG. 206.

Figure 208:
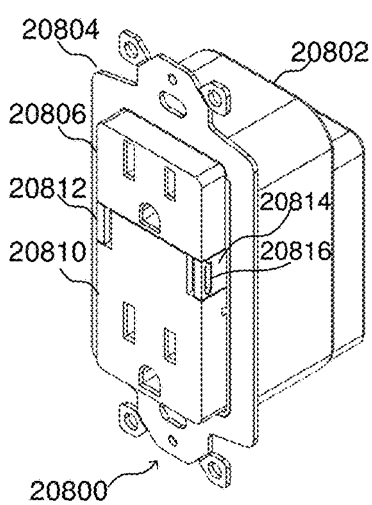

FIG. 208 is a perspective view of a power adapter arrangement having a pair of spring-loaded latch elements placed near the top of the control module.

Figure 209:
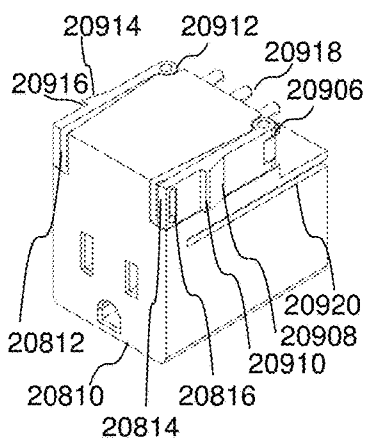

FIG. 209 is a perspective view of the control module of the power adapter arrangement of FIG. 208.

FIG. 210 is a perspective view of the power adapter of the power adapter arrangement of FIG. 208.

Figure 211:
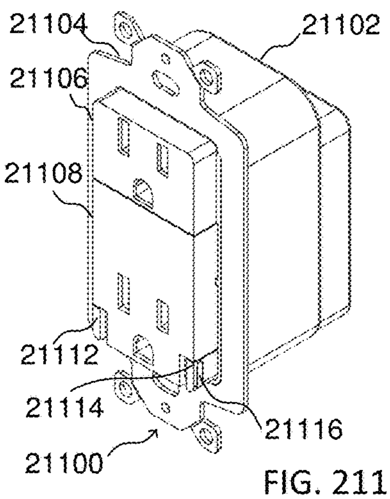

FIG. 211 is a perspective view of a power adapter arrangement having a pair of spring-loaded latch elements placed near the bottom of the control module.

Figure 212:
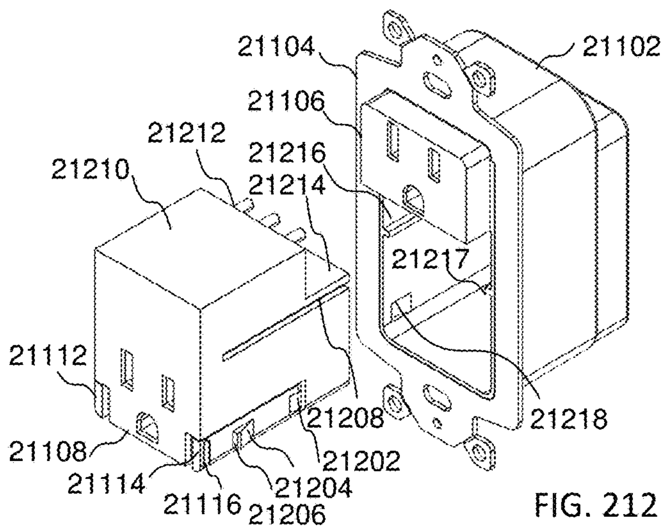

FIG. 212 is a perspective view of the power adapter arrangement of FIG. 211 having the control module removed.

Figure 213:
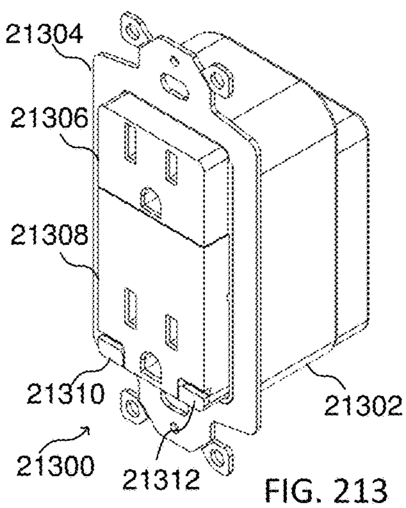

FIG. 213 is a perspective view of another power adapter arrangement having a pair of spring-loaded latch elements placed near the bottom of the control module.

Figure 214:
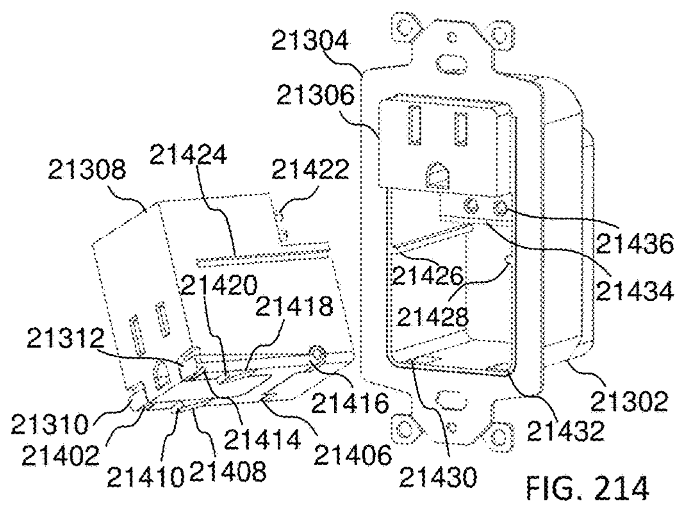

FIG. 214 is a perspective view of the power adapter arrangement of FIG. 211 having the control module removed.

Figure 215:
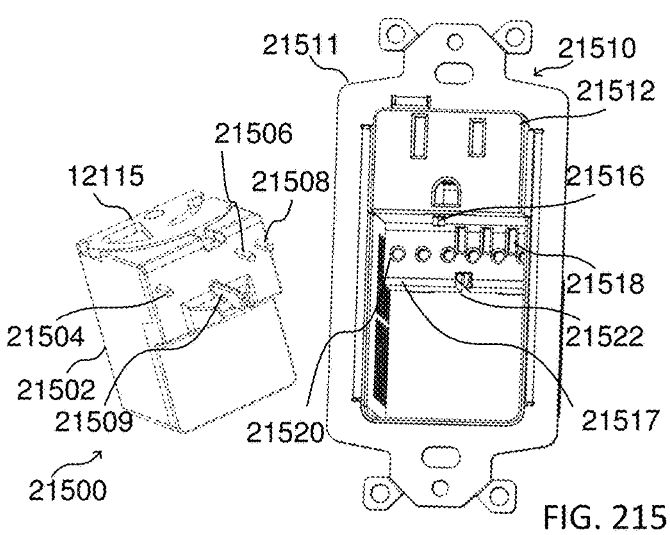

FIG. 215 is a perspective view of a power adapter arrangement having a power adapter comprising an outlet.

Figure 216:
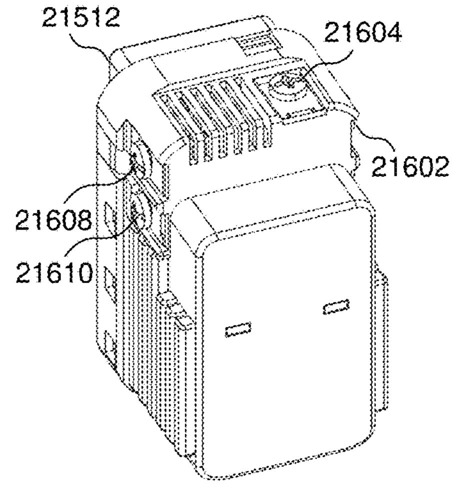

FIG. 216 is a rear perspective view of a power adapter of the power adapter arrangement of FIG. 215.

Figure 217:
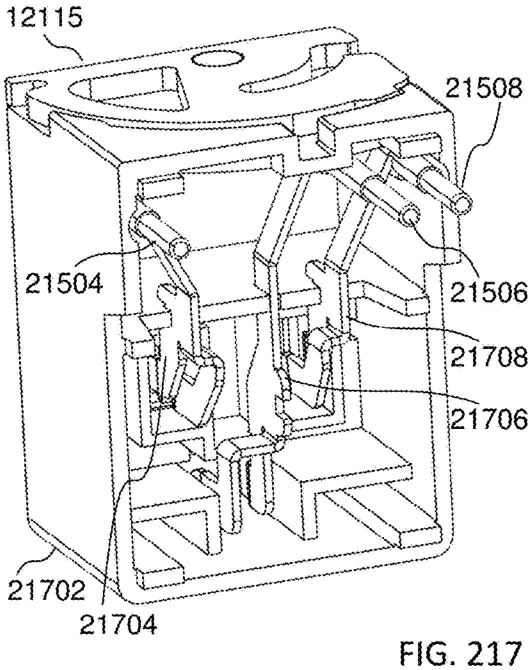

FIG. 217 is a perspective view of contact elements in a housing having an outlet.

Figure 218:
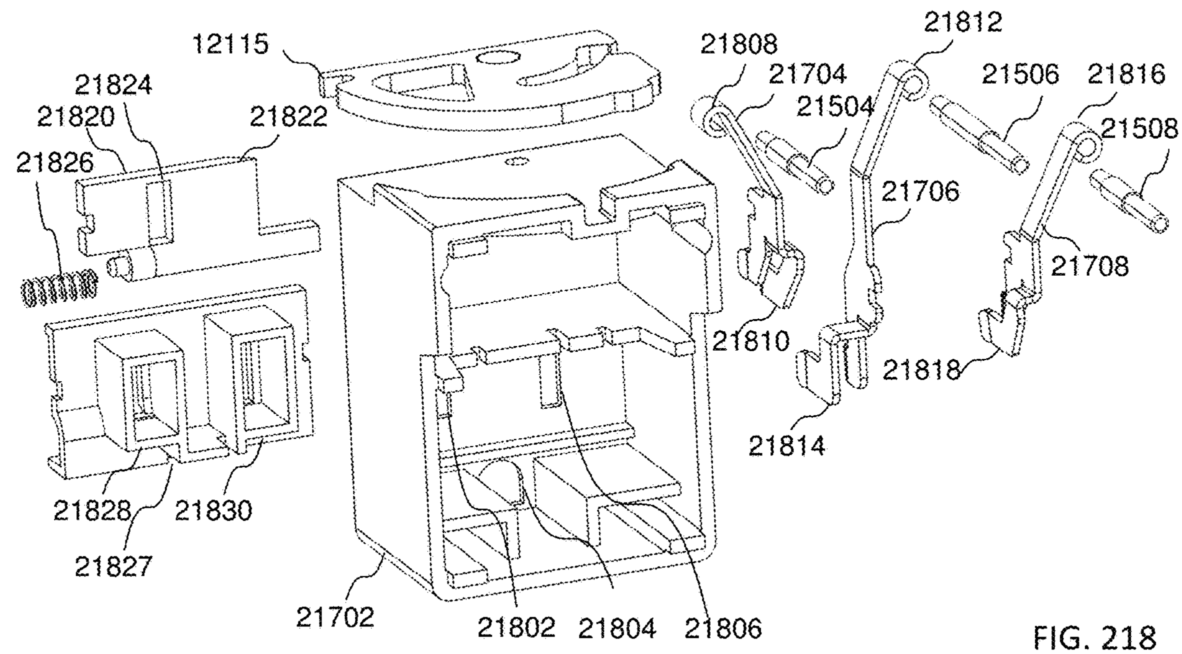

FIG. 218 is an expanded view of the elements of FIG. 217.

Figure 219:
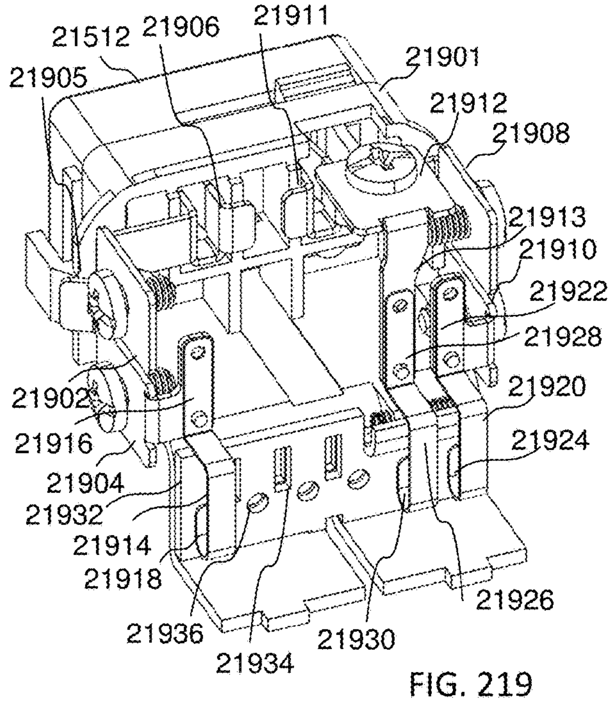

FIG. 219 is a perspective view of elements associated with an outlet of the power adapter of FIG. 216.

Figure 220:
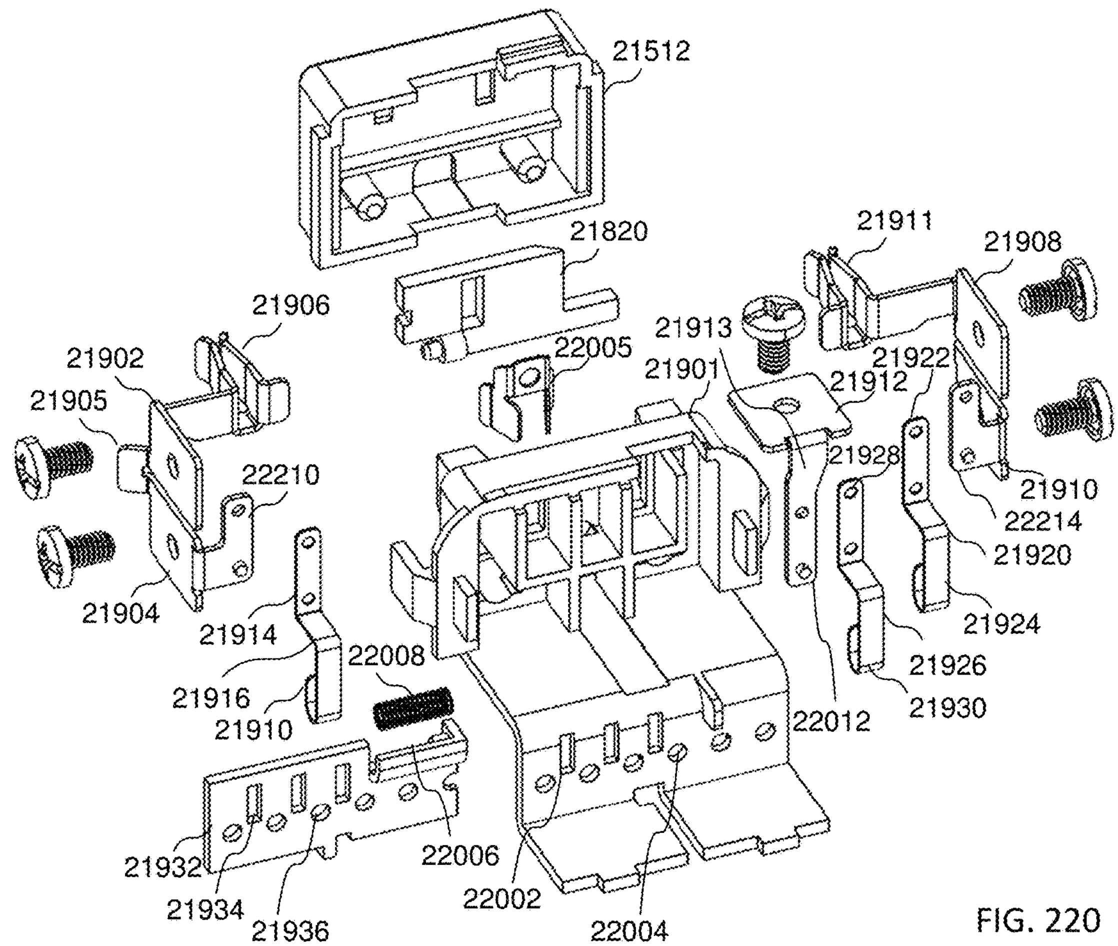

FIG. 220 is an expanded view of the elements associated with an outlet of FIG. 219.

Figure 221:
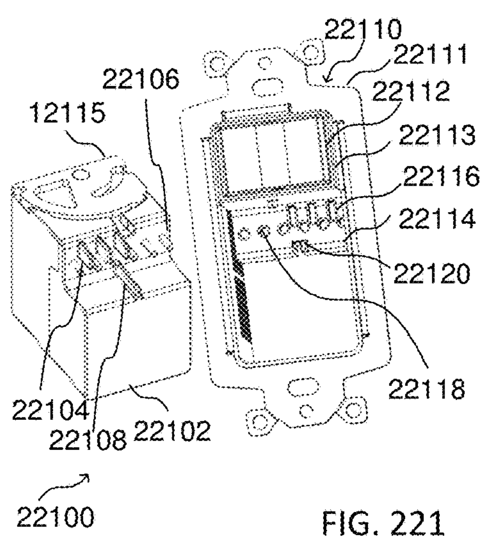

FIG. 221 is a perspective view of a power adapter arrangement having a power adapter comprising a switch.

Figure 222:
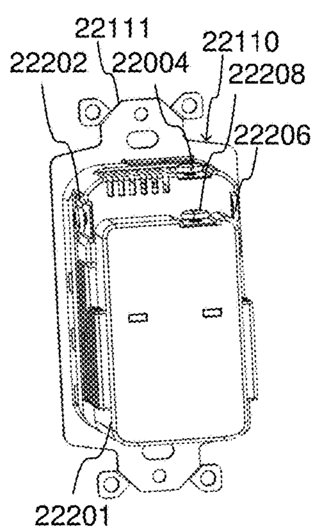

FIG. 222 is a rear perspective view of the power adapter of the power adapter arrangement of FIG. 221.

Figure 223:
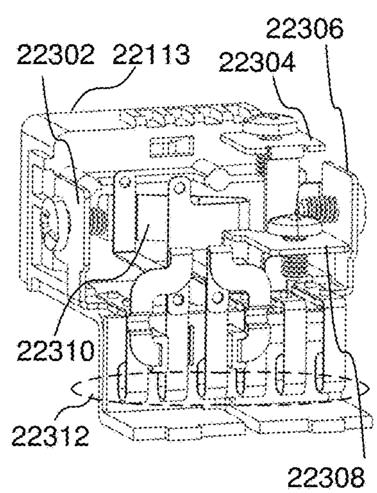

FIG. 223 is a perspective view of elements of a switch of the power adapter of the power adapter arrangement of FIG. 221.

Figure 224:
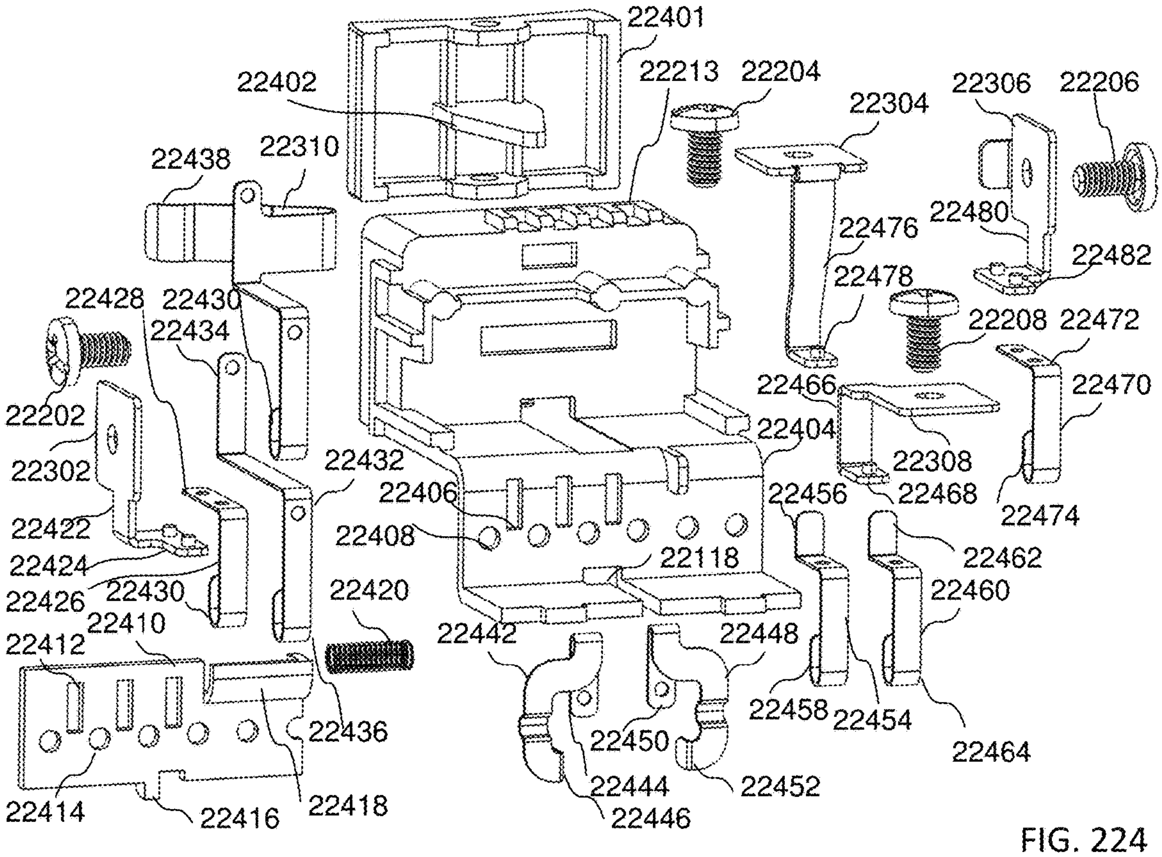

FIG. 224 is an expanded view of the elements of a switch of the power adapter of the power adapter arrangement of FIG. 221.

Figure 225:
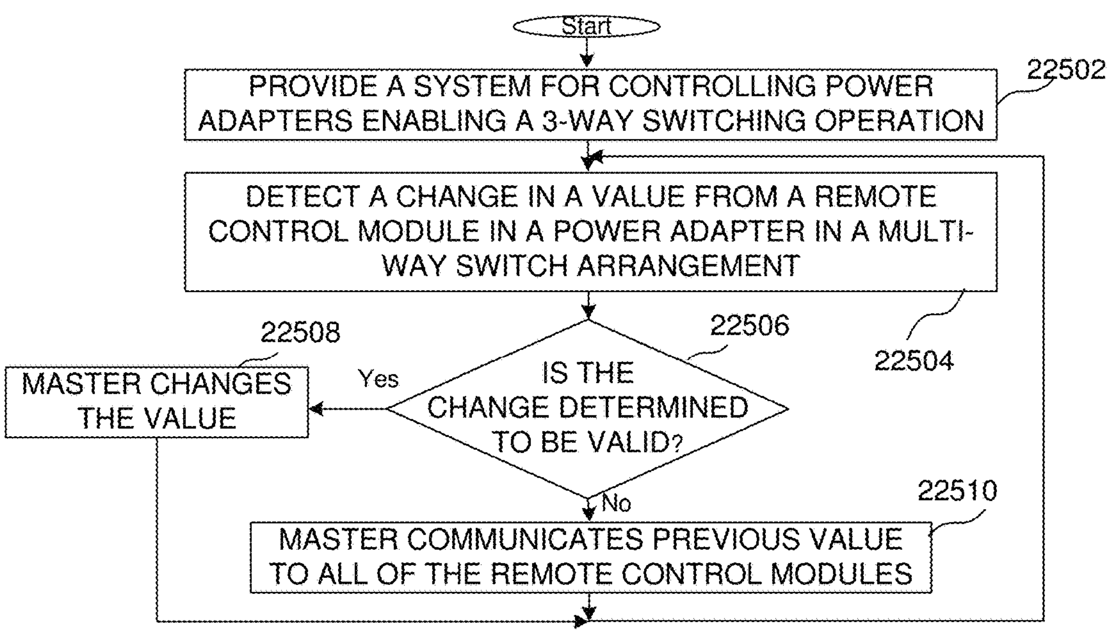

FIG. 225 is a flow chart showing a method of detecting a change in a value provided by a remote control module in a 3-way switching operation.

Figure 226:
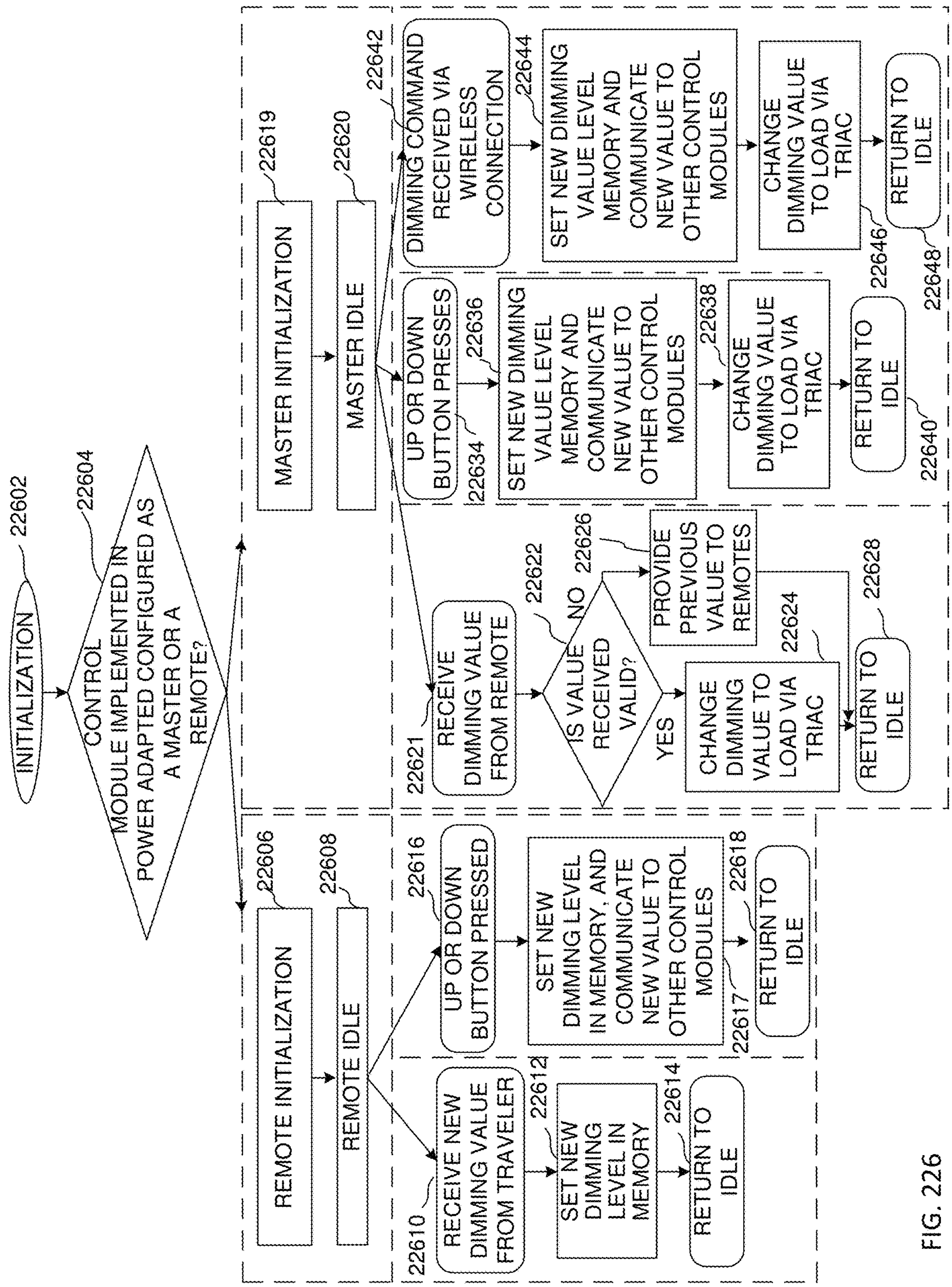

FIG. 226 is a flow chart showing a method of changing values associated with the operation of a power adapter arrangement.

Figure 227:
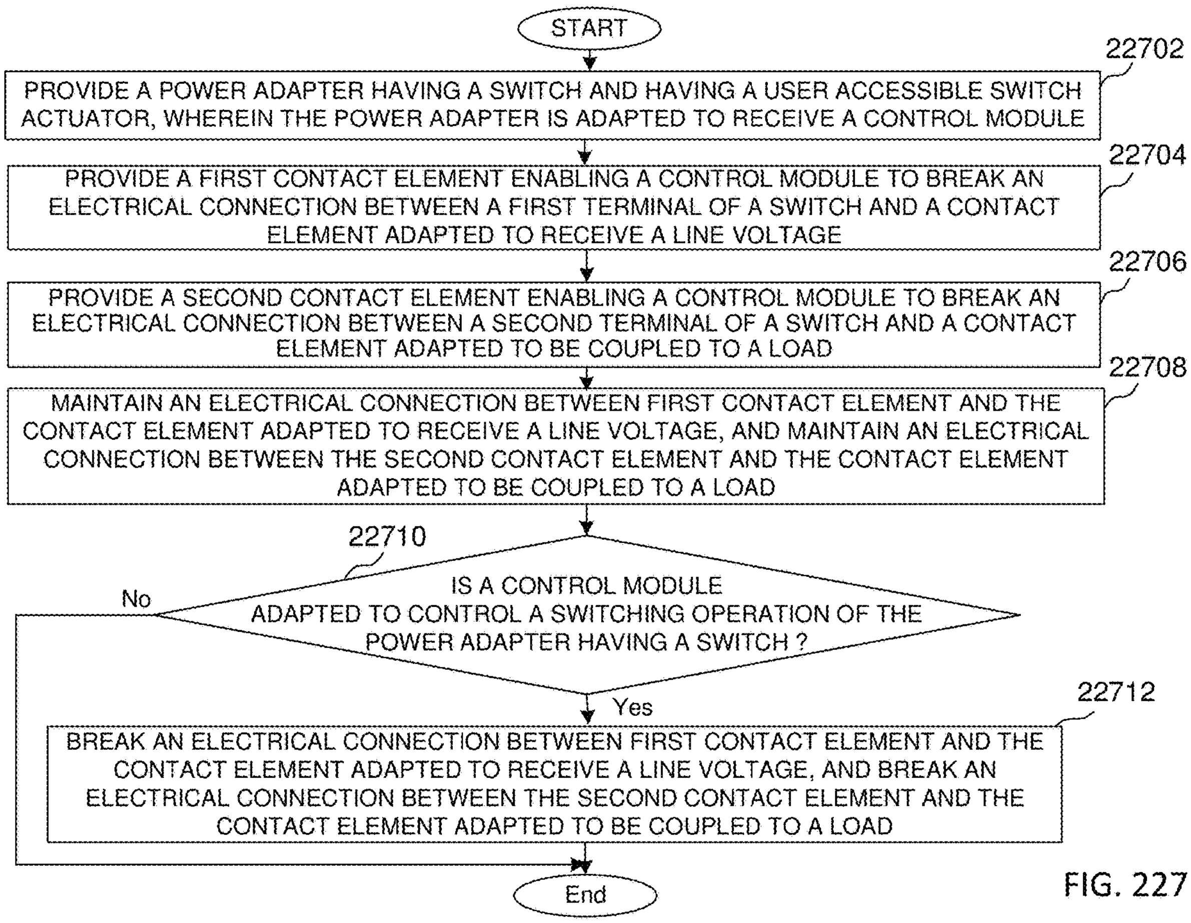

FIG. 227 is a flow chart showing a method of implementing control module in a power adapter arrangement having a power adapter comprising a switch.

Figure 228:
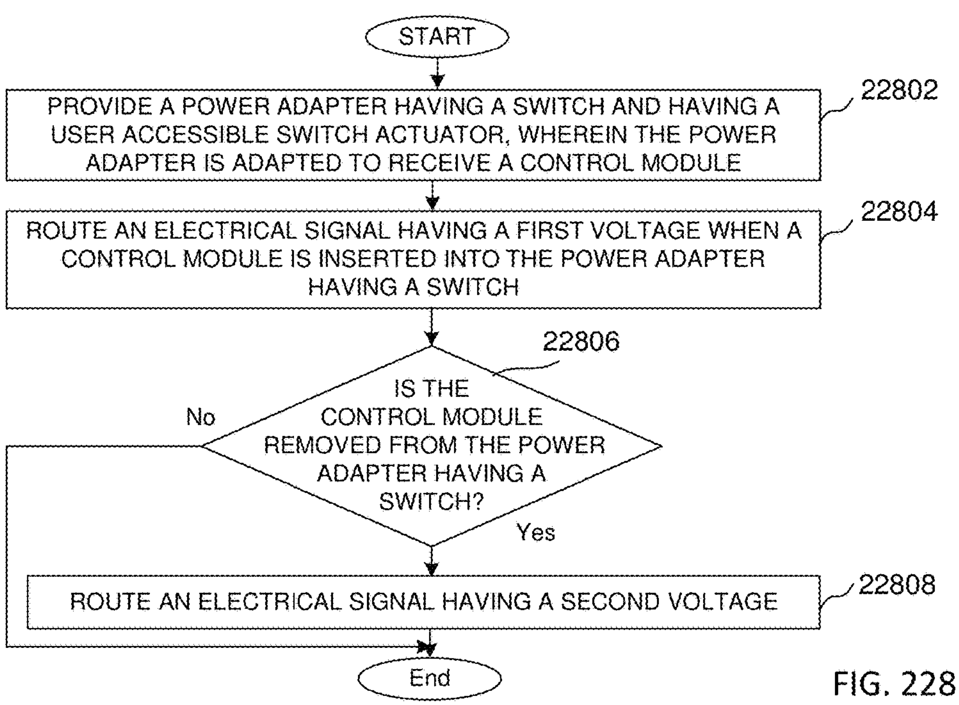

FIG. 228 is a flow chart showing the routing of electrical signals having different voltages through a switch of a power adapter.

Figure 229:
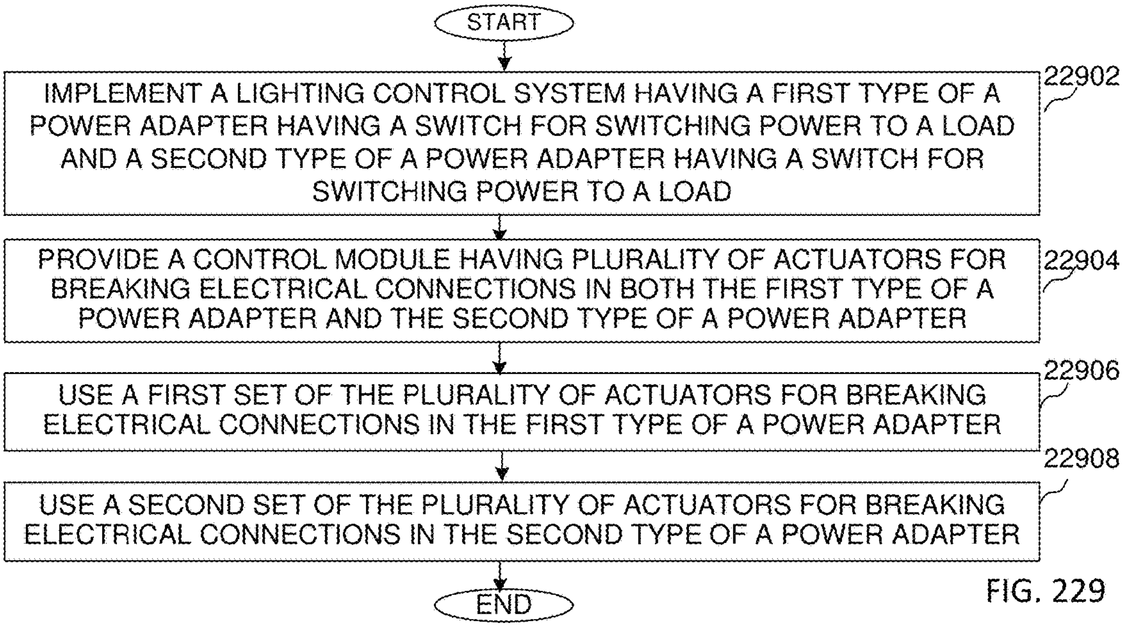

FIG. 229 is a flow chart showing a method of implementing actuators of a control module to break electrical connections in different types of power adapters.

Figure 230:
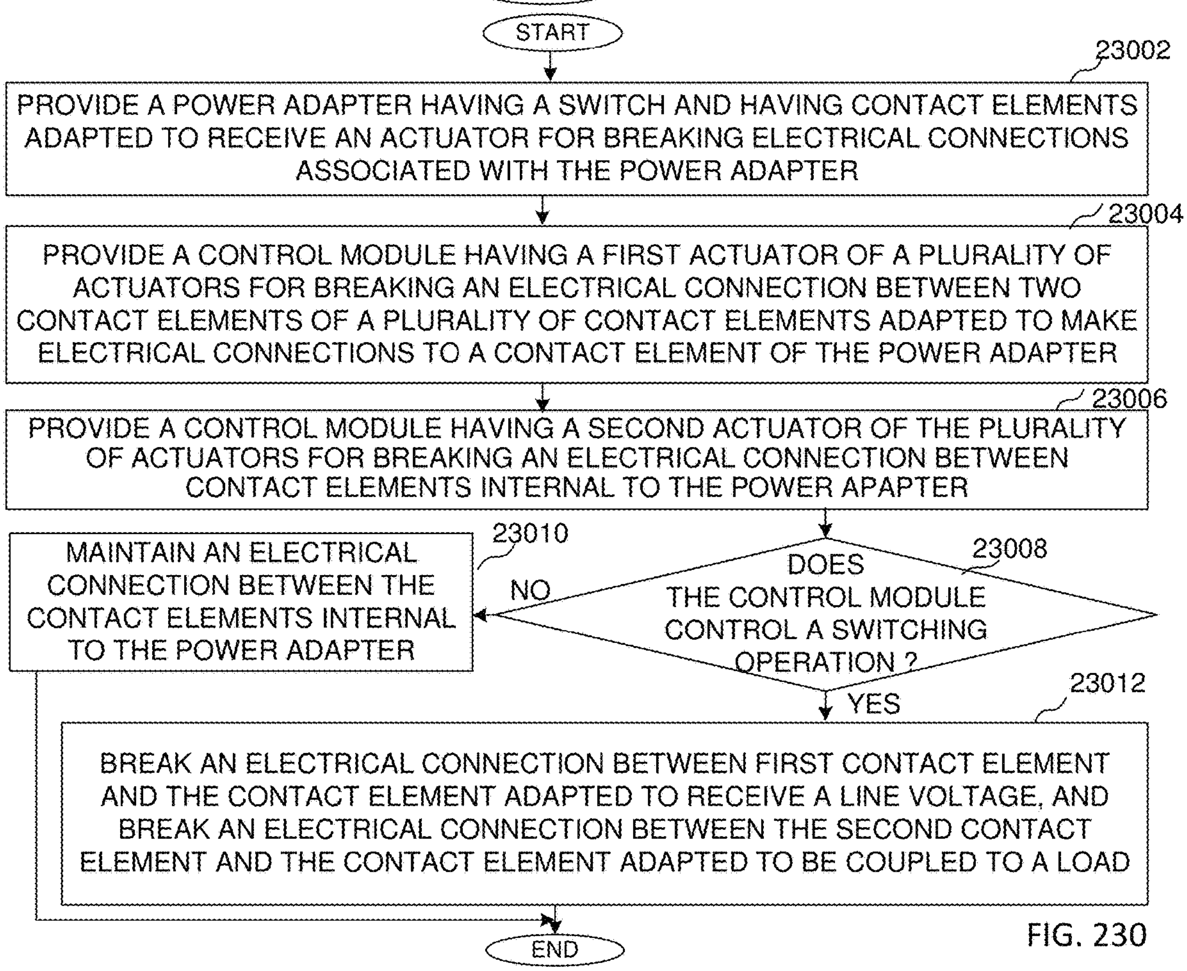

FIG. 230 is a flow chart showing a method of breaking electrical connections associated with a power adapter based upon a type of power adapter arrangement.

Figure 231:
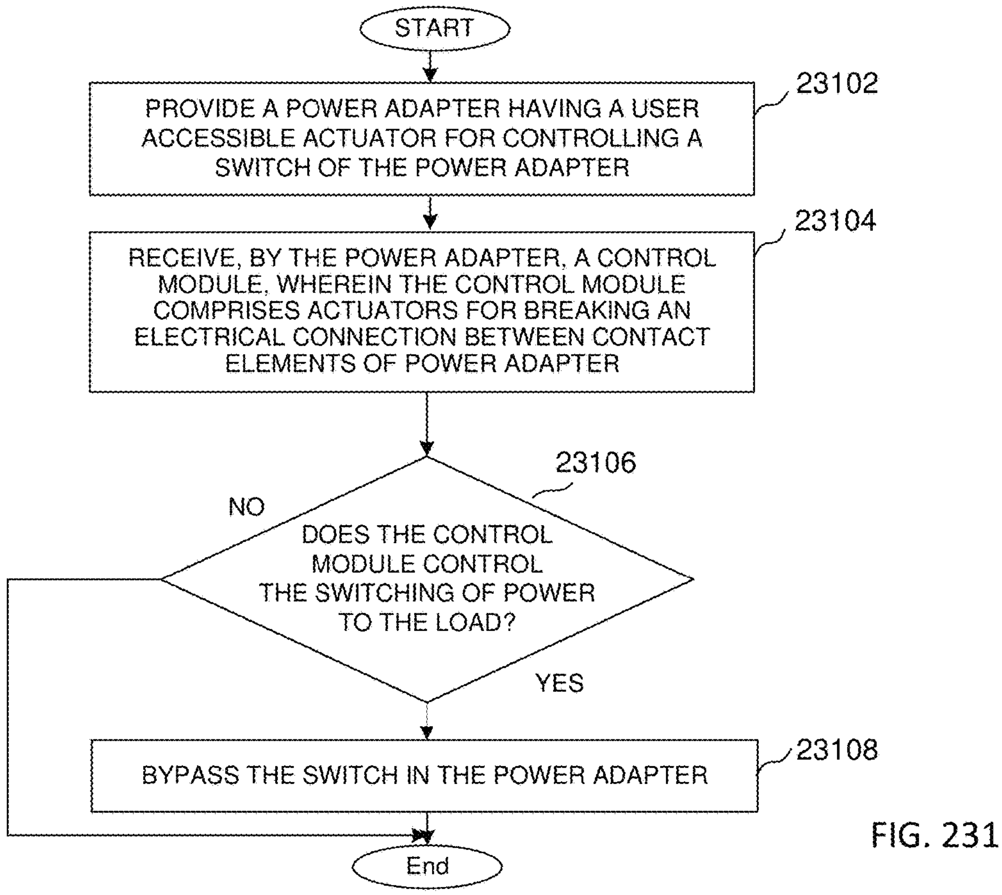

FIG. 231 is a flow chart showing a method of bypassing a switch of a power adapter when using a control module that controls the switching of power to a load.

Figure 232:
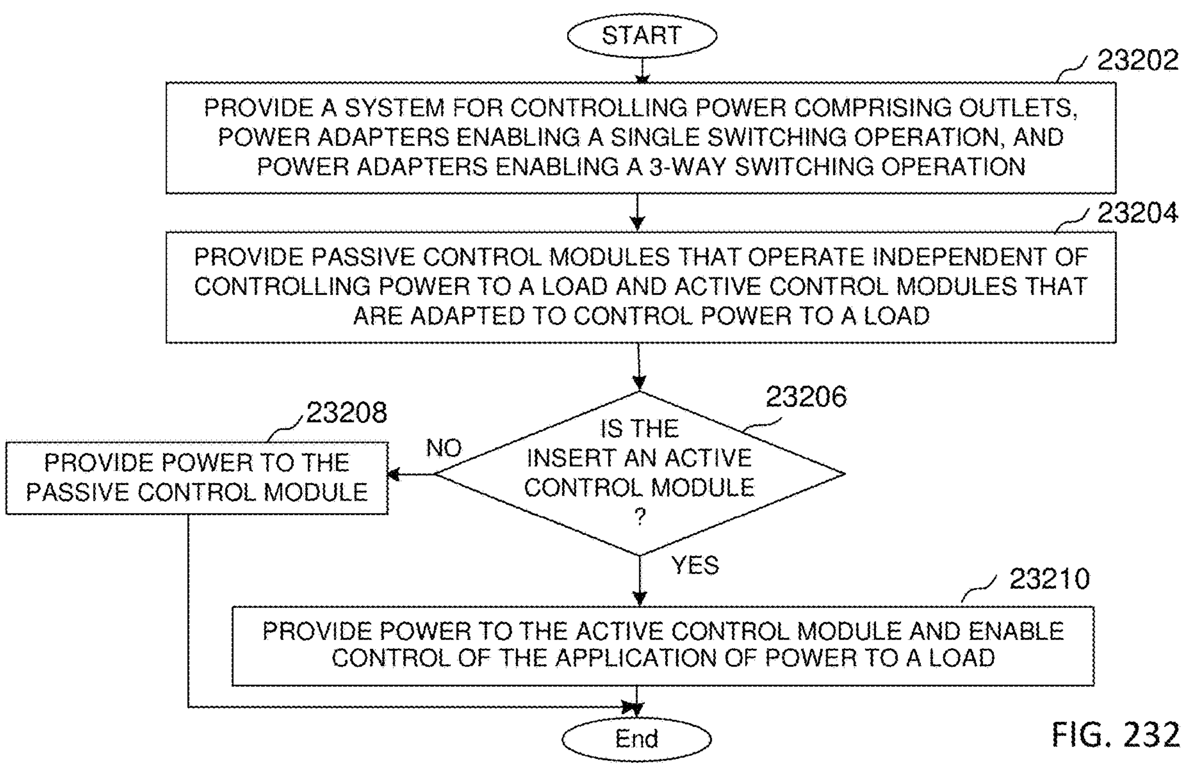

FIG. 232 is a flow chart showing a method of implementing active and passive control modules.

Figure 233:
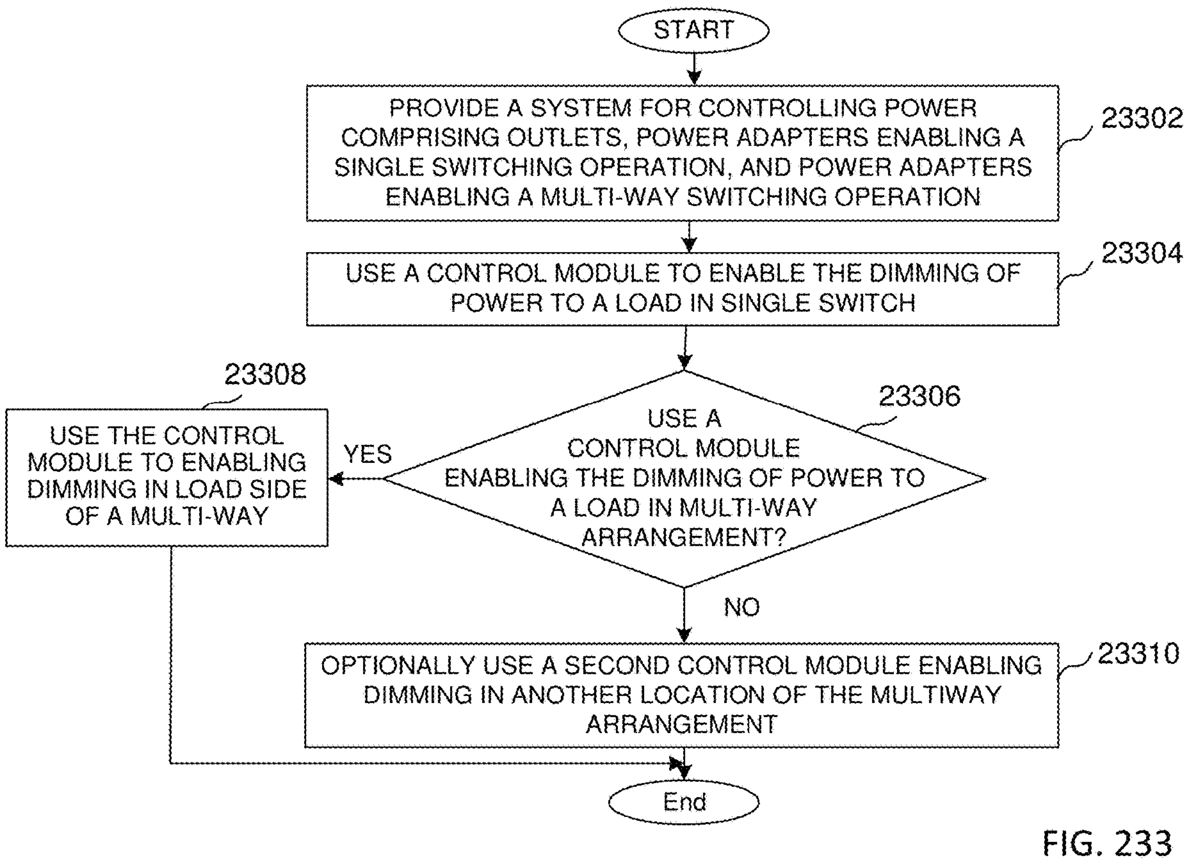

FIG. 233 is a flow chart showing a method of dimming power to a load in a multi-way dimming arrangement.

Figure 234:
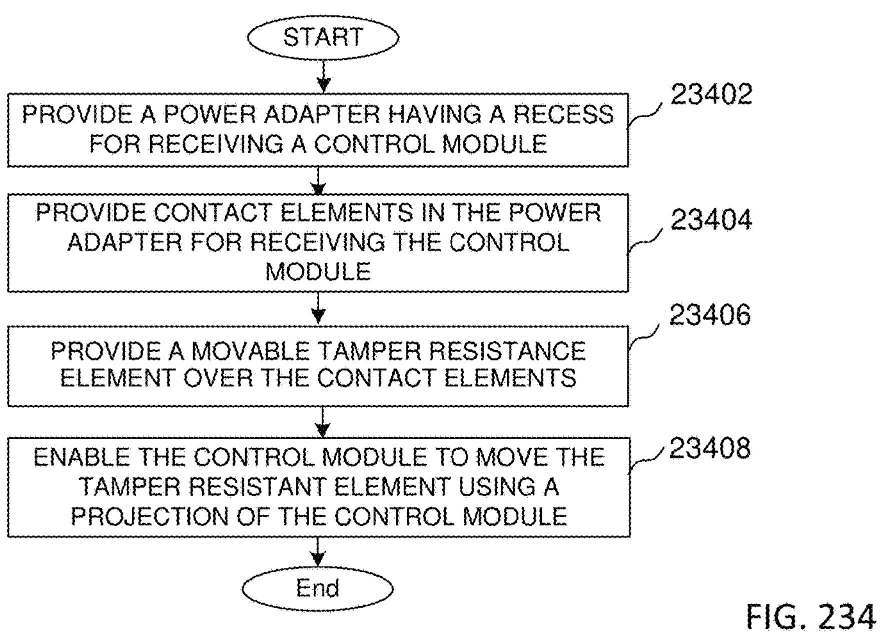

FIG. 234 is a flow chart showing a method of providing tamper resistance in a power adapter arrangement.

Figure 235:
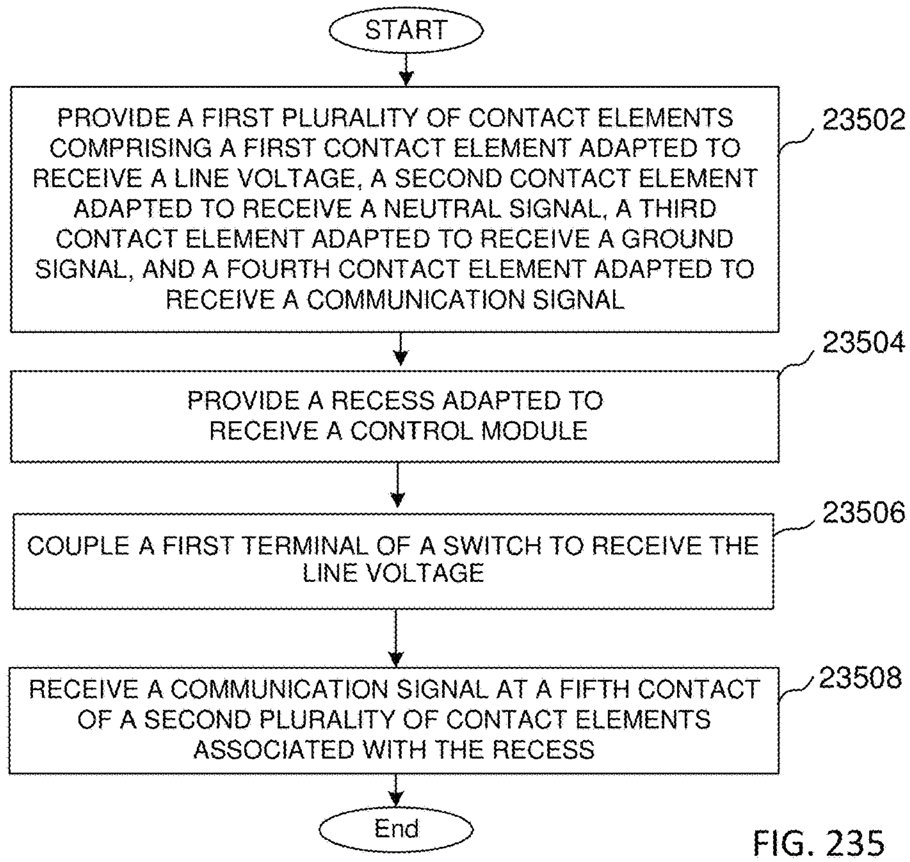

FIG. 235 is a flow chart showing a method of providing an electrical interface in a power adapter arrangement.

Figure 236:
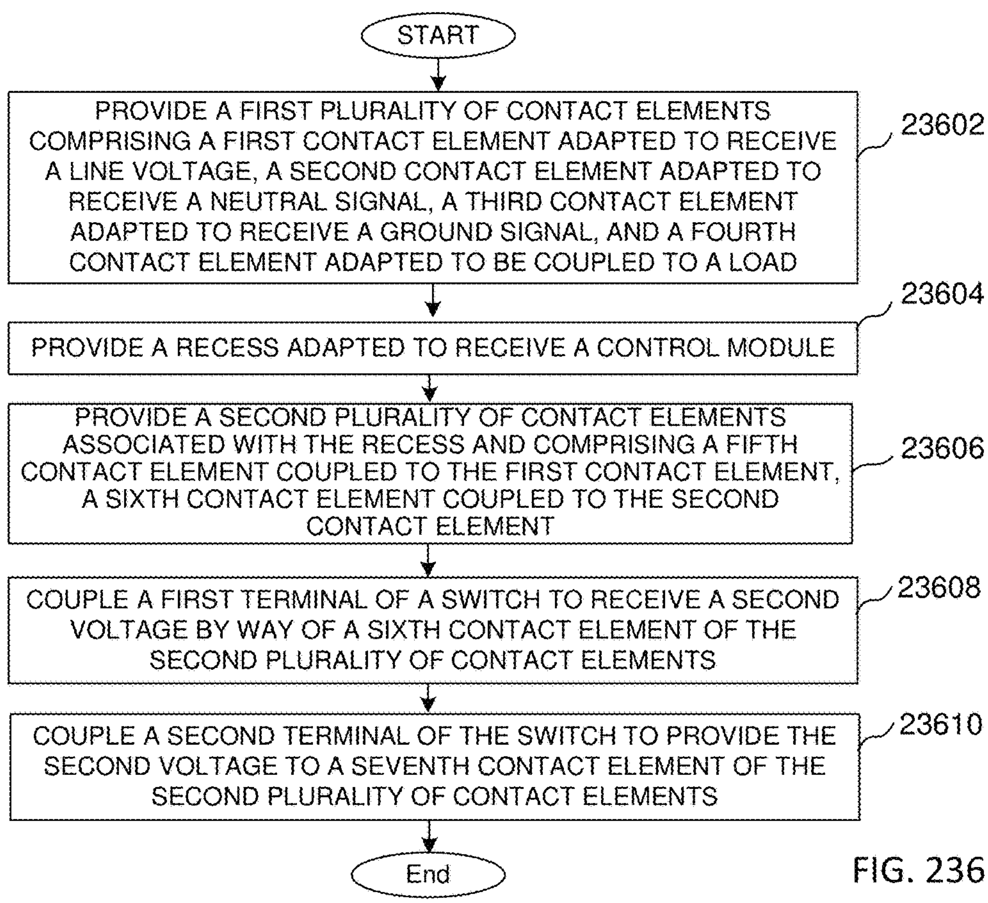

FIG. 236 is another flow chart showing a method of providing an electrical interface in a power adapter arrangement.

Figure 237:
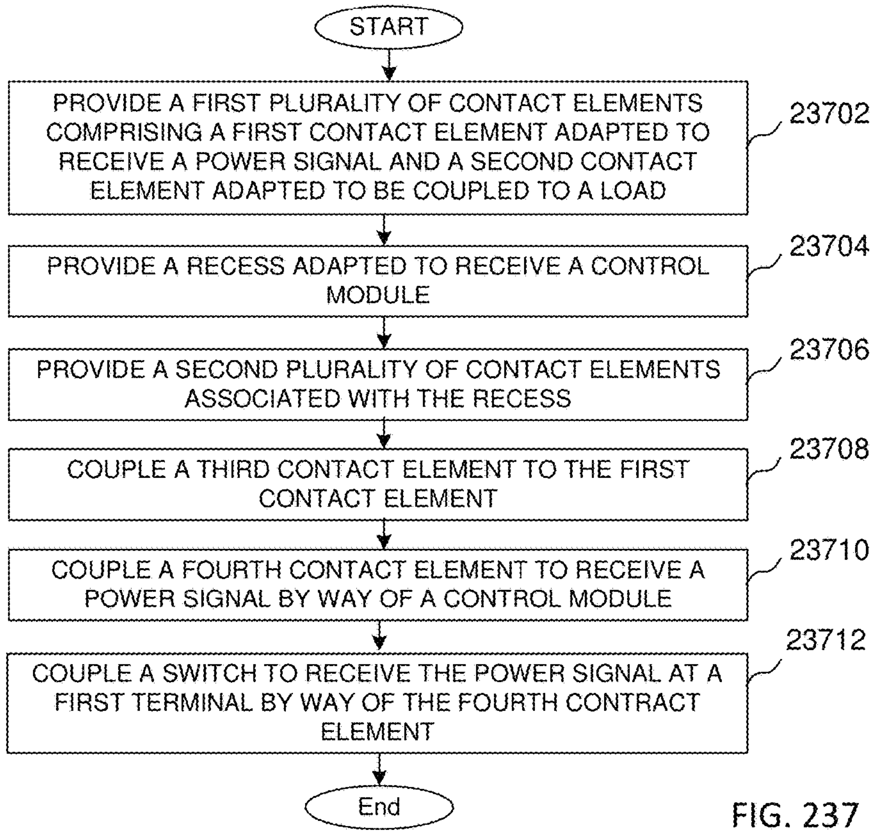

FIG. 237 is a flow chart showing a method of providing an electrical interface in a power adapter arrangement comprising a power adapter having a switch.

Figure 238:
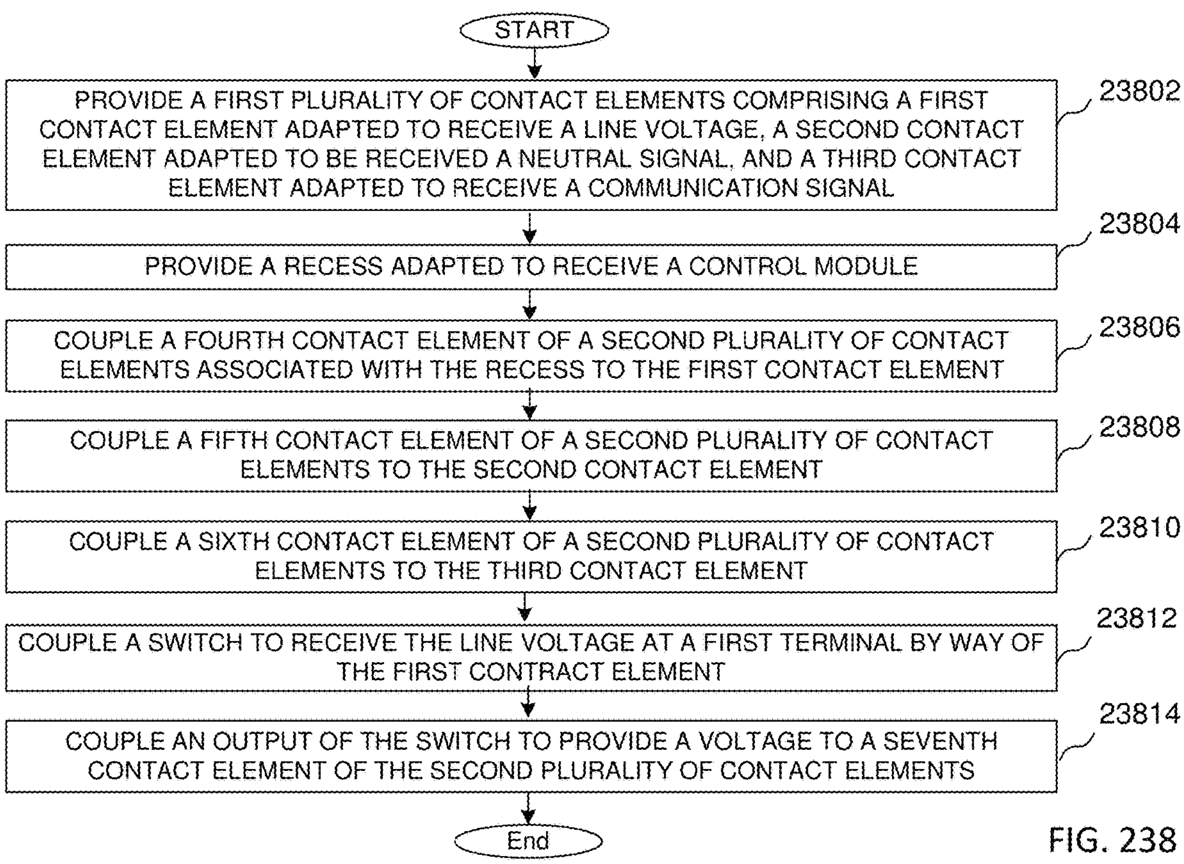

FIG. 238 is another flow chart showing a method of providing an electrical interface in a power adapter arrangement comprising a power adapter having a switch.

Figure 239:
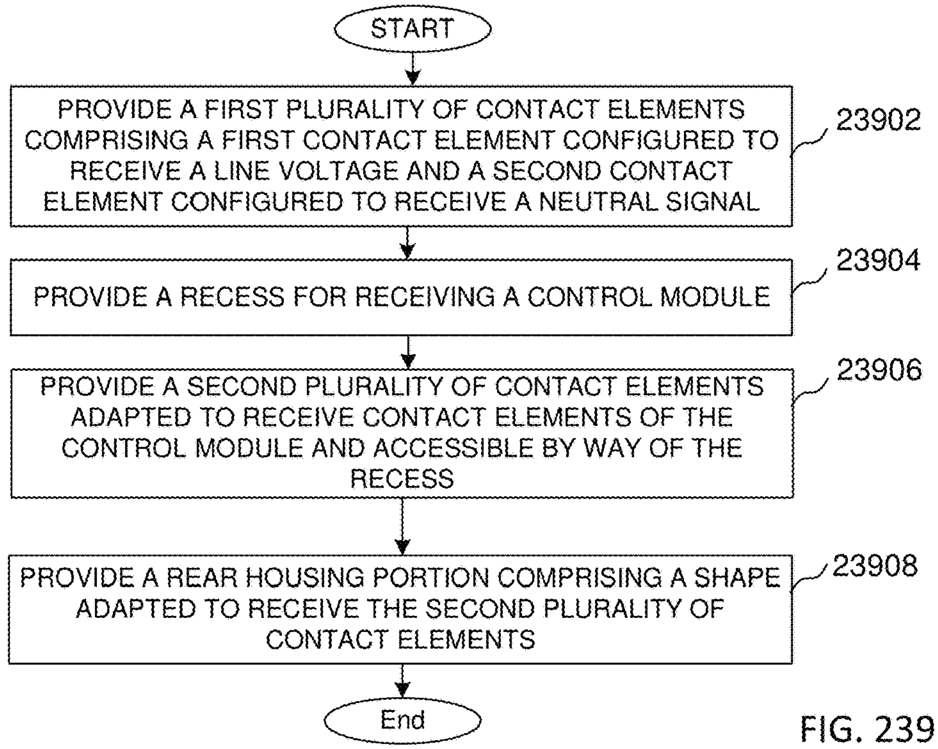

FIG. 239 is a flow chart showing a method of coupling elements of a power adapter arrangement.

Figure 240:
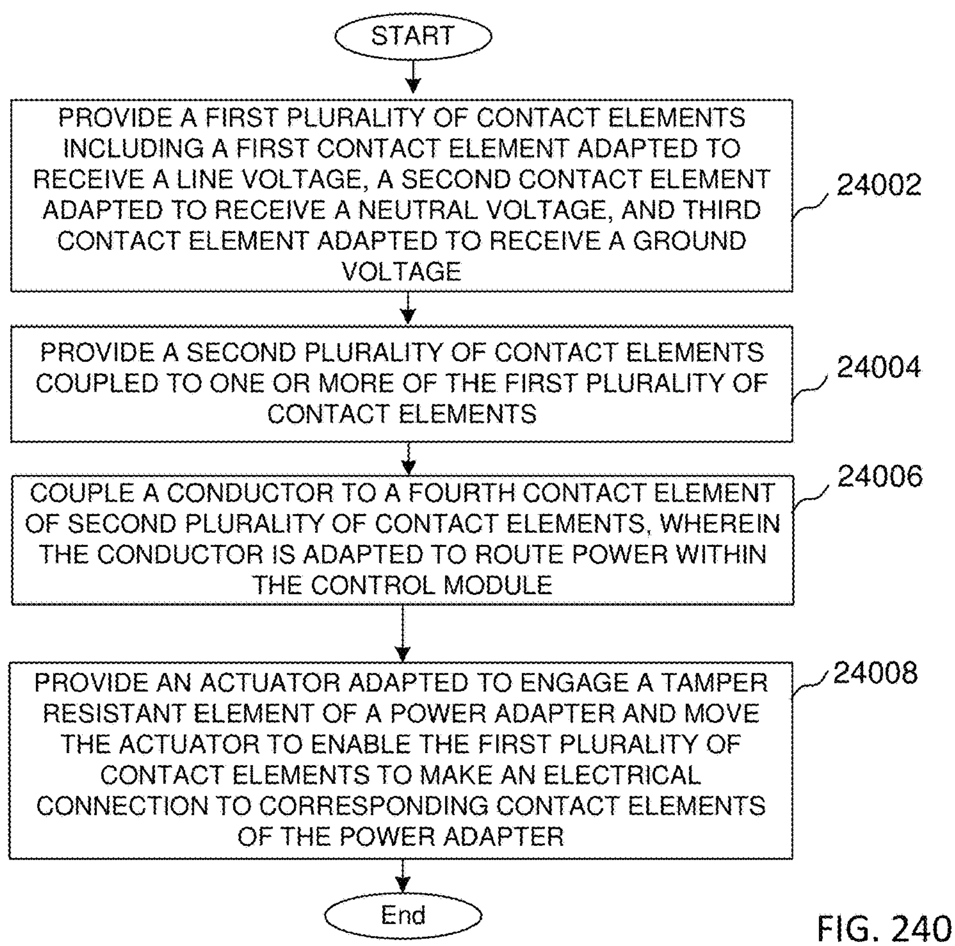

FIG. 240 is another flow chart showing a method of coupling elements of a power adapter arrangement.

Figure 241:
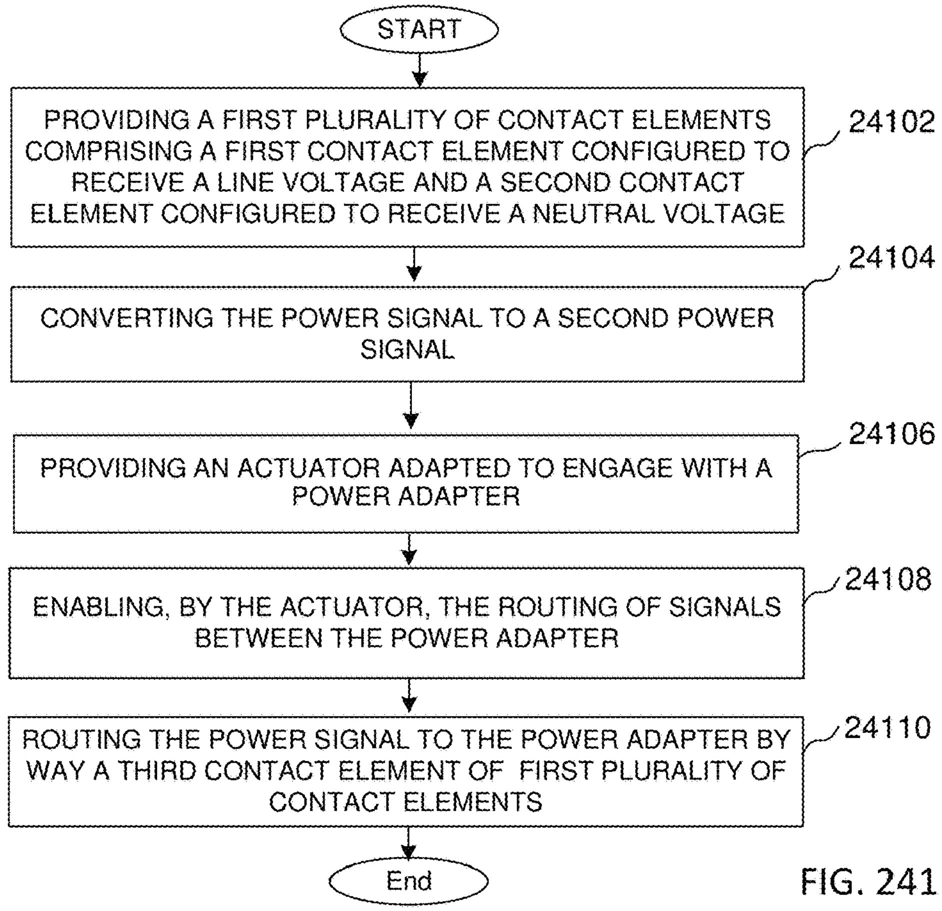

FIG. 241 is a flow chart showing a method of implementing a power adapter arrangement comprising an actuator.

Figure 242:
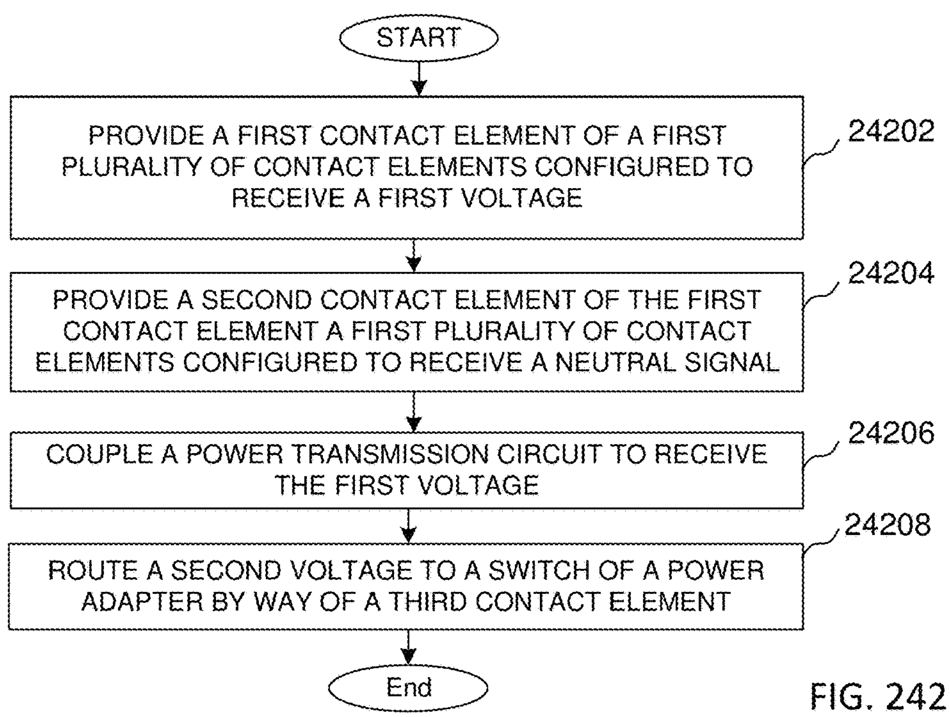

FIG. 242 is another flow chart showing a method of providing an electrical interface in a power adapter arrangement comprising a power adapter having a switch.

Figure 243:
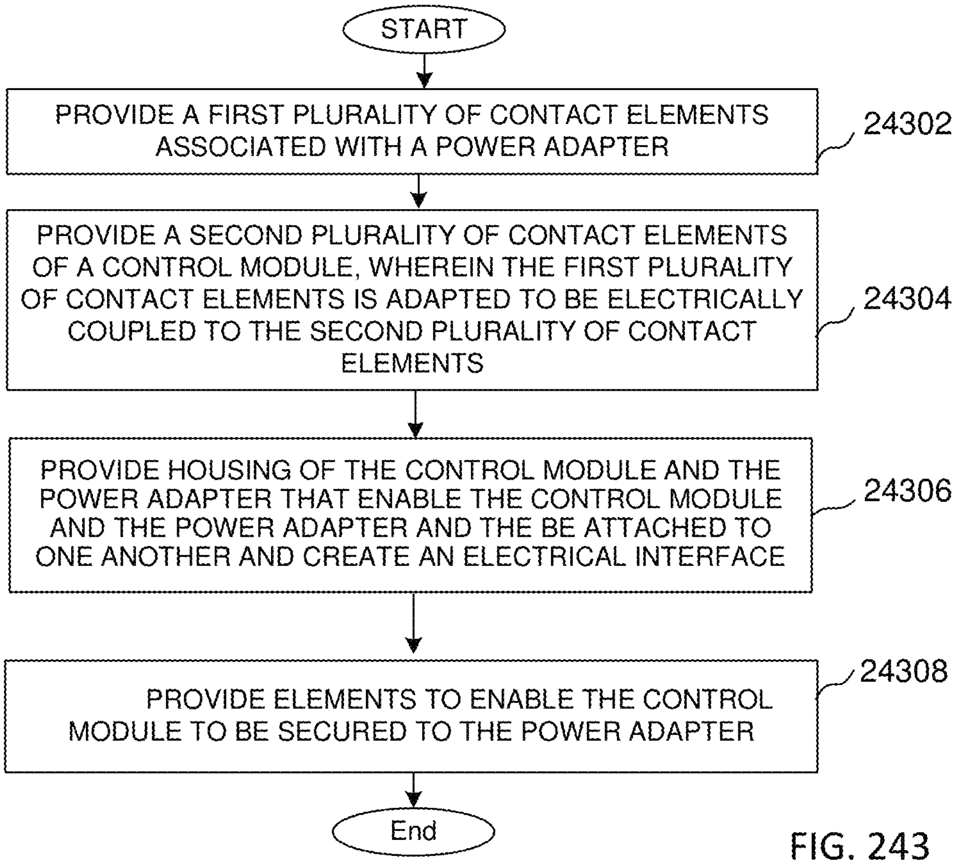

FIG. 243 is a flow chart showing a method of attaching power adapter elements to create an electrical interface.

Figure 244:
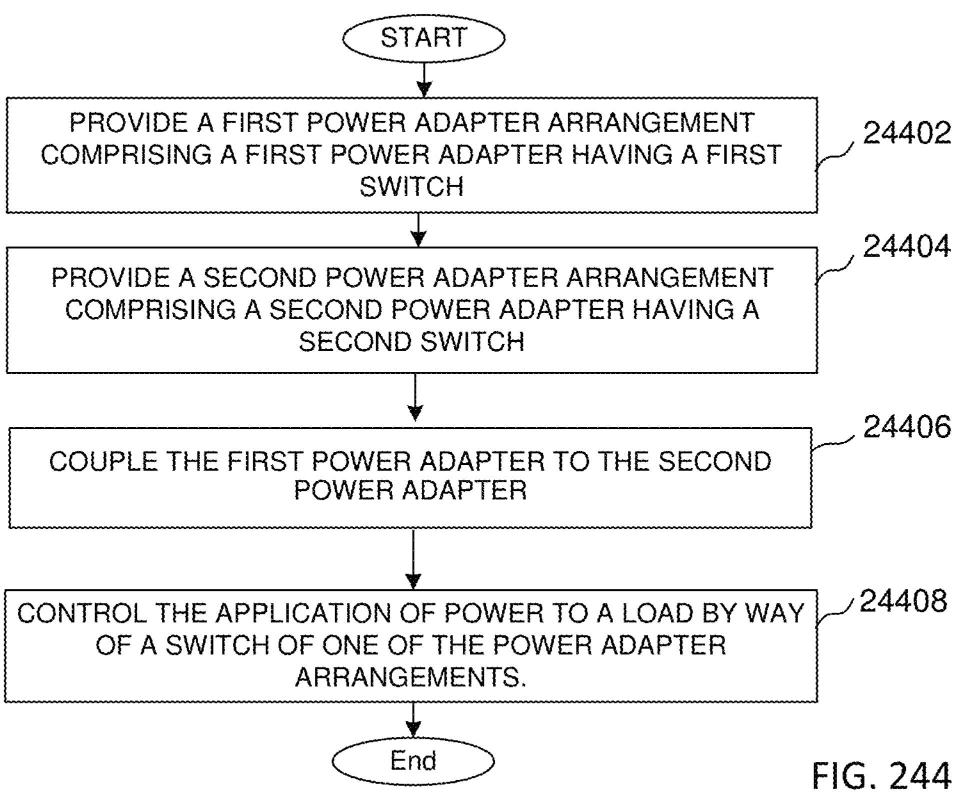

FIG. 244 is a flow chart showing a method of implementing first and second power adapter arrangements.

Figure 245:
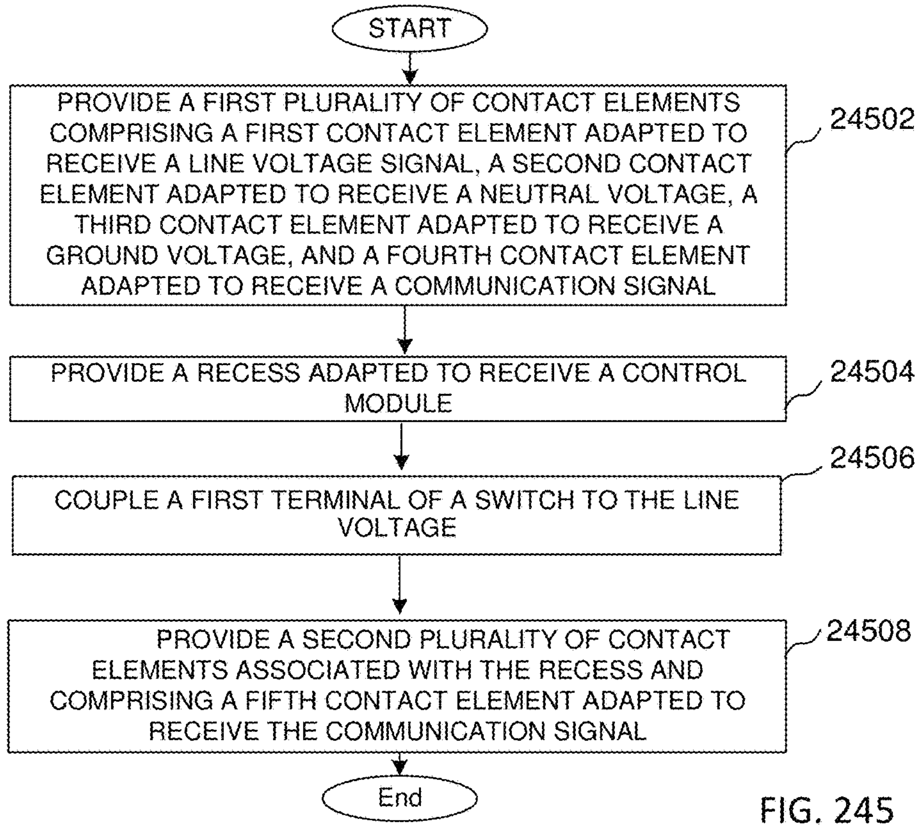

FIG. 245 is a flow chart showing a method of implementing an in-wall power adapter having a switch and a recess adapted to receive a control module.

Figure 246:
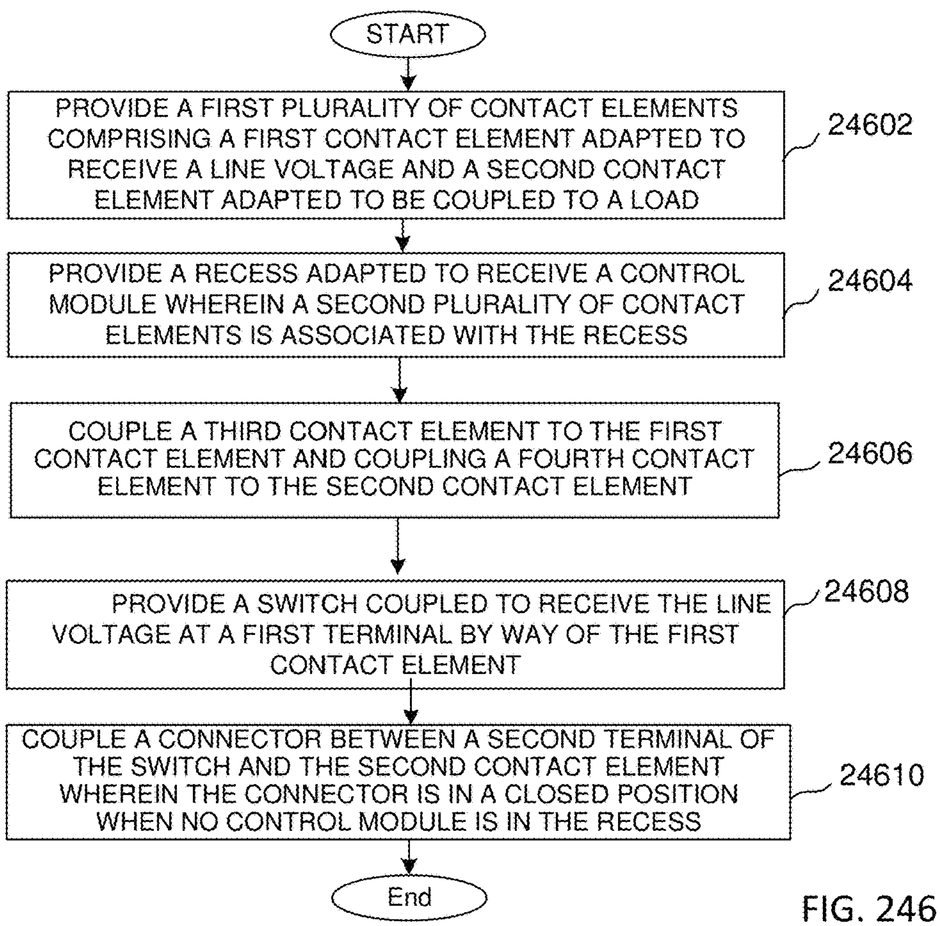

FIG. 246 is a flow chart showing a method of implementing an in-wall power adapter adapted to receive a voltage.

Figure 247:
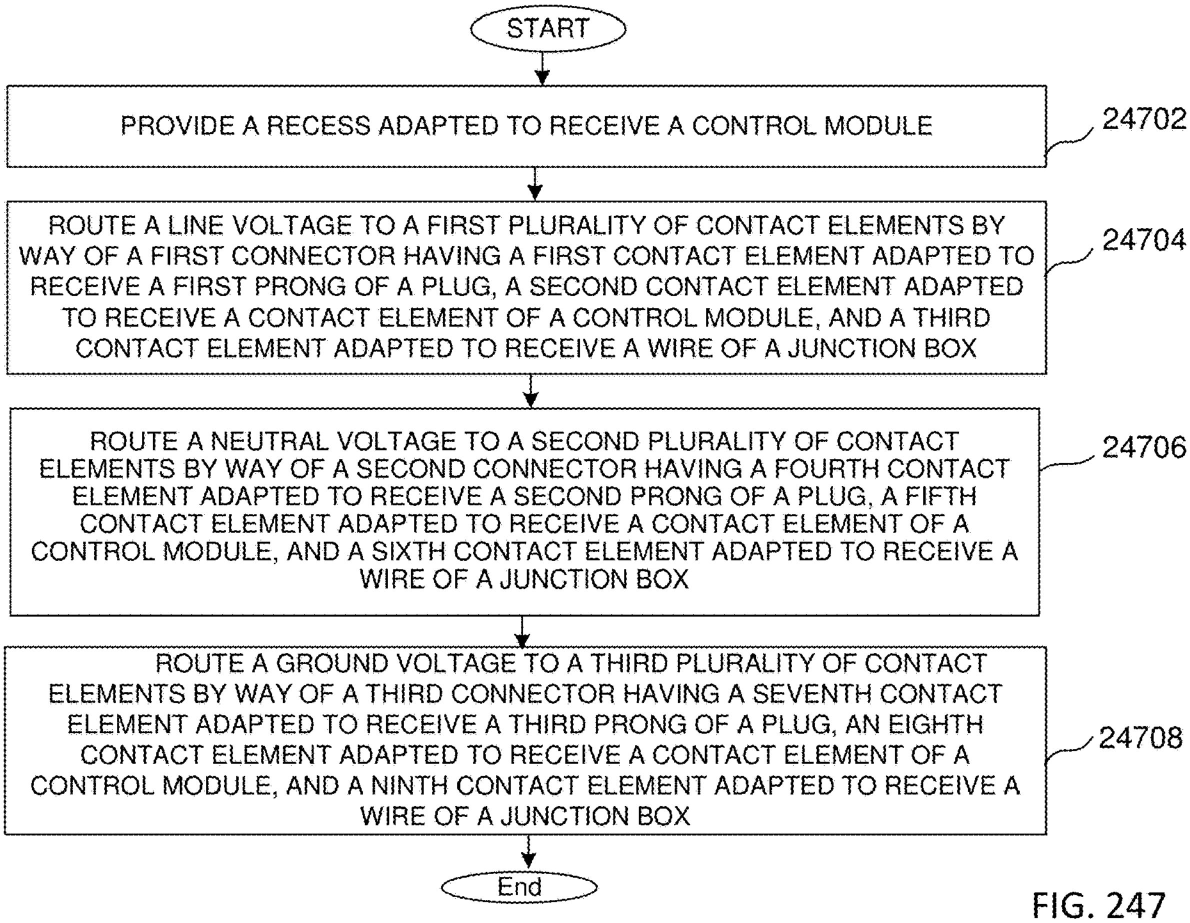

FIG. 247 is a flow chart showing a method of configuring an in-wall power adapter to apply a voltage to a load.

Figure 248:
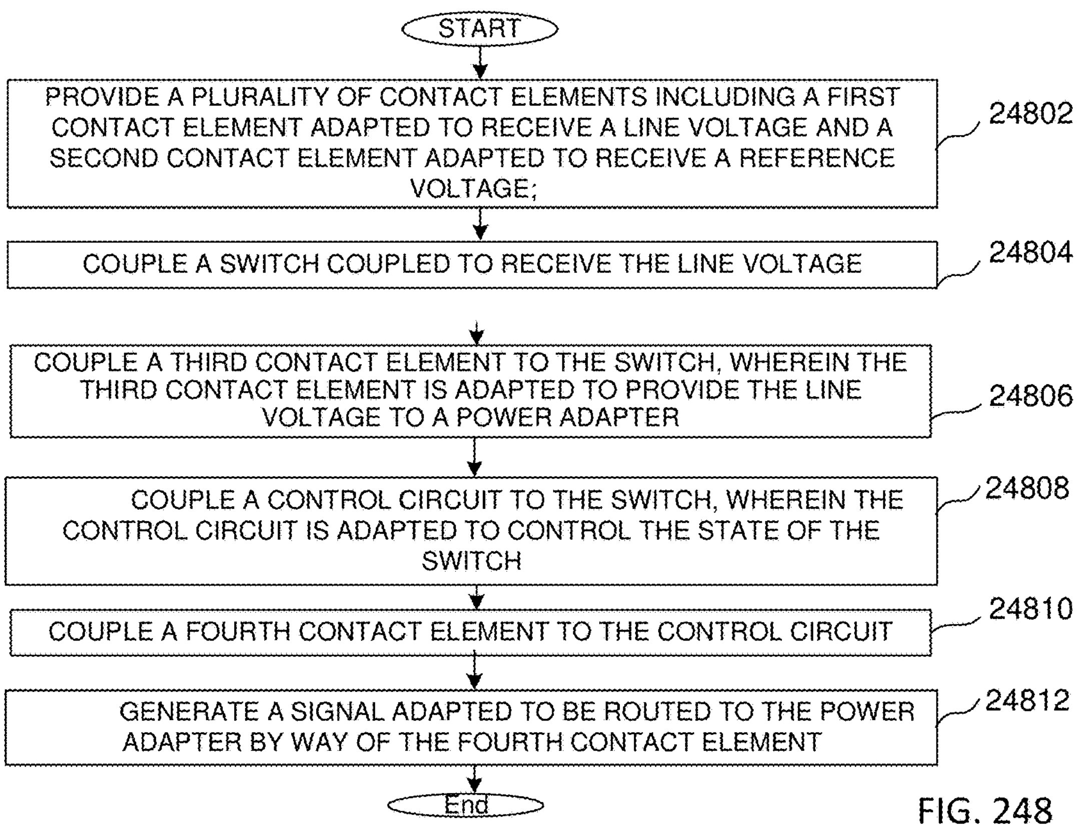

FIG. 248 is a flow chart showing a method of implementing a control module adapted to be attached to a power adapter.

Figure 249:
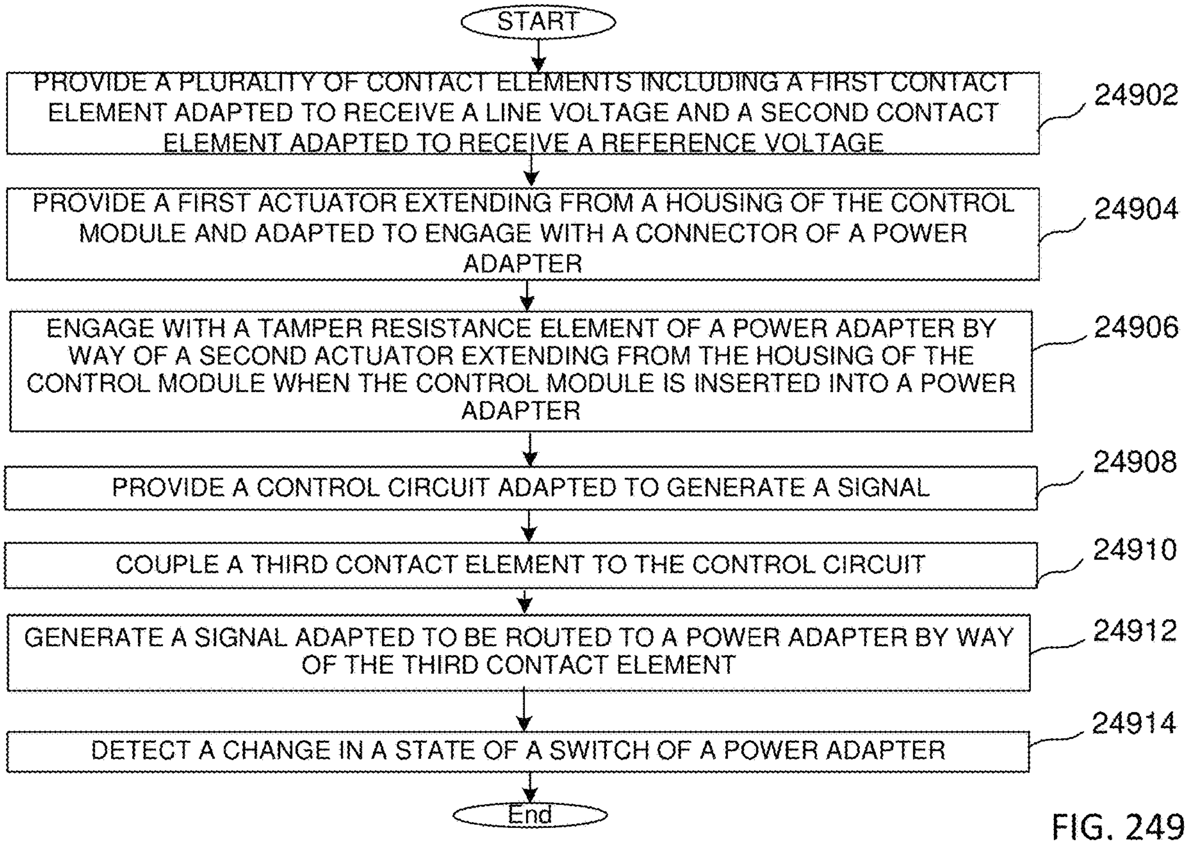

FIG. 249 is a flow chart showing another method of implementing a control module adapted to be attached to a power adapter.

Figure 250:
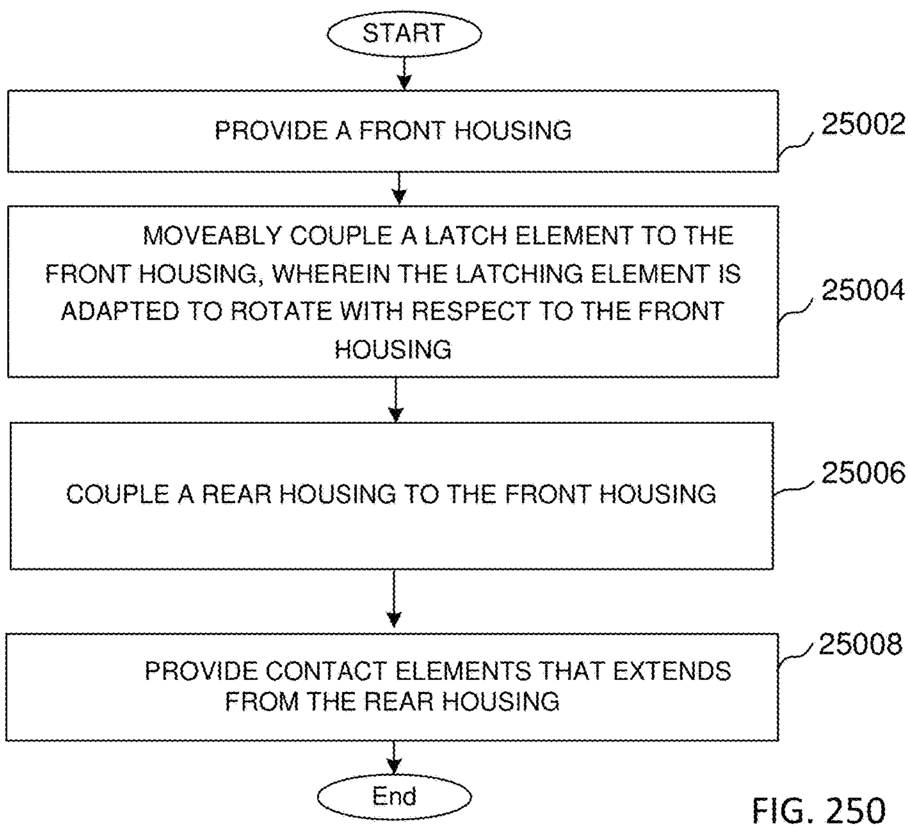

FIG. 250 is a flow chart showing a method of attaching a control module to a power adapter.

Figure 251:
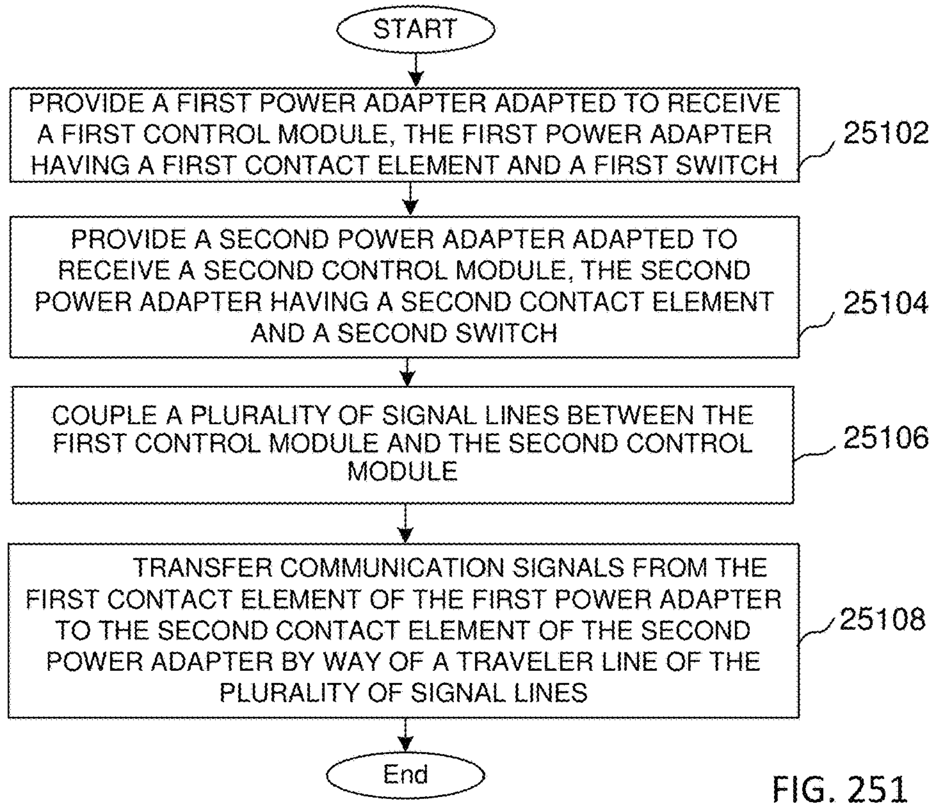

FIG. 251 is a flow chart showing a method of routing signal in a 3-way power adapter arrangement.

Figure 252:
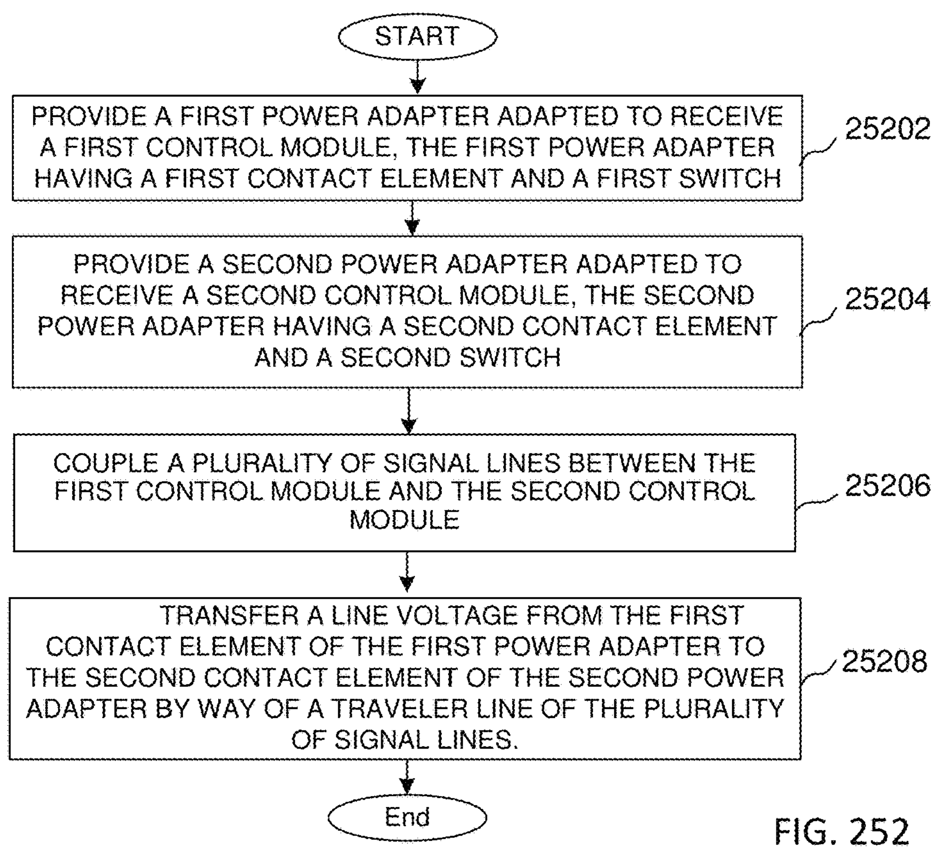

FIG. 252 is a flow chart showing another method of routing signal in a 3-way power adapter arrangement.

DETAILED DESCRIPTION

Figure 1:
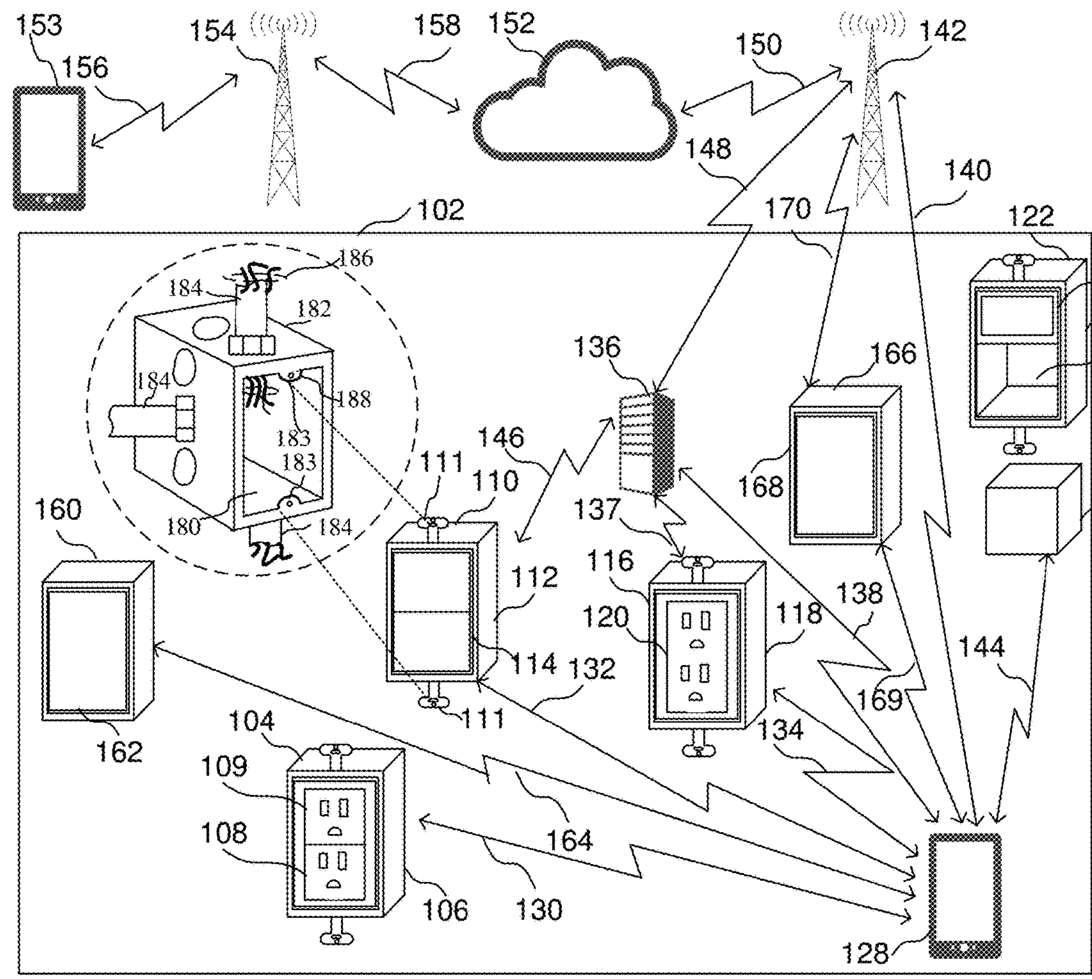
FIG. 1 is a block diagram of a system for controlling the application of power to various loads.

FIG. 1 is a block diagram of a system for controlling the application of power to various loads. As shown in FIG. 1, a system 100 comprises a grouping 102 of power adapter arrangements, such as a residential or commercial building for example, having a plurality of power adapter arrangements. A first power adapter arrangement 104 comprises a power adapter 106 and a control module 108 shown below an outlet 109. The control module 108 is removably attached a recess of the power adapter 106, as shown by way of example for the power adapter arrangement 122. A second power adapter arrangement 110 comprises a power adapter 112 and control module 114 comprising a switch. A third power adapter arrangement 116 comprises a power adapter 118 and a control module 120 comprising outlets. A fourth power adapter arrangement 122 comprises a power adapter 124 having a recess 125 adapted to receive a control module 126 below a switch 127. Flanges are shown on the top and bottom of the power adapter arrangements, where the flanges enable the power adapter arrangements to be attached to a junction box in a residential or commercial building, for example. According to various implementations, in-wall power adapters are attached to junction boxes.

While the control modules provide different functionality, some may provide wireless functionality which enable communication with various elements of the grouping 102. For example, a remote device 128, such as a mobile device (e.g., a cell phone, tablet, or computer), may communicate with the power adapter 106 by way of a wireless connection 130. The remote device 128 may also communicate with the power adapter arrangement 110 by way of a wireless connection 132. Further, the remote device 128 may communicate with the power adapter 118 by way of a wireless connection 134, and with a communication base 136, such as a Wi-fi, Z-wave or Zigbee base for example, by way of a wireless connection 138. The communication base may communicate with the power adapter arrangement 116 by way of a wireless connection 137, enabling the remote device 128 to control the power adapter arrangement 116 through the communication base 136. The remote device 128 may also communicate with wide area communication network 142, such as a cellular telephone network or other wide area communication network. The remote device may communicate directly with the power adapter 124 by way of a wireless connection 144, and indirectly with the power adapter arrangement 110 by way of the wireless connection 146.

The wide area communication network 142 can also enable storage of data associated with the grouping 102 and remote control from additional remote locations. More particularly, a communication base 136 may communicate with a power adapter by way of a wireless connection 137 with a wider area network 142 by way of a wireless connection 148. The wide area communication network 142 may also communicate with a remote computer 152, shown as a cloud server for example. Another remote device 153, which may be out of communication range of any of the power adapter arrangements or the communication base 136, may communicate with another wide area communication network 154 by way of a wireless connection 156, where the wide area communication network 154 may communicate with the remote computer 152 by way of the wireless connection 158. The wide area communication network 154 may be a part of or separate from the wide area communication network 142. While various wireless connections are shown, it should be understood that wired connections may also be used.

According to some implementations, control modules may be used in an appliance of the system 100. That is, the control modules provide functionality that may be beneficial in devices other than switches and outlets and can be used in any type of appliance. The use of a control module in appliance enables a common platform for a wide variety of devices in a home, and therefore fully enables home automation on a single platform. A first appliance 160 comprises a control module 162 and is connected to the Remote device 128 by way of a wireless connection 164. A second appliance 166 comprising a control module 168 is also coupled to the remote device 128 by way of a wireless connection 169 and is connected to the wide area communication network 142 by way of a wireless connection 170. While two appliances are shown by way of example, it should be understood that any number of appliances could be used in the system. The two appliances are shown by way of example to show the different connections to a variety of elements of the system. An appliance outside of the grouping 102 may also be associated with this system and controlled by a remote device within or outside of the group in 102. An appliance may be any type of device, including at least for example, kitchen appliances, laundry appliances, shade control, temperature control, etc.

A junction box 182 may be coupled to conduit 184 having wires 186 that may be used to provide power to the modular power adapter by way of a terminal portion of the wires 186 that extend into a recess 125 adapted to receive a power adapter, such as a modular power adapter. Flanges 183 receive a screw or other attachment element by way of a threaded portion 188 to enable attaching corresponding flanges of the power adapter to the flanges 183, as shown by way of example with power adapter arrangement 110. Junction boxes 182 are commonly installed in residential and commercial building, such as attached to a stud behind wall board material for example.

Figure 2:
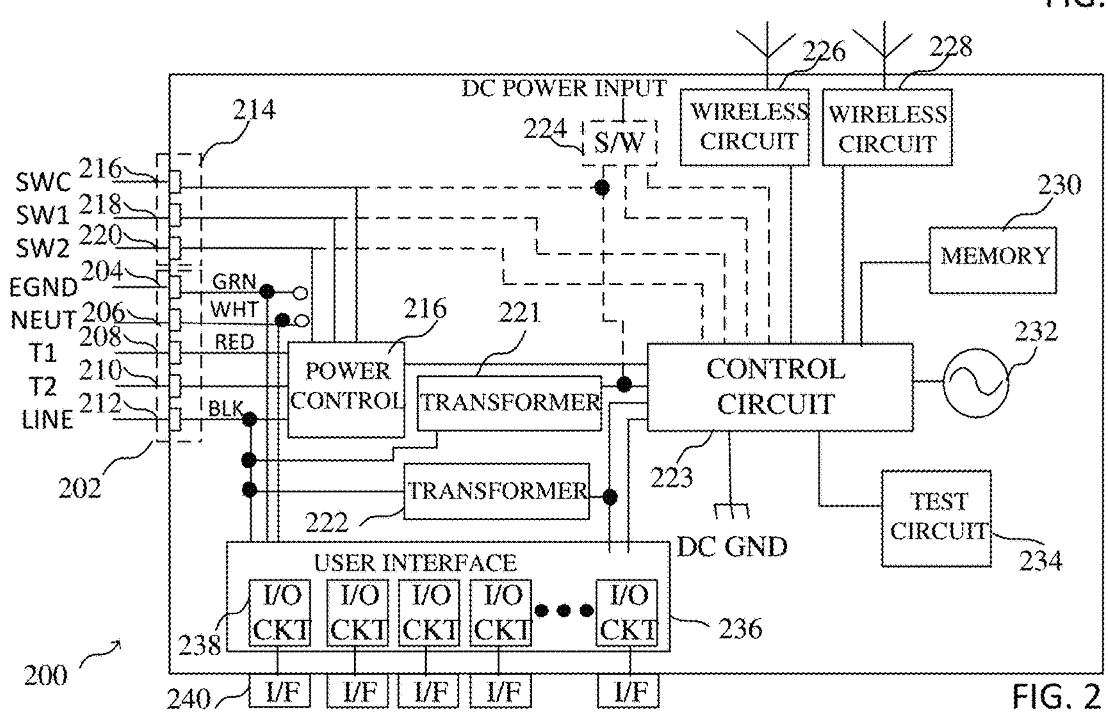
FIG. 2 is a block diagram of a control module that can be used with a variety of power adapters.

Turning now to FIG. 2, a block diagram of a control module 200 that can be used with a variety of power adapters is shown. More particularly, the control module 200 comprises in electrical interface 202 having a plurality of contact elements, including for example a first contact element 204 adapted to receive a ground voltage, a second contact element 206 adapted receive a neutral voltage, a third contact element 208 adapted to receive a first traveler line (Traveler 1) signal a fourth contact element adapted to receive a second traveler line (Traveler 2) signal 210, and a fifth contact element adapted to receive a line voltage 212. The electrical interface 202 also comprises contact elements associated with switching devices, shown here by way of example as a common switch (SWC) contact element 216, a first switching (SW1) contact element 218, and a second switching (SW2) contact element 220. The control module may also comprise one or more Transformers to generate a DC voltage. For example, a first transformer 221 coupled through CB line input voltage they generate a first reference DC signal, while a second transformer 222 also coupled to the line voltage may generate a second reference DC signal. Both DC output signals of the Transformers 221 and 222 are coupled to a control circuit 223. Dashed lines are shown to indicate that the control module 200 may be implemented with a variety of switching arrangements. It should be further understood that the electrical interface 202 is shown by way of example and can include contact element arrangements described in any of the implementations set forth below.

The controls circuit 223 may be coupled to a variety of devices that provide functionality to the control module 200. For example, the control module may comprise one or more wireless communication circuits, shown by way of example here as wireless communication circuits 226 and 228. It should be understood that the wireless communication circuits could implement any wireless signaling protocol. The control circuit may be coupled to a memory 230 for retaining any data or code necessary for implementing the control module, an oscillator 232, and a test circuit 234. It should be understood that any additional peripherals to the control circuit could be implemented. A user interface 236 could also be implemented and may comprise a plurality of input/output (I/O) circuits 238, each of which may have an external interface (I/F) 240. The control module 200 is provided by way of example to show some elements necessary for providing functionality to the control module. It should be understood that FIG. 2 is shown by way of example, and may have fewer elements than are shown, or may include additional elements which may be disclosed for example in other control modules set forth below.

Figure 3:
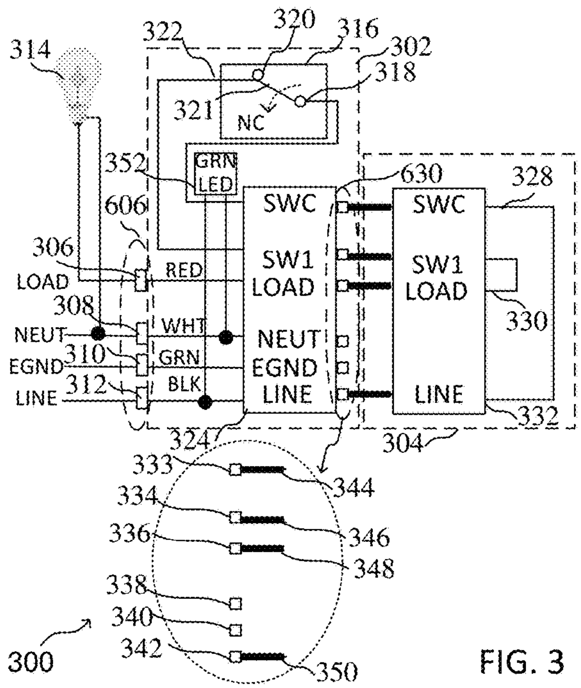
FIG. 3 is a block diagram of a power adapter arrangement having a single pole, single throw (SPST) switch, wherein an enlarged portion of a contact element interface is shown.

Electrical interfaces between power adapters and control modules may comprise a different number of contact elements. The different number of contact elements in electrical interfaces between power adapters and control modules may be beneficial for different reasons, as will be described in more detail below. Turning first to FIG. 3, a block diagram of a power adapter arrangement 300 having a single pole, single throw (SPST) switch is shown, wherein an enlarged portion of a contact element interface is shown in the dashed circle. More particularly, a power adapter 302 is adapted to be coupled to a control module 304. An electrical interface 606 comprising a first plurality of contact elements enables the electrical connection to electrical wires, such as wiring in a commercial or residential building that receives a source of power provided to the residential or commercial building and provides power to a load, such as a light bulb that is shown by way of example to represent a load receiving power. The electrical interface 606 comprises a first contact element 306, which may be a load contact element, adapted to be coupled to the load, a second contact element 308, which may be a neutral contact element, adapted to be coupled to a neutral wire which is associated with a neutral voltage to provide a return current path for the power adapter arrangement, a third contact element 310, which may be a ground contact element, adapted to be coupled to a ground wire which is associated with a ground voltage (often referred to as earth ground (EGND)) to provide grounding for the power adapter and a control module coupled to the power adapter, and a fourth contact element 312, which may be a line contact element, adapted to be coupled to a line wire in the junction box to receive a line voltage to enable the power adapter arrangement to provide power, such as by providing current, to a load 314. The electrical interface 606 may be located on one or more external surface of the power adapter, as will be shown in FIGS. 121-141 and FIGS.

172-224. It should also be understood that the electrical interface 606 comprises contact elements of a power adapter alone, a control module alone, or a combination of a power adapter and a control module. While the power adapter 302 is configured for a single switch control of power to the load, a power adapter may comprise contact elements that are adapted to be coupled to traveler lines extending between two power adapters, as will be described in more detail in reference to FIG. 6. According to some implementations, the traveler lines enable the transfer of communication signals between control modules, where the communication signals may comprise requests, commands, acknowledgement, status information, control signals, or any other information enabling a control module to operate in a multi-way wiring arrangement. The power adapter is configured to route signals (reference voltage signals such as a line voltage signal, a neutral voltage or a ground voltage) to an electrical interface 630 comprising a plurality of contact elements of the power adapter that are electrically coupled to a plurality of contact elements of a module, such as a control module. It should also be understood that the electrical interface 630 comprises contact elements of a power adapter alone, a control module alone, or a combination of a power adapter and a control module. According to various implementations, contact elements adapted to be electrically coupled to contact elements of a control module may be located within a recess of the power adapter.

The power adapter also comprises a switch 316 having a first terminal 318 and a second terminal 320. SPST switches similar to switch 316 may be shown in other implementations below. The switch 316 may be adapted to route an electrical signal from the terminal 318 to the terminal 320 or from the terminal 320 to the terminal 318. As will be described in more detail below, the first terminal 318 is adapted to receive the line voltage (or in some cases a low voltage signal) and the second contact element is adapted to route the line voltage (or a low voltage signal) by way of a conductor element 322 (e.g. a trace on a printed circuit board (PCB) or a metal conductor commonly used in switches and outlets) in response to a switching of the switching contact element 321, which may be caused by the actuation of the 316 by a user of the power adapter (e.g. by way of an actuation of a switch actuator accessible the a user on the power adapter). The conductor element 322 may be coupled to a PCB 324 having contact element of an electrical interface 630 or may be directly connected to a contact element of the electrical interface 630 (e.g., an electrical conductor may extend from the terminal 320 to the contact element 333 of the electrical interface 630). Colors associated with contact elements are provided by way of example that may correspond to the common wire colors if the contact elements are implemented as wires extending from the housing and adapted to be coupled to wires 1801 of a junction box as shown below in FIG. 18, where the load wire may be a red wire, the neutral wire may be a white wire, the ground wire may be a neutral wire and the line wire may be a black wire.

The contact elements of the electrical interface 630 associated with the power adapter are adapted to be electrically connected to corresponding contact elements of a module, such as a control module. According to the example of FIG. 3, six contact elements of the electrical interface 630 are implemented on the power adapter and four corresponding contact elements are implemented on the control module. The control module 304 comprises a standard control module and has conductor elements 328 and 330 that route the line power through the switch as shown to provide the line power to the load. If the switching contact element 321 were moved to the no contact (NC) position, no power would be provided to the load 314. The conductor elements 328 and 330 may be a part of a contact element interface 332. For example, the conductor elements may comprise conductors that provide a direct connection between contact elements of the electrical interface 630, or between the contact elements of the electrical interface 630 and circuit elements of the control module, including for example internal circuit elements of the control module and circuit elements and actuators that may be exposed to a user of the control module or provided on a user interface, as will be described in more detail below. That is, contact element interface 332 may comprise a printed circuit board, or may not be present as a circuit element and only be provided for purposes of labeling the conductor elements. For example, contact element interface 332 may be a PCB enabling the connection of the conductor element 328 to the contact elements 344 and 350 and enabling the connection of the conductor element 330 and the contact elements 346 and 348 by way of traces on the PCB, and may include other elements such as circuit components that enable functions of the control module. According to other implementations, the contact element interface 332 (of the control module 304 or any other control module set forth below) may be shown for the purpose of designating the name of the conductive element that extends between contact elements (e.g., the conductor element 330 extends between the contact element 346 and 348, where no printed circuit board is used, but rather a connector, such as a stamped metal part providing a connection between contact elements 344 and 350 or contact elements 346 and 348). As will further be described in more detail below in reference to FIG. 6, additional contact elements may be implemented in the power adapter and in control modules to achieve 3-way switching. While PCBs are described, it should be understood that any type of circuit board for receiving electronic components and providing electrical connections between the components, conductors, connectors or contact elements of the circuit board could be implemented.

The expanded view of the electrical interface 630 shows the six contact elements of the power adapter, including a contact element 333 for a switch common terminal (SWC), a contact element 334 for a first switch terminal (SW1), a contact element 336 for a load connection (LOAD or LD), a contact element 338 for neutral (NEUT) connection, a contact element 340 for a ground (EGND) connection, and a contact element 342 for a line (LINE or LN) connection. As can be seen in FIG. 3, the contact elements 338 and 340 for neutral and ground are not coupled to a corresponding contact element of the control module because the control module 304 does not require those connections. The expanded view also shows the four contact elements of the control module. As will be described in more detail, additional contact element may be provided to both the power adapter and the control module to enable 3-way switching.

According to various implementations as will be described in more detail below, it may be necessary to understand whether a power adapter is wired to directly receive a line voltage or receive the line voltage by way of a traveler line, such as in a 3-way or 4-way switching arrangement. Accordingly, a line voltage indicator element 352 is provided to indicate that the power adapter 302 or 602 is coupled directly to the line voltage. The line voltage indicator element 352 may comprise a light emitting diode (LED) for example, where the LED would be lit all the time because the power adapter is installed where the line voltage would be continuously applied to the LINE or LN/LD contact element, such as in a conventional switch or on a line side of a 3-way switching arrangement (i.e., a side of a 3-way switching arrangement that receives the line voltage from a line source in the junction box other than from a traveler). However, if the power adapter having a switch is wired to the load side of a 3-way switching arrangement (i.e., the side of the 3-way switching arrangement providing power from the load side power adapter to the load), as will be described in more detail below, the line voltage would not be continuously applied to the LN/LD contact element, and the line voltage indicator element would not always indicate that a line voltage is present. Rather, the line voltage indicator element would toggle on and off with the state of the switch of the power adapter and the power applied to the load 314. As will further be described in more detail below, a line voltage indicator element may also be implemented in a power adapter that is intended to be wired on the load side of a 3-way switching arrangement. The line voltage indicator element may comprise a red LED for example, where the user would see that the LED not only toggles state, but displays red light, indicating that the power adapter is on the load side of the 3-way switching arrangement. That is, according to some implementations, a separate model (e.g., a separate stock-keeping unit or SKU) would be used, where the power adapter for a load side power adapter wired in a 3-way wiring arrangement having a pair or traveler lines would have a red LED.

There are different categories of control modules based upon the routing of a power signal, such as a line voltage, including for example, switching control modules and passive control modules. A switching control module may include a switching element, which may be any type of switch for blocking or passing voltage or current, such as a relay or a TRIAC for example. The switching element may enable switching a 120V AC signal (or a signal that provide a lower voltage or a lower current generated by a dimmer circuit as will be described in more detail below) to a load. A switching control module in a power adapter configured in a 3-way or 4-way switching arrangement may detect a change in a current or voltage caused by a switching associated with a different power adapter (i.e., a detecting of a switching on the load side power adapter by the line side power adapter or vice versa). A switching control module may control the toggling of a line voltage or dimmed line voltage on traveler lines, often designated as Traveler 1 and Traveler 2 for example, of a multi-way switching arrangement (e.g., a 3-way or a 4-way switch). According to some implementations, a line detection circuit for a switching control module may detect a change in the current that is only a result of the switching of the switch on the power adapter, and not a current drawn by a DC circuit in a control module.

A passive control module draws current for powering a passive element, such as a discrete component such as an LED or an AC/DC circuit to generate a DC voltage for example but does not include a switching element that controls the toggling of a line voltage or dimmed line voltage on Traveler 1 and Traveler 2 to control the power to a load. The switching of the line voltage provided to a load or on traveler lines by a power adapter having a switch that is coupled to a passive control module is performed by the switch on the power adapter, where the line voltage may be routed to Traveler 1 or Traveler 2 through the passive control module.

Figure 46:
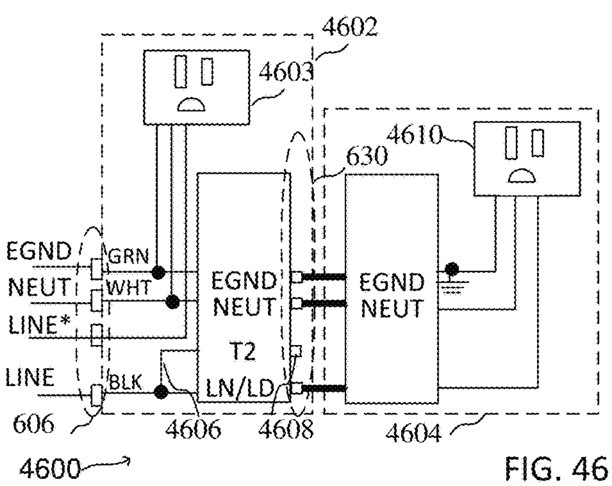
FIG. 46 is a block diagram of a power adapter arrangement having a power adapter comprising an outlet and a standard outlet control module.
Figure 121:
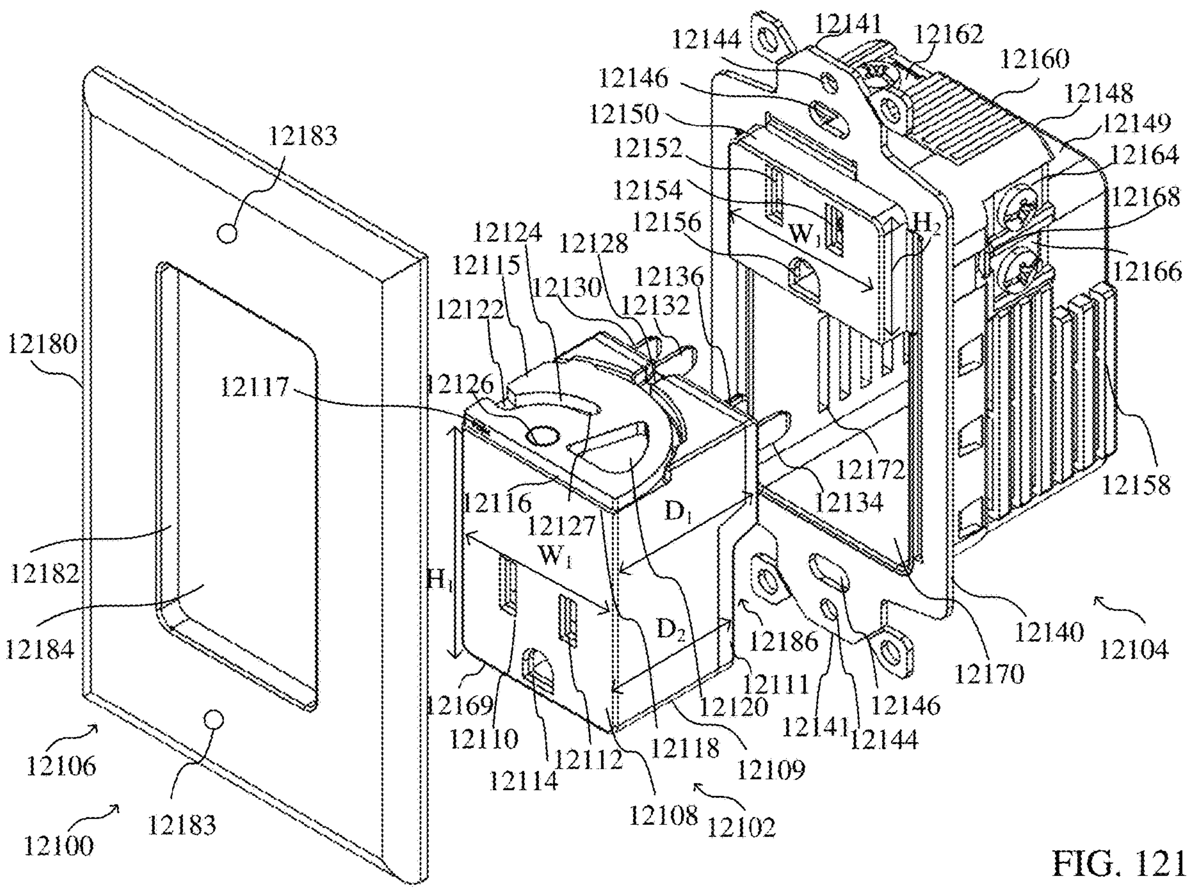

The control modules may also be categorized depending upon how they manage power. Other than a standard outlet control module that provides fixed power to an outlet of the control module, but does not route power or otherwise provide power conversion, as shown in FIGS. 46 and 121 for example, control modules may comprise power managing control modules, which may include (i) power routing control modules, (ii) power switching control modules (e.g., a control module having a timer, motion sensor, or wirelessly controlled outlet), and (iii) power conversion control module (e.g., a module having a USB connector or a night light). Power routing control modules may receive a power signal, such as the line voltage, from a power adapter and route the power signal back into the power adapter. According to some implementations, the power signal routed back into the power adapter may be an AC signal, or a DC signal. A power switching control module may provide a switching of a power signal (i.e., pass or block the power signal). A power switching control module may comprise any control module that includes a dimmer circuit, a motion detection circuit, or a timer circuit, for example. A power conversion control module may comprise a control circuit for converting power from one form of power to another. For example, a simple power conversion circuit may convert an AC line voltage to a light signal, such as by using an LED device. A power conversion circuit may convert an AC signal to a DC signal, such as to provide a DC voltage to enable the operation of internal circuits of the control module or to implement a connector accessible by a user of a power adapter arrangement (e.g., a USB connector for charging a portable device). A power conversion circuit may also convert an AC signal to another AC signal. It should be understood that a given power managing control module may fall into more than one of the three categories (i), (ii) and (iii) listed above.

Figure 4:
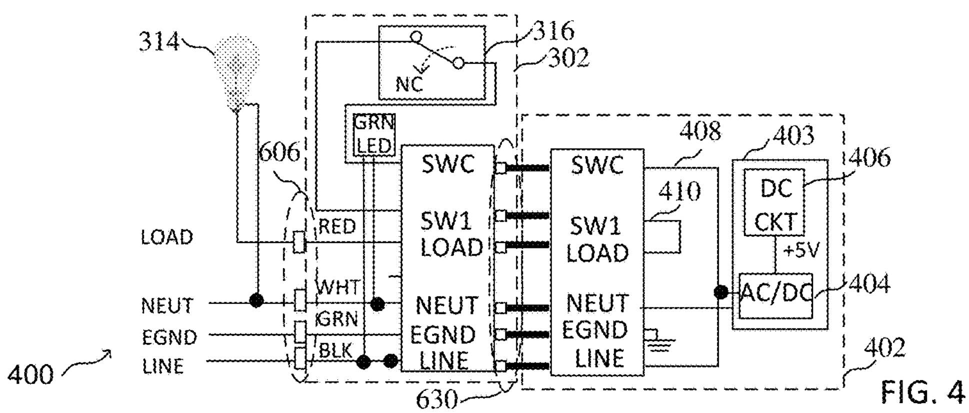
FIG. 4 is a block diagram of a power adapter arrangement having a power adapter with a SPST and a control module having a DC circuit.

Turning now to FIG. 4, a block diagram of a power adapter arrangement 400 having a power adapter with a SPST switch and a control module having a DC circuit is shown. A control module 402 comprises a peripheral device 403 having an AC/DC circuit 404 for converting AC line voltage to a DC voltage, shown here by way of example as a +5 volt DC signal. While the peripheral device 403 is shown by way of example as an AC/DC circuit, it should be understood that the control module 402 may comprise any type of peripheral device that receives one or more reference voltages (e.g., line, neutral or ground). A DC circuit 406 is coupled to receive the DC signal. As will be described in more detail below, the DC circuit could include many types of circuits that could be implemented in a control module, whether standing alone as shown in FIG. 4 or as a part of a control module that is involved, directly or indirectly with switching of power to a load, such as the DC circuit shown in the power adapter 3402 of FIG. 34. Examples of DC circuits that could be implemented in any power adapter include a Wi-Fi extender, Wi-Fi router a data transfer device, a charging circuit, a data processing device, or any sensor that may affect the effect of the power adapter, including for example a light sensor, motion sensor, camera, microphone, a thermometer, humidity sensor, air quality sensor, or any other sensor that could provide information to the control module. Further, it should be understood that features in one control module could be implemented in another control module. For example, a wireless communication circuit may be replaced with a sensor in control modules as set forth below. The control module comprises conductor elements 408 and 410 enabling routing the signals through the switch to the load to enable the normal operation of a switch. The conductor elements 408 and 410 may comprise jumpers and may be implemented for example as traces out of printed circuit board, or metal connectors between the contact elements of the control module. As will be described in more detail below, a power adapter having a switch can be implemented without a control module 402.

Figure 5:
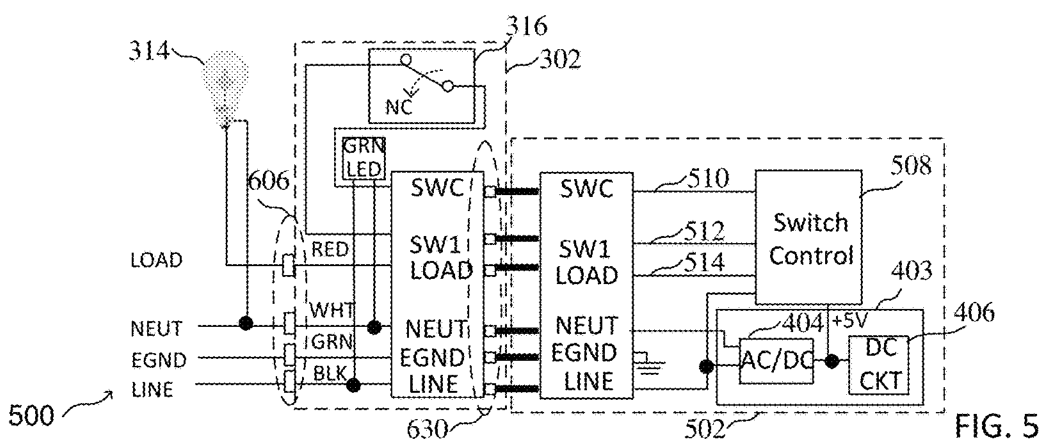
FIG. 5 is a block diagram of a power adapter arrangement having a power adapter with a SPST switch and a control module with switching control.

Turning now to FIG. 5, a block diagram of a power adapter arrangement 500 having a power adapter with a SPST switch and a control module with switching control is shown. According to the implementation of FIG. 5, the control module 502 comprises an AC/DC circuit 404 and a DC circuit 406. A switch control circuit 508 is coupled to receive the +5 volt DC signal, which is provided to the switch 316 on a conductor element 510 to detect a switching of the switch 316 by detecting the presence or absence of the +5 volt DC signal on the SW1 contact element and the conductor element 512. The switch control circuit 508 controls the application of the line voltage to the load by way of the conductor element 514.

Figure 6:
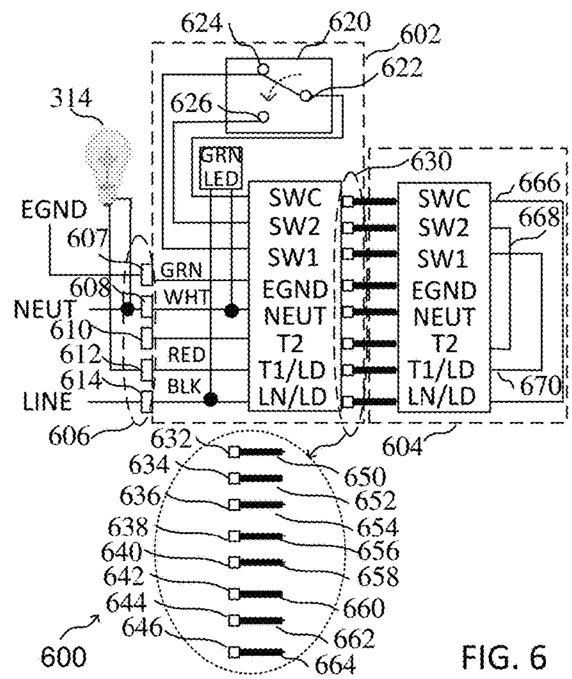
FIG. 6 is a block diagram of a power adapter arrangement having a single pole, double throw (SPDT) switch, wherein an enlarged portion of a contact element interface is shown.

Turning now to FIG. 6, a block diagram of a power adapter arrangement 600 having a single pole, double throw (SPDT) switch, wherein an enlarged portion of a contact element interface is shown. A SPDT switch is commonly used in 3-way switching arrangements and may be used in other implementations as shown below. The power adapter arrangement 600 is similar to the power adapter arrangement 300 but includes further contact elements to enable 3-way switching and other multi-device switching. More particularly, a power adapter 602 is adapted to be electrically coupled to a control module 604 and comprises an electrical interface 606 having contact elements adapted to be coupled to electrical wires, such as wiring in a commercial or residential building that receives a source of power provided to the residential or commercial building and provides power to a load, where the power is generally the current being routed through the load. In addition to the electrical contacts of electrical interface 606 of FIG. 3, the electrical interface 606 of FIG. 6 includes contact elements for traveler lines, which may be implemented as wires between junction boxes, as will be described in more detail below. More particularly, the electrical interface 606 comprises a first contact element 607 adapted to be coupled to a ground wire, second contact element 608 adapted to be coupled to a neutral wire, third contact element 610 adapted to be coupled to a first traveler line (i.e., Traveler 2), fourth contact element 612 adapted to be coupled to a second traveler line (i.e., Traveler 1), and a fifth contact element 614 adapted to be coupled to a line wire to receive the line voltage. Power is provided to the load by way of one of the traveler lines depending upon whether the power adapter is provided on the line side or the load side of the 3-way switching arrangement, and how the power adapter is wired in the 3-way switching arrangement. It should be understood that the control module 604 may be implemented without the ground and neutral contact elements, depending upon factors such as various codes and the application of a power adapter using the control module 604.

The use of the switch 620 enables 3-way switching and other multi-device switching. More particularly, switch 620 comprises a first contact terminal 622 adapted to receive the line power (or a DC voltage) coupled to one of a second terminal 624 or a third terminal 626, depending upon the state of the switch. The switching of the switch will route the line power to the load by way of one of the traveler lines or be used to detect a change in the switch by detecting a change in a DC voltage (or other signal that may be different than a 120V AC line voltage signal) by a control circuit of the control module, as will be described in more detail below.

As is apparent from the electrical interface 630, eight contact elements are provided on both the power adapter 602 and the control module 604. More particularly, the power adapter 602 comprises eight contact elements, including a contact element 632 for a switch common terminal (SWC), a contact element 634 for a first switch terminal (SW2), a contact element 636 for a second switch terminal (SW1), a contact element 638 for a neutral (NEUT) connection, a contact element 640 for a ground (EGND) connection, a contact element 642 for a first traveler connection (i.e., contact element T2), a contact element 644 for a second traveler connection (i.e., the T1/LD contact element), and a contact element 646 for a line connection (i.e., LN/LD contact element). The contact element T1/LD may provide a signal to a traveler line or to a load by way of the contact element 612 depending on how the power adapter is wired for switching power to a load.

The control module comprises corresponding contact elements, including a contact element 650 for a switch common terminal (SWC), a contact element 652 for a first switch terminal (SW2), a contact element 654 for a second switch terminal (SW1), a contact element 656 for a ground (EGND) connection, a contact element 658 for a neutral (NEUT) connection, a contact element 660 for a first traveler connection (T2), a contact element 662 for a second traveler (T1/LD), and a contact element 664 for a line (LN/LD) connection.

The control module 604 is similar to the control module 304, except that it includes an additional conductor element to enable 3-way switching. In addition to conductor element 666 (associated with SWC) and conductor element 668 (associated with SW2), the control module 604 comprises a conductor element 670 extending from the SW1 terminal to the T1/LD terminal. The switching of power to the load is apparent in FIG. 6 and will be described in more detail below when the power adapter arrangement is implemented in a 3-way or other multi-way switching circuit. While a neutral or ground contact element is provided for the control module 604, it should be understood that one or both of these signals may not be required for certain control modules, depending upon a variety of factors, including local or national electrical codes for example. Further, it should be understood that the power adapter 602 could be used as a SPST switch as shown in the implementations of FIGS. 7-17.

Various control modules could be implemented with the power adapter 602, where the implementation of the control module may depend upon whether the control module is attached to a power adapter on a line side of a multi-way switching arrangement (or a power adapter wired as a SPST switch that is not electrically connected to another power adapter, as shown for example in FIGS. 7-18).

Figure 7:
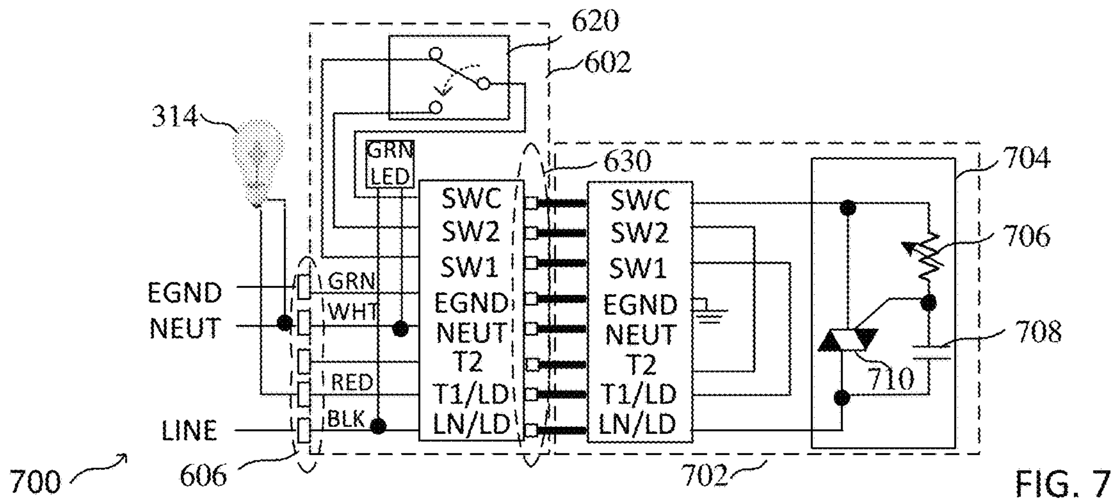
FIG. 7 is a block diagram of a power adapter arrangement having a power adapter having a single pole, double throw switch and a standard dimmer control module.

Turning first to FIG. 7, a block diagram of a power adapter arrangement 700 having a power adapter having a SPDT switch, and a standard dimmer control module is shown. The power adapter 602 is coupled to a control module 702 having a dimmer circuit 704 that provides dimming functionality for the load. More particularly, the dimmer circuit 704 comprises a variable resistor 706 that can be controlled by a user on a user interface of the control module. The variable resistor 706 is coupled between the SWC contact element and a first terminal of a capacitor 708 and a control terminal of a TRIAC 710. The capacitor 708 is coupled between the control terminal of the TRIAC and the LN/LD contact element. The control module 702 comprises a dimmer circuit that does not require any power conversion. Rather, the control of the power provided to the load through the dimmer circuit can be controlled by a user through the variable resistor 706, such as using a knob, or a sliding element as is commonly known. That is, the current passing through the control module 702 from the LN/LD contact element to the switch contact element is controlled by controlling the current through the TRIAC 710. While FIG. 7 shows one example of a simple dimmer circuit that could be used, it should be understood that other dimmer circuits could be employed, or additional components may be used to implement the dimming functionality.

Figure 8:
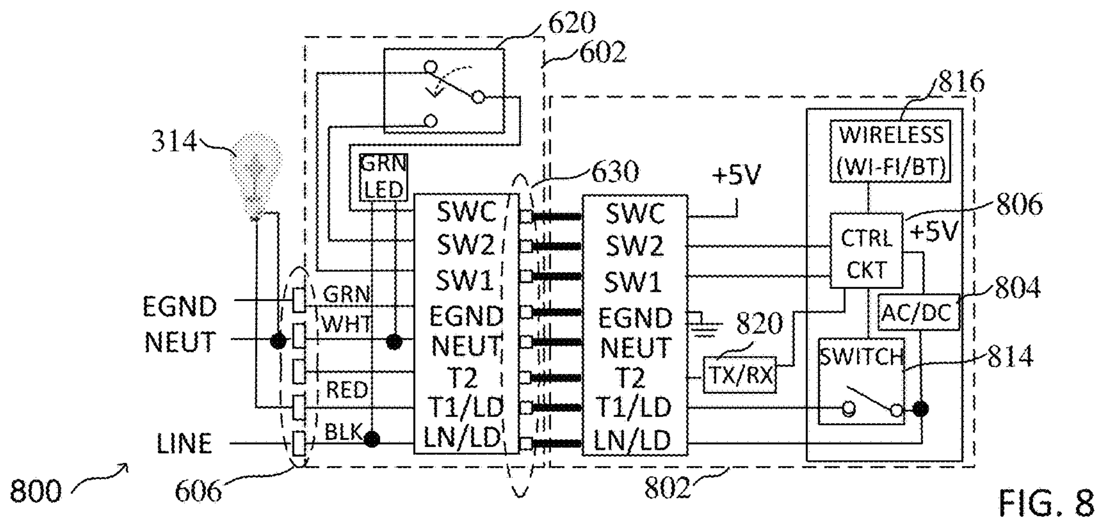
FIG. 8 is a block diagram of a power adapter arrangement having a power adapter having a single pole, double throw switch and a wirelessly controlled switch control module.

Turning now to FIG. 8, a block diagram of a power adapter arrangement 800 having a power adapter having a single pole, double throw switch and a wirelessly controlled switch control module is shown. According to the implementation of FIG. 8, a control module 802 provides the functionality of a switch that may be controlled by receiving signals from a remote device, such as a cell phone or computer for example. That is, in addition to the ability to control an on/off state of load controlled by the power adapter arrangement 800, the control module 802 comprises an AC/DC circuit 804 to generate a DC signal, shown here by way of example as a 5 Volt DC signal. It should be understood that the AC/DC circuit 804 could generate additional voltages, or a voltage at a different level other than 5 volts. The DC signal can be used to provide power to any of the circuits of the control module 802. That is, in this or other control modules having an AC/DC circuit, the DC signal may be provided to any circuits requiring the DC signal, in addition to those that are shown as receiving the DC signal. A control circuit 806 is coupled to the SW1 and SW2 contact elements associated with the switch to detect a change in the switch 620 of the power adapter 602. The control circuit 806 or a control circuit in any other control module may be any type of control circuit, including a circuit implemented using discrete components, or an integrated circuit (IC), such as a processor circuit. By way of example, the control circuit 806 may provide a low voltage signal (e.g., 5 V) to the SWC contact element and detect a change in the signal detected on one of the SW1 or SW2 contact elements, which would indicate that a user has toggled the switch 620 of the power adapter 602. A switch 814, which may be a relay, a solid-state switch or some other switching device, is controlled by the control circuit 806. It should be understood that a circuit for switching a line voltage signal (i.e., passing or blocking the line voltage signal) could be any type of switch for switching an AC voltage signal or both an AC or DC voltage signals, such as a relay, TRIAC or other solid-state switch. A wireless communication circuit 816, shown here by way of example as a Wi-Fi/Bluetooth circuit, is also coupled to the control circuit to provide control signals to the control circuit. A transmitter/receiver (TX/RX) circuit 820 is also coupled to the T2 contact element and adapted to transmit or receive control signals for controlling the application of power to the load received over the traveler line on the T2 contact element.

In operation, the control module 802 can control the application of power to the load in three ways. In addition to detecting a change in the voltage on the SW1 or SW2 contact elements that is a result of a switching of the switch 620, the control module 802 may also receive a wireless signal by way of the wireless communication circuit 816. That is, a user may control the state of the power to a load in response to a signal received from the user by way of a wireless connection such as from a phone, computer or other remote device having a wireless connection, direct or indirect, with the wireless communication circuit 816. The control module may also receive a signal from another power adapter on the contact element T2 by the TX/RX circuit 820. In a single switching arrangement (i.e., a single switch controlling power to a load, and not a switch in a 3-way switching arrangement), the control module 802 may control the state of the relay, and therefore the application of power to the load by way of the switch 620, or in response to a signal received by the wireless communication circuit 816, both of which are controlled by the control circuit 806. A user may also control the application of power to the load by way of a remote switch that sends a signal on the T2 contact element in a 3-way switching arrangement, as will be described in more detail below.

Figure 9:
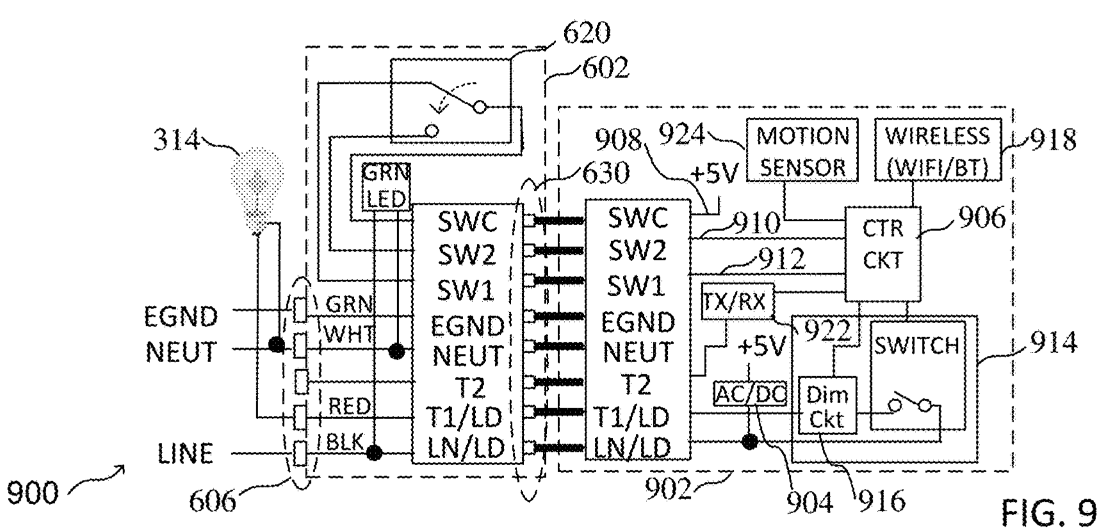
FIG. 9 is a block diagram of a power adapter arrangement having a power adapter comprising a single pole double throw switch and a dimmer control module.

Turning now to FIG. 9, a block diagram of a power adapter arrangement 900 having a power adapter comprising a single pole double throw switch and a dimmer control module is shown. A control module 902 of FIG. 9 is similar to the control module 802, except that the control module 902 includes additional functionality, such as a motion sensor and a dimmer circuit. More particularly, the control module 902 comprises an AC/DC circuit 904 that generates a DC voltage, as shown here by way of example is a 5 Volt DC voltage that is provided to the SWC contact element by way of a line 908. A control circuit 906 is adapted to detect changes on a line 910 coupled to the SW2 contact element and a line 912 that is coupled to the SW1 contact element. A switch 914, which may be a relay, a solid-state switch or some other switching device, is coupled to receive the line voltage by way of the LN/LD contact element, and is adapted to provide the line voltage to the T1/LD contact element. A dimmer circuit 916 is coupled between the switch 914 and the T1/LD contact element that is coupled to the load. The control circuit 906 may control the switch in response to a signal received by the wireless control circuit 918, the TX/RX circuit 922, or the motion sensor 924. Accordingly, the control module 902 provides additional functionality of the motion sensor and the dimmer. However, it should be understood that a control module could be implemented with one of the motion sensors or the dimmer circuit according to various implementations.

Figure 10:
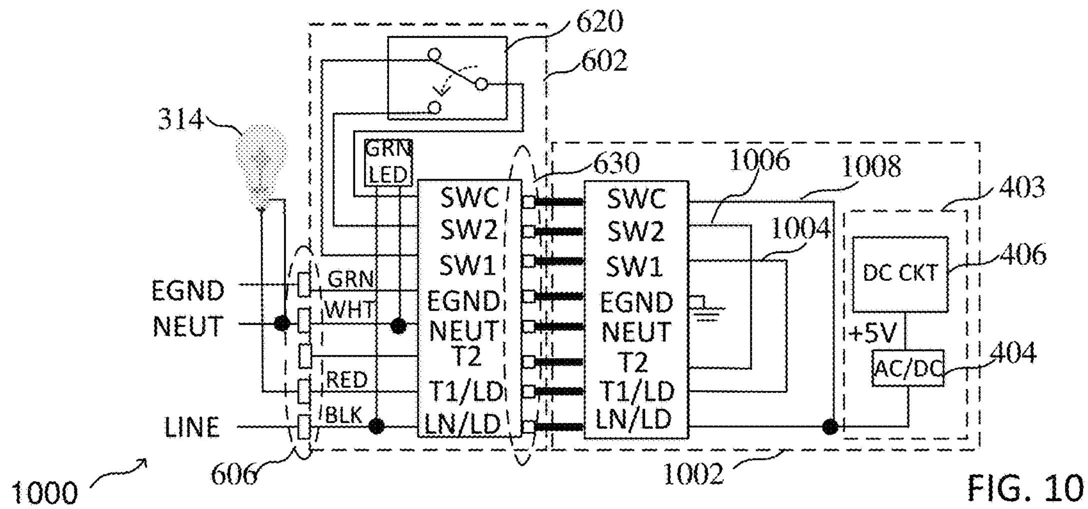
FIG. 10 is a block diagram of a power adapter arrangement having a power adapter comprising a single pole, double throw switch and a control module having a DC circuit.

Turning now to FIG. 10, a block diagram of a power adapter arrangement 1000 having a power adapter comprising a single pole, double throw switch and a control module having a DC circuit is shown. A control module 1002 is similar to the implementation of the control module 402 but includes an additional connector to enable routing signals between the power adapter and the control module. More particularly, the control module 1002 comprises a first conductor element 1004 between the T1 contact element and SW1 contact element, a second conductor element 1006 between the T2 contact element and the SW2 contact element, and a third conductor element 1008 between the line LN contact element and the SWC contact element. That is, the control module 1002 is implemented to enable the operation of a single pole double throw switch by being adapted to route the line voltage to both the T1/LD and T2 contact elements.

Figure 11:
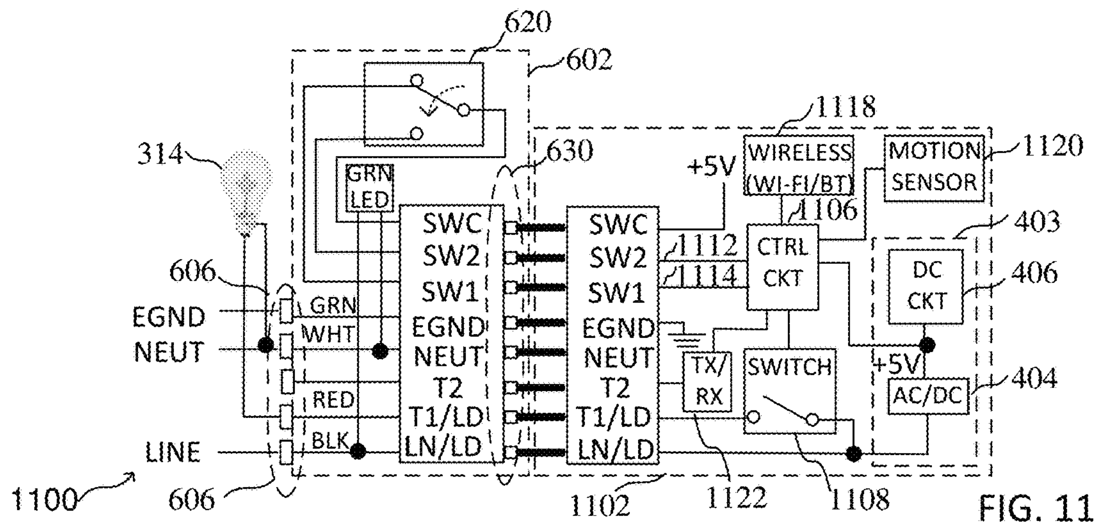
FIG. 11 is a block diagram of a power adapter arrangement having a power adapter comprising a switch and a control module comprising a wirelessly controlled switch and having a DC circuit.

Turning now to FIG. 11, a block diagram of a power adapter arrangement 1100 having a power adapter comprising a single pole, double throw switch and a control module comprising a wirelessly controlled switch and having a DC circuit is shown. The control module 1102 comprises contact elements as shown that are part of the electrical interface 630 as described above in reference to FIG. 6. The control module 1102 comprises an AC/DC circuit 404 for generating a low voltage DC signal, shown here by way of example as a 5 Volt signal that is coupled to a control circuit 1106 and could be used by any other element of the control module necessary to receive the DC power. A switching element 1108, which may be a relay, a solid-state switch or some other switching device, is used to control the application of the line voltage on the LN/LD contact element to the T1/LD contact element to provide power to the load 314. The 5 Volt signal is also provided to the SWC contact element to route the 5 Volt signal through the switch and enable the control circuit to detect a change in the switch 620 on lines 1112 and 1114. A DC circuit 406 is also coupled to the AC/DC circuit 404. The control module may also comprise a wireless communication circuit 1118, shown by way of example here as a Wi-Fi and Bluetooth wireless module. The control circuit may also be coupled to a motion sensor 1120. As described above, the control circuit of the control module 1102 may control the application of power to the load by receiving a signal from the switch 620, a wireless communication circuit 1118, the motion sensor 1120, or the TX/RX circuit 1122.

Figure 12:
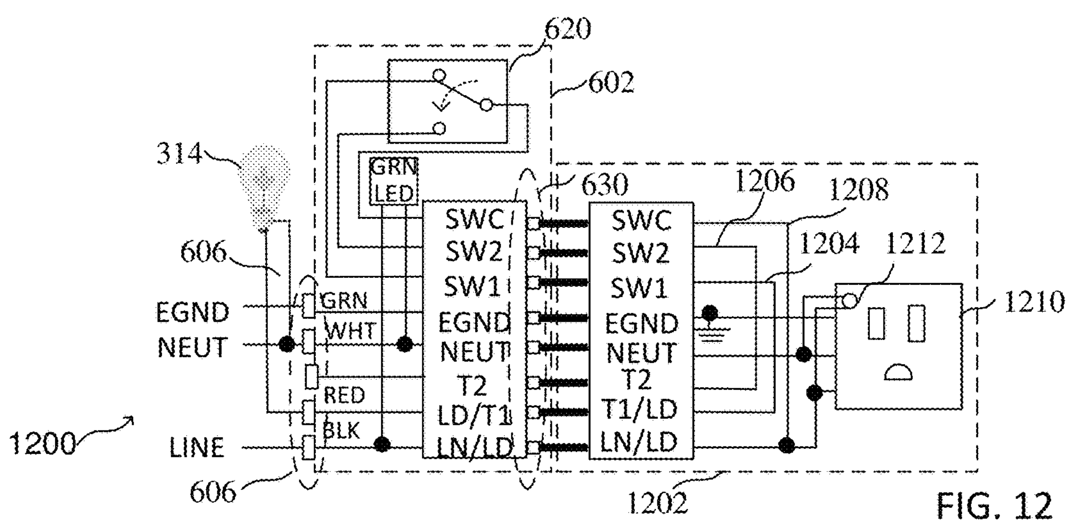
FIG. 12 is a block diagram of a power adapter arrangement having a power adapter comprising a single pole, double throw switch and a control module having an outlet.

Turning now to FIG. 12, a block diagram of a power adapter arrangement 1200 having a power adapter comprising a single pole, double throw switch and a control module having an outlet is shown. A control module 1202 not only routes the line voltage to the switch 620, but also routes the line voltage to an outlet 1210. More particularly, the control module 1202 comprises a first conductor element 1204 between the T1 contact element and SW1 contact element, a second conductor element 1206 between the T2 contact element and the SW2 contact element, and a third conductor element 1208 between the LN/LD contact element and the SWC contact element. The control module also comprises an outlet 1210 and is coupled to the line neutral and ground contact elements of the electrical interface 606 to provide the necessary voltages and current paths for implementing the outlet 1210. The outlet may also comprise an indicator 1212, indicating that power is applied to the outlet. The indicator 1212 may be, by way of example, a light emitting diode (LED).

Figure 13:
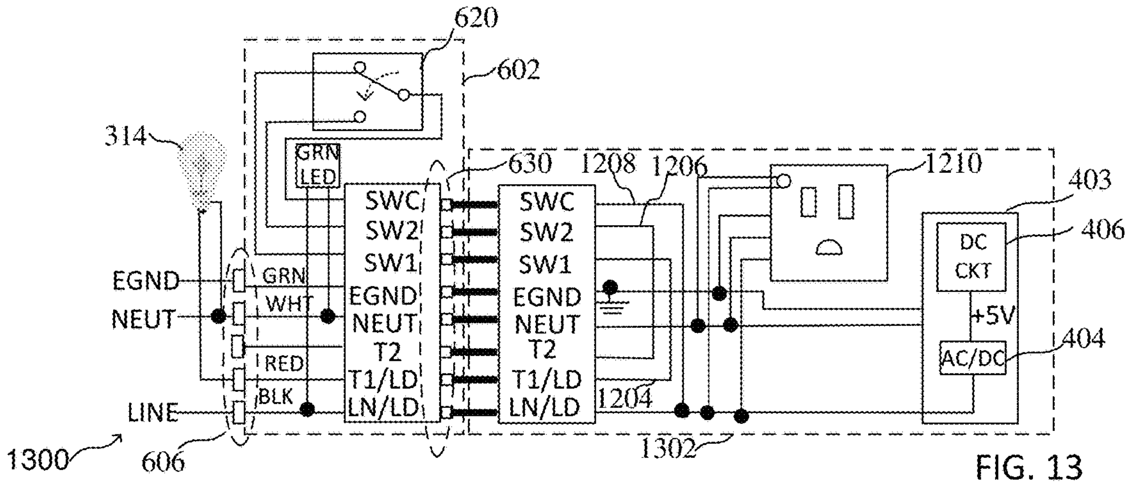
FIG. 13 is a block diagram of a power adapter arrangement having power adapter comprising a single pole, double throw switch and a control module having an outlet and a DC circuit.

Turning now to FIG. 13, a block diagram of a power adapter arrangement 1300 having a power adapter comprising a single pole, double throw switch and a control module having an outlet and a DC circuit is shown. In addition to the elements of the control module 1202 of FIG. 12, the control module 1302 comprises an AC/DC circuit 404 generating a DC signal, shown here by way of example of as a 5 Volt DC signal. It should be understood that the DC circuit could be any type of circuit requiring DC power that is independent of the power adapter 602 or the outlet portion of the control module 1302. By way of example, the control module 1302 could be a circuit for charging an external device, such as a USB charger, a white noise maker, a speaker, or a smart speaker.

Figure 14:
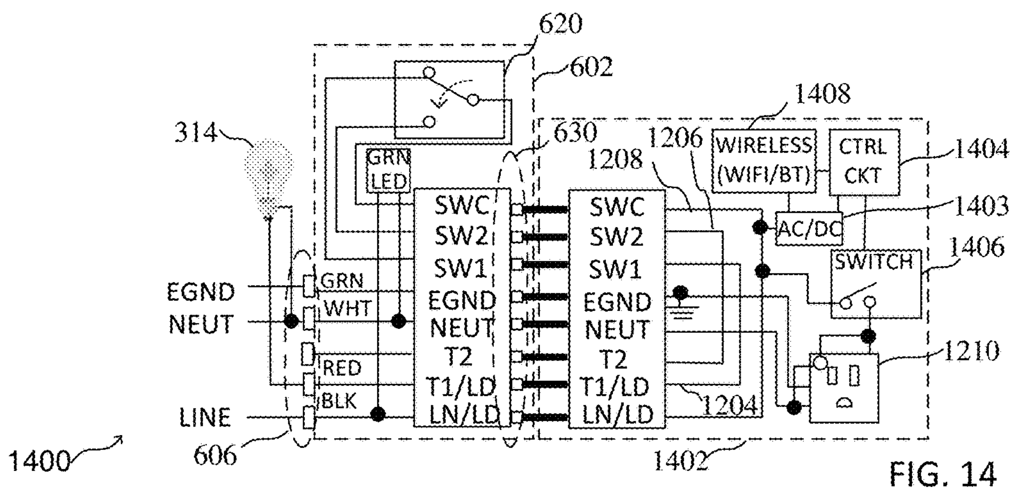
FIG. 14 is a block diagram of a power adapter arrangement having power adapter comprising a single pole, double throw switch and a control module having a wirelessly controlled outlet.

Turning now to FIG. 14, a block diagram of a power adapter arrangement 1400 having a power adapter comprising a single pole, double throw switch and a control module having a wirelessly controlled outlet is shown. The control module 1402, in addition to the outlet elements of control module 1202, comprises elements that enable wireless control of the power applied to the outlet 1210. More particularly, the control module 1402 comprises an AC/DC circuit 1403 to generate a DC voltage to provide power to other elements of the circuit. A control circuit 1404 is coupled to control a switch 1406. As can be seen, the switch is coupled between the line voltage applied to the LN/LD contact element and the line contact element of the outlet 1210. That is, the outlet 1210 receives both neutral and ground voltages, but the power applied to the outlet 1210 is controlled by the switch 1406. The control may be in response to a signal received by the wireless control circuit 1408 that is coupled to the control circuit 1404. While the control is provided wirelessly, it should be understood that additional elements could be provided, such as a manual switch on a user interface of the control module 1402 enabling a user to manually control the power applied to the outlet 1210.

Figure 15:
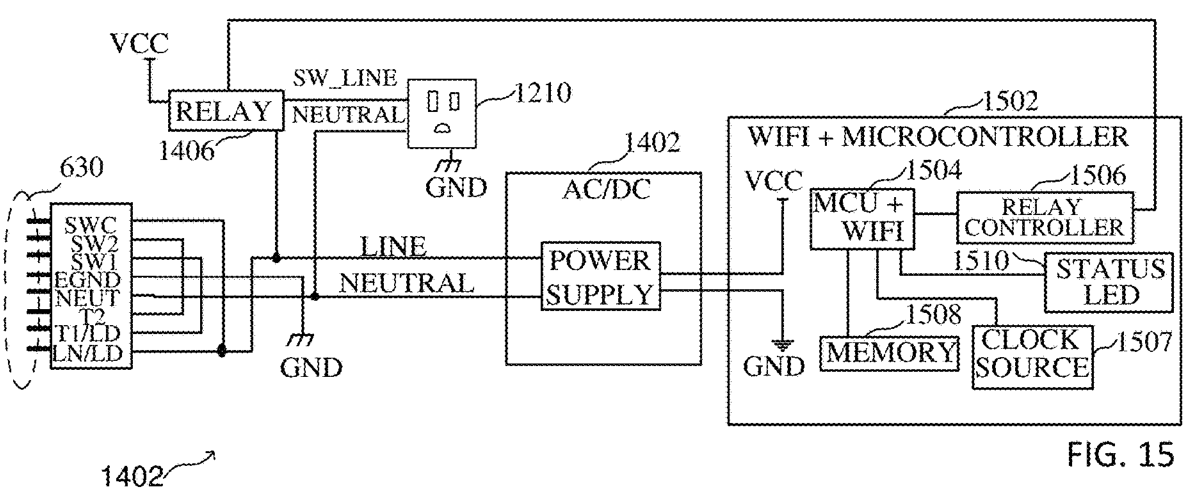
FIG. 15 is a block diagram showing an example of an implementation of the control module of FIG. 14.

Turning now to FIG. 15, a block diagram showing an example of an implementation of the control module 1402 of FIG. 14 is provided. A switching circuit 1502 may implement the control circuit 1404 and the wireless control circuit 1408. More particularly, the switching circuit 1502 comprises a controller 1504, shown here by way of example as a microcontroller and wireless communication circuit. The controller 1504 controls a relay controller 1506 that is coupled to control the switching of the switch 1406, shown by way of example as a relay. The controller 1504 may also be coupled to a clock source 1507, which may comprise an oscillator for example, and a memory 1508. A status indicator 1510, shown here by way of example as an LED, may also be coupled to the controller 1504. While the switching circuit 1502 is shown by way of example, it should be understood that other circuits could be implemented to control the switch and control the power applied to the outlet 1210.

Figure 16:
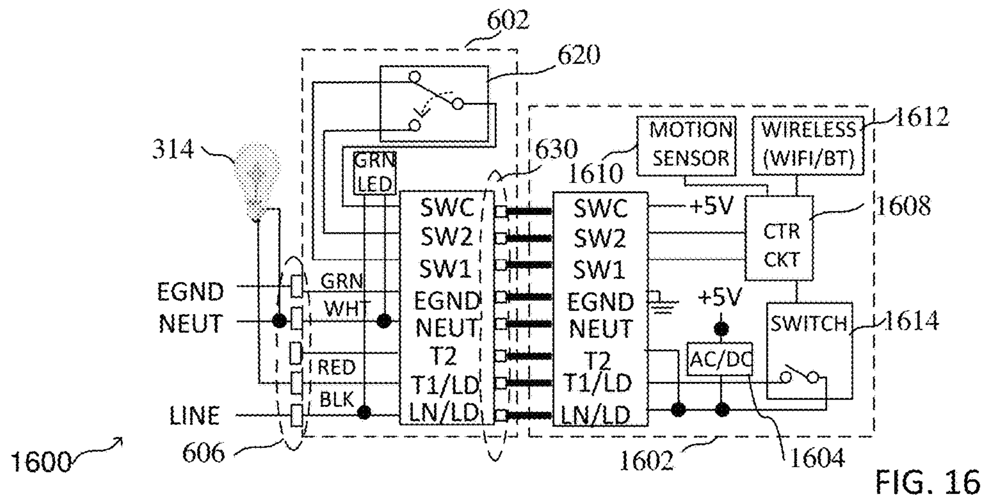
FIG. 16 is a block diagram of a power adapter arrangement having a power adapter comprising a single pole, double throw switch and a control module comprising a wirelessly controlled switch and having a motion sensor.

Turning now to FIG. 16, a block diagram of a power adapter arrangement 1600 having a power adapter comprising a single pole, double throw switch and a control module comprising a wirelessly controlled switch and having a motion sensor is shown. The control module 1602 is configured to control the application of power to a load using a motion sensor. More particularly, an AC/DC circuit 1604 provides a DC signal used for the control module. The control circuit 1608 is coupled to the SW1 and SW2 contact elements to detect a change in a signal received from the switch 620 which receives the DC input signal. The control circuit 1608 is also coupled to a motion sensor 1610 and a wireless control circuit 1612. The control circuit controls a switch 1614, which may be a relay, a solid-state switch or some other switching device, for applying the line voltage received at the LN/LD contact element to the T1/LD contact element to apply power to the load. The LN/LD contact element may be coupled to the T2 contact element to route power to another power adapter when the control module 1602 is used in a 3-way switching arrangement, as will be described in more detail below.

Figure 17:
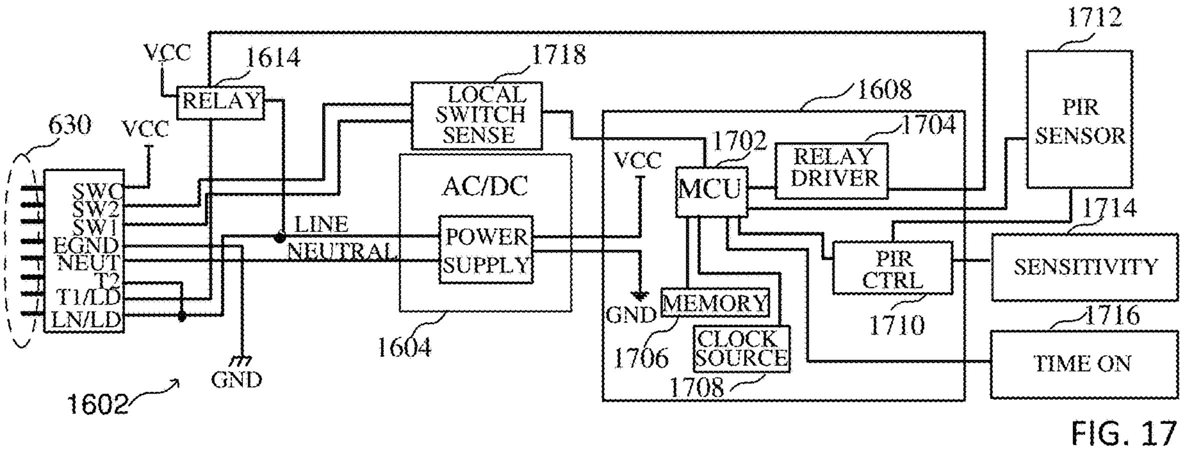
FIG. 17 is a block diagram showing an example of an implementation of the control module of FIG. 16.

Turning now to FIG. 17, a block diagram of an example of an implementation of the control module 1602 of FIG. 16 is shown. More particularly, the control circuit 1608 comprises a microcontroller (MCU) 1702 coupled to a relay driver 1704 that controls the switch 1614, shown by way of example as a relay. The microcontroller may also be coupled to other peripherals, including a memory 1706 and a clock source 1708. A motion sensor controller 1710, shown here by way of example as a passive infrared (PIR) sensor controller, is coupled to a sensor 1712, shown by way of example as a PIR sensor. The sensitivity of the PIR controller may be controlled by a sensitivity input 1714, which may be for example a potentiometer or other adjustable device available to a user. That is, the sensitivity of the sensor can be adjusted to control what types of motions may be detected by the sensor 1712. Further, the amount of time that power is applied to the load in response to a detection by the sensor 1712 can be controlled by a "time on" input 1716, shown here by way of example as a potentiometer. More particularly, the microcontroller 1702 may control the relay driver 1704 in response to a setting of the "time on"

input by a user of the device. By way of example, power may be applied to the load for a selected period of minutes based upon a "time on" period input selected by the user. The microcontroller 1702 may also control the relay driver in response to a signal generated by a local switch sense circuit 1718, which detects a change in the signal on one or both of the SW1 and SW2 contact elements. That is, as described above, when the DC voltage, shown here by way of example as VCC, is routed to the switch, the voltage on one or both of the SW1 and SW2 contact elements may change in response to a toggling of the switch, such as switch 620 of the power adapter 602, by a user. While more detail of the control module 1602 is shown, it should be understood that additional circuits or different circuits could be implemented to provide in control module having motion sensor. The circuit elements of FIG. 17 are provided by way of example.

Figure 18:
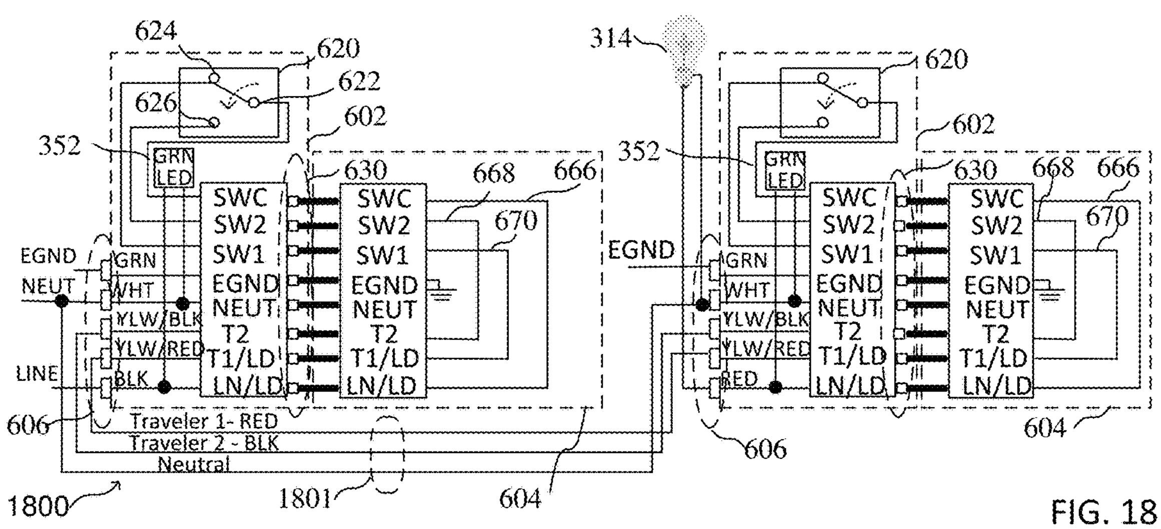
FIG. 18 is a block diagram of a first power adapter arrangement having a standard control module and a second power adapter arrangement having a standard control module wired in a 3-way switching configuration.

Various implementations of multi-way switching arrangements, shown by way of example as 3-way switching arrangements, are shown in FIGS. 18-29. Turning first to FIG. 18, a block diagram of a first power adapter arrangement having a standard control module and a second power adapter arrangement having a standard control module wired in a 3-way switching arrangement 1800 is shown. The control module 604, which may be considered a standard control module, comprises the connections between various conductor elements 666, 668, and 670, as shown in FIG. 6 for example. By implementing the control module 604 in both power adapters of the 3-way switch, a switch would operate as a standard 3-way switch. More particularly, the power adapter on the line side is adapted to receive the line voltage, while the power adapter on the load side is adapted to provide power to the load. That is, two traveler lines are wired between the line side power adapter on the left and the load side power adapter on the right.

By way of example, according to the configuration of the switch 620 in FIG. 18, a line voltage provided to the LN/LD contact element of the line side power adapter and routed through the control module 604 to the SWC contact element. The line voltage applied to the terminal 622 of the switch 620 is routed through the second terminal 624 and through the SW1 switch contact to the conductor element 670, which routes the line voltage to the T1/LD contact element and the Traveler 1 as shown. The line voltage is received by the T1/LD contact element of the load side power adapter and is routed through the control module 604 to the SW1 contact element. Based upon the state of the switch 620, the line voltage is routed through the second terminal 624 and the terminal 622 of the switch 620 of the load side power adapter 602, and then routed to the SWC contact element of the electrical interface 630. As can be seen, the line voltage will then be routed through the LN/LD contact element to the load 314 by way of the conductor 666 and the LN/LD contact element. Therefore, based upon the switching arrangements of the implementation of a 3-way switch in FIG. 18 having the switches 620 in the configuration as shown, the line voltage will be applied to the load (i.e., the light will be on). The switching of either switch 620 will turn the light off, or when the light is off, the switching of either switch will turn the light back on.

The 3-way switching arrangement of FIGS. 18-42 all have two traveler lines and operate based upon the same principle. That is, the switching of the switch 620 on either side of the 3-way switch will cause the state of the power applied to the load to toggle. According to the example of FIG. 18, a plurality of wires 1801 routed between the power adapter arrangements comprises Traveler 1, Traveler 2 and Neutral wires that may be routed, such as through conduit, between junction boxes having the power adapters. The operation of the 3-way switching arrangements may vary depending upon the control module used in the power adapters in the 3-way switching arrangement, as will be described in more detail below in reference to FIGS. 19-42.

Figure 19:
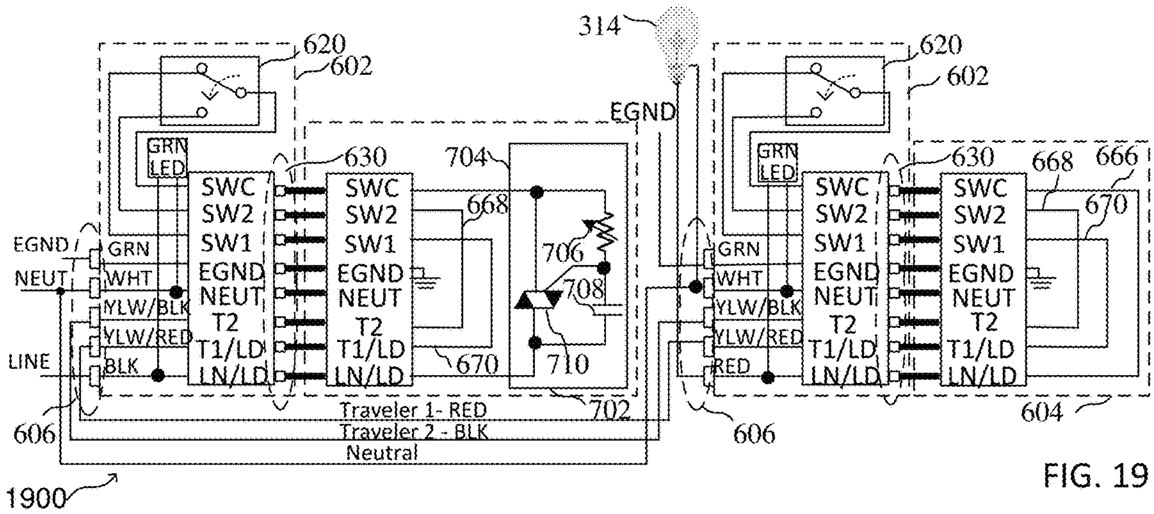
FIG. 19 is a block diagram of a first power adapter arrangement having a control module comprising a standard dimmer circuit and a second power adapter arrangement having a standard control module wired in a 3-way switching configuration.
Figure 20:
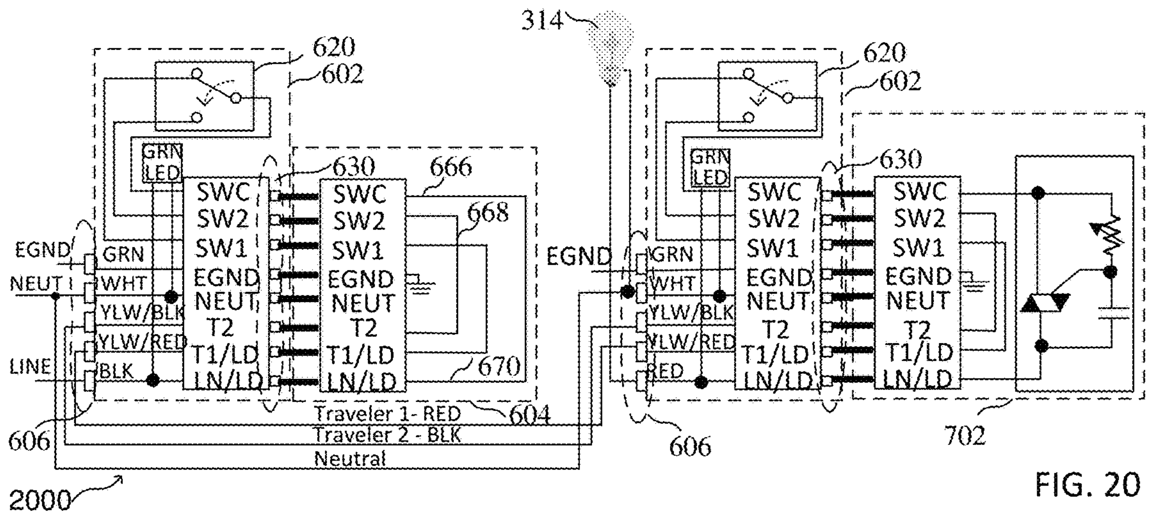
FIG. 20 is a block diagram of a first power adapter arrangement having a standard control module and a second power adapter arrangement having a control module comprising a standard dimmer wired in a 3-way switching configuration.

Turning now to FIGS. 19 and 20, block diagrams of a power adapter arrangement having a control module comprising a standard dimmer circuit are shown. That is, a standard dimmer circuit enables a user to manually change the light level of a load using an actuator on a user interface, in contrast to a wirelessly controlled dimmer that sets a dimming level in response to a wireless communication signal and generally requires a conversion of the line voltage to a stable DC voltage that is used by components of the control module. According to the arrangement 1900 of power adapters of FIG. 19, the control module 702 provides a dimming function using the dimmer circuit 704 in the current path between the line contact element LN/LD and the switch 620. In contrast, in the arrangement 2000 of power adapters of FIG. 20, the dimming functionality is provided between the switch 620, through which the line voltage is routed, and the load by way of the LN/LD contact element. The implementations of FIGS. 19 and 20 show the flexibility of a system for implementing control modules in power adapters of a 3-way lighting arrangement when using a dimmer that does not require any conversion of the line voltage to a stable DC voltage that is used by components of the control module.

Figure 21:
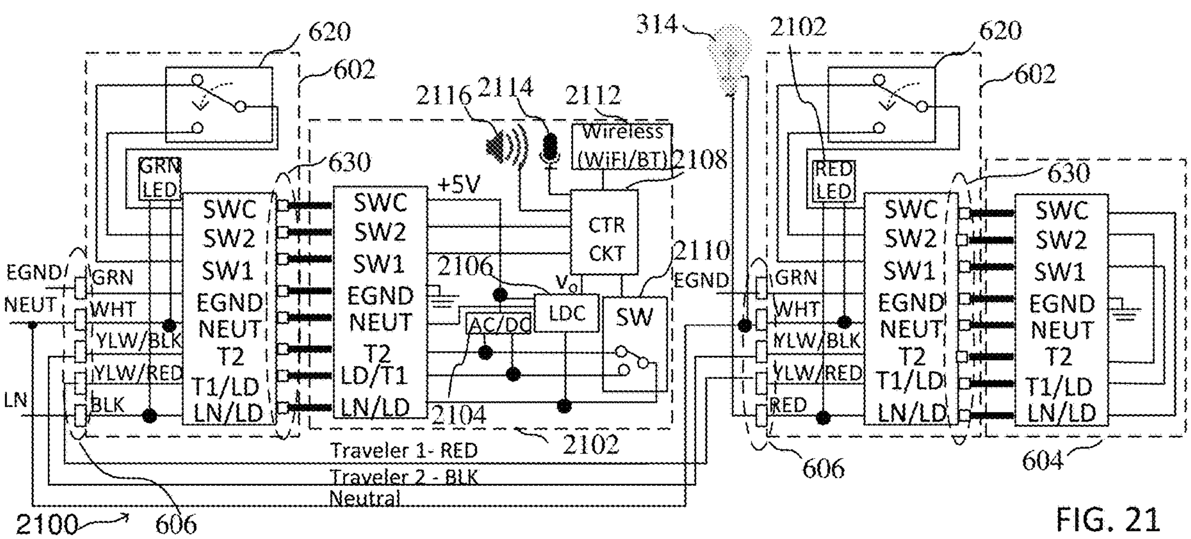
FIG. 21 is a block diagram of a first power adapter arrangement having a control module having a DC circuit and a second power adapter arrangement having a standard control module wired in a 3-way switching configuration.

Turning now to FIGS. 21-29, various examples of 3-way switching arrangements are shown. Referring first to FIG. 21, a block diagram of a first power adapter arrangement having a control module comprising a DC circuit, shown here by way of example as a smart speaker and a second power adapter arrangement having a standard control module wired in a 3-way switching configuration 2100 is shown. As shown in FIG. 21, the control module 2102 comprises an AC/DC circuit 2104, a line detection circuit 2106 and a control circuit 2108. The control circuit 2108 will control the state of a switch (SW) 2110, which may be a relay, a solid-state switch or some other switching device. The control circuit may receive input from a wireless control circuit 2112 or a microphone 2114 and generate as output through a speaker 2116. The control circuit will enable the operation of a smart speaker as is known in the art. While the elements of a smart speaker are shown by way of example in FIG. 21, it should be understood that the elements of a smart speaker could be used in other control modules set forth below.

Figure 22:
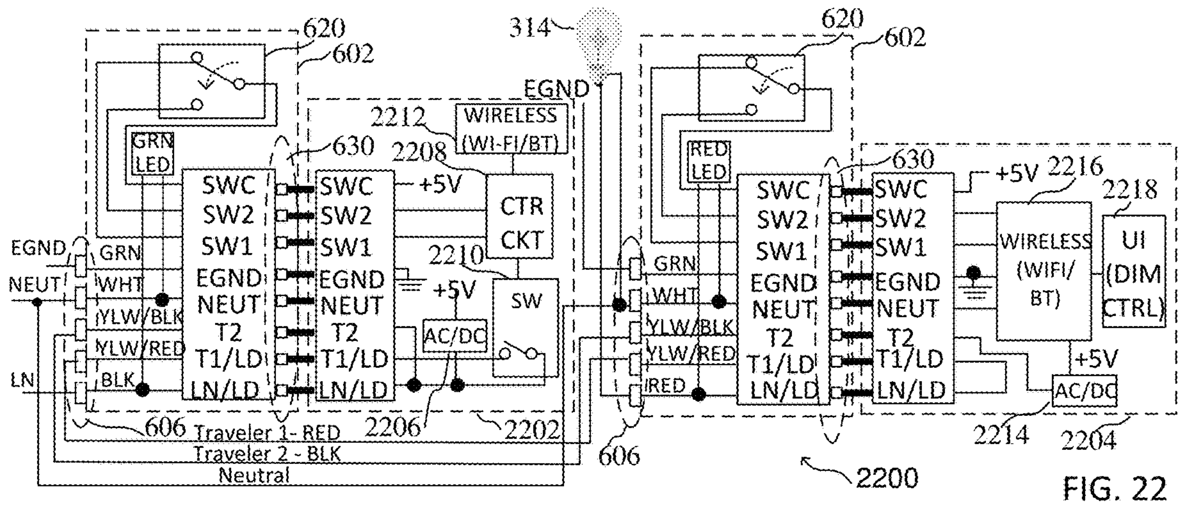
FIG. 22 is a block diagram of a first power adapter arrangement having a control module with a wirelessly controlled switch and a second power adapter arrangement having a control module with a remote dimmer wired in a 3-way switching configuration.

Turning now to FIG. 22, a block diagram of a first power adapter arrangement having a control module with a wirelessly controlled switch and a second power adapter arrangement having a control module with a remote dimmer wired in a 3-way switching configuration 2200 is shown. A control module 2202 is attached to a power adapter 602 on the line side of the 3-way switching arrangement, and a control module 2204 is attached to a power adapter 602 on the load side of the 3-way switching arrangement. By providing line power to both power adapters (i.e., through Traveler 2), no battery is required. The control module 2202 comprises an AC/DC circuit 2206 that generates a DC voltage used by circuit elements of the control module. A control circuit 2208 is coupled to control a switch 2210 which may be a relay, a solid-state switch or some other switching device, where the switching of the power to the load (by way of one of the two traveler lines) is controlled by the control module 2202. The control circuit may detect a change in a voltage on a SW1 or SW2 contact element, which may be a 5 Volt signal provided to the switch 620 by the SWC contact element. The control circuit may also receive a signal by way of a wireless communication circuit 2212, which is shown by way of example as a combined Wi-Fi and Bluetooth wireless communication circuit. The control module 2204 also comprises an AC/DC circuit 2214, and includes a wireless communication circuit 2216, which may also be a combined Wi-Fi and Bluetooth circuit. A user interface 2218, which may enable dimming control on a surface of the control module, enables communication between the control modules 2202 and 2204.

A description of the operation of the 3-way switching arrangement based upon the state of the switches of the switching arrangement as shown is now described. It should be noted that the LN/LD contact element is electrically connected to the T2 contact element of the power adapter on the line side of the 3-way power adapter arrangement to enable the line voltage to be routed over the Traveler 2 to the T2 contact element of the power adapter 602 on the load side of the 3-way circuit. Therefore, the control module 2204 will always receive power by way of the T2 contact element. A DC signal, shown by way of example as a 5 Volt signal, is provided to the SWC contact element to enable the detection of a toggling of the switch 620. That is, a wireless communication circuit 2216, shown by way of example as it combined Wi-Fi and Bluetooth wireless communication circuit, is configured to detect a switching of a voltage on the SW1 and SW2 contact elements. It should be understood that it may be possible to monitor only one of the two lines associated with the SW1 and SW2 contact elements to detect a change from 0 V (or a floating condition) to 5 V. A user interface 2218 is also provided to the wireless communication circuit. The wireless communication circuit 2216 can therefore receive a toggle input from the switch 620 or a dimmer control input from the user interface 2218. The detection of the toggling by the switch 620 or a changing the dimming level on the user interface 2218 could be received by the wireless communication circuit 2212. The control circuit 2208 would then change the state of the switch 2210. If the control module attached to the power adapter on the line side comprises a dimmer circuit, the control circuit would also adjust the dimming level in response to the signal sent from the control module on the load side. While dimming control is the primary function of the control module 2204, it should be understood that other input signals could be provided to the control module.

A description of the operation of the 3-way switching arrangement based upon the state of the switches of the switching arrangement of FIG. 22 as shown is now described. The switching arrangement enables a user to change the state of the power applied to the load 314 using either switch 620 on the line side or the load side of the switching arrangement. More particularly, when the switch 620 on the line side is toggled by a user, the control circuit 2208 will detect the change on one or both of the SW1 and SW2 contact elements, and in turn change the state on the switch 2210. When the switch 620 on the load side is toggled, a wireless signal is provided from the wireless communication circuit 2216 to the wireless communication circuit 2212 to enable the control circuit 2208 to change the state of the power applied to the load by way of the switch 2210.

Figure 23:
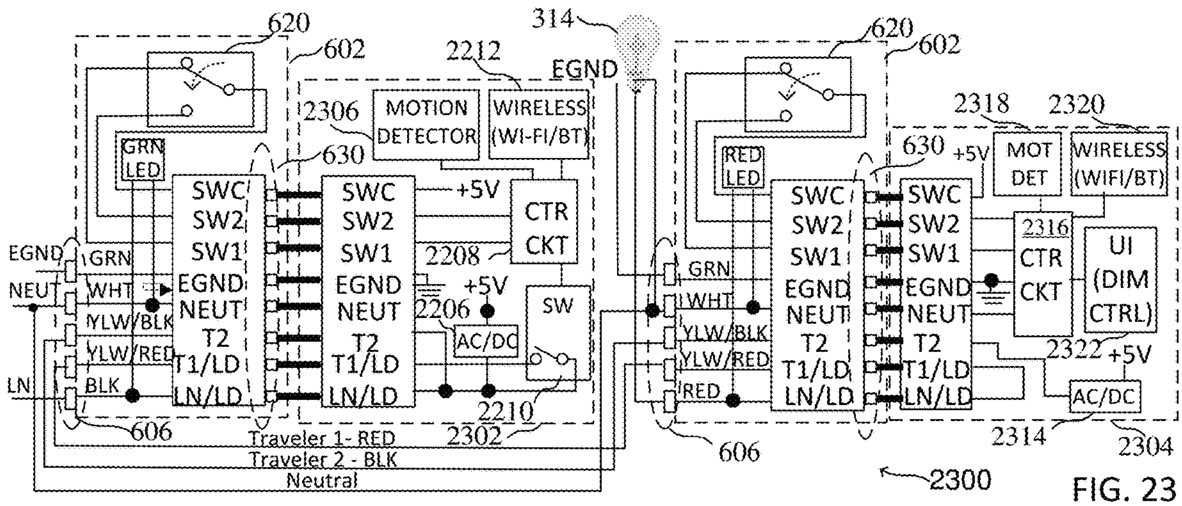
FIG. 23 is a block diagram of a first power adapter arrangement having a control module with a remote dimmer and a second power adapter arrangement having a control module with a wirelessly controlled switch wired in a 3-way switching configuration.

Turning now to FIG. 23, a block diagram of a first power adapter arrangement having a control module with a remote dimmer and a second power adapter arrangement having a control module with a wirelessly controlled switch wired in a 3-way switching configuration 2300 is shown. The implementation of the 3-way switching arrangement of FIG. 23 is similar to that of FIG. 22, except that a control module 2302 attached to the power adapter on the line side and the control module 2304 attached to the power adapter on the load side have additional functionality, including for example motion detection. The control module 2302 comprises a motion sensor 2306 coupled to the control circuit 2208. The control circuit will control the state of the switch 2210 in response to a detection of motion by the motion sensor 2306.

The control module 2304 comprises an AC/DC circuit 2314 adapted to generate a DC signal, and a control circuit 2316 is coupled to detect a change in a signal on one or both of the SW1 and SW2 contact elements. The control circuit is coupled to a plurality of interfaces, including a motion detection circuit 2318, a wireless communication circuit 2320, and a user interface 2322. The motion detection circuit may provide a signal to the control circuit in response to detection of motion. Similarly, the user interface 2322 may comprise a dimming controller, which may provide a dimming control signal to the control circuit in response to a dimming selection by a user of the user interface 2322. The signals detected by the control circuit may then be transmitted by the wireless communication circuit 2320 to the wireless communication circuit 2212 of the control module 2302. The operation of the 3-way switching arrangement of FIG. 23 is similar to the 3-way switching arrangement of FIG. 22, except that motion sensors are provided.

While the control module 2302 comprises a switch 2210, the control module 2302 and 2304 may be paired, where one control module act as a master so that a switch in only one of the control modules is controlling the application of power to the load. The pairing can be achieved by any pairing technique, including by way of user interfaces on the control modules, using an app on a remote control device, or automatically by a communication between the wireless communication circuits of the control modules.

Pairing can be performed in different ways. According to one implementation, auto-pairing can be performed using a number of steps, including a first step where a "new wirelessly controlled dimmer" may be placed on the wireless network that an original wirelessly controlled dimmer that it will be paired with is on (i.e., Wi-Fi, Z-Wave, Zigbee, Bluetooth). This step may be performed regardless of whether the new wirelessly controlled dimmer will be paired with another dimmer. In a second step, once the new wirelessly controlled dimmer is on the wireless network, it will send a signature signal (e.g., one of a limited number of signature signals) on one or both of the traveler lines that will be detected by the other dimmer. In a third step, any dimmer control module that detects a signature signal (which may be one or more dimmers) will send a "pairing request." During a fourth step, for a certain period after sending the signature signal, the new wirelessly controlled dimmer will listen for the pairing request from the original dimmer. The pairing request may contain a signature that it provided on one of the traveler lines to ensure that the new wirelessly controlled dimmer knows that it is pairing with the original dimmer that received the signature that the new wirelessly controlled dimmer had sent. During a fifth step, the wirelessly controlled dimmer may send an acknowledge and complete the pairing process. During a sixth step, the new wirelessly controlled dimmer and the original wirelessly controlled dimmer will operate as master and slave control modules as described below.

According to other implementations, a signature signal could be sent. For example, the signal on the traveler line could be a toggling of the switch (3 times or 5 times for example). The signal on the traveler line could be a dimming sequence (e.g., toggle between 100% and 75% three times). The dimming sequence would not reduce the voltage so much that the other side would not have power, but enough to detect a signal, where preferably the dimming is something that the user will not easily see. According to a Master-Slave implementation, if the dimmer control module is in a SPST switch, it would never detect a signal with the signature signal and will not listen for a signal after the predetermined time. Also, the dimmer control module will always know if it is on the line side or the load side based upon whether adjusting the dimmer affects the current on the LN/LD contact element. According to a manual pairing implementation, there may also be a simple manual pairing option that a homeowner could use if necessary if the auto pairing fails. Pairing may be performed on an app. To implement simple pairing on an app, when a control module is inserted to perform wirelessly controlled dimming, it may be necessary to gain access to a network. When the network is identified, it is possible to pair the control modules in a variety of ways, such as "drag and drop" of a new control module having a dimmer control module on top of an existing dimmer control module or providing a control module with a name that would pair the control modules in the app.

According to some implementations, a connection button may be used with control modules having wireless capability. An LED (e.g., a green light) on the line side to help distinguish between control modules on the line side and on the control side. Control module pairs may have Bluetooth connections or a combination of Bluetooth and another wireless protocol (i.e., Wi-Fi/BT, Z-wave/BT, Zigbee/BT). Connection button on the line side enables establishing a Wi-Fi connection, for example by a press and hold of the connection button for 5 seconds. Connection buttons on the line side and load side can be used for pairing, including Bluetooth pairing. According to some implementations, only one person would be needed. For example, a user may press a connection button on the line side twice to start pairing (e.g., LED blinks orange), and press a connection button on load side twice to allow the load side to pair with line side. Pairing could also be performed for Wi-Fi pairing. Bluetooth pairing can be done many ways, and Bluetooth signaling for 3-way switching is very reliable.

According to some implementations, a universal dimmer could be provided. When a homeowner installs a dimmer switch, they might be using one type of bulb, but later may change to another type of bulb. The dimmer that is installed may not be optimal for the new type of bulb. As a result, the homeowner may have to replace the dimmer switch just to be able to use a different type of light bulb. Providing a control module having a universal dimmer switch that is designed to extend a wide range of dimming functionality (e.g., voltage and/or current requirements), an entire range or a large subset to limit the types of dimmer control modules that might need to be provided.

Control modules having a wide range of dimming functionality could be enabled based different hardware and software implementations. According to one hardware implementation, a control module having a dimmer may be designed for an entire range (voltage and/or current requirements), including LEDs, CFL, Fluorescent, MLVs, and forward/reverse phase dimming. A mechanical switch (e.g., sliding switch) on the wall switch or on the control module (such as the back of the module) may be provided to allow the selection of the type of bulb, such as one of the four types of bulbs. The control module will function in the correct dimming range based upon the selected bulb type. Therefore, only a single control module having a dimmer (or reduced number of control modules having a dimmer depending upon the ability to define ranges and dimming operation) will be needed for any dimming application. Rather than just selecting between two ranges, it would be possible to select a particular type of bulb. When selecting a particular type of bulb, it may also be possible to implement reverse phase dimming control (i.e., switch to a different dimming operation, and not just a dimming range) for that bulb.

According to one software implementation for providing a wide range in dimming capability in the control module, each control module having a dimmer circuit could be implemented with a Bluetooth circuit. The user could pair with the dimmer switch control module. A settings option on an app for interfacing with the control module could include "bulb type" (or some other designation that would indicate dimming range). Available bulb types or ranges could be updated using over-the-air (OTA) updates as different types of bulbs are developed. The dimmer would then automatically apply a certain dimming range that is appropriate for the bulb in response to the movement of the dimmer actuator. This software implementation may be included in place of a manual switch or could override a manual switch.

According to another software implementation, the dimmer control module may detect a range for the bulb(s) that are controlled by the dimmer module. When the control module is initially inserted, it could apply a range of voltage/current and decide what type of bulb is used and what the optimal range should be used. This could be implemented alone or in combination with a manual setting (i.e., a switch on the back or selection of a bulb type on an app).

In the examples of FIGS. 21-23, the switching of power to the load is performed by a switch, such as a relay, on the line side. In FIGS. 24-25 and 27-28, the switching of power to the load is performed by a switch, such as a relay, on the load side. Load side switching may require line detection of a switching on a line side power adapter by a load side switching control module based upon voltage detection on the contact T1 and T2 elements by the switching control module on the load side. When line power will be on either the T1 or T2 contact elements, it may only be necessary to detect a voltage change on one of the T1 or T2 contact elements. This voltage detection can be performed by circuits required for current detection when a switching control module is used on the line side. When a control module that performs switching is used on the line side, it is necessary to detect a change in current drawn on the LN/LD contact element due to a switching of the load side power adapter. Regardless of whether the switch that switches the power switches the line voltage to T2 or T1 contact elements, current due to powering the load will only be drawn on either T2 or T1 contact elements depending on whether the light is on or off. Examples of the switching of power on the load side is now described in reference to FIGS. 24-25 and 27-28.

Figure 24:
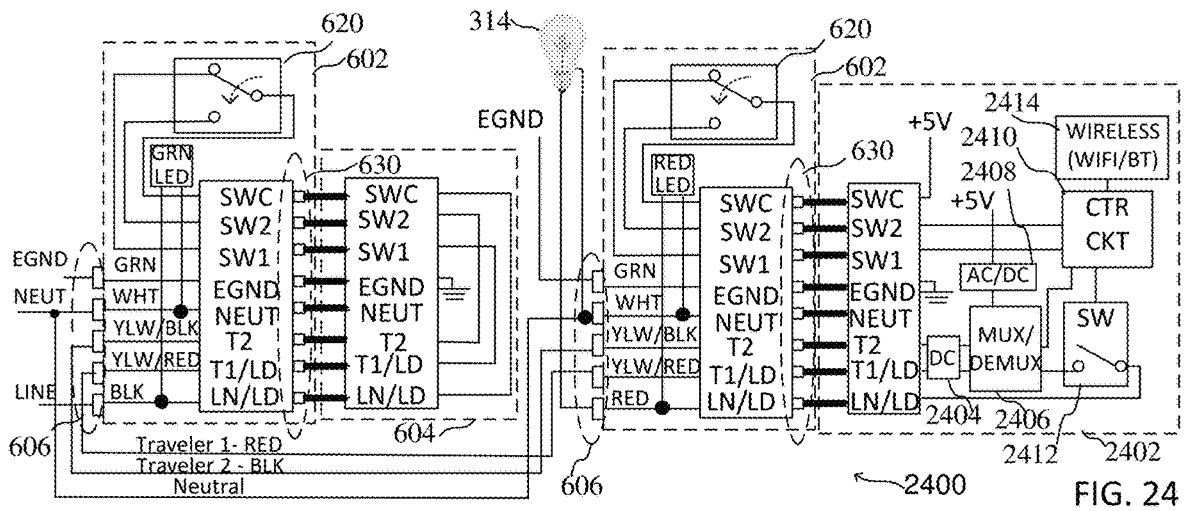
FIG. 24 is a block diagram of a first power adapter arrangement with a standard control module and a second power adapter arrangement with a control module having a wirelessly controlled switch wired in a 3-way switching configuration.

Turning first to FIG. 24, a block diagram of a first power adapter arrangement with a standard control module and a second power adapter arrangement with a control module having a wirelessly controlled switch wired in a 3-way switching configuration 2400 is shown. The control module 604 enables the signals to be routed through the power adapter as described in FIG. 18. The control module 2402 is configured to control the switching of the power to the load on the load side of the 3-way switching arrangement.

However, in order to switch the power on the load side control module, the control module 2402 may detect power on either one of the traveler lines on the T1/LD or T2 contact elements. That is, the line voltage provided to the power adapter 602 on the line side will be routed to one of the T1/LD or T2 contact elements. Therefore, it is possible for control module to tap the line power off one of those two lines, and to convert the AC voltage to a DC voltage as necessary to operate the control module 2402. More particularly, a detection circuit (DC) 2404 is coupled to the T1 and T2 contact elements, where an output of that detection circuit is detected by the multiplexor/demultiplexer 2406. A control circuit 2410 will control the multiplexer to select the output of the detection circuit and provide the output to an AC/DC circuit 2408. The control circuit 2410 controls the operation of a switch 2412, which may be a relay, a solid-state switch or some other switching device, which controls the application of the detected power signal to the LN/LD contact element, which is coupled to the load 314. According to some implementations, the control module of 2402 may comprise additional elements, such as a motion sensor as shown in FIG. 12, or a dimmer circuit as shown in FIG. 14 for example.

A description of the operation of the 3-way switching arrangement based upon the state of the switches of the switching arrangement as shown is now described. It should be noted that the control module 604 routes the signal selected by the switch 620 to the load side power adapter arrangement, wherein the control of the switching of the line power to the load is controlled by the control module 2402. That is, in addition to detecting which of the traveler lines the power is on and using that line power to provide a DC voltage to the control module 2402, the control circuit will not only detect a toggling of the switch 620 on the line side power adapter 602, but also control the application of the power to the load by controlling switch 2412. According to the implementation of FIG. 24, the control circuit 2410 may change the state of the switch, and therefore the application of the power to the load, in response to a toggling of the switch 620 of the power adapter on the line side, the toggling of the switch 620 of the power adapter on the load side, or in response to a signal received by way of the wireless communication circuit 2414.

Figure 25:
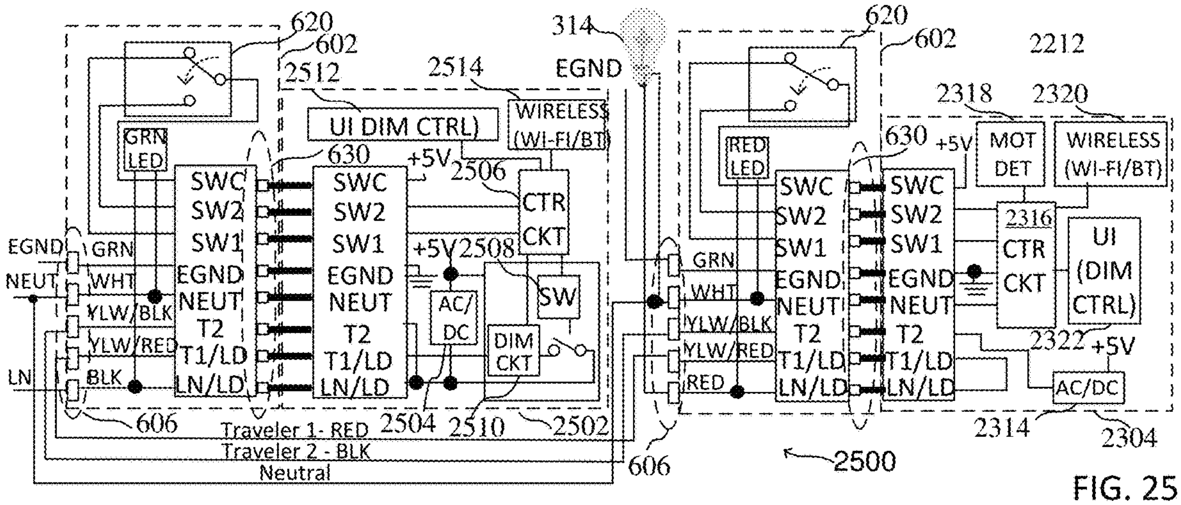
FIG. 25 is a block diagram of a first power adapter arrangement with a control module having a wirelessly controlled dimmer and a second power adapter arrangement having wireless signaling wired in a 3-way switching configuration.

Turning now to FIG. 25, a block diagram of a first power adapter arrangement with a control module having a wirelessly controlled dimmer and a second power adapter arrangement having wireless signaling wired in a 3-way switching configuration 2500 is shown. According to the implementation of FIG. 25, fixed line power is provided using the Traveler 2. Switching is performed on the line side by the control module 2502, where the switching may be initiated by a user interface on the load side. The control module 2502 comprises an AC/DC circuit 2504 to generate a DC voltage used by the control module. A control circuit 2506 is coupled to detected change in a signal on the SW1 and SW2 contact elements in response to a toggling of the switch 620 of the power adapter 602 on the line side. The control circuit controls a switch 2508 which controls the application of the line voltage to the Traveler T1 by way of the T1/LD contact element. The line voltage is then provided to the LN/LD contact element of the power adapter 602 on the load side, and therefore to the load. The control module 2502 also comprises a dimmer circuit 2510 to enable dimming of the load. The LN/LD contact element of the control module 2502 is electrically connected to the T2 contact element to enable the line power to be provided to the control module 2302, as described above in reference to FIG. 23. The control module 2502 may also comprise a user interface 2512, which may comprise a dimmer controller for example, and a wireless communication circuit 2514, shown by way of example as a combine Wi-Fi and Bluetooth circuit, but could implement any communication protocol.

Figure 26:
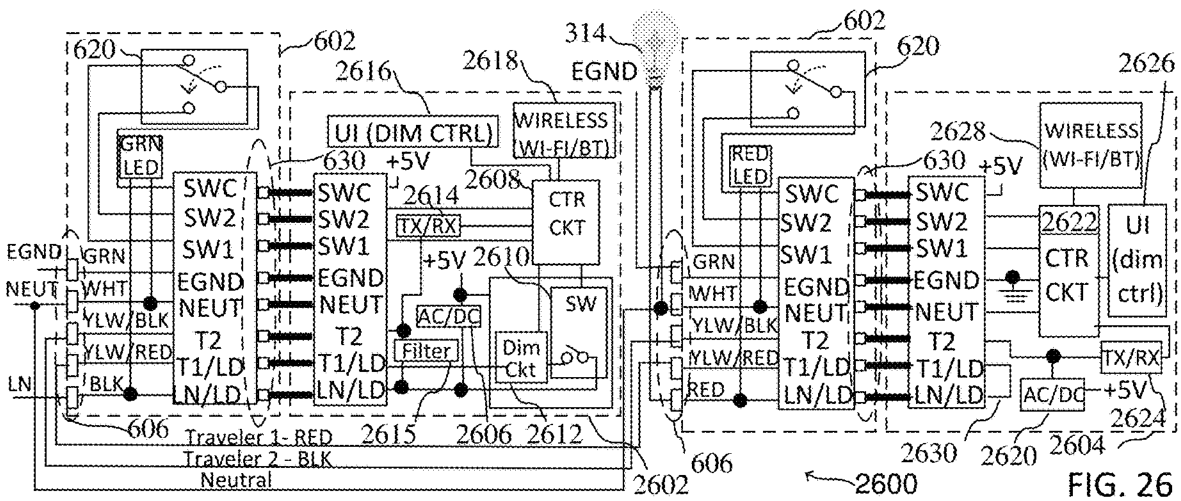
FIG. 26 is a block diagram of a first power adapter arrangement with a control module having a wirelessly controlled dimmer and a second power adapter arrangement having a remote dimmer receiving line power and wired signaling wired in a 3-way switching configuration.

Turning now to FIG. 26, a block diagram of a first power adapter arrangement with a control module having a wirelessly controlled dimmer and a second power adapter arrangement having a remote dimmer receiving line power and wired signaling wired in a 3-way switching configuration 2600 is shown. The control module 2602 is attached to the power adapter 602 on the line side and comprises a switch 2610 for controlling the switching of the power to the load over the Traveler T1, while a control module 2604 attached to the power adapter on the load side communicates with the control module 2602 on the line side by way of the Traveler 2. That is, both control modules receive power by way of the Traveler 2 and communicate over the wire between the T2 contact elements. As will be described in more detail below, the control modules may also communicate wirelessly.

The control module 2602 comprises in AC/DC circuit 2606 couple to the LN/LD contact element to receive the line voltage and generate a DC voltage signal. A control circuit 2608 is coupled to control a switch 2610 which may be a relay, a solid-state switch or some other switching device. A dimmer circuit 2612 is provided in line between the switch and the T1/LD contact element. A TX/RX circuit 2614 is also coupled to the control circuit and may receive a communication signal on the LN/LD contact element by way of a filter 2615. That is, a filter is beneficial in blocking any extraneous noise or communication signals that may be associated with a different system. The control circuit 2608 may also be coupled to a variety of peripherals for receiving inputs. For example, a user interface 2616, which may enable dimming control, may be provided. The control circuit may also receive signals by way of a wireless communication circuit 2618.

The control module 2604 also comprises an AC/DC circuit 2620 coupled to receive the line voltage on the contact element T2 to generate a DC voltage. A control circuit 2622 is coupled to the SW1 and SW2 contact elements to detect a change in the switch 620. The control circuit may also comprise peripheral circuits that are adapted to receive control signals. For example, the control module 2604 may comprise a TX/RX circuit 2624 that is adapted to receive a signal sent on the Traveler 2. A user interface 2626, which may comprise a dimmer control interface, is also coupled to the control circuit 2622. The control module 2604 may also comprise an optional wireless communication circuit 2628 for receiving commands by way of a wireless connection.

A description of the operation of the 3-way switching arrangement based upon the state of the switches of the switching arrangement as shown is now described. The control module 2602 controls the switching of the power to the load based upon signals or inputs received by the control module 2602 or the control module 2604. By way of example, the control circuit 2608 may receive and input or signal at one of its circuits or may receive an input or signal by way of the TX/RX circuit 2614. The switching of the switch 2610 will change the state of the line voltage signal applied to the Traveler 1, which is routed through the control module 2604 to the load, such as by a conductor element 2630 as shown. It should be understood that the control modules 2602 and 2604 may communicate over the Traveler 2 or directly by way of the wireless communication circuits to provide control of the switch 2610, or other for other reasons, such as disabling one of the wireless communication circuits for example so that only a single wireless communication circuit in the power adapter arrangement is used.

Figure 27:
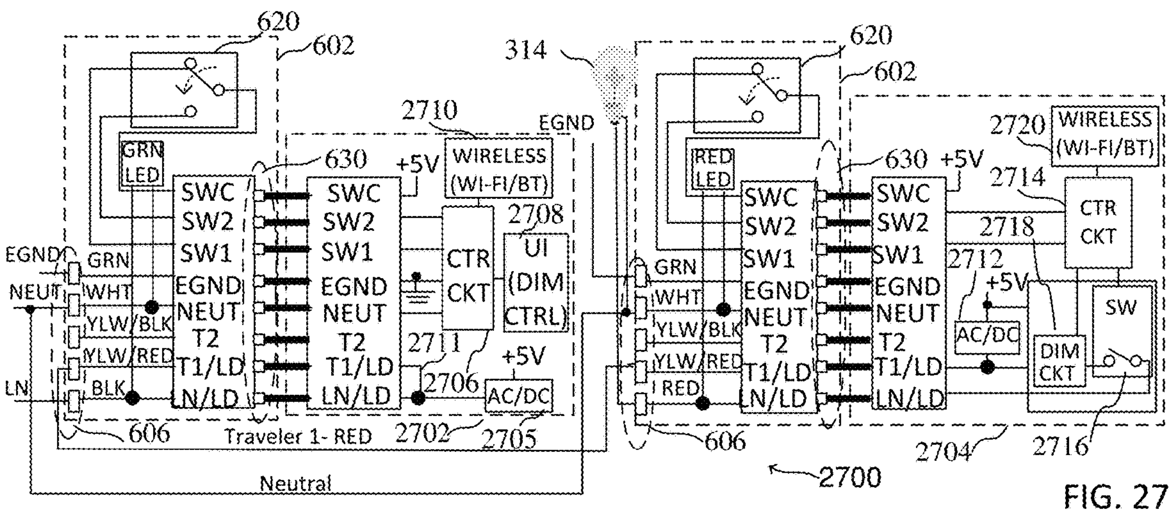
FIG. 27 is another block diagram of a first power adapter arrangement with a control module having a remote switch having wired control and a second power adapter arrangement with a control module having a wirelessly controlled dimmer wired in a 3-way switching configuration.

Turning now to FIG. 27, another block diagram of a first power adapter arrangement with a control module having a remote switch having wired control and a second power adapter arrangement with a control module having a wirelessly controlled dimmer wired in a 3-way switching configuration 2700 is shown. Unlike the implementation of FIG. 26, the power adapter arrangements in the 3-way switching arrangement do not communicate over a traveler line, but rather by way of wireless communication circuits of the control modules. More particularly, the control module 2702 comprises in AC/DC circuit 2705. A control circuit 2706 is coupled to peripherals to control the switching and dimming of a load, including by way of a user interface 2708, which may enable dimming control, and a wireless communication circuit 2710. The control circuit detects a toggling of the switch 620 or a signal from the user interface 2708 and provides a signal to the wireless communication circuit 2710 to enable the control module 2704 to control the switching of the line power to the load. Accordingly, any control input received by the control module 2702 is provided to the control module 2704. The line power is provided to the Traveler 1 by way of the T1/LD contact element and a conductor element 2711.

The control module 2704 comprises an AC/DC circuit 2712 for generating a DC signal. A controls circuit 2714 is coupled to control a switch 2716, which may be a relay for example. A dimmer circuit 2718 is coupled between the switch and the T1/LD contact element, where the output provided to the load is based upon the state of the dimmer circuit and the switch 2716 to the load. Therefore, the control of the power provided to the load is controlled by the control circuit 2714 in response to an input received by the control circuit 2714, which may include signals received by the wireless communication circuit 2720 from the wireless communication circuit 2710 control module 2702. As shown in FIG. 27, the second traveler line is not necessary in the implementation of FIG. 27 because the communication between the control modules, including control signals provided from the control module 2702 to the control module 2704, is performed wirelessly. Power is always provided to the power adapter 602 on the load side, and the application of power to the load is controlled by the control module 2704.

Figure 28:
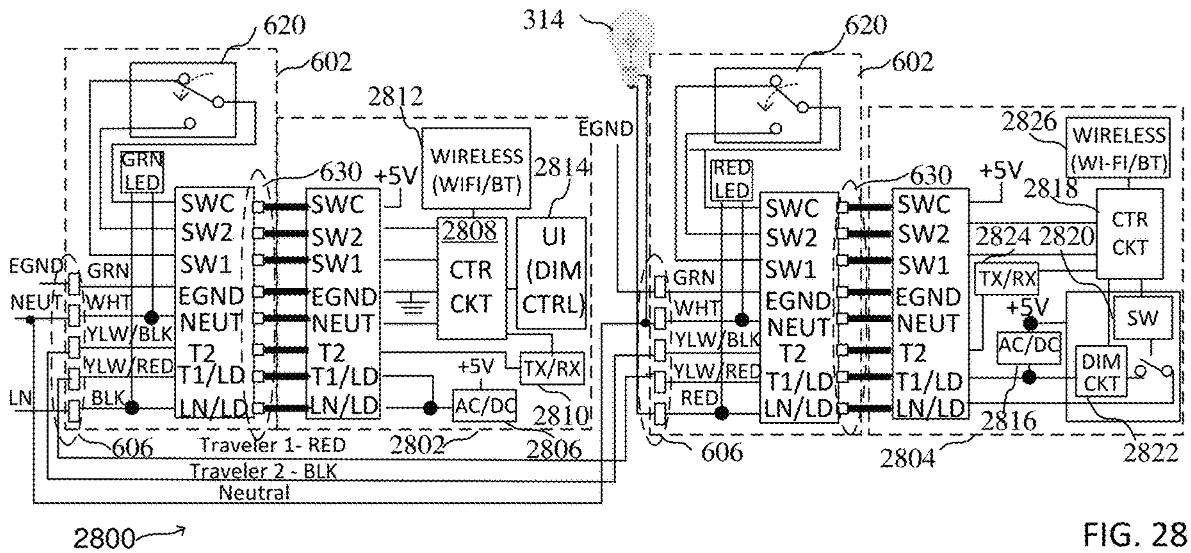
FIG. 28 is another block diagram of a first power adapter arrangement with a control module having wireless control and a second power adapter arrangement with control module having a wirelessly controlled dimmer wired in a 3-way switching configuration and signaling on a traveler line.

Turning now to FIG. 28, another block diagram of a first power adapter arrangement with a control module 2802 having wireless control and a second power adapter arrangement with a control module 2804 having a wirelessly controlled dimmer wired in a 3-way switching configuration 2800 and having signaling on a traveler line is shown. The 3-way arrangement comprises the transfer of the fixed line power on the Traveler 1 to provide power to the load side and wired signaling between the power adapters on the Traveler 2. Switching is performed on the load side. A control module 2802 comprises an AC/DC circuit 2806 and a control circuit 2808. The control circuit 2808 is coupled to the SW1 and SW2 contact elements to detect a change in the signal routed through the switch 620. A wireless communication circuit 2812 may be coupled to the control circuit 2808 to enable the transfer of signals by way of the TX/RX circuit 2810 on the Traveler 2 by way of the contact element T2. A user interface 2814 may also be provided to provide dimming control or other functionality.

The control module 2804 is coupled to receive the line voltage by way of the Traveler T1, where an AC/DC circuit 2816 receives the line voltage and generates a DC voltage. A control circuit 2818 is coupled to the SW1 and SW2 contact elements to detect a toggling of the switch 620. A switch 2820 is controlled by the control circuit to controls the application of the line voltage received by way of the dimmer circuit 2822 to the load by way of the LN/LD contact element. As shown in FIG. 28, the switching is controlled by the control module 2804, where the control may be in response to signals received either wirelessly or by way of the Traveler 2 on a TX/RX circuit 2824. The control module 2804 may also comprise a wireless communication circuit 2826 that is coupled to the control circuit.

Figure 29:
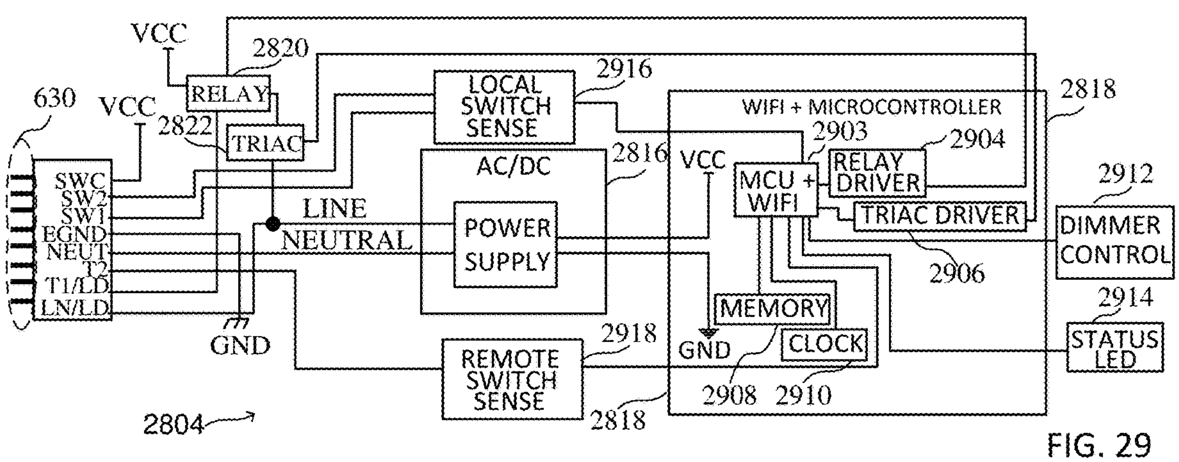
FIG. 29 is a block diagram of a control module having a wirelessly controlled dimmer circuit.

Turning now to FIG. 29, a block diagram of a control module 2804 having a wirelessly controlled dimmer circuit is shown. The control module 2804 comprises a microcontroller 2903, which may include some or all the elements of the control circuit 2818 of FIG. 28 and may comprise a microcontroller 2903 having a wireless communication circuit, shown here by way example is a Wi-Fi circuit. The microcontroller 2903 is coupled to a relay driver 2904 to control the switch 2820, shown by way of example as a relay. A TRIAC driver 2906 is also coupled to the microcontroller 2903 and controls the dimmer circuit 2822, shown by way of example as a TRIAC. While a TRIAC is shown by way of example, it should be understood that any type of dimmer circuit, such as a solid-state dimmer circuit could be used. The microcontroller 2903 is also coupled to a plurality of peripheral circuits, including a memory 2908, a clock circuit 2910, a dimmer control circuit 2912, and a status circuit 2914, shown here by way of example as an LED circuit. The dimmer control circuit 2912 may be accessible by a user to enable manual dimming of the power to the load at the control module 2804. A local switch sense circuit 2916 is coupled to the SW1 and SW2 contact elements to detect a switching of a switch of the power adapter, such as switch 620, where a signal is provided to the microcontroller 2903 in response to the detection of a toggling of the switch. A remote switch sense circuit 2918 may be used to detect a control signal on the contact element T2 and provide the control signal to the microcontroller 2903.

Figure 30:
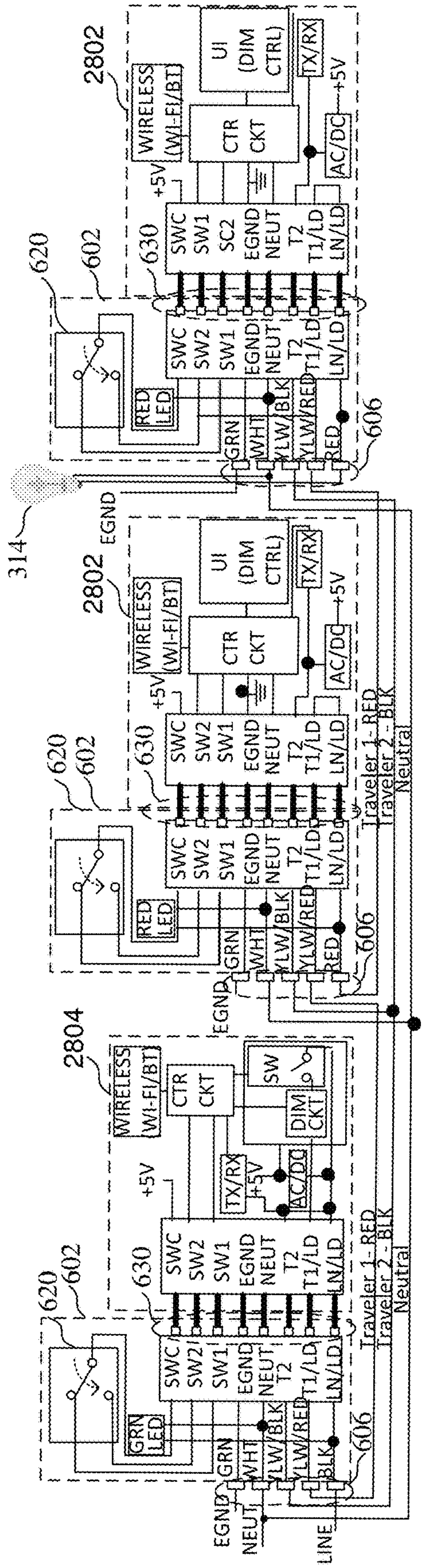
FIG. 30 is a block diagram of a power adapter arrangement wired in a 4-way circuit.
Figure 31:
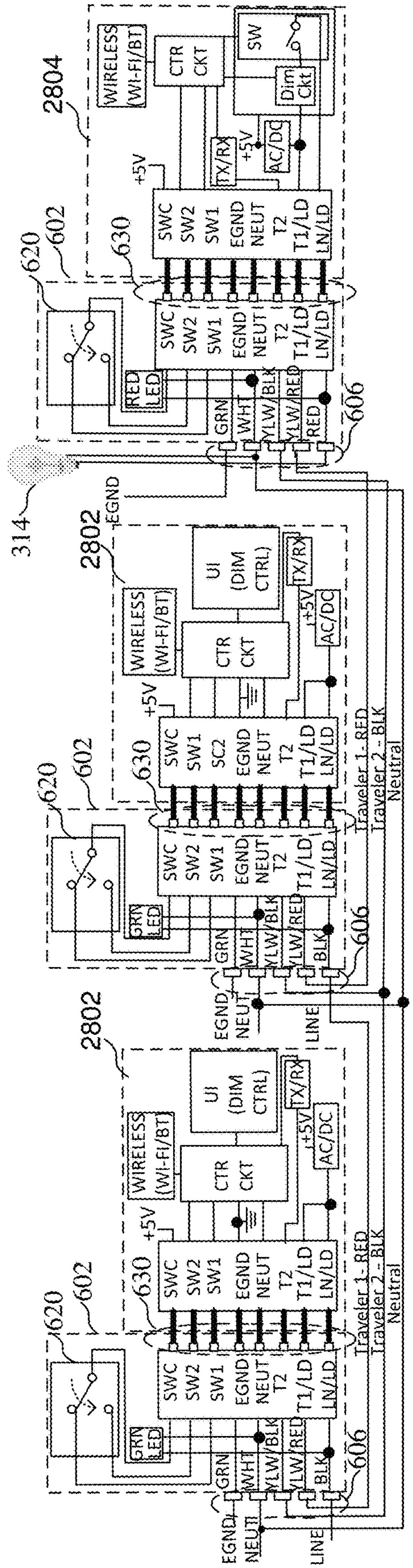
FIG. 31 is another block diagram of a power adapter arrangement wired in a 4-way circuit.

While the multi-way switching arrangements of FIGS. 18-29 are directed to 3-way switching arrangements, FIGS. 30 and 31 describe 4-way switching arrangements, where a designated 4-way power adapter having a switch is implemented between the line side and the load side power adapters. Turning first to FIG. 30, a block diagram of a power adapter arrangement wired in a 4-way circuit 3000 is shown. According to the configuration of power adapter arrangements in FIG. 30, the switching of the power to the load is controlled by the control module in the first power adapter arrangement (i.e., the first power adapter coupled to receive the line voltage), shown by way of example as having the control module 2804. Each of the second and third power adapter arrangements comprises a control module couple to receive or transmit control signals by way of the Traveler 2 or a wireless communication circuit. The control modules are shown by way of example as control module 2802. It should be understood that other control modules could be used to transmit and receive signals with the control module 2804. It should also be understood that any number of power adapter arrangements could be wired between the first power adapter arrangement receiving the line voltage and the last power adapter arrangement controlling the load. As can be seen in FIG. 30, the signal provided to the load is transferred by way of the traveler signals, where the control modules 2802 pass the line voltage (which may be altered by the dimmer circuit from the T1/LD contact element to the LN/LD contact element. The control modules 2802 do not control any switching of the load (other than changing of the state of the line voltage on the Traveler 1 or Traveler 2 in response to a switching of the switch 620) but provide wireless signals to the control module 2804, which controls the application of power to the load using the switch of the control module 2804.

Turning now to FIG. 31, another block diagram of a power adapter arrangements wired in a 4-way circuit 3100 is shown. According to the configuration of power adapter arrangements of FIG. 31, the switching of the power to the load is controlled by a switch of the control module 2804 of the last power adapter arrangement coupled to the load. That is, the line power received by the power adapter 602 of the first power adapter arrangement is routed through each of the first two control modules 2802. The application of the power to the load is controlled by the switch SW of the control module 2804. The application of power to the load may be based upon a signal received or generated by either of the control modules 2802 in the first and second power adapter arrangements, or by a signal received by the control module 2804 of the last power adapter arrangement. It should be understood that the control modules may communicate and effectively establish a certain control module as a master control module if there are overlapping circuits, such as the wireless communication circuits. For example, the wireless communication circuits of the control modules 2802 may be disabled, and any wireless signals may only be received by the wireless communication circuit of the control module 2804. Alternatively, the master control module 2804 may determine that signals received by a wireless communication circuit of a control module 2802 are redundant and ignore those signals.

Figure 32:
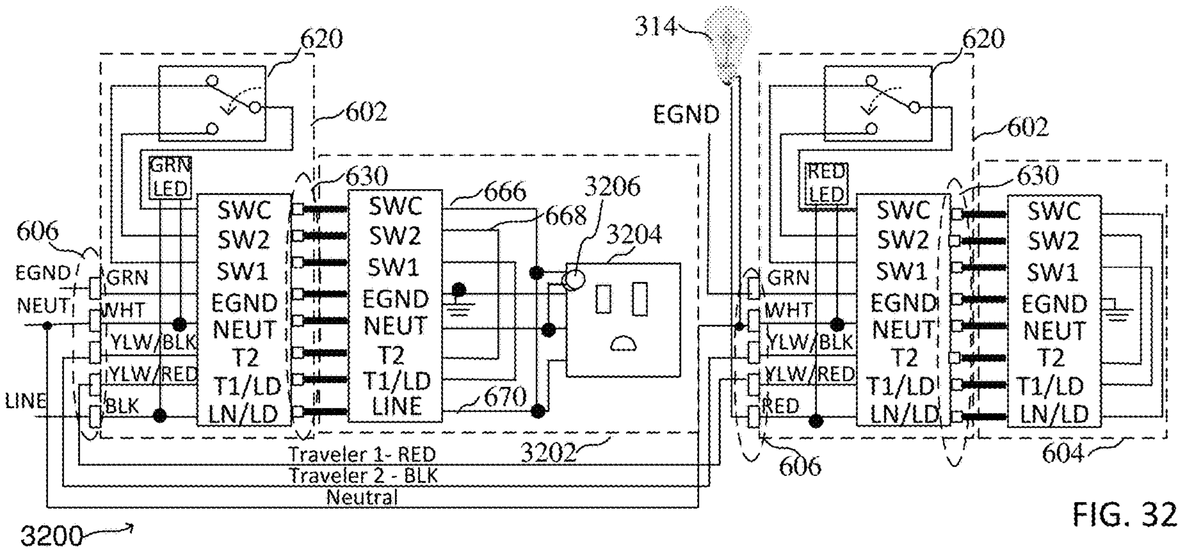
FIG. 32 is a block diagram of a first power adapter arrangement with a control module having an outlet and a second power adapter arrangement having a standard control module wired in a 3-way switching configuration.
Figure 33:
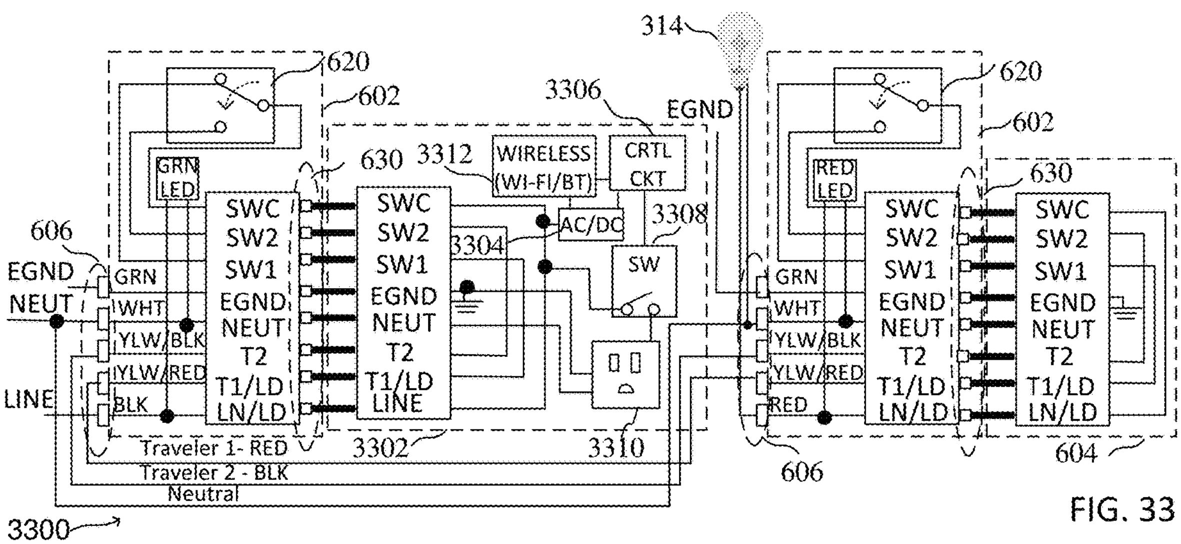
FIG. 33 is a block diagram of a first power adapter arrangement with a control module having a controlled outlet and a second power adapter arrangement having a standard control module wired in a 3-way switching configuration.

Power adapters in 3-way switching arrangements having a control module having an outlet attached to one of power adapters are described in FIGS. 32 and 33. Turning first to FIG. 32, a block diagram of a first power adapter arrangement with a control module having an outlet and a second power adapter arrangement having a standard control module wired in a 3-way switching configuration 3200 is shown. The control module 3202 comprises an outlet 3204 coupled to the line, neutral, and ground contact elements to provide power to a plug attached to the outlet. An indicator 3206 may be coupled to the line and neutral contact elements to indicate when power is applied to the outlet. Therefore, the outlet of the control module 3202 taps power off the LN contact element, but does not otherwise affect these switching of the 3-way switching arrangement shown in FIG. 32. That is, the 3-way switching operation is not impeded, but is performed as described above in reference to FIG. 18.

Turning now to FIG. 33, a block diagram of a first power adapter arrangement with a control module having a controlled outlet and a second power adapter arrangement having a standard control module wired in a 3-way switching configuration 3300 is shown. The control module 3302 is similar to the control module 3202 except that the outlet is a controlled outlet. More particularly, the control module 3302 comprises an AC/DC circuit 3304 and a control circuit 3306. The control circuit 3306 may control the application of the line voltage to the outlet 3310 using a switch 3308, which may be a relay, a solid-state switch or some other switching device. The control circuit may be controlled by a signal received by a wireless communication circuit 3312.

Figure 34:
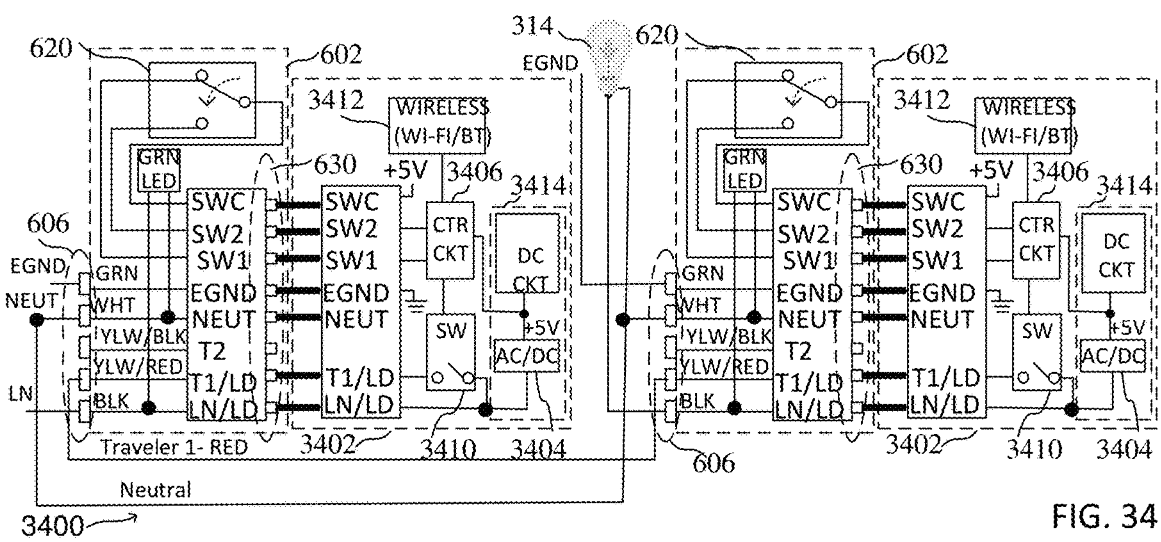
FIG. 34 is a block diagram of a first power adapter arrangement with a control module having a circuit requiring a DC voltage and a second power adapter arrangement having a standard control module wired in a 3-way switching configuration.

Power adapters implemented in a 3-way switching arrangement and having one or more control modules having wireless communication capability attached to power adapters are described in FIGS. 34-37. Turning first to FIG. 34, a block diagram of a first power adapter arrangement with a control module comprising a circuit requiring a DC voltage and a second power adapter arrangement having a standard control module wired in a 3-way switching configuration 3400 is shown. More particularly, an AC/DC circuit 3404 is coupled to the LN/LD contact element and generates a DC voltage, shown here by way of example as a 5 Volt DC voltage. A control circuit 3406 is couple to the SW1 and SW2 contact elements and detects a toggling of the switch 620 by the user by detecting a change of the 5 Volt DC signal on one of SW1 or SW2 contact elements. The control circuit will control the operation of switch 3410 to apply power to the load by way of Traveler 1 and the control module attached to the power adapter on the load side. A wireless communication circuit 3412 is provided on both the line side and the load side to enable communication between the control modules. As will be described in more detail below, the state of the switches will be controlled by the respective control circuits of the control modules to provide the correct on/off state of power to the load. The control module may also comprise a DC circuit 3414, which may be associated with the user interface or provide external electrical connections, such as a USB connection for example.

A description of the operation of the 3-way switching arrangement based upon the state of the switches of the switching arrangement as shown is now described. It should be noted that a wireless connection between the wireless communication circuits 3412 of the control modules enable setting the switch to the correct state to either apply power to the load based on a current state and a selection of switch 620 of either power adapter. According to the state of the switches 620 and the switches 3410 on both sides of the power adapter arrangement, the state of the switches could be changed to change the state of the power to the load. Because both of the switches 3410 are open, power cannot be provided to the load. However, if one of the control circuit detects a change in the switch 620 on the load side for example, the control circuit 3406 on the line side would change the state of the switch on the line side, and provide a signal by way of a wireless connection to the control module on the load side of the switching arrangement, wherein the control circuit 3406 would cause the switch to close on the load side. Therefore, both switches would be closed, and power would be provided to the load. The control modules would communicate to know the state of the switches and control the switches to provide power to the load as needed. It should be noted that the Traveler 2 is not used in the 3-way arrangement, as the control modules 3402 do not have a contact element T2.

According to some implementations, one of the control modules may operate as a master control module, and the other control module may operate as a slave control module. For example, because the wireless communication circuits are shown as having both Wi-Fi and Bluetooth functionality, it may be possible for the master control module to receive communication signals from one wireless communication network, such as Wi-Fi for example, and communicate with the slave control by way of a second communication protocol or network, such as Bluetooth. A master control module may instruct the slave control module to ignore Wi-Fi communication, and only receive Bluetooth communication from the master device.

Figure 35:
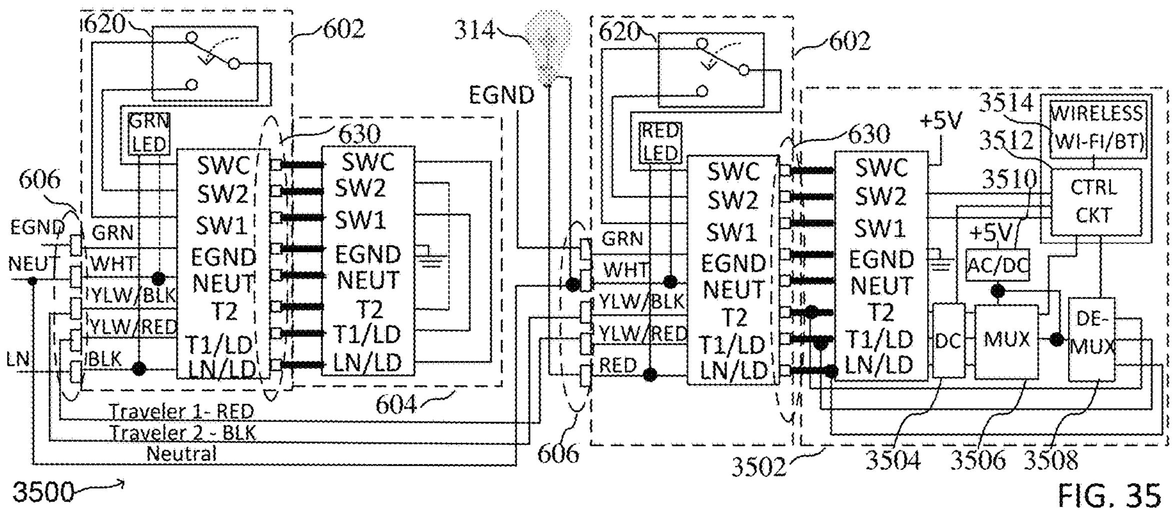
FIG. 35 is a block diagram of a first power adapter arrangement having a standard control module and a second power adapter arrangement having a control module comprising a wirelessly controlled switch wired in a 3-way switching configuration.

Turning now to FIG. 35, a block diagram of a first power adapter arrangement having a standard control module and a second power adapter arrangement having a control module comprising a wirelessly controlled switch wired in a 3-way switching configuration 3500 is shown. According to the implementation of FIG. 35, a control module 604 simply routes the power through the switch 620 and onto one of the traveler lines, while the control module 3502 comprises a detector circuit (DC) 3504 to enable the detection of the line voltage. That is, the line voltage could be on either of the Traveler 1 or Traveler 2. The detector circuit 3504 is also coupled to the LN/LD contact element so that the control module 3502 could also be used on the line side, as described in reference to FIG. 36. The detector circuit 3504 generates a control signal provided to the control circuit indicating which contact element of the T2, T1/LD, or LN/LD contact elements is coupled to the line voltage. Outputs of the detector circuit 3504 are routed to a multiplexer (MUX) 3506 which is used to generate the line voltage at an output, where the line voltage is then routed by a demultiplexer (DEMUX) 3508 to provide the line voltage on or decouple the line voltage from the LN/LD contact element (to which the load is coupled), depending upon the desired state of providing power to the load. That is, if it is desired to place the line voltage on the load, the demultiplexer 3508 would route the output of the multiplexer to the LN/LD contact element, which is coupled to the load. An AC/DC converter 3510, which receives the output of the multiplexer 3506 which has the line voltage, generates a DC voltage that may be used by other elements of the control module. A control circuit 3512 is coupled to the SW1 and SW2 contact elements to detect a change in the switch 620. A wireless communication circuit 3514 may also be coupled to the control circuit to receive control signals that enabled the control signal to control the application of the line voltage to the load.

The operation of switching circuits comprising the detector circuit 3504, the MUX 3506, and the DEMUX 3508 will now be described. The detector circuit 3504 detects the presence of a line voltage on any of the T2, T1/LD, or LN/LD contact elements. While the control module 3502 may detect the presence of the line voltage on the LN/LD contact element when the control module 3502 is on the load side, it should be understood that the control circuit had selected the output of the multiplexer to place the line voltage on the LN/LD contact element. That is, any switching events associated with a switching of the switch 620 will be detected by a change of the line voltage on the T2 contact element or the T1/LD contact element, where an output of the DC circuit is provided to the control circuit 3512 indicating that a switching event has occurred on the switch 620 of the power adapter on the line side. The control circuit also controls the DEMUX 3508 to route the line voltage to the appropriate contact element.

A description of the operation of the 3-way switching arrangement based upon the state of the switches of the switching arrangement as shown is now described. A switching of the switch 620 on the line side power adapter is detected by the detector circuit 3504, which generates an output signal to the control circuit indicating which of the T1/LD and T2 contact elements is receiving the line power. That is, one of Traveler 1 or Traveler 2 is receiving the line power. The control circuit will then change the state of the power to the load in response to the detection of a change of state of the line power on the T2 and T1/LD contact elements by controlling the demultiplexer to change the state the output of the demultiplexer having the line power. On the load side, the control circuit will detect a change in the switching of the switch 620 by detecting a change in the 5 Volt signal routed through the switch 620 on the SW1 and SW2 contact elements. The control circuit will then change the state of the output of the demultiplexer having the line power to change the state of the power to the load.

Figure 36:
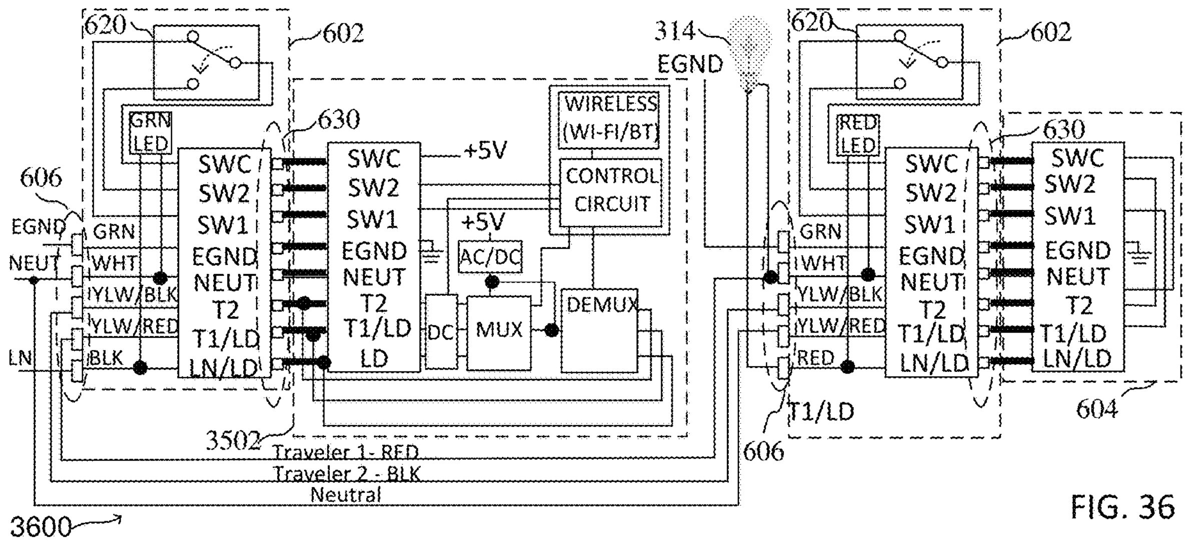
FIG. 36 is a block diagram of a first power adapter arrangement with a control module having a wirelessly controlled switch and a second power adapter arrangement having a standard control module wired in a 3-way switching configuration.

Turning now to FIG. 36, a block diagram of a first power adapter arrangement with a control module having a wirelessly controlled switch and a second power adapter arrangement having a standard control module wired in a 3-way switching configuration 3600 is shown. When the control module 3502 is placed on the line side as shown in FIG. 36, the detector circuit will always detect line voltage on the LN/LD contact element. The control circuit will switch the line power generated at the outputs of the demultiplexer whenever a switching of the switch 620 on the line side is detected, or if a wireless signal is received by the wireless communication circuit. Therefore, if the current state of the demultiplexer provides line power on Traveler 1, then the control circuit will instruct the multiplexer to change the line voltage to the Traveler 2. By changing the state of line on Traveler 1 and Traveler 2, the state of the application applied to the load will also change. On the load side, the state of the application of power to the load will change in response to a switching of the switch 620 on the load side.

Figure 37:
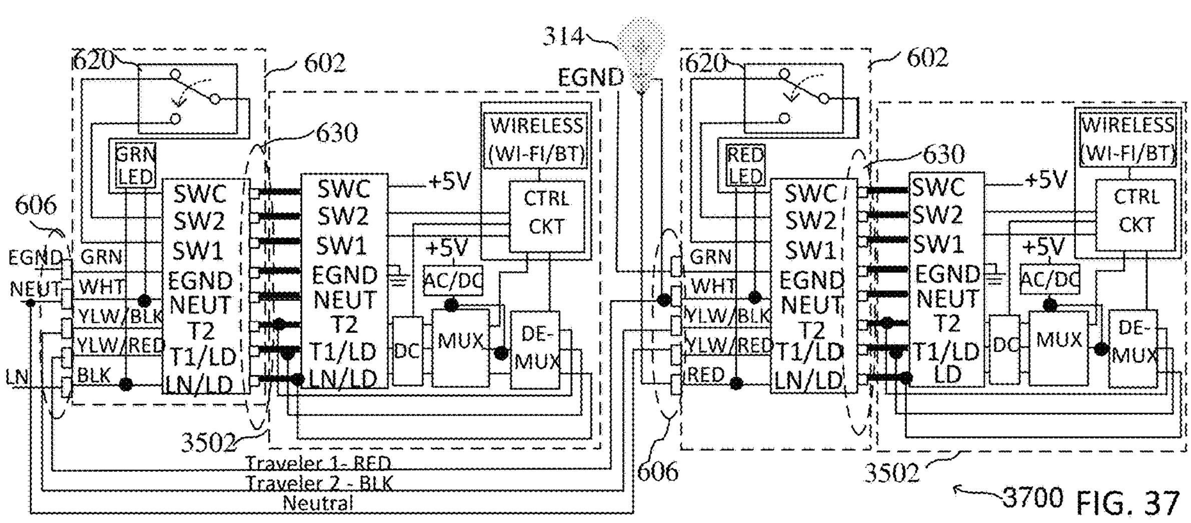
FIG. 37 is a block diagram of a first power adapter arrangement with control module having a wirelessly controlled switch and a second power adapter arrangement having a control module having a wirelessly controlled switch wired in a 3-way switching configuration.

Turning now to FIG. 37, a block diagram of a first power adapter arrangement with control module having a wirelessly controlled switch and a second power adapter arrangement having a control module having a wirelessly controlled switch wired in a 3-way switching configuration 3700 is shown. When the control module 3502 is attached to power adapters on both sides of the 3-way switch, the control modules can operate to change the state of the light to the load by changing the output of the demultiplexer. When the control module 3502 is attached to the line side, the detection circuit will continuously detect a line voltage on the LN/LD contact element, and therefore detect that it is connected to the power adapter on the line side. The control module can toggle an output of the demultiplexer to verify that it is on the line side. Similarly, the control module 3502 will detect a toggling of the line voltage on the LN/LD contact element when the control module is on the load side. The control module can toggle the output of the demultiplexer to verify that it is on the load side. During operation of the 3-way switching arrangement with both power adapters having the control module 3502, each control module will switch the output of the demultiplexing circuit in response to the detection of a switching by the switch 620 of the control module to which it is attached.

Figure 38:
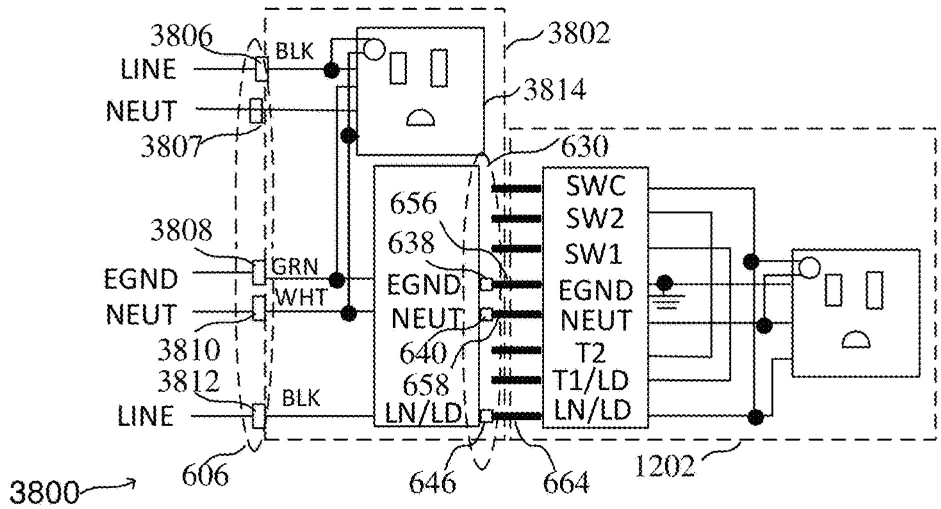
FIG. 38 is a block diagram of a power adapter arrangement having a power adapter having an outlet and a basic outlet control module.
Figure 39:
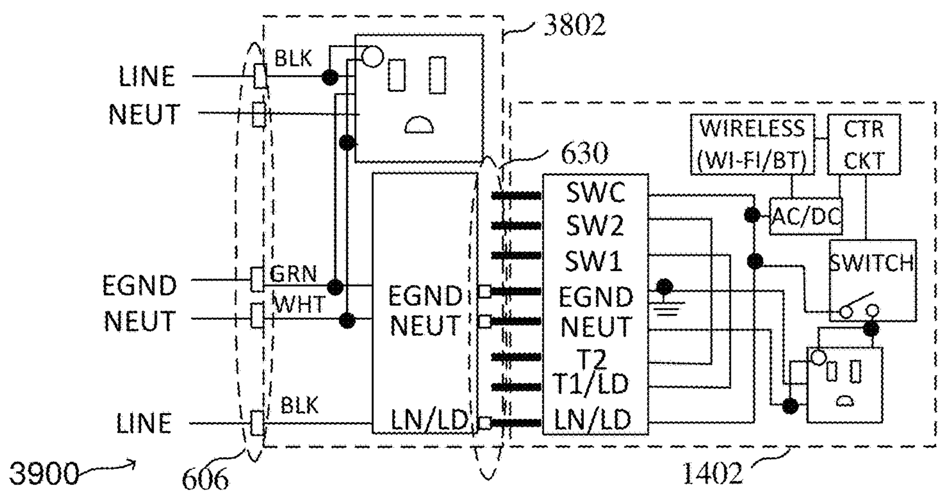
FIG. 39 is a block diagram of a power adapter arrangement having a power adapter comprising an outlet and a wirelessly controlled outlet control module.
Figure 40:
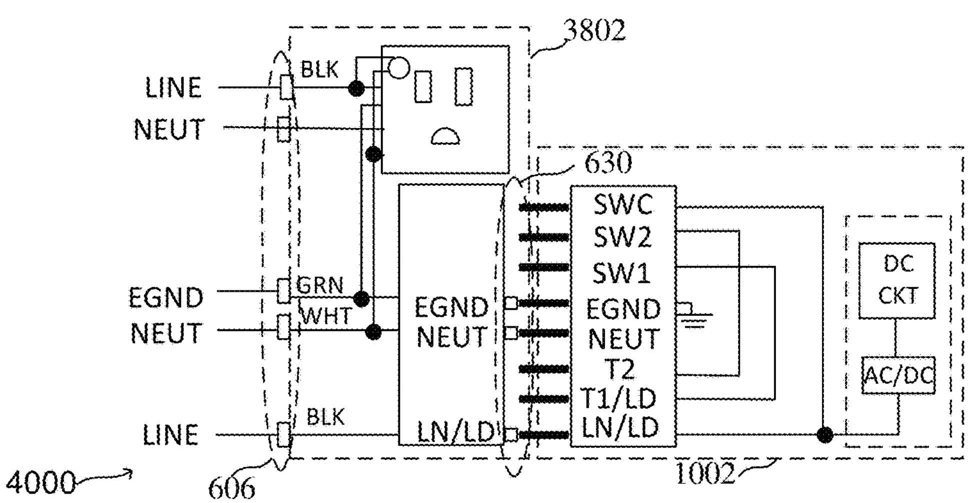
FIG. 40 is a block diagram of a power adapter arrangement having a power adapter having outlet and a control module having A DC circuit.

FIGS. 38-40 are directed control modules that receive power from the power adapter 3802 having an outlet. That is, the control modules attached to the power adapter 3802 do not control the switching of any element in the power adapter, but rather taps off the line power to provide power to the control module. Turning first to FIG. 38, a block diagram of a power adapter arrangement 3800 having a power adapter having an outlet and a basic outlet control module is shown. A power adapter 3802 comprises an electrical interface 606 having a plurality of contact elements adapted to be coupled to wires of a junction box, shown here by way of example as having line (LN) contact element 3806, ground (EGND) contact element 3808 for making a connection to earth ground, a neutral (NEUT) contact element 3810, and another line contact element 3812 for example. The two line contact elements 3806 and 3812 and will enable separately wiring the outlets, and particularly enable a switched outlet (e.g., the top outlet may be wired to and controlled by a wall switch). It should be noted that in the implementation of FIG. 38 or any other implementation of a power adapter having an outlet that includes a separate line contact element, a separate neutral contact element, as shown here by way of example as a contact element 3807, may be included. That is, a separate line contact element enables wiring the outlet of the power adapter as a switched outlet. A second neutral contact element may not be required if the line power is provided by the same power transmission system (i.e., line voltages having the same phase.) However, if the line voltages are provided by different power transmission systems, a second neutral contact would be necessary. That is, it would be necessary to wire one pair of a load contact element and a line contact element to one power transmission system, and wire a second pair of a load contact element and a line contact element to the other power transmission system. Accordingly, for any power adapter having an outlet that comprises two line inputs (i.e., a first contact element to the outlet of the base and a second contact element to a recess of the power adapter), then the power adapter may comprise separate neutral contact elements (i.e., a first contact element to the outlet of the base and a second contact element to a recess of the power adapter as shown for example in FIGS. 121-125). As can be seen in FIG. 38, contact elements that are not coupled to corresponding contact elements of the power adapter 3802 are included with the basic outlet control module. As will be described in more detail below, the additional contact elements enable the use of the basic outlet control module in a power adapter having a switch.

According to the implementation of FIG. 39, the power adapter 3802 having an outlet 3814 is coupled to the control module 1402. As can be seen in FIG. 39, the power adapter 3802 of the power adapter arrangement 3900 is also adapted to receive a control module having wirelessly switched outlet, such as the outlet of control module 1402. According to the power adapter arrangement 4000 of FIG. 40, the power adapter 3802 is coupled to the control module 1002 having a DC circuit as shown.

Figure 41:
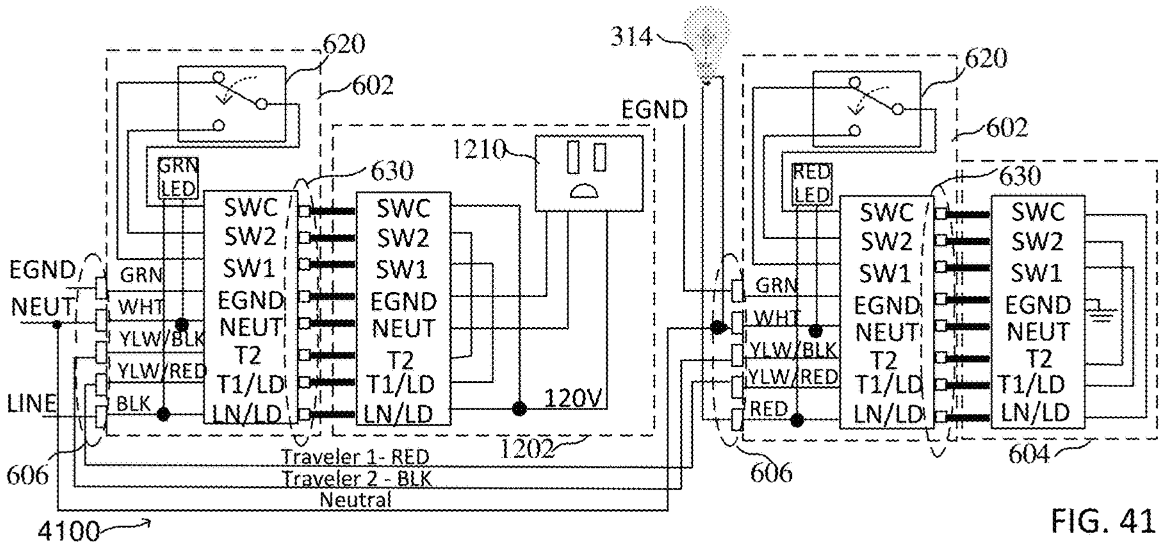
FIG. 41 is a block diagram of a first power adapter arrangement with a control module having an outlet and a second power adapter arrangement having a standard control module wired in a 3-way switching configuration.
Figure 42:
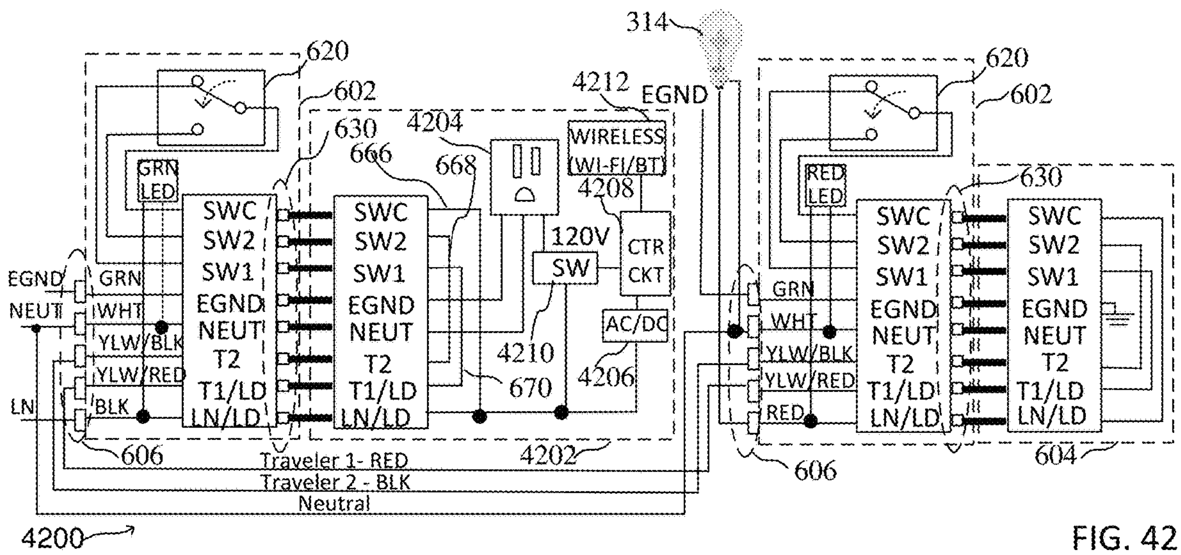
FIG. 42 is a block diagram of a first power adapter arrangement with a control module having a controlled outlet and a second power adapter arrangement having a standard control module wired in a 3-way switching configuration.

FIGS. 41 and 42 show the use of outlets in power adapters configured in a 3-way switching arrangement on the line side of the 3-way switching arrangement. Turning first to FIG. 41, a block diagram of a first power adapter arrangement with a control module having an outlet and a second power adapter arrangement having a standard control module wired in a 3-way switching arrangement 4100 is shown. That is, the 3-way switching arrangement comprises a first power adapter 602 coupled to receive the line voltage at the LN/LD contact element of the electrical interface 606, and a second power adapter 602 couple to provide power to the load, as described above in reference to FIG. 18. The control module 1202 having an outlet is attached to the power adapter 602 on the line side, and the outlet 1210 is electrically coupled to receive the line, neutral, and ground voltages as shown.

As shown in FIG. 42, a block diagram of a first power adapter arrangement with a control module having a controlled outlet and a second power adapter arrangement having a standard control module wired in a 3-way switching configuration 4200 is shown. A control module 4202 having an outlet that is wirelessly controlled is attached to the power adapter 602 on the line side of the 3-way switching arrangement. The control module 4202 comprises an outlet 4204 that is adapted to receive a switched power signal. More particularly, an AC/DC circuit 4206 is coupled to the LN/LD contact element to receive the line voltage and generate a DC voltage that is coupled to a control circuit 4208. The control circuit is coupled to a switch 4210, which routes the line voltage to the outlet 4204. The switch 4210 can be any type of switch, including a relay, a TRIAC, or any type of switching element. The control module 4202 may also comprise a wireless communication circuit 4212, which is coupled to the control circuit. The wireless communication circuit is adapted to receive communication signals for controlling the operation of the switch by way of the control circuit (i.e., to provide a wirelessly controlled outlet associated with a power adapter having a switch). It should be understood that the operation of the switching in the 3-way switching arrangement of FIGS. 41 and 42 is as described above in reference to FIG. 18.

Figure 43:
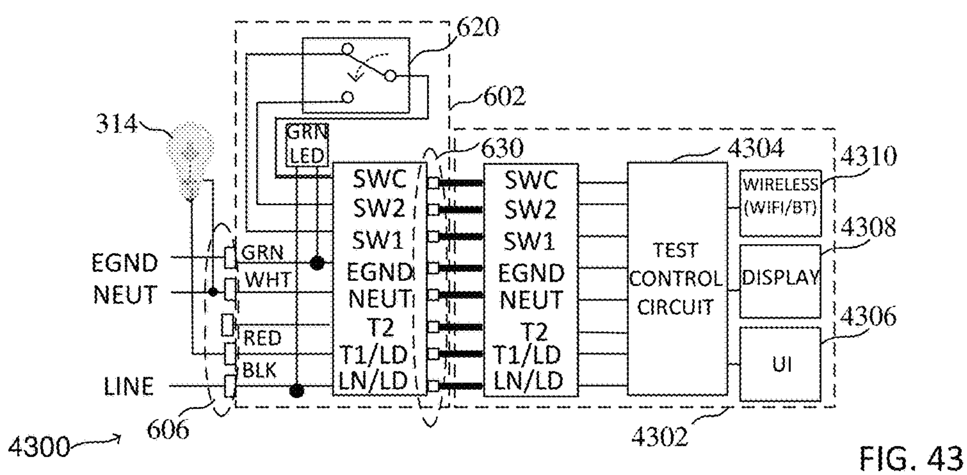
FIG. 43 is a block diagram of a power adapter arrangement having a test module.
Figure 44:
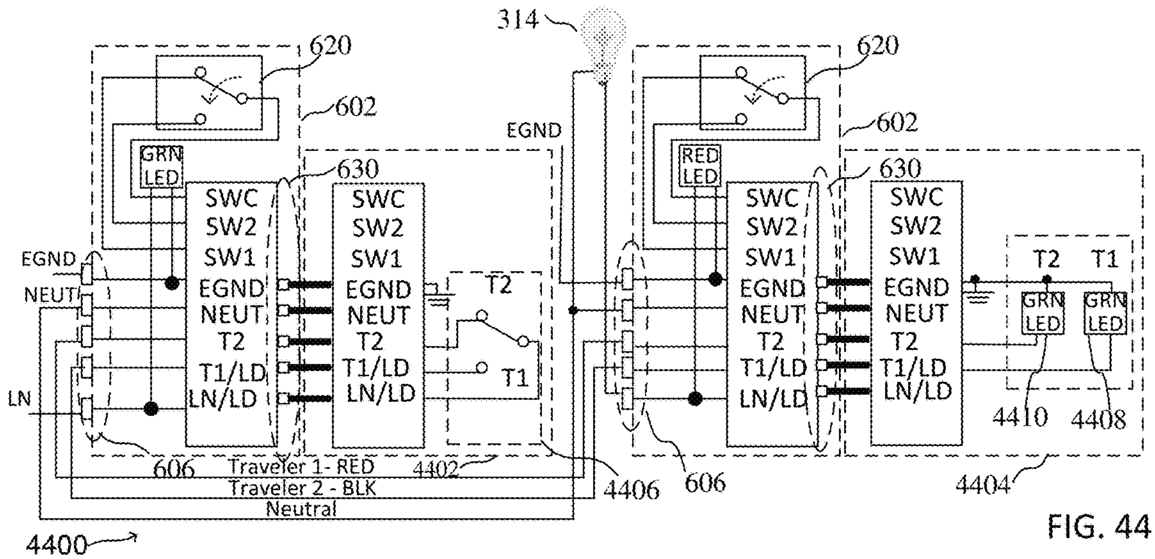
FIG. 44 is a block diagram of first and second power adapter arrangements each having test modules and wired in a 3-way circuit.
Figure 45:
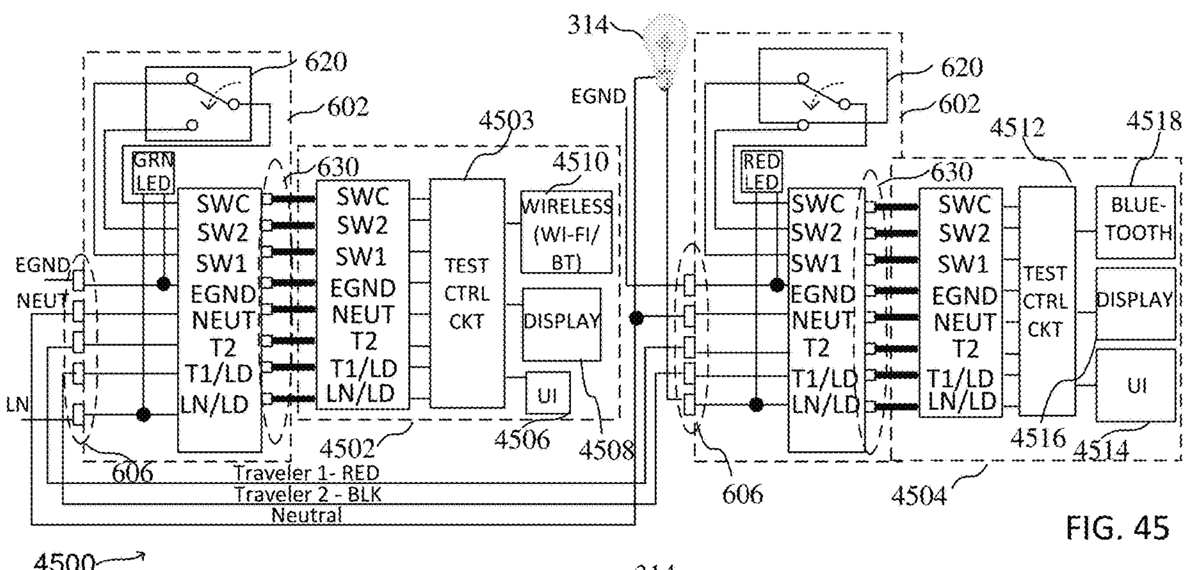
FIG. 45 is another block diagram of first and second power adapter arrangements each having test modules and wired in a 3-way circuit.

One beneficial aspect of the power adapter arrangements described above is that a test module can be implemented according to various implementations as described in reference to FIGS. 43-45 to determine whether the power adapter is wired correctly in the junction box and whether the power adapter is defective. Turning first to FIG. 43, a block diagram of a power adapter arrangement 4300 having a test module is shown. More particularly, a test module 4302 may be coupled to a power adapter to determine whether the power adapter is properly wired within a junction box. The test module 4302 comprises a test control circuit 4304 which is adapted to transmit and receive test signals. The test control circuit 4304 may be coupled to peripheral blocks, including a user interface 4306, a display 4308, and a wireless communication circuit 4310. The user interface 4306 may provide simple feedback, such as an output on an LED indicating a pass fail, for example, or may include additional inputs that a user can select, such as a test button for example. The display 4308 may be included to provide additional information, such as to indicate that an error in wiring has occurred and provide an error type. The wireless communication circuit 4310 may be provided to receive communication signals associated with a test or transmit communication signals associated with test results to a remote location, such as a laptop or other portable device for example.

The test control circuit 4304 may provide test signals through the switch based upon inputs received at the test module. For example, a signal may be transmitted through the switch 620 and detected at one of the SW1 and SW2 contact elements. The test circuit may also detect the voltage on the LN/LD contact element, and, depending upon the position of the switch 620, the voltage on T1/LD or T2 contact elements. The test control circuit 4304 may also test the ground and neutral voltages to determine whether they are properly connected. For example, the ground and neutral contact elements should be at different voltages. That is, although the voltages may be close, they should be different. The test control circuit 4304 should also determine whether the line voltage is the correct voltage. It should be understood that the test module 4302 could also be used on each end of a 3-way switch.

Turning now to FIG. 44, a block diagram of first and second power adapter arrangements each having test modules and wired in a 3-way circuit 4400 is shown. According to the implementation of FIG. 44, test modules 4402 and 4404 are coupled to power adapters on both sides of the 3-way switching arrangement as shown. The test modules 4402 are implemented to determine whether the power adapters are wired properly in the 3-way switching arrangement. Accordingly, a user may toggle the switch 4406, where the toggling would be detected by the changing of the power applied to indicator elements, shown here by way of example as LEDs. That is, when the line voltage is initially applied to T1/LD contact element, the indicator element 4408 will provide an indication that the power is routed through Traveler 1, and when the line voltage is applied to T2, the indicator element 4410 will provide an indication that the power is routed through Traveler T2.

Test modules having additional functionality can also be provided. The block diagram of FIG. 45 has a first power adapter arrangement having a test module 4502 and second power adapter arrangement having a test module 4504 which are wired in a 3-way arrangement 4500. The test module 4502 comprises a test control circuit 4503 that may be coupled to a plurality of peripheral elements, including a user interface 4506, a display 4508, and a wireless communication circuit 4510. The wireless communication circuit is shown by way of example as a combined Wi-Fi and Bluetooth communication circuit. However, it should be understood that the wireless communication circuit could implement any wireless protocol. The test module 4504 also comprises a test control circuit 4512 and may comprise a plurality of peripherals including a user interface 4514, a display 4516, and a wireless communication circuit 4518, shown here by way of example as a Bluetooth wireless communication circuit. That is, it may not be necessary to have remote wireless communication with the test module 4504, and only short-range communication circuit such as a Bluetooth connection would be necessary between the test modules 4502 and 4504. While the test modules 4502 and 4504 are shown as a pair of different test modules, a single test module such as test module 4502 could be implemented according to another implementation, where one of the test modules may be designated as a master test module.

According to the implementation of FIG. 45, the test modules 4502 and 4504 are adapted to detect whether the power adapter 602 is working properly. That is, the test modules will determine whether a signal is being routed through the switch from the SWC contact element. A technician testing the power adapter may also switch the switches 620 to determine that these switches are working properly. For example, the test module on the line side for example can be the master test module and initiate a test to determine whether the traveler lines are wired properly. The test control circuit may apply a signal to one of the traveler lines, such as Traveler 2 for example, and the test module 4504 may detect a signal on the Traveler 2 line, indicating that the traveler line is wired properly. The test modules may also determine whether the line voltage is properly wired to the LN/LD contact element on the line side and the load 314 is wired to the LN/LD contact element on the load side. The various tests that are performed could be selected by a technician on the user interface of either test module 4502 or 4504. Feedback related to tests that are performed or test results could be displayed on a display of either test module. The various tests could be selected by the technician on a remote device and provided to one or both of the test modules. The test could be provided remotely by way of a wireless connection such as a Wi-Fi connection or could be provided locally to one of the test modules by a short range connection, such as a Bluetooth connection or NFC connection. Tests could also be performed manually using the user interface.

As with any consumer product, it is beneficial to reduce the complexity of the product. For example, it may be beneficial to reduce the part count associated with the product, making manufacturing of the product simpler. According to the implementations of FIGS. 46 and 47, a simplified power adapter having an outlet and a simplified power adapter having a SPST switch are shown. Turning first to FIG. 46, a block diagram of a power adapter arrangement 4600 having a power adapter 4602 comprising an outlet 4603 and a standard outlet control module 4604 having an outlet 4610 is shown. According to the implementation of FIG. 46, the contact element T2 of the power adapter is provided to allow a variety of control modules to be used in an outlet. For a control module that draws power off of either contact elements LN/LD or T2, a conductor element 4606 is provided to enable a control module to be able to draw power off of the contact element 4608 of the electrical interface 630. That is, because a control module may not receive power from the LN/LD contact element in certain circumstances, it may be necessary to provide fixed power on the T2 contact element, as described in more detail below.

Figure 47:
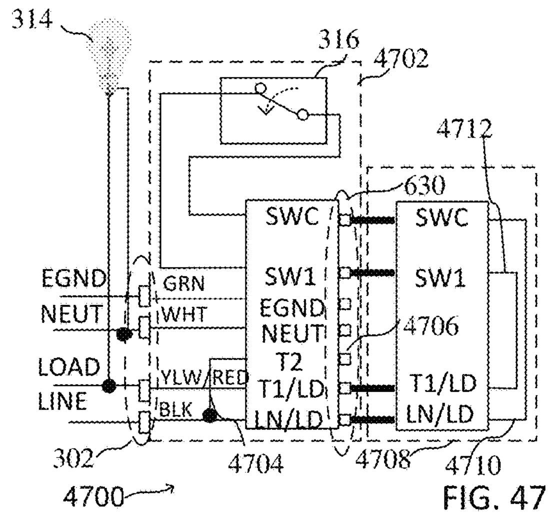
FIG. 47 is a block diagram of a power adapter arrangement having a SPST switch and a standard SPST switch control module.

Turning now to FIG. 47, a block diagram of a power adapter arrangement 4700 having a SPST switch and a standard SPST switch control module is shown. The power adapter 4702 having a SPST switch 316 comprises a conductor element 4704 to route the line power to the contact element 4706 of the electrical interface 630. A control module 4708 comprises a first conductor element 4710 between the LN/LD contact element and the SWC contact element and a second conductor element 4712 between the SW1 contact element and the T1/LD contact element. Any control module that may require receiving line power at either the T1/LD or T2 contact elements will receive line power on the contact element 4706 regardless of this state of the switch 316.

Figure 48:
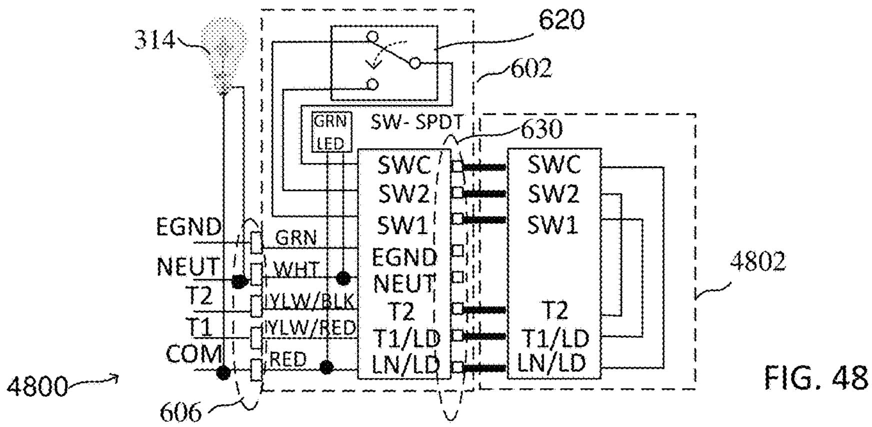
FIG. 48 is a block diagram of a power adapter arrangement having a SPDT switch and a standard SPDT switch control module.

Turning now to FIG. 48, a block diagram of a power adapter arrangement 4800 having a switch 620 and a control module 604 is shown. As shown in FIG. 48, five contact elements are provided in the electrical interface 606 and eight contact elements are provided on the power adapter 602 for the electrical interface 630. It should be noted that the control module 4802 comprises a reduced number of contact elements associated with the electrical interface 630, where ground or neutral voltages may not be provided to the control module 4802.

A line detection circuit (LDC), which may comprise one or both of a current detection circuit and a voltage detection circuit, where a voltage detection circuit may comprise an AD/DC circuit for example, may be provided according to various implementations. A line detection circuit may be implemented to detect a switching on a different switch in a multi-device switching circuit (e.g., 3-way switching). A switching control module in a 3-way or 4-way switch may need to detect a change in a current caused by a switching (e.g., a switching of the switch 620) on a different switch (i.e., a detecting of a switching on the load side power adapter by the line side control module or vice versa). A line detection circuit for a switching control module may have to detect a change in the current that is only a result of the switching of the switch on the power adapter, and not a current drawn by a DC circuit in the other control module.

Figure 49:
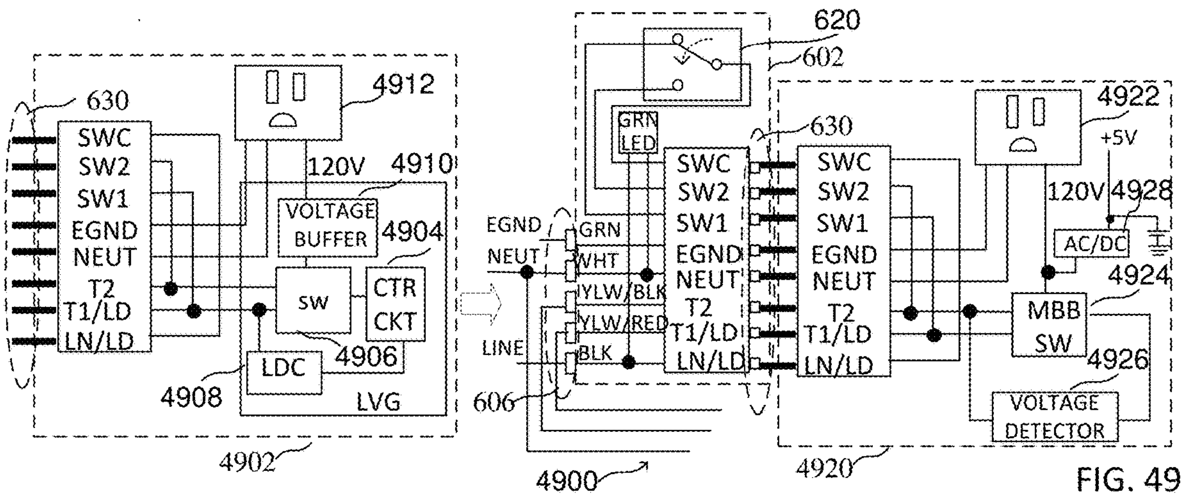
FIG. 49 is a block diagram of a control module having a controlled outlet.
Figure 50:
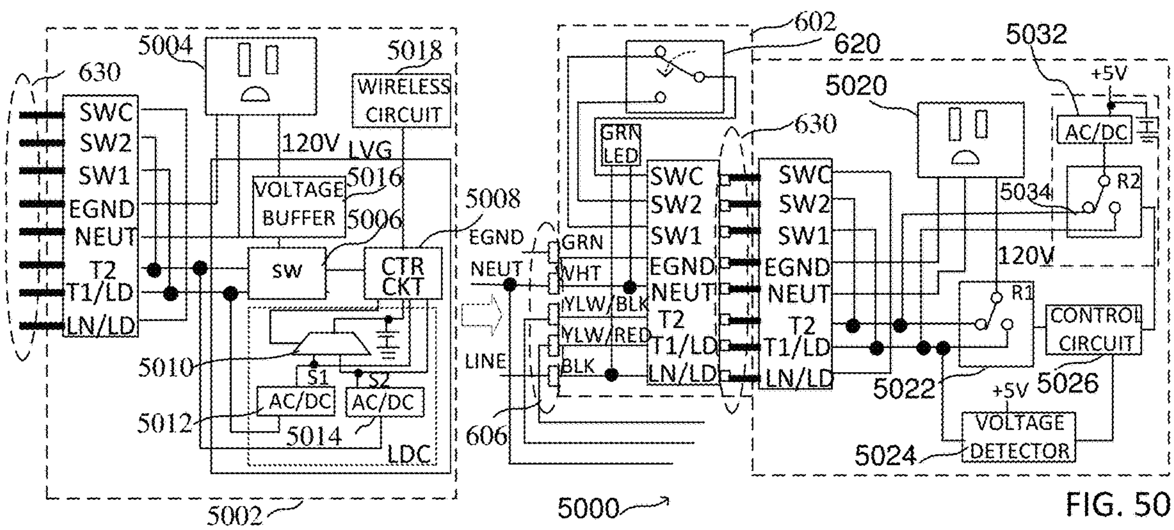
FIG. 50 is a block diagram of a control module having a wirelessly controlled outlet.

While implementing a control module on the line side of a 3-way switching arrangement may not require complex circuits because the line power can be found on the LN/LD contact element, it is beneficial to provide control modules that may be implemented on either the line side or the load side of a multi-way switching arrangement. FIGS. 49 and 50 disclose the use of a control module having an outlet with a power adapter on the load side. A block diagram of a control module 4902 having a controlled outlet is shown in FIG. 49. The control module 4902 comprises a control circuit 4904 adapted to control a switch 4906, which may be a relay, a solid-state switch or some other switching device. A line detection circuit 4908 provides a signal, which indicates whether a power voltage signal (e.g., 120 volts) is on the T1/LD contact element, to the control circuit. The control circuit controls the application of power by way of a voltage buffer 4910 to an outlet 4912. The voltage buffer may optionally be included to maintain the voltage at the output of the switch so that the outlet 4912 receives a constant 120 volts and may be implemented as a capacitor for example.

According to another implementation, the switch 4906 may be replaced by a make-before-break (MBB) circuit, alone or in combination with a switch 4924 comprising an MBB switch, shown in the power adapter arrangement 4900 on the right side of FIG. 49 having control module 4920. The switch 4924 holds the power signal on both the T2 and T1/LD contact elements to minimize any glitch of power to the outlet, where the only element of a loss of power to the outlet would be based upon the switch 4924. Depending upon the delay, it may be necessary to maintain the voltage to the outlet 4922 at the output of the switch 4924 using a voltage buffer with the switch 4924 to ensure that any loss of power to the outlet is for a short enough period of time that a load applied to the outlet would not be affected. The switch 4924 could be controlled by an output of the voltage detector 4926. By way of example, if a voltage is detected on the T2 line as shown, the switch would be switched to provide the power to the outlet 4922, otherwise the switch 4924 would provide power by way of the T1/LD contact element to the outlet. An AC/DC circuit 4928 could also be provided to an outlet of the switch to generate a DC signal, such as a 5 V DC signal.

Turning now to FIG. 50, a block diagram of a control module 5002 having a wirelessly controlled outlet is shown. The control module 5002 comprises an outlet 5004 is controlled by a switch 5006 and a control circuit 5008 to control the application of power to the outlet 5004. Because a 120 V power will be on either one of the traveler lines (i.e., a voltage received from the traveler lines at the T2 or T1/LD contact elements), a multiplexer circuit 5010 could be used to select the output of one of two AC/DC circuits 5012 and 5014 to generate a low voltage DC signal (e.g., 5 volts) that is provided to the control circuit 5008. A voltage buffer 5016 may be used to maintain the power to the outlet 5004. A wireless communication circuit 5018 may be implemented to provide a switching operation for the outlet (i.e., to implement a controlled outlet). That is, while in a power adapter having an outlet that has fixed power, the control circuit 5008 and the switch 5006 could be used to provide power to a controlled outlet, where power can be applied to the outlet as desired by a user, such as according to a timing pattern for example.

The control module 5002 may be modified to have a single AC/DC circuit, rather than two AC/DC circuits as shown on the left side of FIG. 50. More particularly, as shown on the right side of FIG. 50 having the power adapter arrangement 5000, an outlet 5020 is coupled to a switch 5022 to receive the line power from one of the T2 or T1/LD contact elements. A voltage detector 5024 is coupled to one of the T2 or T1/LD contact elements and generates an output signal to the control circuit to indicate whether line voltage is on the Traveler 1 or Traveler 2. The control circuit 5026 controls the state of the switch to provide the line voltage to the outlet. That is, because the line voltage is only on one of the T2 and T1/LD contact elements, it is necessary to switch the switch 5022 to provide the line voltage to the outlet. A switch 5034 is also provided to enable the generation of a DC signal. More particularly, the inputs to the switch 5034 are coupled to the T2 and T1/LD contact elements. The control circuit will also control the state of the switch 5034 to ensure that the AC/DC circuit 5032 always receives the line power. Therefore, because power is always on one of T2 or T1/LD contact elements, the voltage detector will always be able to detect which contact element the line voltage is on and provide a constant voltage to the outlet 5020 and the AC/DC circuit 5032.

Figure 51:
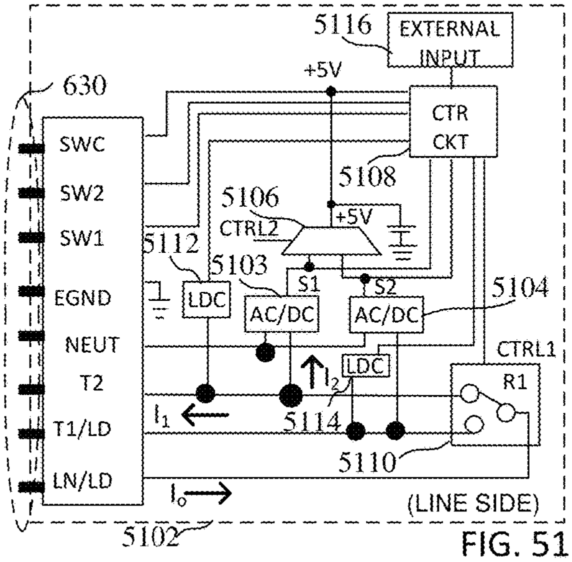
FIG. 51 is a block diagram showing an operation of a control module for controlling switching on a line side of a 3-way switch.

Various implementations and the operation of switching control modules that may be implemented in a power adapter on either the line side or the load side are described in reference to FIGS. 51-57. Turning first to FIG. 51, a block diagram showing an operation of a control module 5102 for controlling switching on a line side of a 3-way switch is shown. $I_0=I_1+I_2$, where $I_1$ (on Traveler 1 or Traveler 2) is the component drawn by the load side and is independent of $I_2$. A first AC/DC circuit 5103 is coupled to the contact element T2, and a second AC/DC circuit 5104 is coupled to the T1/LD contact element. A multiplexer 5106 is coupled to the output of the AC/DC circuits to receive signals S1 and S2. A control circuit (CTR CKT) 5108 is also coupled to the output of the AC/DC circuits and is coupled to control the multiplexer 5106 using a control signal CTRL2. A switch 5110 is coupled to the T2 and LN/LD contact elements. A line detection circuit 5112 is couple between the T2 contact element and the control circuit. A second line detection circuit 5114 is coupled between the T1/LD contact element and the control circuit. An external input 5116, such as a wireless control signal, is coupled to the control circuit. It should be noted that an external input could be any type of non-manual input (e.g., a control signal from a phone using Wi-Fi or a signal received by a motion sensor).

When the light is off, $I_1=0$. The line side wirelessly controlled switching control module may be drawing 12, but that is independent of $I_1$. The switch may be rated to be used with a minimum power, such as 5 Watts of power, where the line detection circuit 5114 will need to detect a change in the $I_1$ current of about 35 mA or greater for example. When used on the line side, the control circuit 5108 will detect a change in current $I_1$ from 0 A to 35 mA or greater but will not detect a change in voltage in response to a change in the switch on the load side (i.e., 120 V will be on either Traveler 1 or Traveler 2 regardless of a change in the switch 620 on the load side). If the light is off, and $I_1=0$, neither line detection circuit 5112 or 5114 will detect a current. If the load side switch is switched, $I_1$ current will be drawn on Traveler 2, and will be detected by the line detection circuit 5112 connected to Traveler 2 at the T2 contact element.

Figure 52:
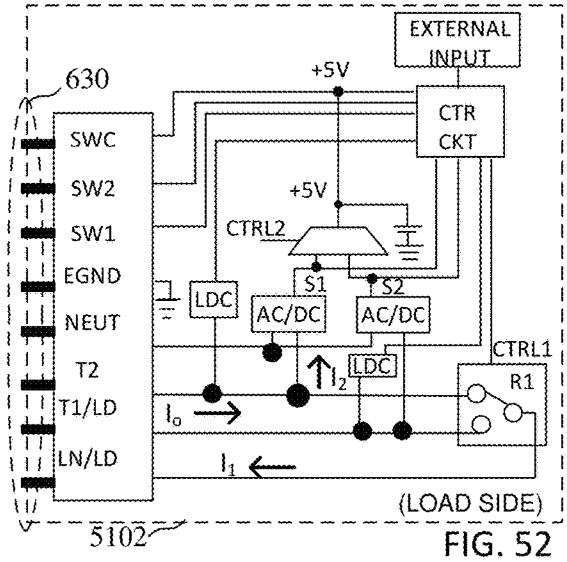
FIG. 52 is a block diagram showing an operation of the control module of FIG. 51 on a load side of a 3-way switch.

Turning now to FIG. 52, a block diagram showing an operation of the control module of FIG. 51 on a load side of a 3-way switch is shown. On the load side, $I_0$ is not independent of $I_2$. Changes in $I_0$ detected by the LDC circuits will depend upon changes in both $I_1$ and $I_2$. It may be necessary to detect whether a change in $I_0$ is caused by a change in $I_1$ or $I_2$. However, on the load side, the control circuit will detect a change in the voltage on Traveler 1 or Traveler 2, which will indicate a switching of the 120 V between Traveler 1 or Traveler 2 in response to a toggling of the switch in the line side power adapter. Therefore, if a switching control module detects a switching of the voltage (between 0 and 120 V) on Traveler 1 or Traveler 2 that it did not cause (i.e., by the control circuit on the load side switching relay R1), it will know that there is a switching of the switch 620 on the line side power adapter. If the switching control module does not detect a change in the voltage (between 0 and 120 V) on Traveler 1 or Traveler 2, but detects a current change, it will also know that there is a switching of the opposite side power adapter (i.e., the switching control module is on the line side and the manual switching is on the load side as previously described).

Figure 53:
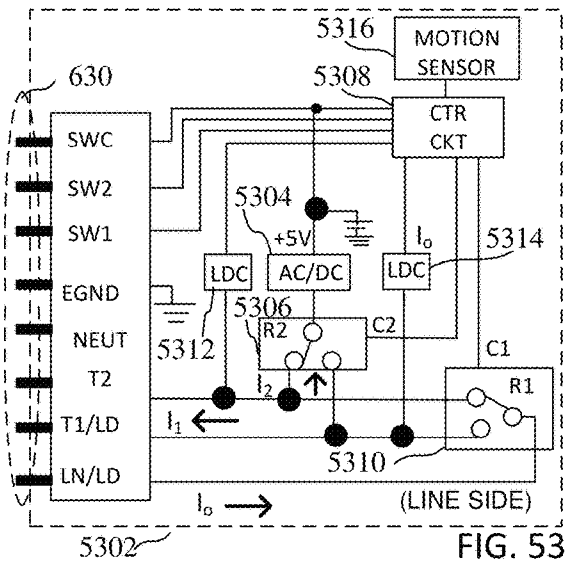
FIG. 53 is a block diagram of the control module of FIG. 51, but having a single power supply.

Turning now to FIG. 53, a block diagram of the control module 5302, which is similar to the control module of FIG. 51 but having a single power supply, is shown. That is, the control module 5302 comprises an AC/DC circuit 5304 coupled to an output of a switch 5306, which may comprise a relay for example. A control circuit 5308 is coupled to control a switch 5310 coupled to receive the line voltage at LN/LD contact element and route a current $I_0$ through the switch 5310 to the T1/LD contact element or the T2 contact element as shown.

A pair of line detection circuits are coupled to the control circuit to enable the control circuit to control the state of the switch 5306 and the state of the switch 5310. More particularly, the line detection circuit 5312 is coupled to detect the current $I_2$ routed to the T2 contact element. The line detection circuit 5314 is coupled to detect the current $I_1$ to the T1/LD contact element. The control circuit will control the states of the switch 5306 to provide the line voltage to the AC/DC circuit 5304 and allow the AC/DC circuit to generate a DC signal used by the control module. That is, if current is detected being routed to the contact element T2, the control circuit will control the switch 5306 so that the line power is provided to the AC/DC circuit as shown. If current is detected being coupled to the T1/LD contact element, the control circuit will change the switch 5306 to the other state to route the line voltage to the AC/DC circuit 5304. Similarly, the control circuit will control the state of the switch 5310 to route the line voltage to the desired T2 contact element or T1/LD contact element, depending upon the desired state of applying power to the load. A motion sensor 5316 may also provide a control signal to the control circuit to control the state of the power applied to the load.

Figure 54:
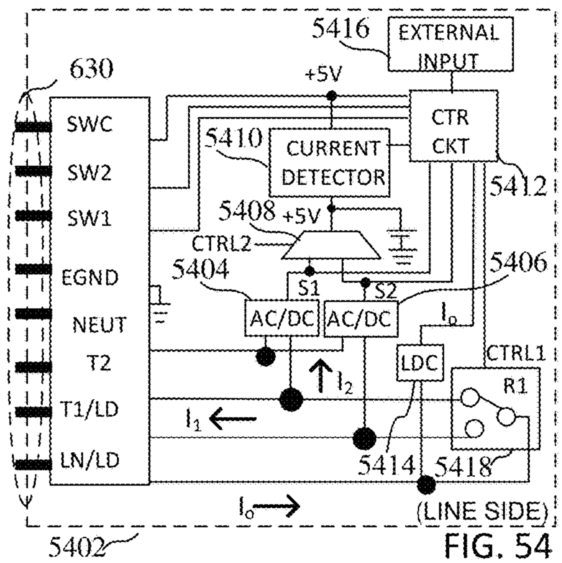
FIG. 54 is another block diagram showing an operation of a control module for controlling switching on a line side of a 3-way switch.

Turning now to FIG. 54, another block diagram shows an operation of a control module 5402 for controlling switching on a line side of a 3-way switch. A control circuit 5412 selects an output of one of the AC/DC circuits 5404 and 5406 based upon the S1 and S2 signals. Only one of Traveler 1 or Traveler 2 will have 120 V and generate a DC output. A capacitor circuit could be used to maintain +5V at the output of the multiplexer (MUX) 5408 during switching. A current detector 5410 could be used at the output of the MUX to determine if the change in $I_0$ is caused by $I_2$. The current at the output of the MUX could be used to estimate the $I_2$ current drawn by one of the AC/DC circuits based upon the efficiency of the AC/DC circuits. The control circuit could be used to detect a change in current $I_2$ and compared to a change in the current $I_0$ detected by a line detection circuit (LDC). It may be necessary to rate the switch for use with a minimum watt bulb (e.g., 5 W bulb that would draw 37.5 mA) to determine the resolution of the current detection by the current detector 5410 and the LDC 5414. The LDC may need to take a variation of 120V line voltage (e.g., 10%) or a significant drop (e.g., a power glitch) in 120V into account. However, because the currents being detected will all be based upon the same input voltage, it may not be necessary to compensate for a variation in the line voltage. An external input may be provided by a circuit 5416, such as a motion sensor. The control circuit 5412 may control the state of a switch 5418 for applying power to the load based upon an externa input, or the detection of a switching by the switch 620 on either power adapter.

Figure 55:
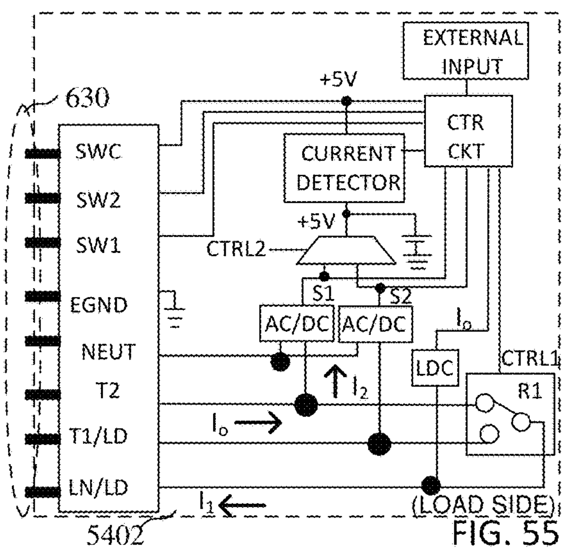
FIG. 55 is another block diagram showing an operation of the control module of FIG. 54 on a load side of a 3-way switch.

Turning now to FIG. 55, another block diagram showing an operation of the control module 5402 of FIG. 54 on a load side of a 3-way switching arrangement is shown. The same principle is applied on the load side as FIG. 54, where it is possible to detect a change in the voltage on Traveler 1 or Traveler 2 that will indicate a manual switching on the line side. That is, the current at the output of the MUX could be used to estimate the $I_2$ current drawn by on one of the AC/DC circuits based upon the efficiency of the AC/DC circuit. The control circuit could be used to detect a change in current $I_2$ and compare that to a change in the current $I_0$ detected by the LDC.

Figure 56:
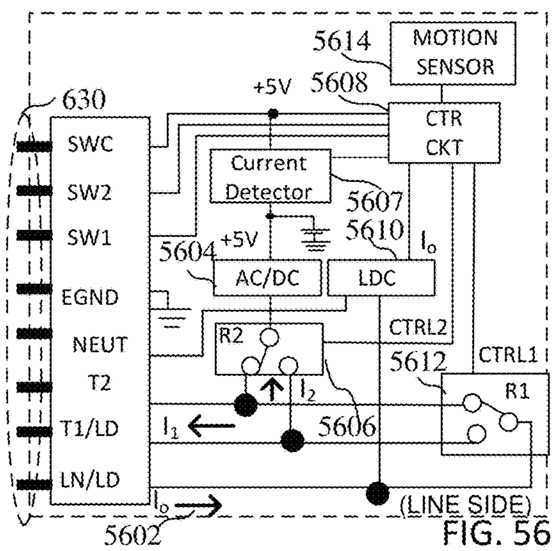
FIG. 56 is another block diagram of the control module of FIG. 54, but having a single power supply and a single line detection circuit.

Turning now to FIG. 56, another block diagram of the control module 5602, which is similar to the control module of FIG. 54 but having a single power supply and a single line detection circuit, is shown. More particularly, the control module 5602 comprises an AC/DC circuit 5604 coupled to a switch 5606. The switch 5606 is coupled to T1/LD and T2 contact elements. A current detector 5607 is coupled to the AC/DC circuit, where an output of the current detector is coupled to a control circuit 5608. A line detection circuit 5610 is also coupled to the LN/LD contact element to detect a line current, where an output of the line detection circuit 5610 is coupled to the control circuit 5608. The control circuit will control the state of the switch 5606 to provide power to the current detector and generate a 5 Volt signal. The control circuit will also control the state of a switch 5612 based upon a desired state of the power provided to the load. A motion sensor 5614 may be coupled to the control circuit to enable control of the switching of power to the load.

In operation, when the current detector detects the 5 Volt output of the AC/DC circuit 5604, the current detector will send a signal to the control circuit, which will switch the state of the switch 5606 to ensure that the AC/DC circuit receives the line voltage. The line detection circuit 5610 will detect whether the amount of current has changed in the line current $I_0$, indicating that there has been a switching on the load side of the 3-way switching arrangement.

Figure 57:
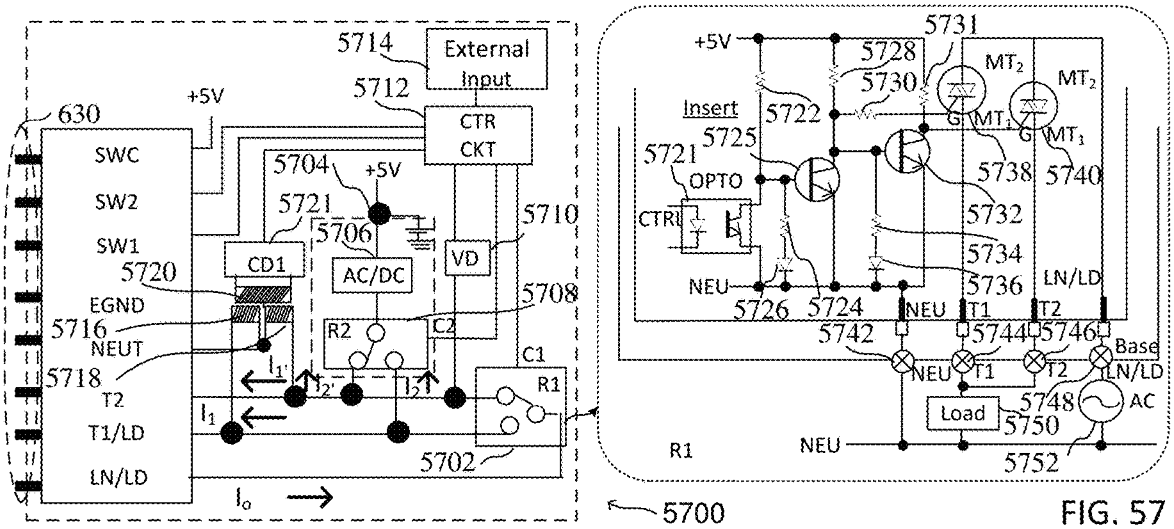
FIG. 57 is a block diagram of a switching circuit for implementing a switching operation in the control modules of FIGS. 53 and 56.

FIG. 57 is a block diagram of a control module 5700 having a switching circuit for implementing a switching operation in the control modules of FIGS. 53 and 56. According to the implementation of FIG. 57, a single current detector may be used to detect current $I_1$ or It, both of which are independent of the current $I_2$ drawn by the AC/DC circuits, and therefore, are only dependent on current being drawn by the load when the control module 5700 is used on the line side. More particularly, the circuit comprises a switch 5702 couple to receive the line voltage at a LN/LD contact element and route the line voltage to one of the T1/LD or T2 contact elements. A DC generator circuit 5704 comprises an AC/DC circuit 5706 coupled to receive an AC signal from a switch 5708 adapted to receive a line voltage from the contact element T1/LD or the T2 contact element as shown. A voltage detector (VD) 5710 is coupled to the T2 contact element and adapted to generate a voltage detection signal to a control circuit 5712, which may also receive a signal from an external input 5714, which may comprise a motion sensor or some other input for example. A plurality of coils is also implemented to provide a signal to a current detector. More particularly, a first coil 5716 coupled between the T1/LD contact element and neutral and a second coil 5718 decoupled between the T2 contact element and neutral are adapted to generate a signal in a coil 5720 that is detected by a current detector 5721. That is, the main coil 5720 can be used to sense the current on either coil 5718 or coil 5716, where the current detector may provide a signal to the control circuit 5712. The voltage detector 5710 is used to detect a switching of the switch on the line side (i.e., based upon a switching of the line voltage on the Traveler 1 or Traveler 2) when the control module 5700 is used on the load side.

An example of a switch 5702 is shown in the dashed line portion on the left-hand portion of FIG. 57 and designated as R1 is now described. The switch 5702 may comprise a current detector 5721 implemented as an optocoupler coupled between a resistor 5722 and the neutral node, which is coupled to a neutral contact element 5742. A resistor 5724 is also coupled to the resistor 5722 and the base of a transistor 5725. A diode 5726 is coupled between the resistor 5724 and the neutral node. A resistor network comprising a resistor 5728 and a resistor 5730 are coupled to the collector of the transistor 5725. A resistor 5731 is coupled to the resistor 5728 and the collector of the transistor 5732. The collector is also coupled to the base of a transistor 5732, and a resistor 5734 coupled in series with a diode 5736, which is coupled to the neutral node as shown.

A pair of TRIACs are also implemented to route current to the T1 and T2 contact elements. More particularly, a first TRIAC 5738 is coupled between the LN/LD contact element 5748 and the T1 contact element 5744. A second TRIAC 5740 is coupled between the LN/LD contact element 5748 and the T2 contact element 5746. A current generator 5752 is coupled to the LN/LD contact element 5748, and a load 5750 is coupled to contact elements 5744 and 5746 associated with the travelers.

Figure 58:
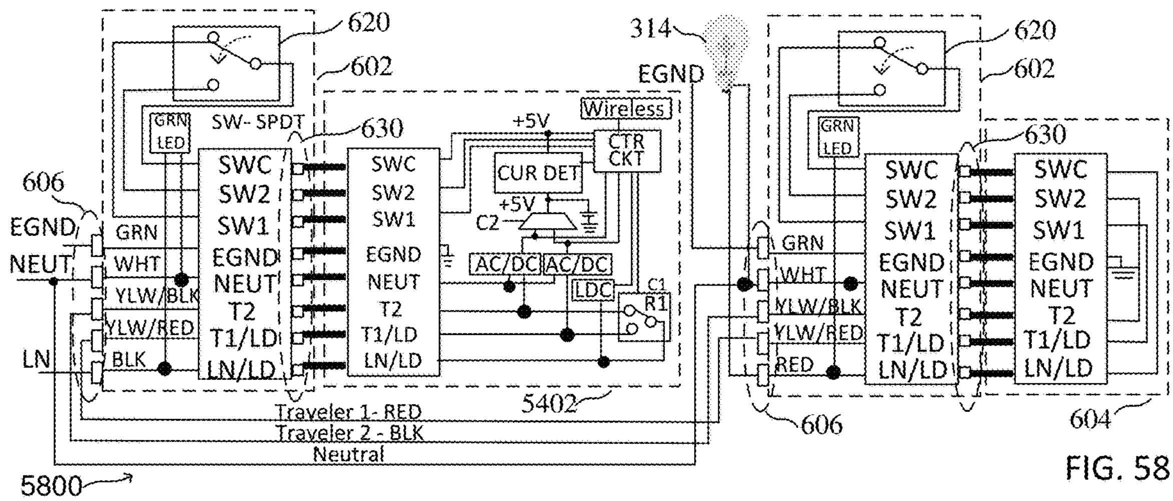
FIG. 58 is a block diagram of a first power adapter arrangement with a control module having a wirelessly controlled switch and a second power adapter arrangement with a standard control module wired in a 3-way switching configuration.

Additional examples of power adapters having control modules that implement line detection circuits are described in reference to FIGS. 58 through 70. Turning first to FIG. 58, a block diagram of a system 5800 having a first power adapter arrangement with the control module 5402 having a wirelessly controlled switch and a second power adapter arrangement with a control module 604 wired in a 3-way switching configuration is shown. Because the 120 V AC signal will always be present on the LN/LD contact element, the line detection circuit will always detect the 120 V signal and the control circuit will detect that the control module 5402 is on the line side of the 3-way switching arrangement. The power adapter will detect a switching of the switch 620 on the load side as described above in reference to FIG. 54.

Figure 59:
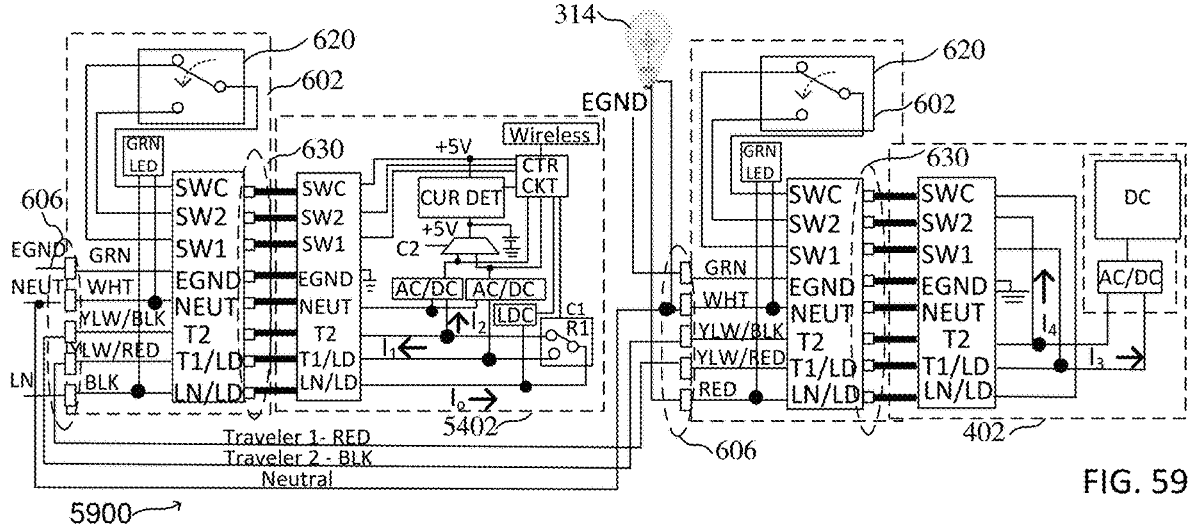
FIG. 59 is a block diagram of a first power adapter arrangement with a control module having a wirelessly controlled switch and a second power adapter arrangement with a control module having a DC circuit wired in a 3-way switching configuration.

Turning now to FIG. 59, a block diagram of a first power adapter arrangement with the control module 5402 having a wirelessly controlled switch and a second power adapter arrangement with the control module 402 having a DC circuit wired in a 3-way switching configuration 5900 is shown. As shown in FIG. 59, current $I_3$ in the control module 402 on the load side is drawn by the DC circuit of the control module in addition to current $I_4$ being drawn by the load. However, there are many implementations of the DC circuit that would enable the current $I_3$ to remain constant or be distinguished from the current $I_4$ drawn by the load. For example, a fixed current source could be implemented to maintain a constant current $I_3$, enabling a change in the current $I_4$, and therefore a change in current $I_0$ can be detected. Therefore, the operation of the power adapter arrangement of FIG. 59 will be similar to the operation of the power adapter arrangement of FIG. 58.

Figure 60:
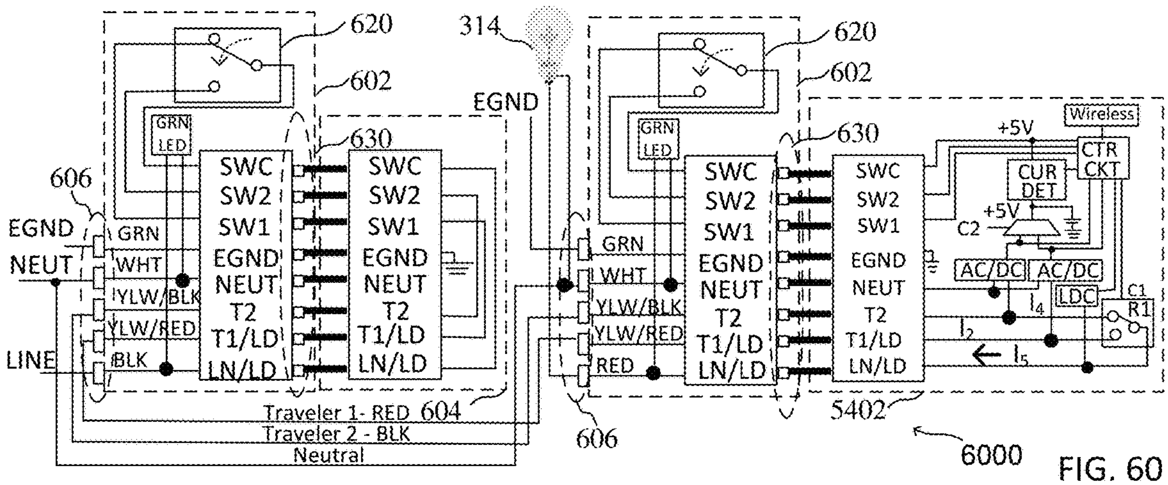
FIG. 60 is a block diagram of a first power adapter arrangement with a standard control module and a second power adapter arrangement with a control module having a wirelessly controlled switch wired in a 3-way switching configuration.

Turning now to FIG. 60, a block diagram of a first power adapter arrangement with a standard control module and a second power adapter arrangement with a control module having a wirelessly controlled switch wired in a 3-way switching configuration 6000 is shown. The switching and detection of current according to the arrangement of FIG. 60 is similar to the signaling and detection of current when the control module is on the line side, as described above in reference to FIG. 55. According to some implementations, when a wirelessly controlled switch is inserted, the control module will toggle the switch to determine if it is on the line side or the load side. If it is on the line side, a 120 V AC signal will be detected on the LN/LD contact element in either state of the switch 620. If the control module is on the load side, the signal on the LN/LD contact element may have 120V based upon a toggling of the switch of the control module on the load side. Determining of a location of a control module may be beneficial for pairing (e.g., establishing a master control module as described above).

Figure 61:
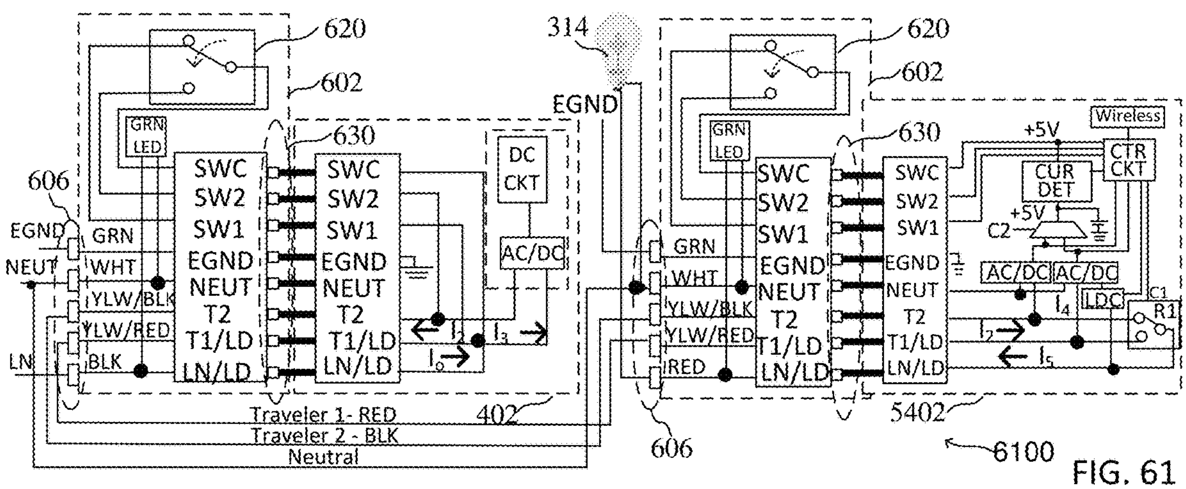
FIG. 61 is a block diagram of a first power adapter arrangement with a standard control module having a DC circuit and a second power adapter arrangement with a control module having a wirelessly controlled switch wired in a 3-way switching configuration.

Turning now to FIG. 61, a block diagram of a first power adapter arrangement with a standard control module having a DC circuit and a second power adapter arrangement with a control module having a wirelessly controlled switch wired in a 3-way switching configuration 6100 is shown. According to the implementation of FIG. 61, the line detection circuit will detect a change in the current $I_5$ which may depend on the current $I_4$ drawn by the other circuits of the control module 5402.

Figure 62:
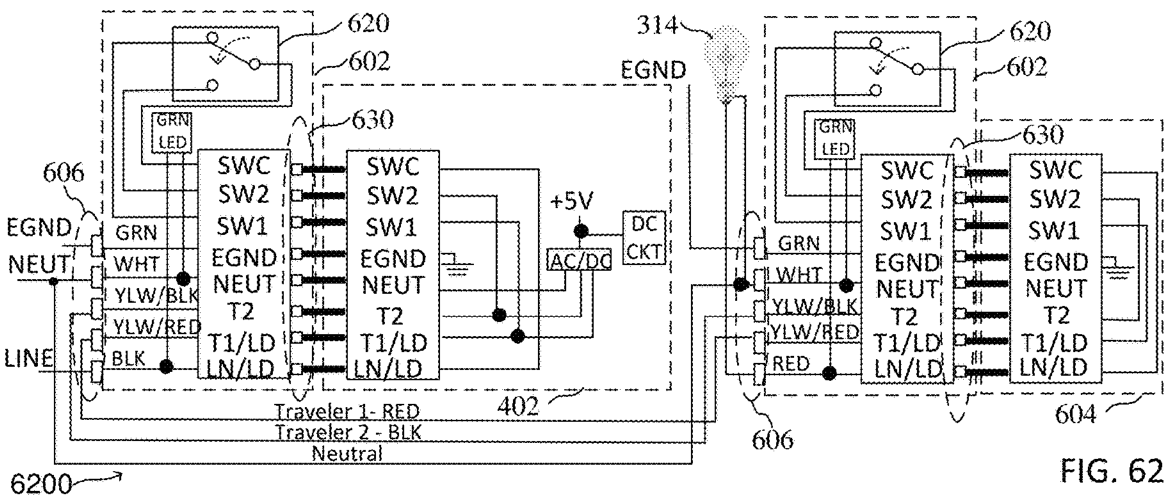
FIG. 62 is a block diagram of a first power adapter arrangement with a standard control module having a DC circuit and a second power adapter arrangement with a standard control module wired in a 3-way switching configuration.

Turning now to FIG. 62, a block diagram of a first power adapter arrangement with a standard control module having a DC circuit and a second power adapter arrangement with a standard control module wired in a 3-way switching configuration 6200 is shown. It should be noted that any non-switching circuit of a control module will not affect the switching operation of a 3-way circuit arrangement. The control module 402 will draw current by way of the T1/LD contact element or the T2 contact element but will not affect the power adapter 602 on the line side from providing the line voltage on either the Traveler 1 or Traveler 2 to enable routing power to the load 314, where the switching of power to the load will operate as described in reference to FIG. 18 (i.e., where the switching is based upon switching of the switches 620).

Figure 63:
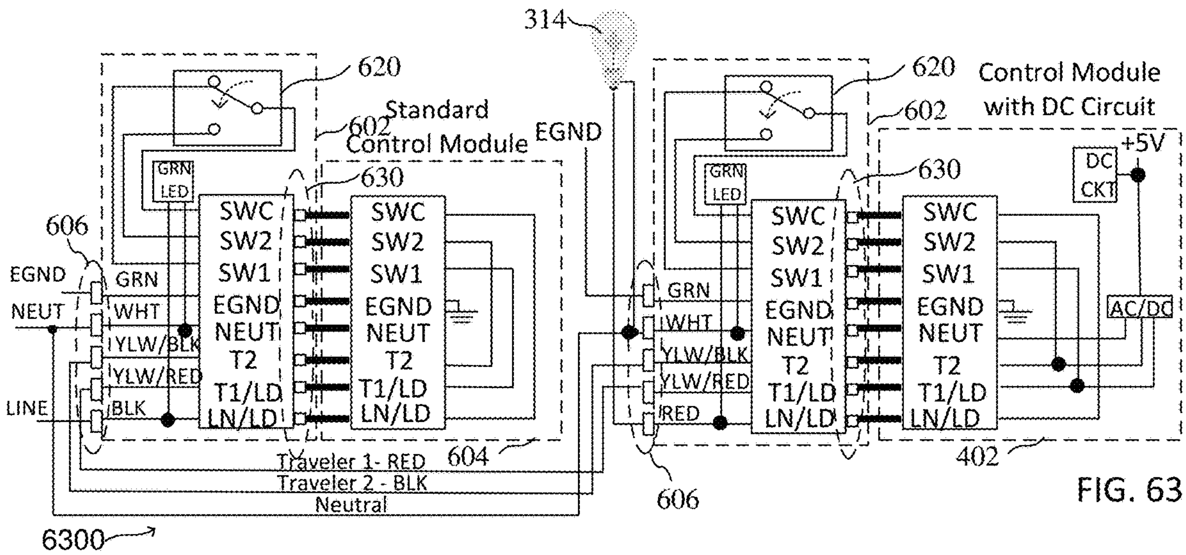
FIG. 63 is a block diagram of a first power adapter arrangement with a standard control module and a second power adapter arrangement with a standard control module having a DC circuit wired in a 3-way switching configuration.

Turning now to FIG. 63, a block diagram of a first power adapter arrangement with a standard control module and a second power adapter arrangement with a standard control module having a DC circuit wired in a 3-way switching configuration 6300 is shown. It should also be noted that any non-switching circuit of a control module 402 on the load side will not affect the operation of a 3-way circuit. The control module 402 will draw current by way of the T1/LD contact element or the T2 contact element but will not affect providing the line voltage on either the Traveler 1 or Traveler 2 to enable routing power to the load 314, where the switching of power to the load will also operate as described in reference to FIG. 18. The AC/DC circuit of the power adapter 402 will both determine whether the line voltage is on the T1/LD or T2 contact element and generate a DC signal based upon that.

Figure 64:
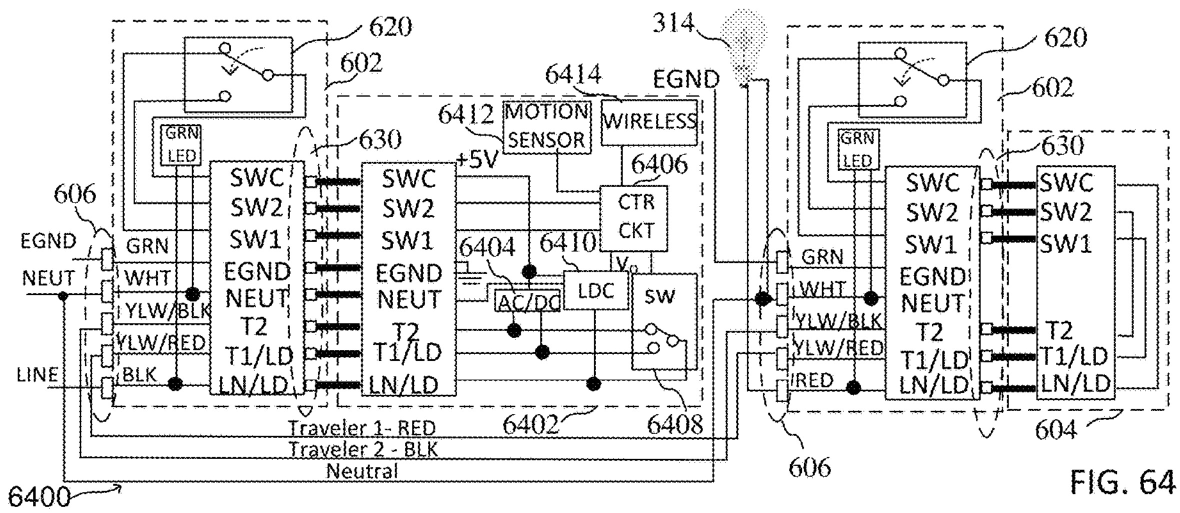
FIG. 64 is a block diagram of a first power adapter arrangement with a control module having a wirelessly controlled switch and a second power adapter arrangement with a standard control module wired in a 3-way switching configuration.

It is possible to change the state of power to the load based upon a wireless signal, as described by way of example in some of the FIGS. 64-78. Turning first to FIG. 64, a block diagram of a first power adapter arrangement with a control module having a wirelessly controlled switch and a second power adapter arrangement with a standard control module wired in a 3-way switching configuration 6400 is shown. A control module 6402 comprises in AC/DC circuit 6404 having inputs coupled to the T1/LD contact element and T2 contact element. Because there will always be power on one of the T1/LD and T2 contact elements, the AC/DC circuit 6404 will receive power and generate a DC signal, shown here by way of example as a 5 Volt DC signal. The DC signal is coupled to the SWC switch contact which is routed through the switch 620 to either the SW1 contact element or SW2 contact element. A change in the voltage on the SW1 contact element or the SW2 contact element indicates a manual switching of the switch 620, which is detected by the control circuit 6406. The control circuit will then control the switch 6408, which may be a relay, a solid-state switch or some other switching device, to change the state of the power applied to the load 314. A line detection circuit 6410 is coupled to the LN/LD contact element to enable the control circuit 6406 to determine whether the control module 6402 is on the line side or the load side of the 3-way switching arrangement. The control circuit is also coupled to a motion sensor 6412 and a wireless communication circuit 6414. Accordingly, the control module 6402 can detect a desire to change the state of power applied to the load in 4 ways, including an actuation of the switch 620, a detection by the motion sensor 6412, a signal received by the wireless communication circuit 6414, or a detection of a switching of the switch 620 of the power adapter on the load side. The operation of the control module 6402 on the load side of the 3-way switching arrangement will be described in more detail in reference to FIG. 65.

Figure 65:
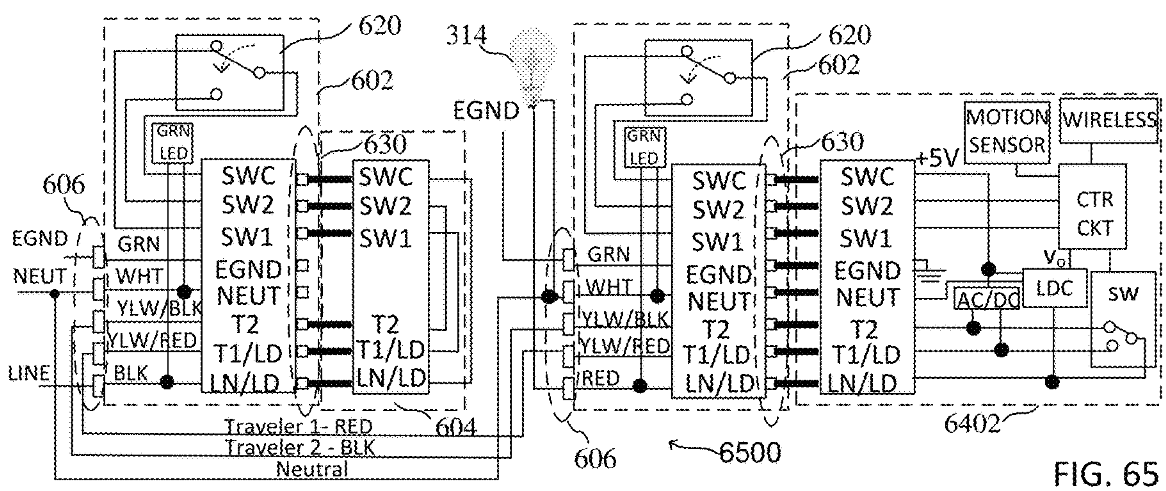
FIG. 65 is a block diagram of a first power adapter arrangement with a standard control module and a second power adapter arrangement with a control module having a wirelessly controlled switch wired in a 3-way switching configuration.

Turning now to FIG. 65, a block diagram of a first power adapter arrangement with a standard control module and a second power adapter arrangement with a control module having a wirelessly controlled switch wired in a 3-way switching configuration 6500 is shown. When the control module 6402 is placed on the load side, the line detection circuit will detect a toggling of the voltage on the LN/LD contact element, where the LN/LD contact element is coupled to the load. The line detection circuit 6410 will also detect a change in the power applied to the T1/LD contact and the T2 contact element that may be a result of the switching of the switch 620 on the line side power adapter 602. That is, the line detection circuit may detect a glitch at the output of the AC/DC circuit for example and therefore detect a desire to change a state of the power to the load. Alternatively, the line detection circuit will detect a change in a switching of the switch 620 on the line side by detecting a state of the voltage on the LN/LD contact element. That is, when the line voltage is switched from the T1/LD contact element to the T2 contact element, the line voltage will now be detected on the LN/LD contact element based upon the state of the switch 6408. The line detection circuit will generate an output signal Vo to the control circuit, which will change the state of the load by changing the state of the switch 6408. The control circuit will also change the state of the switch 6408 in response to a change in the state of the switch 620 of the power adapter 602 on the load side, as well as a detection by the motion sensor 6412 or a signal received by the wireless communication circuit 6414.

Figure 66:
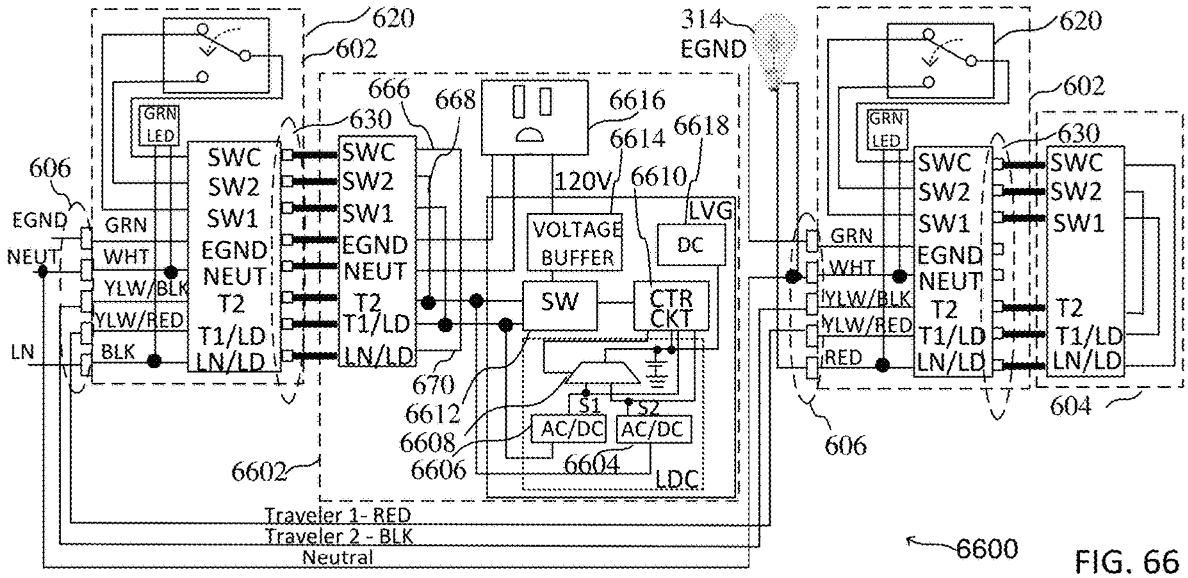
FIG. 66 is a block diagram of a first power adapter arrangement with a control module having a wirelessly controlled outlet and a second power adapter arrangement with a standard control module wired in a 3-way switching configuration.

Turning now to FIG. 66, a block diagram of a first power adapter arrangement with a control module having a wirelessly controlled outlet and a second power adapter arrangement with a standard control module wired in a 3-way switching configuration 6600 is shown. According to the implementation of FIG. 66, a control module 6602 comprises a circuit for switching the power to an outlet. More particularly, an AC/DC circuit 6604 is coupled to the T2 contact element, and a second AC/DC circuit 6606 is coupled to the T1/LD contact element. A signal S1 at the output of the AC/DC circuit 6606 is coupled to a first terminal of a multiplexer 6608 and a signal S2 at the output of the AC/DC circuit 6604 is coupled to a second terminal of the multiplexer 6608. The outputs S1 and S2, which may comprise DC voltages, are also routed to a control circuit 6610 to enable the control circuit to select the signal S1 or S2 that is receiving power and therefore providing a DC voltage signal to the control circuit. The control circuit is coupled to a switch 6612 to route the line power received at one of the two inputs of the switch coupled to the T2 contact element and the T1/LD contact element. The output of the switch is coupled to a voltage buffer 6614 to provide the 120 V line voltage to the outlet 6616. The voltage buffer is provided to prevent any glitches that may result from switching to the switch. A DC circuit 6618, shown here by way of example as a USB circuit, could be coupled to the output of the multiplexer 6608, which is a DC signal.

Switching examples are the same for the wirelessly controlled switch on the line side. When a wirelessly controlled outlet module is inserted, the control module may toggle the switch to determine if it is on the line side or the load side. If it is on the line side, 120 V will always be on the LN/LD contact element. If it is on the load side, the voltage on the LN/LD contact element will toggle between 0V and 120V. Determining which side the control module is on may be beneficial if two wirelessly controlled control modules are used, and particularly for auto pairing.

Figure 67:
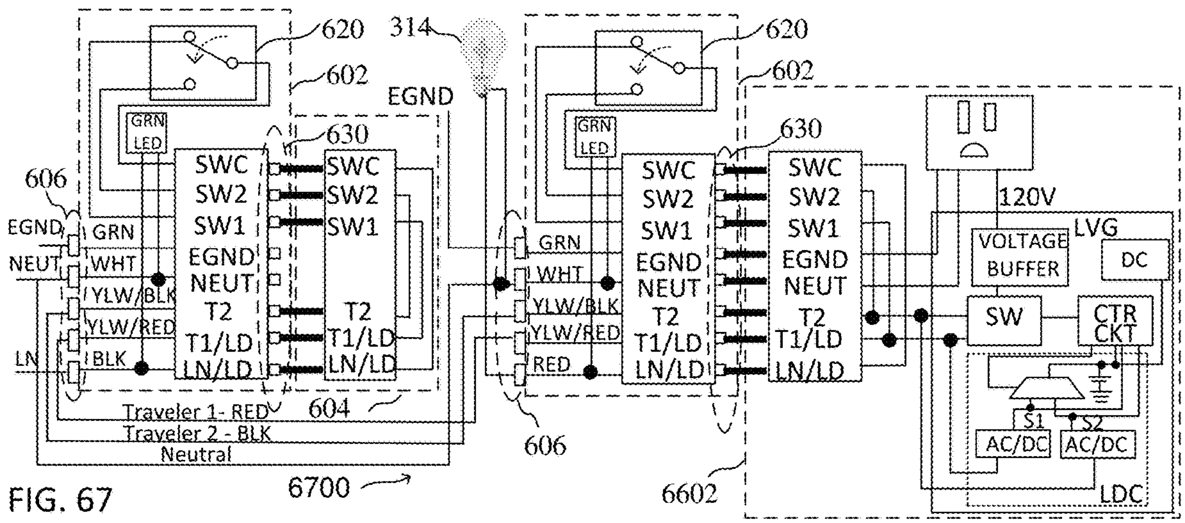
FIG. 67 is a block diagram of a first power adapter arrangement with a standard control module and a second power adapter arrangement with a control module having a wirelessly controlled outlet wired in a 3-way switching configuration.

Turning now to FIG. 67, a block diagram of a first power adapter arrangement with a standard control module and a second power adapter arrangement with a control module having a wirelessly controlled outlet wired in a 3-way switching configuration 6700 is shown. As can be seen in FIG. 67, the control module 6602 having a controlled outlet will also be coupled to the T2 and T1/LD contact elements. As can be seen in FIGS. 66 and 67, the two inputs of the switch 6612 are coupled to the T2 and T1/LD contact elements and enable the control module 6602 to be used on either the line side power adapter or the load-side power adapter.

Figure 68:
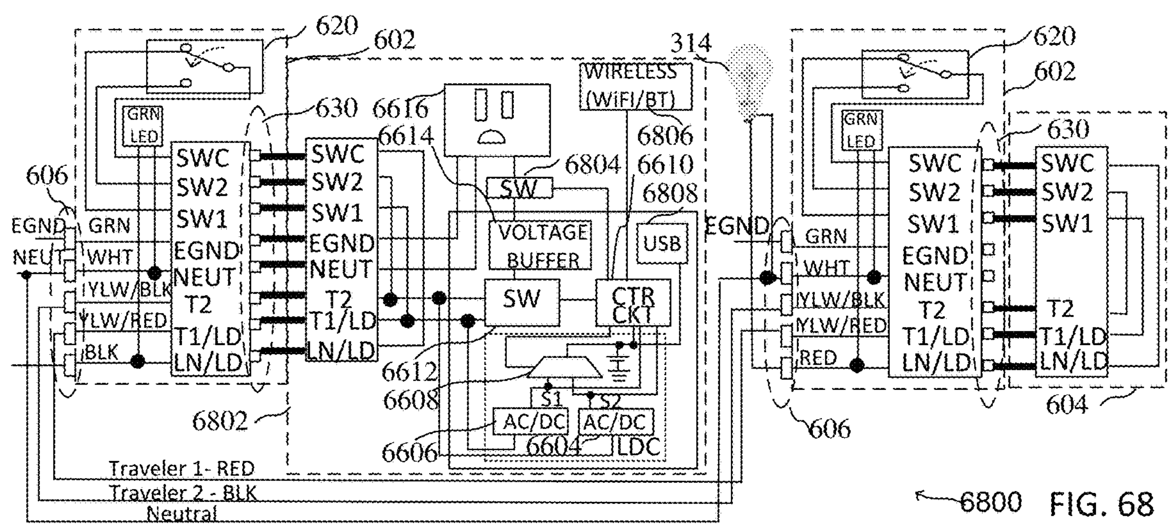
FIG. 68 is a block diagram of a first power adapter arrangement with a control module having a wirelessly controlled outlet and USB and a second power adapter arrangement with a standard control module wired in a 3-way switching configuration.

Turning now to FIG. 68, a block diagram of a first power adapter arrangement with a control module having a wirelessly controlled outlet and USB and a second power adapter arrangement with a standard control module wired in a 3-way switching configuration 6800 is shown. The control module 6802 comprises a switch 6804 coupled between the voltage buffer 6614 and the outlet 6616. The switch 6804 may comprise a relay or some other solid-state switch that is controllable to pass the line voltage to the outlet. The control module 6802 may also comprise a wireless communication circuit 6806 that is adapted to receive control signals that may control the operation of the switch 6804 by way of the control circuit 6610. The DC circuit of FIG. 66 may be implemented as a USB circuit 6808 as shown.

Figure 69:
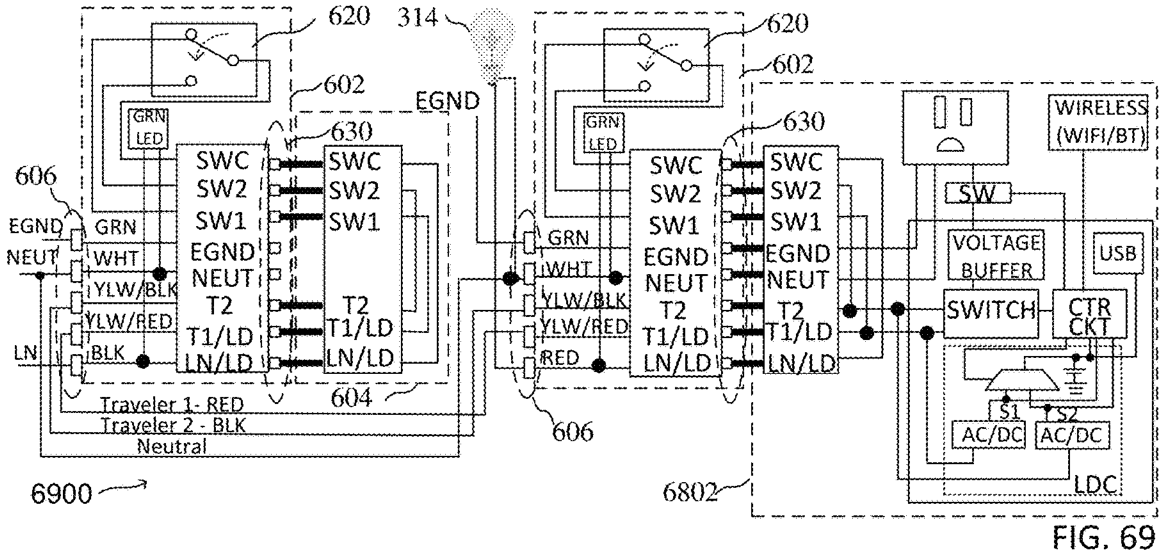
FIG. 69 is a block diagram of a first power adapter arrangement with a standard control module and a second power adapter arrangement with a control module having a wirelessly controlled outlet and USB wired in a 3-way switching configuration.

Turning now to FIG. 69, a block diagram of a first power adapter arrangement with a standard control module and a second power adapter arrangement with a control module having a wirelessly controlled outlet and USB wired in a 3-way switching configuration 6900 is shown. As can be seen in FIG. 69, the control module 6802 having a controlled outlet will also be coupled to the T2 and T1/LD contact elements. As can be seen in FIGS. 68 and 69, the two inputs of the switch 6612 coupled to the T2 and T1/LD contact elements enable the control module 6802 to be used on either the line side power adapter or the load-side power adapter.

Figure 70:
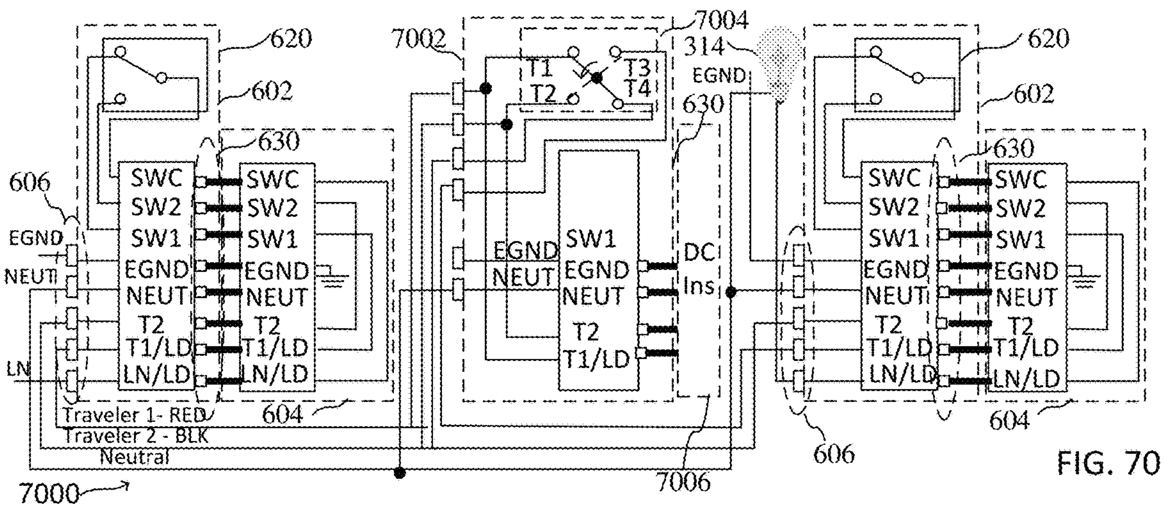
FIG. 70 is a block diagram of power adapter arrangements wired in a 4-way circuit.

Turning now to FIG. 70, a block diagram of power adapter arrangements wired in a 4-way circuit 7000 is shown. The power adapter arrangement of FIG. 70 comprises 3 power adapters. In addition to power adapters 602 having a control module 604 on both the line side and the load side, a power adapter 7002 comprises a double pole double throw (DPDT) switch 7004 and a module 7006. While it is not necessary to couple a module to the power adapter 7002, a module 7006 may comprise any module adapted to receive a DC signal, such as a night light or module having USB connectors. As can be seen, the operation of the power adapter arrangement of FIG. 70 is similar to a 4-way switching arrangement that is commonly used.

Figure 71:
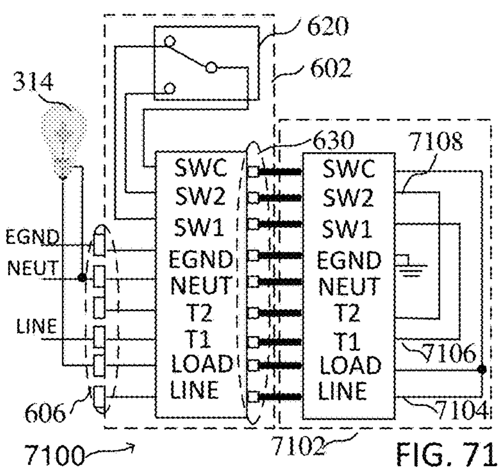
FIG. 71 is a block diagram of a power adapter arrangement having separate line and load contact elements and a standard control module.

Turning now to FIG. 71, a block diagram of a power adapter arrangement 7100 having separate line and load contact elements and a standard control module is shown. The power adapter 602 comprises an electrical interface having nine contact elements as shown. The control module 7102 comprises a first conductor element 7104 between the line contact element and the SWC contact element, a second conductor element 7106 between the T1 contact element and the SW1 contact element, and a third conductor element 7108 between the T2 contact element and the SW2 contact element. The line contact element and load contact element are coupled together as shown. Because the line voltage is provided to the T1 contact element the switch 620 operates as a single pole switch to provide the line power to the load.

Figure 72:
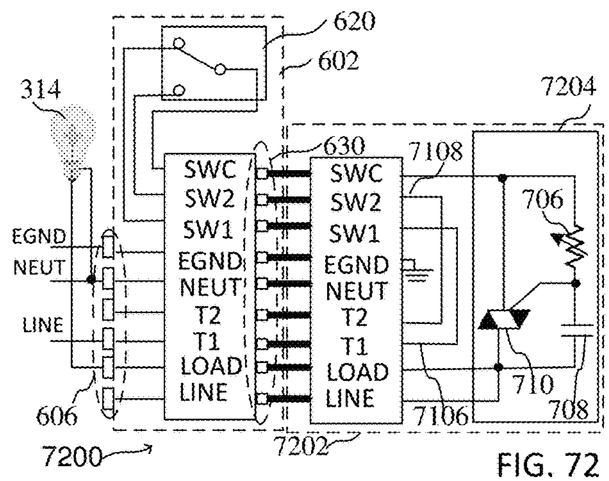
FIG. 72 is a block diagram of a power adapter arrangement having separate line and load contact elements and a control module having standard dimmer circuit.

Turning now to FIG. 72, a block diagram of a power adapter arrangement 7200 having separate line and load contact elements and a control module 7202 having a standard dimmer circuit is shown. According to the implementation of FIG. 72, the control module 7202 comprises a dimmer circuit 7204. While any type of dimmer circuit that does not require the generation of a DC signal to power elements of the circuit could be used, one example of a dimmer circuit is shown and corresponds to the dimmer circuit of FIG. 7.

Figure 73:
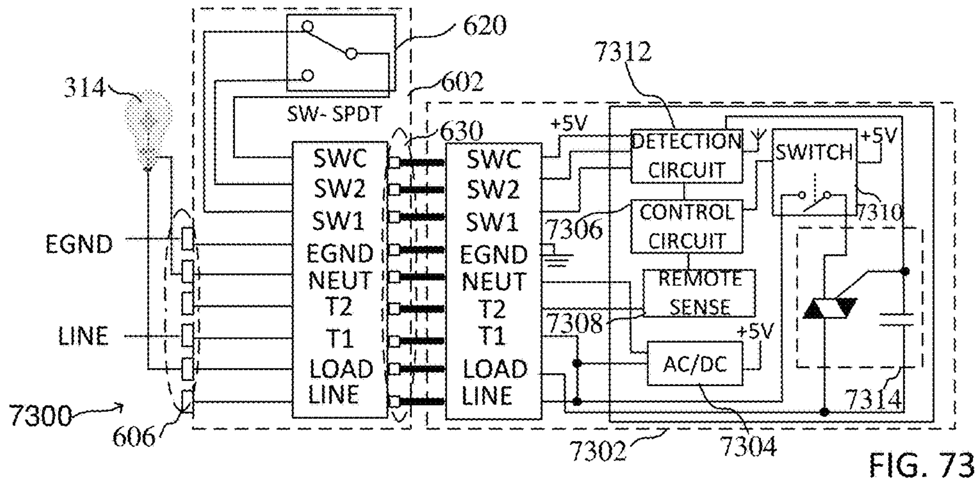
FIG. 73 is a block diagram of a power adapter arrangement having separate line and load contact elements and a control module with a wirelessly controlled dimmer.

Turning now to FIG. 73, a block diagram of a power adapter arrangement 7300 having separate line and load contact elements and a control module with a wirelessly controlled dimmer is shown. According to the implementation of FIG. 73, the control module 7302 comprises an AC/DC circuit 7304 that generates a DC signal, shown by way of example as a 5 Volt signal it control circuit 7306 is coupled to both a remote sense circuit 7308 and a switch 7310. The control circuit is also coupled to a detection circuit 7312 that provides the DC signal to the contact element, which is routed through terminal 622 to one of the SW1 or SW2 contact elements. The detection circuit will detect a switching of the switch 620 and provide a detection signal to the control circuit. The remote sense circuit 7308 will also sense a switching of the switch 620 from a power adapter on the other side of a 3-way switching arrangement when the control module 7302 is used in a 3-way switching arrangement. The switch 7310 is controlled by the control circuit to route power back to the load contact element, where a dimmer circuit 7314 may be implemented in between the switch 7310 and the load contact element, or in place of the switch 7310.

Figure 74:
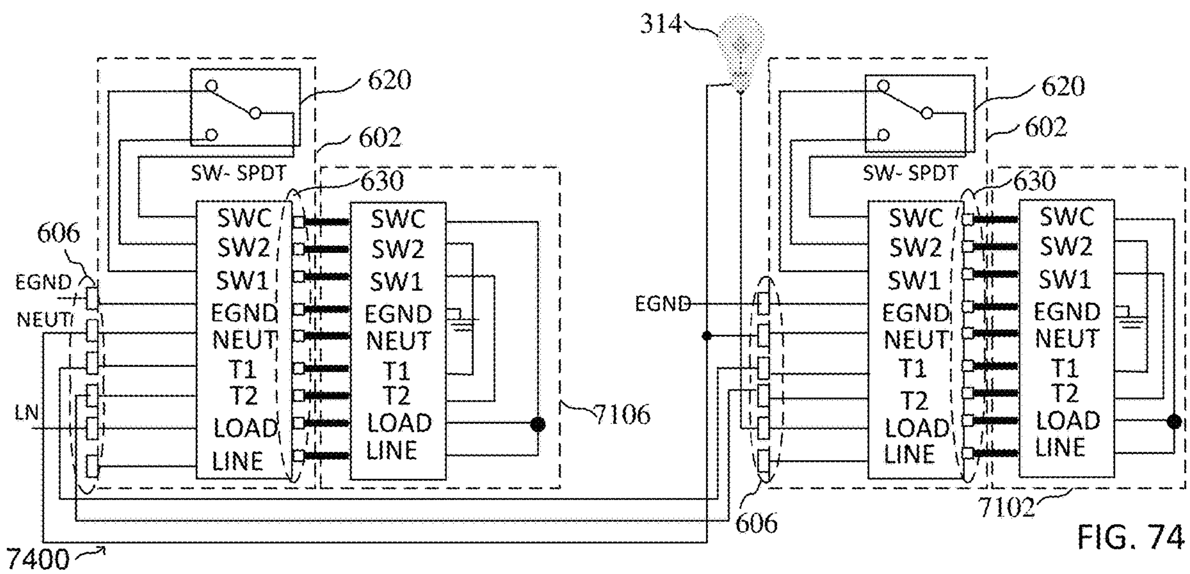
FIG. 74 is a block diagram of a first power adapter arrangement with a standard control module and a second power adapter arrangement with a standard control module in a 3-way switching configuration.

Turning now to FIG. 74, a block diagram of a system 7400 having a first power adapter arrangement with a standard control module and a second power adapter arrangement with a standard control module in a 3-way switching configuration is shown. The power adapter arrangement comprises a control module 7102 attached to both power adapters on the line side and the load side as shown. The line power is routed to the load contact element on the power adapter on the line side and is then provided to either the T1 or T2 contact element. The line power is received by the T1 or T2 contact elements of the power adapter on the load side and is routed to the SW1 or SW2 contact element. As can be seen, the 3-way switching arrangement will operate as a conventional 3-way switching arrangement to switch power to the load.

Figure 75:
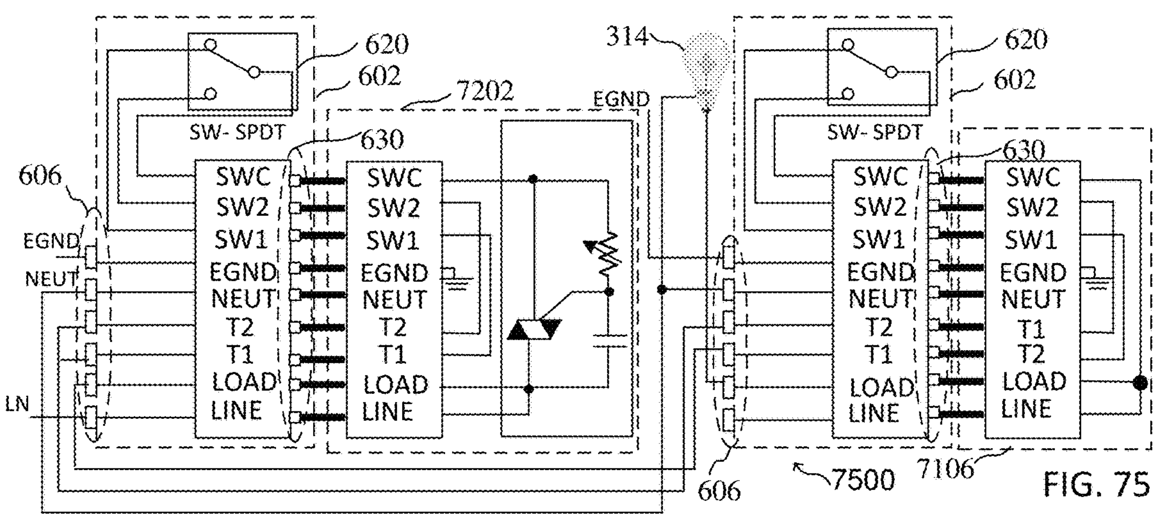
FIG. 75 is a block diagram of a first power adapter arrangement with a control module having dimmer circuit and a second power adapter arrangement with a standard control module in a 3-way switching configuration.

Turning now to FIG. 75, a block diagram of a system 7500 having a first power adapter arrangement with a control module having a dimmer circuit and a second power adapter arrangement with a standard control module in a 3-way switching configuration is shown. According to the implementation of FIG. 75, the control module 7202 may be implemented on the line side, where the switching operation is the same as the switching operation of FIG. 74, where the line voltage may be modified by the control module 7202.

Figure 76:
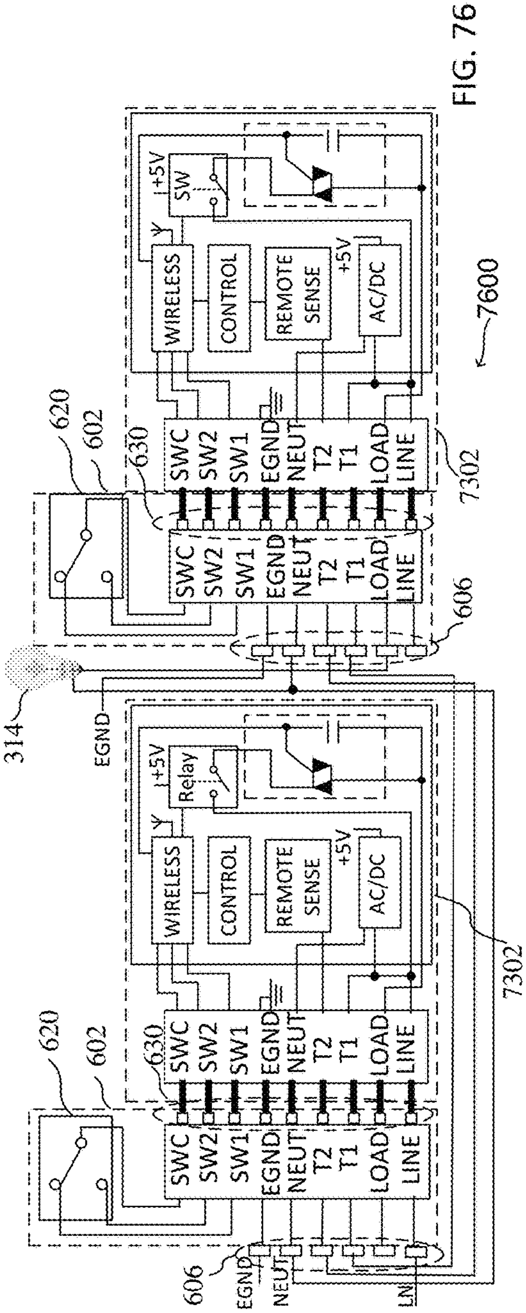
FIG. 76 is a block diagram of a first power adapter arrangement with a control module having a wirelessly controlled dimmer and a second power adapter arrangement with a control module having a wirelessly controlled dimmer in a 3-way switching configuration.

Turning now to FIG. 76, a block diagram of a system 7600 having a first power adapter arrangement with a control module having a wirelessly controlled dimmer and a second power adapter arrangement with a control module having a wirelessly controlled dimmer in a 3-way switching configuration is shown. When the control module 7302 is used on both sides of a 3-way switching arrangement, the control modules may communicate wirelessly, and one of the control modules may operate as a master and perform the switching. For example, the control module 7302 on the line side may operate only to detect a change in the switch 620 and provide a wireless signal indicating that a toggling of the switch 620 to which it is attached has occurred. The control module 7302 on the load side will then control the application of the power to the load contact element.

Figure 77:
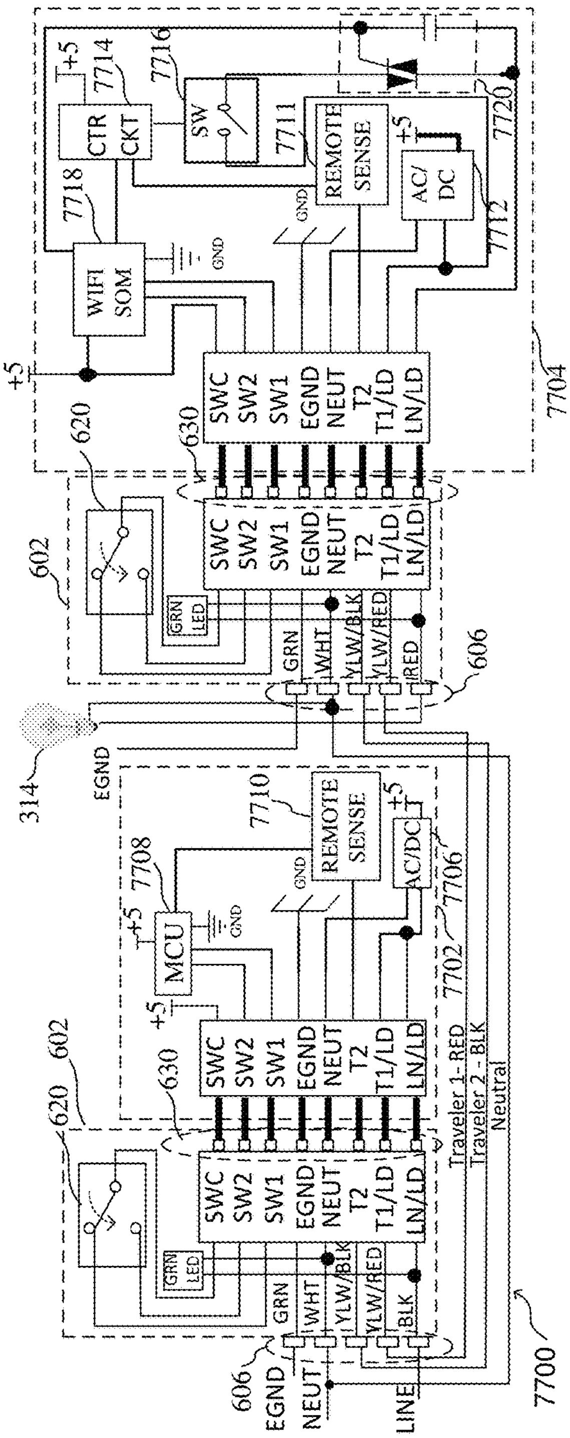
FIG. 77 is a block diagram of a first power adapter arrangement with a remote dimmer control module and a second power adapter arrangement with a wirelessly controlled dimmer control module in a 3-way switching configuration.

Turning now to FIG. 77, a block diagram of a system 7700 having a first power adapter arrangement with a control module 7702 and a second power adapter arrangement with a wirelessly controlled dimmer control module 7704 in a 3-way switching configuration is shown. According to the implementation of FIG. 77, each power adapters comprises eight contact elements in the electrical interface 630. The control module 7702 coupled to the power adapter 602 on the line side comprises an AC/DC circuit 7706 adapted to generate a DC voltage. The DC voltage is provided to the SWC contact element, and a control circuit 7708, shown by way of example as a microcontroller (MCU) is coupled to detect a change on the SW1 or SW2 contact elements. A remote sense circuit 7710 is coupled to the MCU and provides a signal on the contact element T2 that is detected by a remote sense circuit 7711 of the control module 7704. The control module 7704 comprises an AC/DC circuit 7712 to generate a DC signal. The control module also comprises a control circuit 7714 coupled to a wireless communication circuits 7718, shown by way of example as a Wi-Fi SOM that is coupled to detect a change in the switch 620 of the power adapter on the load side. The control circuit controls a switch 7716 to control the application of the power to the LN/LD contact element of the power adapter 602 that is coupled to the load. As can be seen, the control module 7702 is implemented to provide a signal associated with the toggling of the switch 620 on the line side, while the control module 7704 is adapted to control the switching of the power to the load, which may be in response to a signal received by the wireless communication circuit 7718, which may be used to control the operation of a dimmer circuit 7720.

Figure 78:
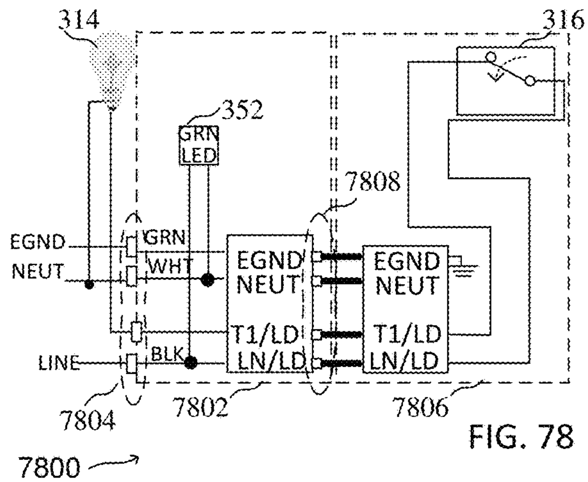
FIG. 78 is a block diagram of a switching arrangement having a base and standard SPST control module.

According to some implementations, a switch for switching the line voltage to the load may be placed in the control module, where the control module is coupled to a base. Turning first to FIG. 78, a block diagram of a switching arrangement 7800 having a base and standard SPST control module is shown. More particularly, a base 7802 comprises an electrical interface 7804 that receives the line voltage at a LN/LD contact element which is routed to the LN/LD contact element of a control module 7806. A single pole, single throw switch 316 is coupled between the LN/LD contact element and the T1/LD contact element. The line voltage is routed to the load by way of the switch 316. An electrical interface 7808 comprises a plurality of contact elements of the base 7802 and of the control module 7806.

Figure 79:
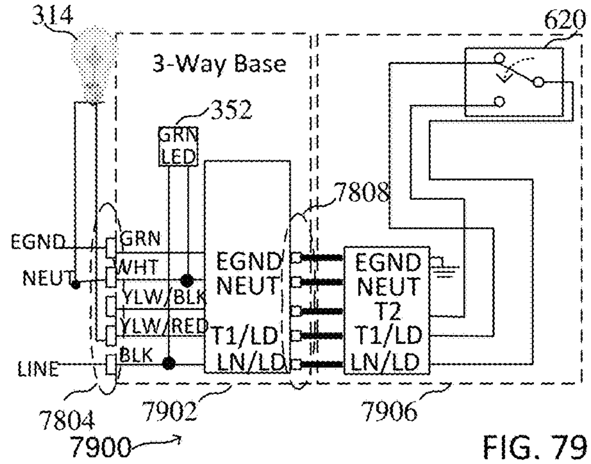
FIG. 79 is a block diagram of a switching arrangement having a base for 3-way wiring and a standard SPST control module.

Turning now to FIG. 79, a block diagram of a switching arrangement 7900 having a base for 3-way wiring and a standard SPST control module is shown. The base 7902 comprises a contact element for a second traveler to enable 3-way switching as will be described in more detail below. The control module 7906 comprises the switch 620 and can route the line voltage to either of the T1/LD or LN/LD contact elements.

Figure 80:
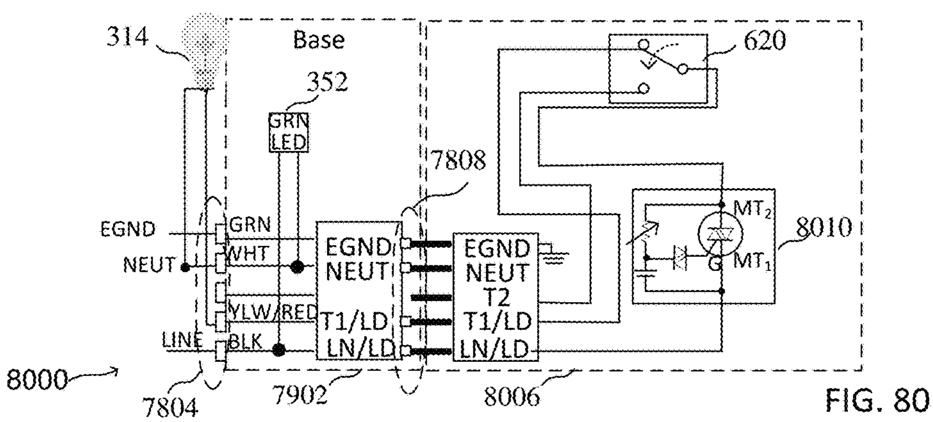
FIG. 80 is a block diagram of a switching arrangement having a base for 3-way wiring and a control module with an SPST switch and a dimmer circuit.

Turning now to FIG. 80, a block diagram of a switching arrangement 8000 having a base for 3-way wiring and a control module with a standard SPST switch and a dimmer circuit is shown. According to the implementation of FIG. 80, the control module 8006 comprises a dimmer circuit 8010 between the LN/LD contact element and the switch 620.

Figure 81:
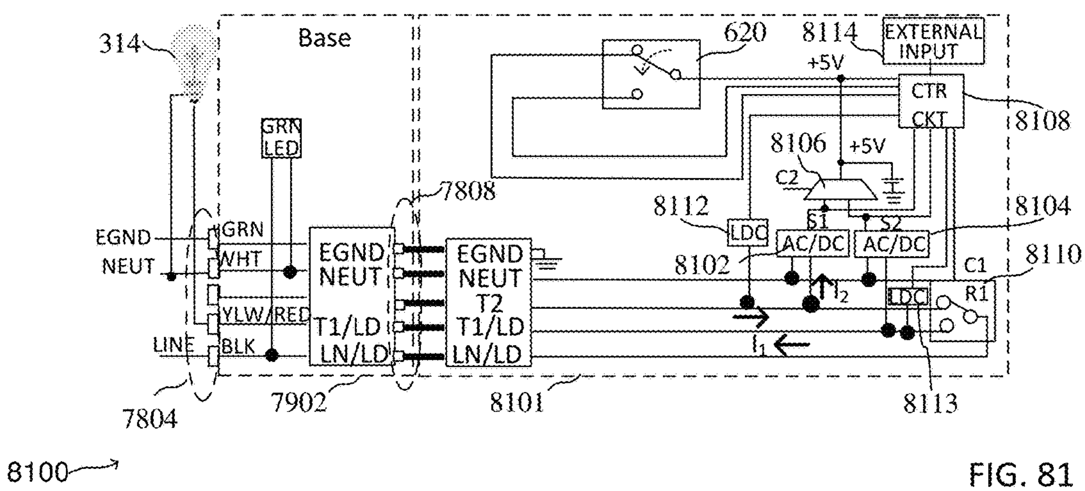
FIG. 81 is a block diagram of a switching arrangement having a base for 3-way wiring and a control module with a wirelessly controlled SPDT switch.

Turning now to FIG. 81, a block diagram of a switching arrangement 8100 having a base for 3-way wiring and a control module with a wirelessly controlled SPDT switch is shown. The control module 8101 controls a switch 620 and comprises a control circuit 8108 to control the application of power to the load. Because a 120 V power will be on either one of the traveler lines (i.e., on the T2 or T1/LD contact elements), a multiplexer circuit 8106 could be used to select the output of one of two AC/DC circuits 8102 and 8104 to generate a low voltage DC signal (e.g., 5 volts) that is provided to the control circuit 8108, where the control circuit detects a switching of the switch 620. A line detection circuit 8112 and line detection circuit 8113 may provide line detection signals to the control circuit to enable the control circuit to control the switch 8110 and switch the line voltage between the T2 contact element, which is not connected, and T1/LD contact element, which is coupled to the load. An external circuit 8114, which may be a wireless communication circuit for example, may be implemented to provide a switching operation.

Figure 82:
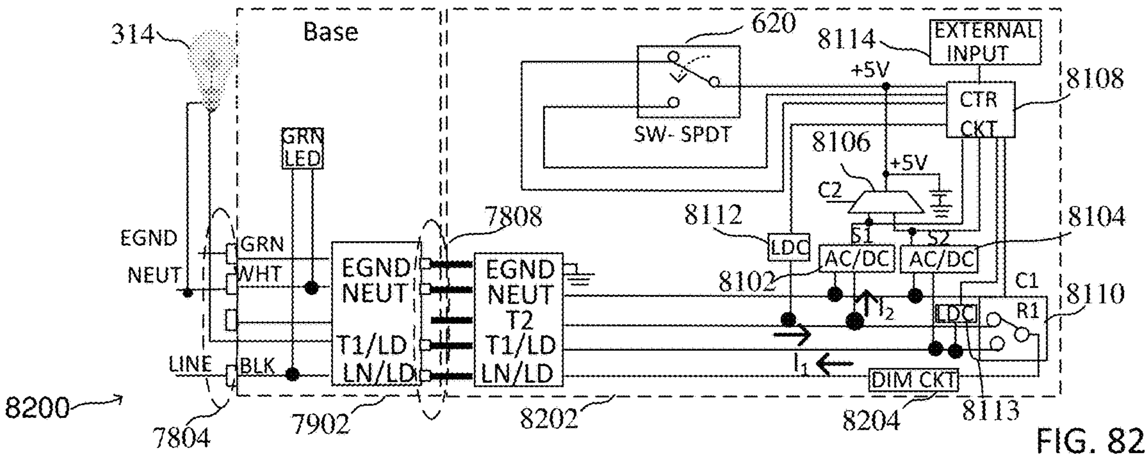
FIG. 82 is a block diagram of a switching arrangement having a base for 3-way wiring and a control module with a SPST switch and a line detection circuit.

Turning now to FIG. 82, a block diagram of a switching arrangement 8200 having a base for 3-way wiring and a control module with a SPST switch and a line detection circuit is shown. The switching arrangement of FIG. 82 is similar to the switching arrangement of FIG. 81, except that the switching arrangement 8202 comprises a dimmer circuit 8204 between the LN/LD contact element and the switch 8110.

Figure 83:
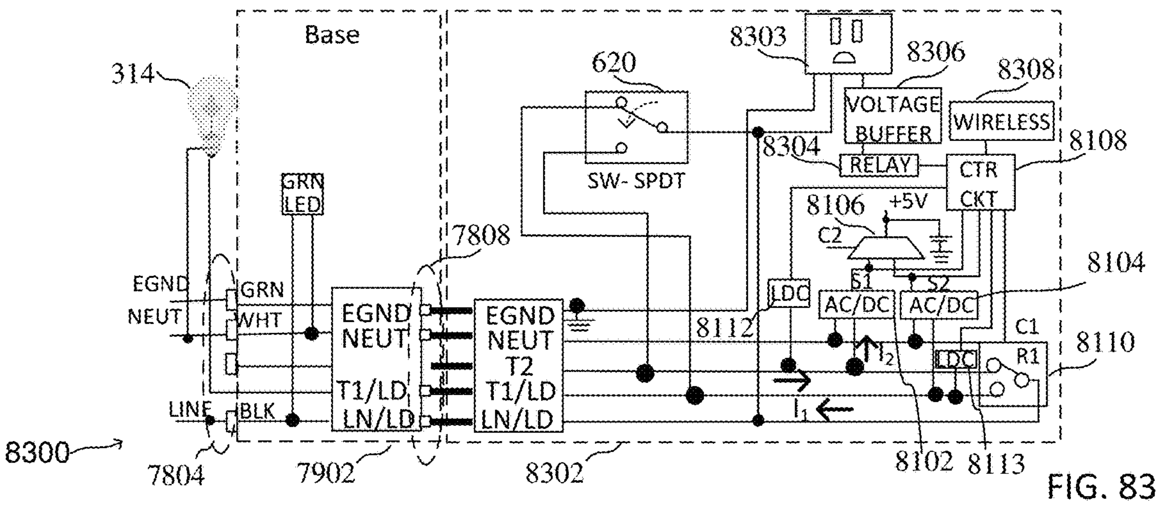
FIG. 83 is a block diagram of a switching arrangement having a base for 3-way wiring and a control module with an outlet and a line detection circuit.

Turning now to FIG. 83, a block diagram of a switching arrangement 8300 having a base for 3-way wiring and a control module with an outlet and a line detection circuit is shown. FIG. 83 is similar to the implementation of FIG. 81, except that the control module 8302 comprises an outlet 8303 that is controlled by the control circuit. More particularly, the control circuit is coupled to control the line voltage coupled to a switch 8304, which may be a relay for example, and a voltage buffer 8306 is coupled to the output of the switch to prevent any glitches on the line voltages applied to the outlet 8303. A wireless communication circuit 8308 may also be provided to enable wireless control of power to the outlet.

Figure 84:
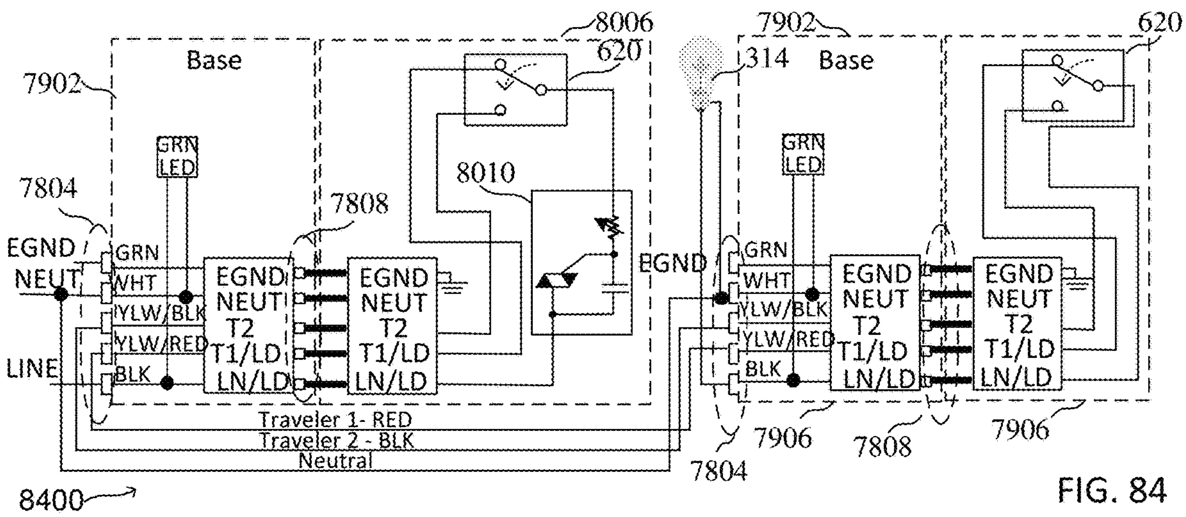
FIG. 84 is a block diagram of a switching arrangement having a base with a control module with a simple dimmer in a first power adapter and a base with a standard SPDT control module.

Turning now to FIG. 84, a block diagram of a system 8400 having a base with a control module having a simple dimmer and a base with a standard SPDT control module is shown. The control module 8006 is implemented on the line side of the 3-way switching circuit. The 3-way switching operation is similar to the 3-way switching operation as described above in reference to FIG. 19.

Figure 85:
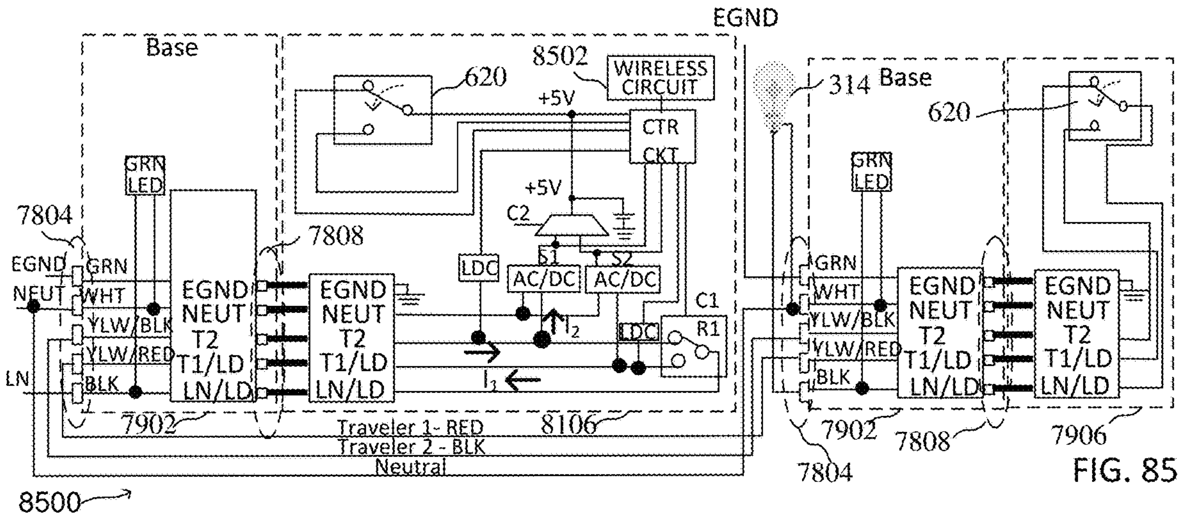
FIG. 85 is a block diagram of switching arrangement having a base with a simple dimmer and a base with a standard SPDT control module.

Turning now to FIG. 85, a block diagram of a switching arrangement 8500 having a base with a control module with a simple dimmer and a base with a standard SPDT control module is shown. The operation of the switching arrangement 8500 of FIG. 85 is similar to the operation of the switching arrangement 8100 of FIG. 81. According to the implementation of FIG. 85, the external circuit 8114 is replaced with a wireless communication circuit 8502, which provides control signals to the control circuit to control the application of the power to the load by way of the switch 620.

Figure 86:
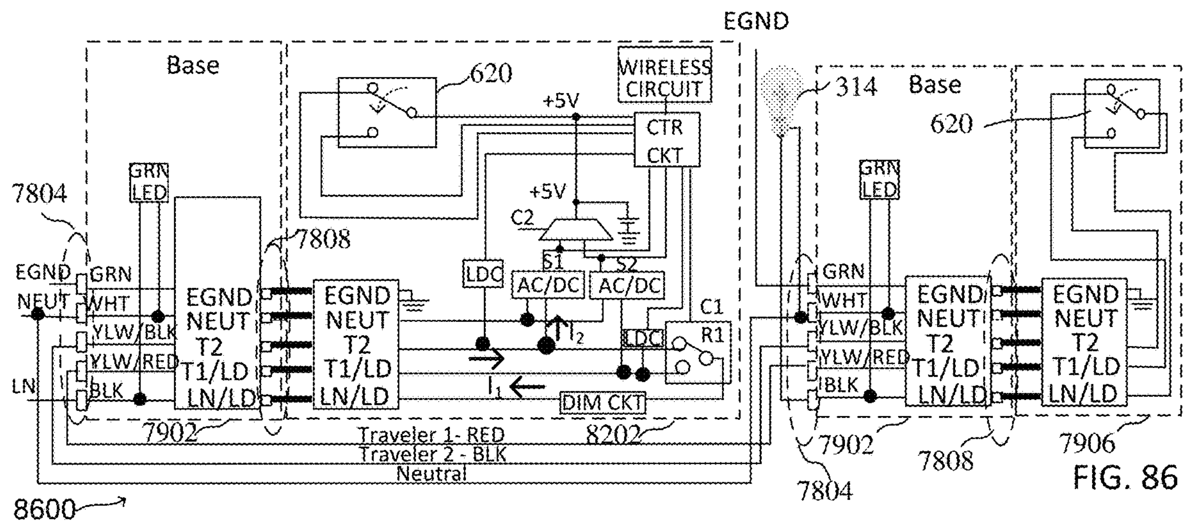
FIG. 86 is a block diagram of a switching arrangement having a base with a wirelessly controlled switch and a base with a standard SPDT control module.

Turning now to FIG. 86, a block diagram of a switching arrangement 8600 having a base with a control module with a wirelessly controlled switch and a base with a standard SPDT control module is shown.

Figure 87:
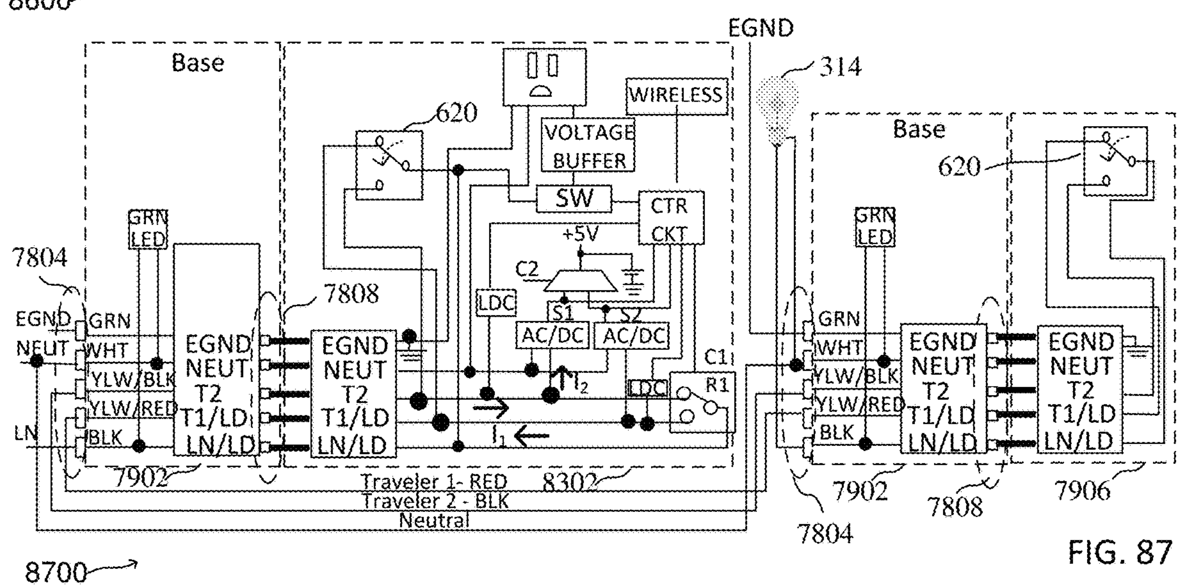
FIG. 87 is a block diagram of a switching arrangement having a base with a control module with a controlled outlet and a base with a standard SPDT control module.

Turning now to FIG. 87, a block diagram of a switching arrangements 8700 having a base with a control module with a controlled outlet and a base with a standard SPDT control module is shown.

Figure 88:
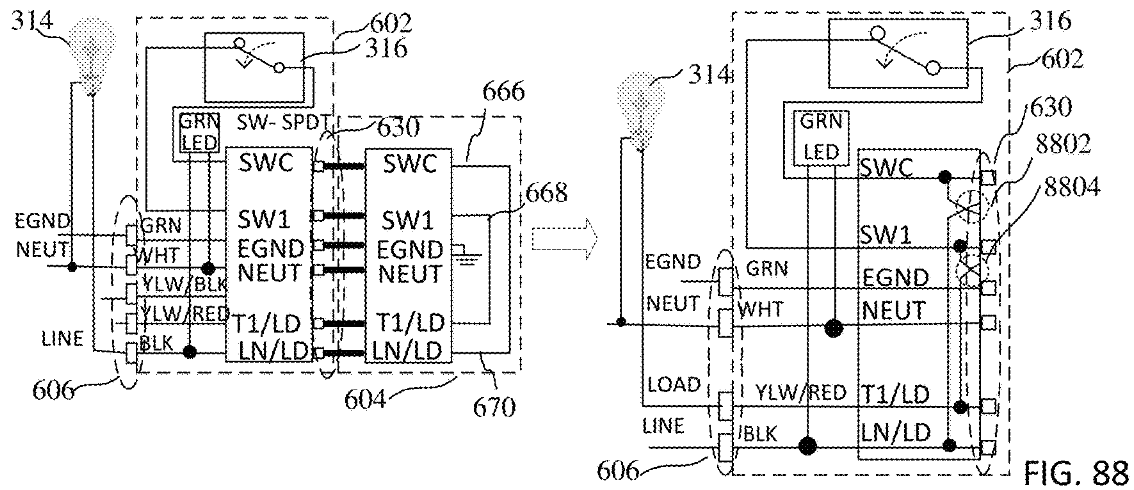
FIG. 88 is a block diagram of a power adapter configured to operate without a control module.

Reducing parts and simplifying the requirements for power adapter arrangements, is beneficial to manufacturers, builders and homeowners. One significant way to reduce parts is to enable a power adapter, such as a power adapter having a switch or an outlet, to function without any control module. In the case of a power adapter having a switch, it is beneficial to eliminate the need for a control module, and preferably provide a reliable design with a reduced part count. While the elimination of a control module may require some additional parts in the power adapter, the modification to power adapters shown below significantly reduce the overall part count and the complexity of the power adapter arrangement. Turning first to FIG. 88, a block diagram of a power adapter configured to operate without a control module is shown. The power adapter 602 of the power adapter arrangement can be modified to implement a power adapter that is adapted to operate without a control module. More particularly, the power adapter comprises a plurality of contact elements of the electrical interface 630 including connectors 8802 and 8804 (shown in the dashed circles) that are adapted to provide the function of the conductors for routing of signals that are normally routed within the standard control module.

The connectors 8802 and 8804 may comprise contact elements that are normally closed (i.e., providing an electrical connection between the contact elements to enable the connectors 8802 and 8804 to conduct current), but where the connector will be opened (i.e., create an open circuit) to block the passage of current or a voltage through the connector when certain control modules having an actuator that aligns with the connector are inserted into a recess of the power adapter. The connectors 8802 and 8804 could be any type of device for passing or blocking current or a voltage by providing isolation between the input and the output of the connectors. The connectors 8802 or 8804 could be simple devices that comprise two conducting components that make an electrical connection that can be broken, or could be dedicated switches for example. Examples of some connectors that could be implemented for connectors 8802 and 8804 are described for example in FIGS. 92, 93, 95, 96, and 112-120.

The connector 8802 that connects the SWC contact element and the LN/LD contact element on the modified switch provides the electrical connection between the SWC and LN/LD contact elements that is provided by the conductor 666 between the SWC and LN/LD contact elements of the control module 604 of the power adapter arrangement. Similarly, the connector 8804 that connects the SW1 contact element and the T1/LD contact element and provides the electrical connection between the SW1 and T1/LD contact elements that is provided by the conductor 668 between the SW1 and T1/LD contact elements of the control module 604 of the power adapter arrangement. The connectors 8802 and 8804 may comprise break connectors (i.e., normally closed connectors that can be opened by an actuator of the control module or the power adapter when a control module is inserted into the power adapter) as will be described in more detail in reference to FIG. 89.

As can be seen in FIG. 88, line power provided to the LN/LD contact element is routed to the SWC contact element by way of the connector 8802, which is in the closed position or state (i.e., in a state to pass the line voltage or current). The line power provided to the SW1 contact element is routed to the T1/LD contact element by way of the connector 8804, which is also in the closed position. Therefore, the line power is routed through the switch 316 (when the switch 316 is closed as shown) from the LN/LD contact element to the SWC contact element and through the switch 316 to the T1/LD contact element by way of the connector 8804 and back to the load. By providing the connector 8802 and 8804, the standard control module can be eliminated as shown. However, because the connector 8802 and 8804 can be opened (i.e., create an open circuit between the nodes between the connectors that provide an electrical connection), a control module can be used to receive line power and control the application of power to the load when attached to the power adapter, as will be described in more detail below in reference to FIG. 89.

Figure 89:
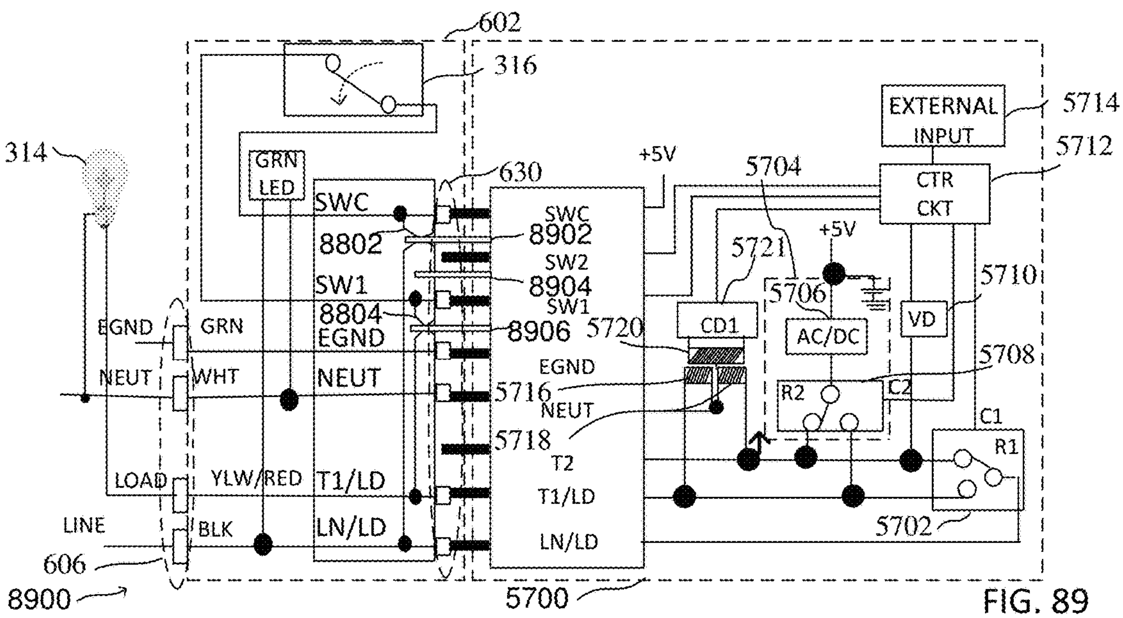
FIG. 89 is a block diagram of a power adapter arrangement having a control module for controlling the application of power to a load.

Turning now to FIG. 89, a block diagram of a power adapter arrangement 8900 having a control module for controlling the application of power to a load is shown. The control module 5700 comprises actuators 8902, 8904 and 8906, wherein actuators 8902 and 8906 are adapted to control the connectors 8802 and 8804. More particularly, actuator 8902 causes the connectors 8802 to create an open circuit, while actuator 8906 causes the connector 8804 to create an open circuit. As will be described in more detail below in reference to FIGS. 90-91, the actuator 8904 will create an open circuit in a power adapter that operates in a 3-way circuit. According to one implementation, the actuators may comprise insulating elements, such as a plastic divider for example, which creates a gap between contact elements of the connectors 8802 and 8804 to create open circuits and allow power to be routed through the control module. According to other implementations, the actuators may be a part of the power adapter, where the movement of the actuator is caused by the insertion of the control module. For example, the actuator may comprise a portion extending into the recess of the power adapter, where the portion of the actuator is moved when the control module is inserted into the power adapter.

Figure 90:
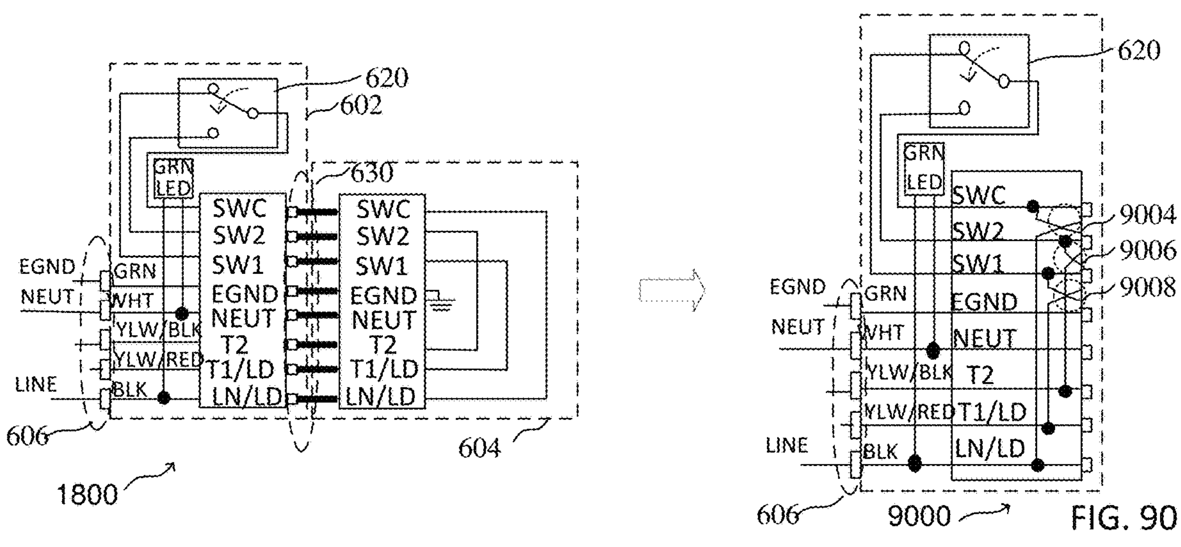
FIG. 90 is another block diagram of a power adapter configured to operate without a control module.

Turning now to FIG. 90, another block diagram of a power adapter configured to operate without a control module is shown. The power adapter 602 comprising the switch 620 can be modified to eliminate the standard control module by including three connectors 9004, 9006 and 9008. That is, the connector 9004 that connects the SWC contact element and the LN/LD contact element provides the electrical connection between the SWC and LN/LD contact elements that is provided by the conductor 666 between the SWC and LN/LD contact elements of the standard control module 604 of the power adapter arrangement 1800. Similarly, the connector 9008 that connects the SW1 contact element and the T1/LD contact element provides the electrical connection between the SW1 and T1/LD contact elements that is provided by the electrical connection between the SW1 and T1/LD contact elements of the standard control module of the power adapter arrangement. The connector 9006 that connects the SW2 contact element and the T2 contact element provides the electrical connection between the SW2 and T2 contact elements that is provided by the conductor between the SW2 and T2 contact elements of the standard control module of the 3-way switching configuration 1800.

Figure 91:
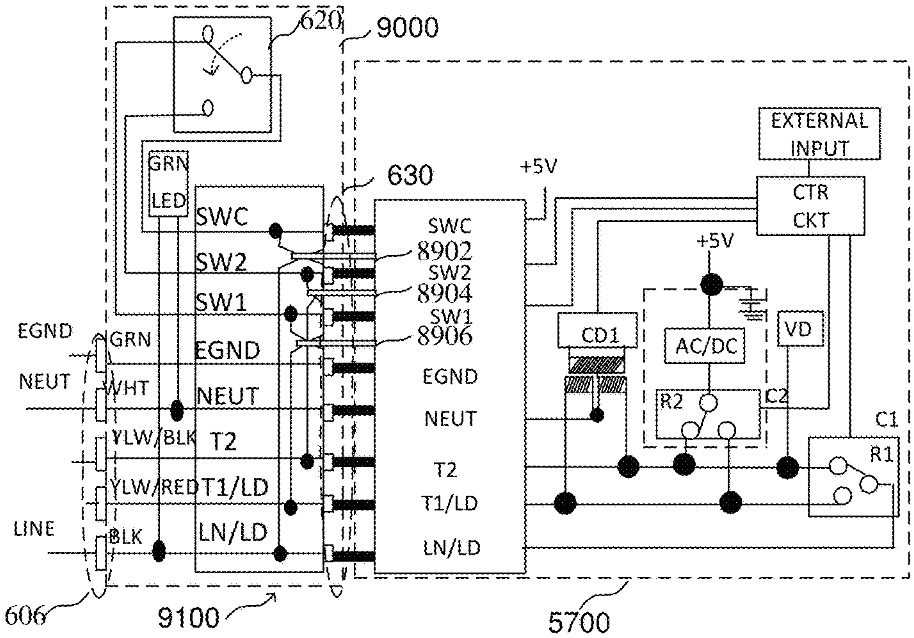
FIG. 91 is another block diagram of a power adapter arrangement having a control module for controlling the application of power to a load.

Turning now to FIG. 91, another block diagram of a power adapter arrangement 9100 having a control module for controlling the application of power to a load is shown. As can be seen in FIG. 91, the actuators 8902-8906 create an open connection in the connectors 9004, 9006, and 9008 to allow power to be routed through the control module 5700. The power adapter 9000, which comprises a single pole, double throw switch, will operate as a 3-way switch with used in a 3-way connection when a control module is not attached (i.e., power from the LN contact element can be provided to one of the two traveler lines (i.e., on the T1/LD or T2 contact elements) by way of the switch 620 and the connectors 9004 and 9008), but allow power to be applied to a control module coupled to a power adapter, where the control module may control the application of power to a load.

Figure 92:
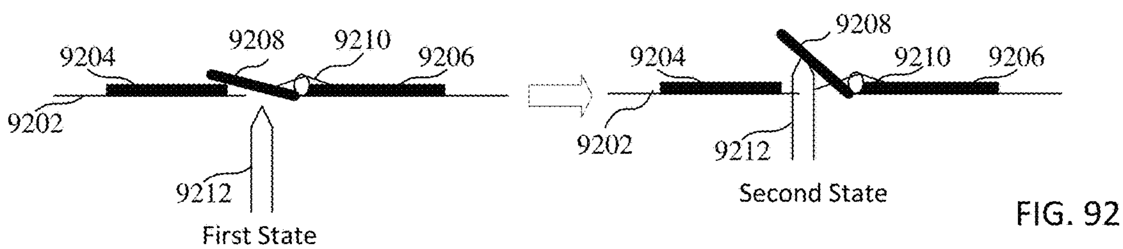
FIG. 92 is a diagram of a connector adapted to break a connection in a power adapter having a switch.

Turning now to FIG. 92, a diagram of a connector adapted to break a connection in a power adapter having a switch is shown, and particularly changing from a first state on the left to a second state on the right. More particularly, the connectors 8802 and 8804 of FIG. 88 and the connectors 9004, 9006 and 9008 of FIG. 90 can be implemented as spring-loaded contact elements between two contact nodes (e.g., between SWC and LN/LD contact elements for connectors 8802 and 9004). While the contact element is shown controlled by a separate spring, it should be understood that the contact element could be on the end of a leaf spring connected to a contact node. That is, a contact element implemented as a lead spring may comprise two ends that are connected, where a contact element at the center of the leaf spring may be bowed in a direction to create an electrical connection. According to another implementation, a contact element may be at the end of a flexure, where a contact element may be placed at the end of a flexible portion, where the flexible portion is adapted to move when pressure is placed on the contact element, such as when the contact element comes into contact with a corresponding contact element. The actuator could be an insulating element, such as the blade of FIGS. 89 and 91 or an element of the power adapter that is moved when the control module is inserted into the power adapter. The connector comprises a printed circuit board 9202 having a first contact portion 9204 and a second contact portion 9206, where a movable contact element 9208 is controlled by a spring 9210. The contact element of FIG. 92 is closed when in a first state, and opened when in a second state (i.e., when a control module is inserted into the power adapter).

Figure 93:
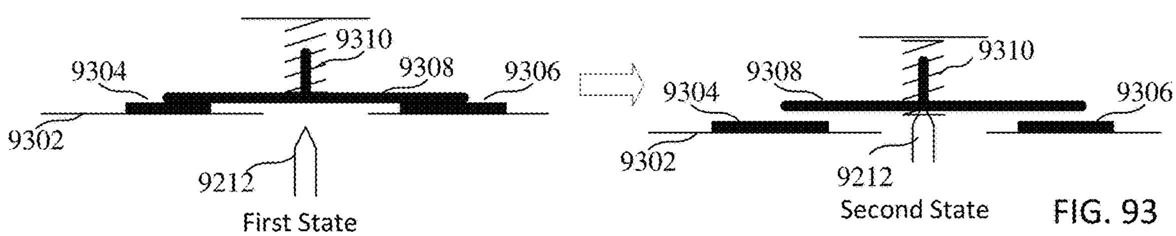
FIG. 93 is a diagram of another connector adapted to break a connection in a power adapter having a switch.

Turning now to FIG. 93, a diagram of another connector adapted to break a connection in a power adapter having a switch is shown, and particularly changing from a first state on the left to a second state on the right. According to the implementation of FIG. 93, a movable contact element may be controlled by a spring, where the contact is closed in a first state and opened by the actuator in the second state. More particularly, the connector of FIG. 93 comprises a circuit board 9302 having a first contact element 9304 and a second contact element 9306, where a contact element 9308 that is held in place by a spring 9310. When an actuator 9212 is moved from a first state to a second state as shown, the electrical connection between the contact element 9308 and the contact elements 9304 and 9306 is broken to create an open circuit. While FIGS. 92 and 93 are shown by way of example as having PCBs, it should be understood that the contact elements could be used with metal connectors that are not connected to a PCB.

Figure 94:
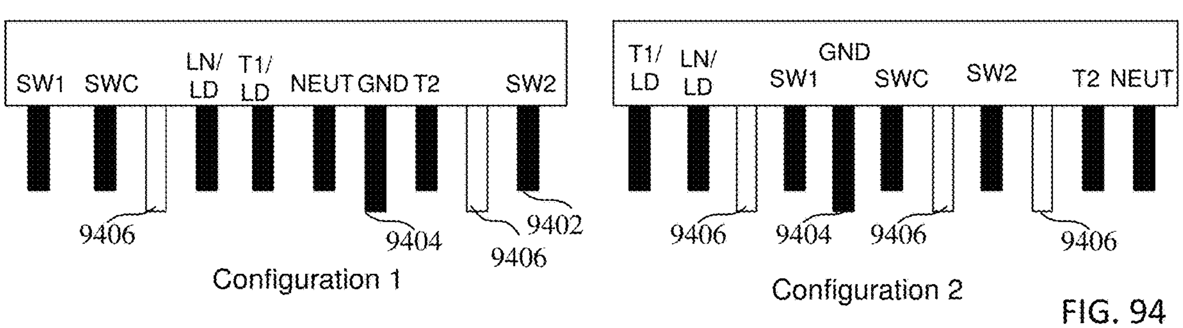
FIG. 94 is a diagram of an arrangement of contact elements of a plurality of contact elements.

Turning now to FIG. 94, a side view of arrangements of a plurality of contact elements is shown, including a first configuration on the left and a second configuration on the right. The contacts, shown here by way of example as blades, may be arranged to provide isolation for the switch contact elements (i.e., SWC, SW1 and SW2) that may carry DC signal from other contacts that may carry high voltage signals. The ground contacts and insulating elements may be longer than the other contacts to make or break a contact first when a control module is attached to a power adapter (or break or make a contact last when a control module is detached from a power adapter). More particularly, a first contact element 9402 having a first height, which is less than the height of a second contact element 9404, which is a ground contact element. Actuators 9406 have a height that is also greater than the height of the contact element 9402 to break a connection before the remaining contacts having the height of the contact element 9402 make an electrical connection.

Figure 95:
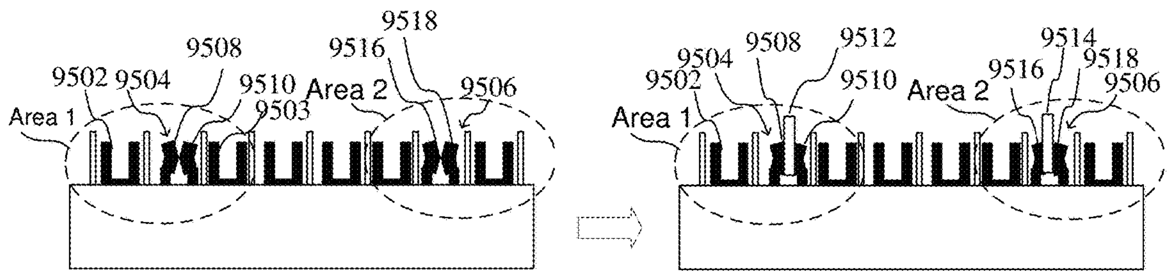
FIG. 95 is a diagram of an arrangement of receptacle contact elements for receiving a corresponding contact elements and elements for breaking a contact.

Turning now to FIG. 95, a diagram of an arrangement of receptacle contact elements for receiving a corresponding contact elements and elements for breaking a contact is shown, and particularly showing the state of contacts without actuators on the left and with actuator on the right. According to the implementation of FIG. 95, the contact elements may be configured to receive a corresponding contact element of a control module, such as the contact elements of FIG. 94. Modified contact elements may be implemented to be normally closed, where an open circuit can be created when insulating elements 9512 and 9514 (such as the actuators 9406 of FIG. 94) is inserted into the modified contact elements (as shown on the right side of the arrow in FIG. 95). According to one implementation, the modified contact elements can be placed between the contact elements to which they connect and may be connected on a PCB for example.

More particularly, Area 1 shows a plurality of contact elements including conventional contact elements 9502 and 9503 and a connector 9504 that is adapted to be normally closed but may be opened when a control module is inserted into the power adapter. Both contact elements 9502 and 9503 are adapted to receive contact elements, such as a blade contact element for example. Area 2 also comprises a plurality of contact elements including conventional contact elements and a connector 9506 having contact elements 9516 and 9518 that is adapted to be normally closed but be opened when a control module is inserted into the power adapter. Both contact elements 9502 and 9503 are adapted to receive contact elements, such as a blade connector for example. However, connector 9504 comprises a first contact element 9508 and a second contact element 9510. As shown in FIG. 95, the two projections of the contact element 9502 are connected along the bottom and provide a single node. In contrast, contact elements 9508 and 9510 of the connector 9504 are not connected along the bottom to receive corresponding contact elements.

Figure 96:
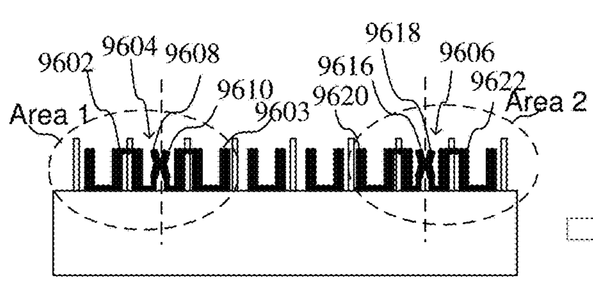
FIG. 96 is a diagram of another arrangement of receptacle contact elements for receiving a corresponding contact elements and elements for breaking a contact.

Turning now to FIG. 96, a diagram of another arrangement of receptacle contact elements for receiving corresponding contact elements and elements for breaking a contact is shown, and particularly the states of contacts without actuators on the left and with actuators on the right are shown. More particularly, the modified contact elements may have two conductive elements, each of which may be a part of an adjacent contact element. For example, Area 1 may comprise two contact elements, including a first contact element comprising a contact element and a first conductive element of a modified contact element and a second contact element comprising a contact element and a second part of the modified contact element. More particularly, Area 1 comprises contact elements 9602 and 9603 that are electrically connected to a connector 9604 comprising contact elements 9608 and 9610. Similarly, Area 2 comprises contact elements 9620 and 9622 that are electrically connected to a connector 9606 comprising contact elements 9616 and 9618. As shown on the right-hand side, the contact elements of the connectors 9604 and 9606 are electrically isolated when the projections 9612 and 9614 are inserted between the contact elements of the connector.

Figure 97:
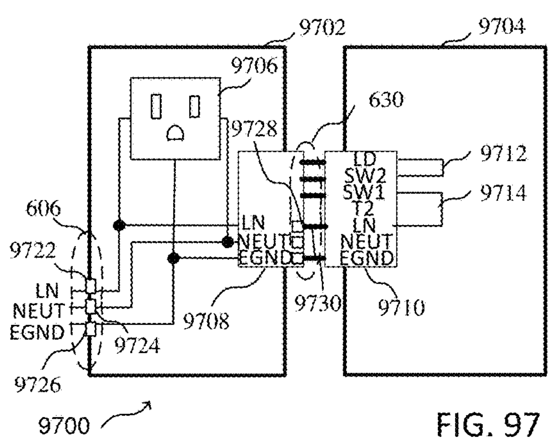
FIG. 97 is a block diagram of a power adapter arrangement having a power adapter comprising an outlet and a standard control module.

A system for controlling the application of power to a load is now described, where control modules of FIGS. 97-106 may be coupled to power adapters of the system, and where power adapter arrangements having up to seven contact elements are now described. Turning first to FIG. 97, a block diagram of a power adapter arrangement having a power adapter comprising an outlet and a standard control module is shown. According to the implementation of FIG. 97, a power adapter arrangement 9700 comprises a power adapter 9702 and a control module 9704. The power adapter 9702 comprises an outlet 9706 and a plurality of contact elements of an electrical interface 606, including a line (LN) contact element 9722, a neutral contact element (NEUT) 9724, and a ground (EGND) contact element 9726 required by the outlet. The control module 9704 comprises contact elements of the electrical interface 630 that are coupled to conductors 9712 and 9714. The control module 9704 also comprises contact elements that are coupled to corresponding contact elements of the power adapter in the electrical interface 630 for receiving line, neutral and ground voltages. By way of example, a contact element 9730 of the control module is coupled to a contact element 9728 of the power adapter. The power adapter 9702 does not require contact elements associated with the electrical interface other than the contact elements for the line, neutral and ground voltages, but must be able to receive contact elements, such as the load (LD) and switch (SW1 and SW2) contact elements as shown. That is, even though the contact elements associated with the load and switch contact elements are not used, the power adapter 9702 needs to be able to receive a control module having the load and switch contact elements to enable interchangeability, as will be described in more detail in reference to FIG. 98. While the control module 9704 does not provide any electrical connections to the power adapter 9702 that are used by the power adapter arrangement but functions as a cover when used with a power adapter having an outlet, the contact elements enable the operation of the switch of the power adapter arrangement of FIG. 101 for example, as will be described below in reference to FIG. 101. Conductors 9708 and 9710 are provided for enabling the control module 9802 to be used in a power adapter having a switch, such as power adapter 10102 as described below. It should be understood that the power adapter 9702 could be implemented with a separate line input for separately controlling the application of power to the outlet 9706 (to operate outlet 9706 as a switched outlet), as described herein for power adapters having outlets, such as in reference to FIG. 38 for example.

Figure 98:
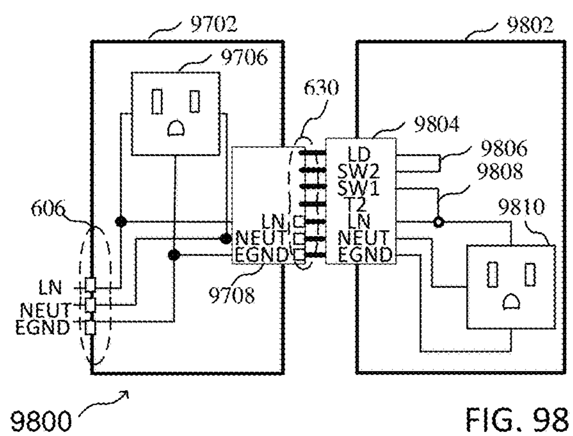
FIG. 98 is a block diagram of a power adapter arrangement having a power adapter comprising an outlet and a standard outlet module.

Turning now to FIG. 98, a block diagram of a power adapter arrangement 9800 having a power adapter comprising an outlet and a standard outlet module is shown. The control module 9802 comprises a plurality of contact elements (comprising seven contact elements) that provide both conductors 9806 and 9808 for enabling a switching operation of a power adapter having a switch, and contact element that provide power, neutral and ground voltages to an outlet 9810 as shown. While contact elements LD, SW2, SW1 and T2 of the control module 9802 do not provide an electrical connection when connected to the power adapter 9702, these contact elements enable the transfer of control signals in a multi-way switching arrangement as will be described in more detail below in reference to FIG. 102.

Figure 99:
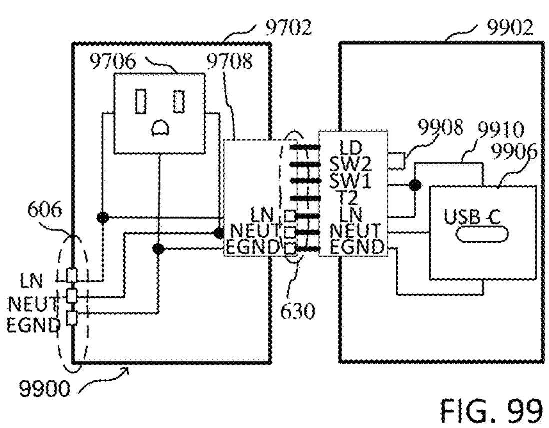
FIG. 99 is a block diagram of a power adapter arrangement having a power adapter comprising an outlet and a module having a USB connector.

Turning now to FIG. 99, a block diagram of a power adapter arrangement 9900 having a power adapter comprising an outlet and a module having a USB connector is shown. The control module 9902 of FIG. 99 also comprises a plurality of contact elements, including seven contact elements for enabling the operation of both a switch of a power adapter and a circuit requiring power, neutral and ground, shown here by way of example as a USB connector 9906 having elements for charging or data transfer for example. A conductor 9908 provides an electrical connection between the SW2 contact element and the LD contact element, while a conductor 9910 provides an electrical connection from the LN contact element to the SW1 contact element and the USB connector 9906. While a USC-C connector is shown by way of example, it should be understood that any type of connector for charging, data communication or other electrical functions could be implemented.

Figure 100:
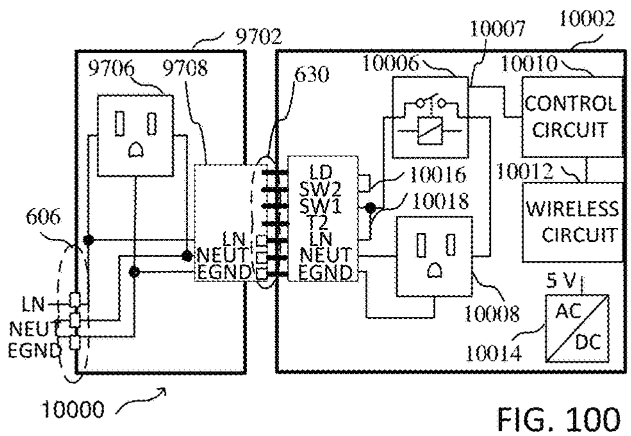
FIG. 100 is a block diagram of a power adapter arrangement having a power adapter comprising an outlet and a module having a controlled outlet.

Turning now to FIG. 100, a block diagram of a power adapter arrangement 10000 having a power adapter comprising an outlet and a module having a controlled outlet is shown. According to the implementation of FIG. 100, the control module 10002 comprises a plurality of contact elements associated with the electrical interface 630 enabling the coupling of power to the control module. Unlike the fixed outlet of the control module of FIG. 98, the control module 10002 comprises a switch 10006, which may be a relay for example, which controls the application of power applied to an outlet 10008. A control circuit 10010 is coupled to a wireless communication circuit 10012 for example to control the switch 10006 at a control input 10007, and therefore control the application of power to the outlet 10008, where the control circuit may control the application of power to the load by controlling the switch 10006 in response to wireless communication signals received by the wireless communication circuit 10012. An AC/DC circuit 10014, also known as a power supply, is coupled to the line voltage to generate a DC voltage, shown here by way of example as a 5 V DC signal, which could be distributed to any circuit elements of the control module that needs the DC signal. It should be understood that the control circuit could also receive external inputs from a user by way of a user interface on the control module, such as a button for enabling a user to manually control the application of power to the outlet 10008. Conductor elements 10016 and 10018 are provided to enable the routing of signals when the control module 10002 is used in a switch.

When the control modules of FIGS. 97-100 are implemented in the power adapter 9702 having an outlet, the control modules receive the power from the power adapter. However, the control modules of FIGS. 97-100 also comprise conductors (e.g., conductors 9712 and 9714) that enable a switching operation of a power adapter having a switch, as will be described in more detail in reference to FIGS. 101-104.

Figure 101:
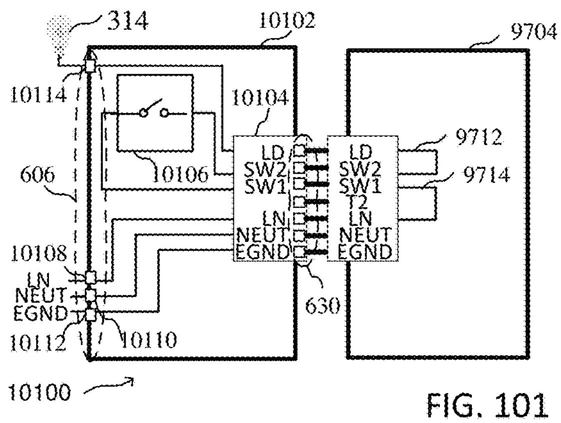
FIG. 101 is a block diagram of a power adapter arrangement having a power adapter having a switch and a standard module.

Turning now to FIG. 101, a block diagram of a power adapter arrangement 10100 having a power adapter comprising a switch and a standard module is shown. As shown in the implementation of FIG. 101, when the control module 9704 is attached to the power adapter 10102, the plurality of contact elements 10104 of the electrical interface 630 enable the operation of the switch 10106 to route the line voltage to the load by way of the conductors 9712 and 9714 in response to the switching of the switch 10106. For example, the line voltage is routed from the line contact element 10108 of the electrical interface 606 through the line contact elements of the electrical interface at 630 to the conductor 9714 and to the switch 10106 by way of the SW1 contact elements of the electrical interface 630. With the switch in the open state as shown in FIG. 101, the line voltage will not be routed through to the load. However, if the switch 10106 is switched to a closed state, the line voltage will be routed through the SW2 contact elements of the electrical interface 630, the conductor 9712, and the LD contact elements of the electrical interface 630 to provide the line voltage to the load 314 at the LD contact element 10114. A contact elements 10110 is provided to receive a neutral voltage and a contact element 10112 is provided to receive a ground voltage.

Figure 102:
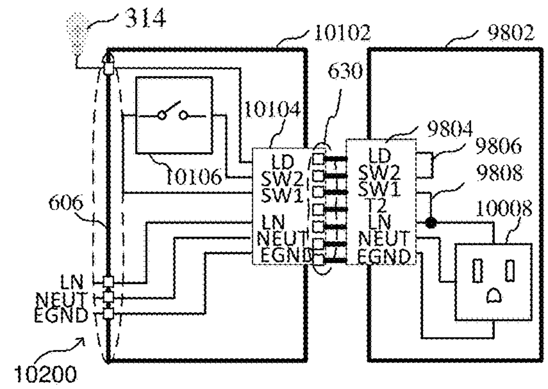
FIG. 102 is a block diagram of a power adapter arrangement having a power adapter having a switch and a module having an outlet.

Turning now to FIG. 102, a block diagram of a power adapter arrangement 10200 having a plurality of contact elements 1s shown. As shown in FIG. 102, the contact elements of the plurality of contact elements 9804 not only provide power to the outlet 10008, but the conductors 9806 and 9808 enable the switching operation of the switch 10106.

Figure 103:
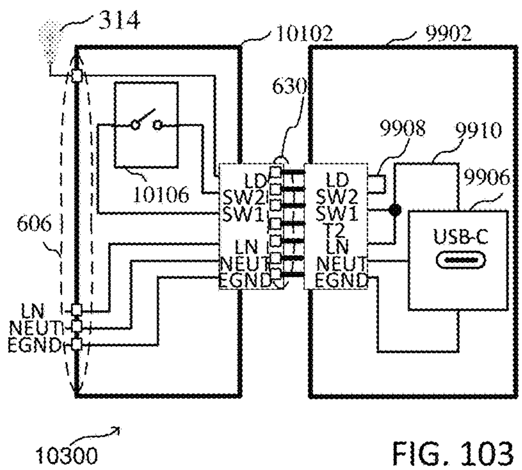
FIG. 103 is a block diagram of a power adapter arrangement having a power adapter having a switch and a module having a USB connector.

Turning now to FIG. 103, a block diagram of a power adapter arrangement 10300 having a power adapter comprising a switch and a control module having a USB connector is shown. As shown in FIG. 103, the contact elements of the plurality of contact elements of the electrical interface 630 not only provide power to the USB connector 9906, but the conductors 9908 and 9910 enable the switching operation of the switch 10106.

Figure 104:
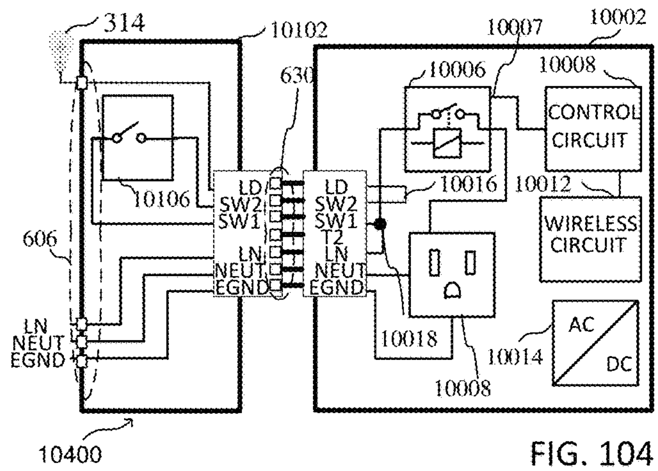
FIG. 104 is a block diagram of a power adapter arrangement having a power adapter having a switch and a control module having a controlled outlet.

Turning now to FIG. 104, a block diagram of a power adapter arrangement 10400 having a power adapter having a switch and a control module having a controlled outlet is shown. As shown in FIG. 104, the contact elements of the electrical interface 630 not only provide power to the outlet 10008, but the conductor elements 10016 and 10018 enable the switching operation of the switch 10106. The operation associated with the switching the power to the load 314 is the same as described above in reference to FIG. 101, and the operation associated with switching power to the switched outlet 10008 is the same as described above in reference to FIG. 100, which describes the operation of the control module 10002.

Figure 105:
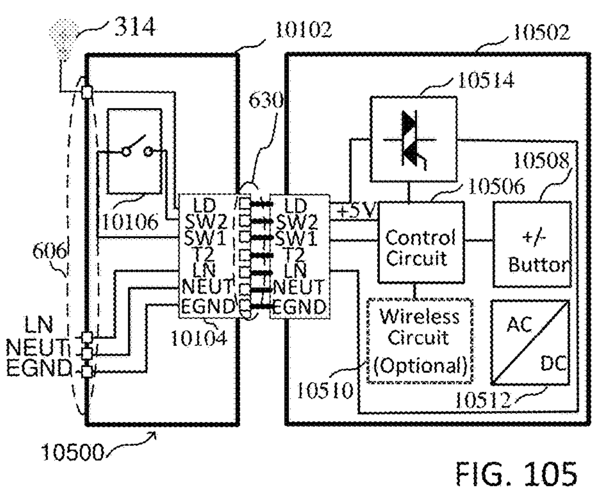
FIG. 105 is a block diagram of a power adapter arrangement having a power adapter having a switch and a control module having a circuit for dimming.
Figure 106:
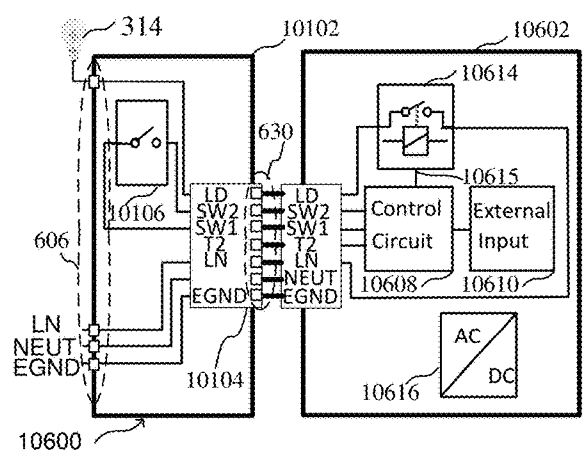
FIG. 106 is a block diagram of a power adapter arrangement having a power adapter having a switch and a module having a module having a motion sensor.

According to the implementation of FIGS. 105 and 106, control modules for controlling the operation of the switch are shown. Turning to FIG. 105, a block diagram of a power adapter arrangement 10500 having a power adapter having a switch and a control module having a circuit for dimming is shown. A control module 10502 comprises a dimmer circuit for controlling the application of power to a load. More particularly, the control module 10502 comprises a plurality of contact elements of the electrical interface 630 that enable the dimming of power to the load. A control circuit 10506 is adapted to receive external dimmer control inputs from an actuator 10508 or from a wireless communication circuit 10510. The AC/DC circuit 10512 receives the line voltage from the power adapter 10102 and generates a DC voltage for use by other circuit elements of the control module 10502. A dimmer circuit 10514, shown here by way of example as a TRIAC circuit, is controlled by the control circuit 10506 to control the power applied to the load.

It should be noted that the control module 10502 does not route the power signal through the switch 10106, but rather routes a signal, which may be a DC signal for example, though the switch 10106 to detect a change in the switch 10106 in response to an actuation by a user. That is, the control circuit 10506 provides a DC signal to the SW2 contact and detects the presence or absence of the DC signal on the SW1 contact element in response to the switching of the switch 10106. The control circuit also controls the application of the power received by way of the LN contact element and routed to the LD contact element by way of the dimmer circuit 10514.

Turning now to FIG. 106, a block diagram of a power adapter arrangement 10600 having a power adapter comprising a switch and a control module having a circuit for receiving an external input, such as a motion sensor, is shown. According to the implementation of FIG. 106, a control module 10602 comprises a switch 10614 having a control input 10615 adapted to receive a control input from the control circuit 10608 to enable control of the application of power to the load. More particularly, the control module 10602 comprises a plurality of contact elements associated with the electrical interface 630 enabling application of the power to the load by routing the power through the control module 10602. The control module does not route the power signal through the switch 10106, but rather routes a DC signal though the switch 10106 to detect a change in the switch in response to an actuation by a user as described in reference to FIG. 105. That is, the control circuit 10608 provides a DC signal to the SW2 contact element and detects the presence or absence of the DC signal on the SW1 contact element in response to the switching of the switch 10106. The control circuit also controls the application of the power received by way of the LN contact element and routed to the LD contact element in response to a signal receive by circuit 10610 for receiving an external input. It should be noted that the control module 10602 may receive an external input for controlling the switch 10614 from one or more of a variety of circuits, such as a motion sensor, a wireless communication circuit, or an external input from a user for example. An AC/DC circuit 10616 is also provided to provide a DC signal used by circuits in the control module.

According to another implementation, communication between power adapter arrangements may be achieved over a traveler line between the power adapter arrangements, as will be described in more detail in reference to FIGS. 107-120. A block diagram of the system 10700 of FIG. 107 comprises a load-side power adapter and one or more additional power adapters that transfer communication signals with the load side power adapter by way of a traveler line, where the one or more additional power adapters may be called remote or companion power adapters. The communication signals may comprise requests, commands, acknowledgement, status information, control signals or any other information enabling a control module or a pair of control modules to operate in a multi-way wiring arrangement. According to the system of FIG. 107, the power adapter 10702 coupled to the load, which may be considered a master power adapter, is implemented in a location wired to receive the line voltage and be coupled to the load, and another type of power adapter 10704, which may be considered a remote or companion power adapter, is implemented at another location of a multi-way switching arrangement, where a multi-way switching arrangement may comprise a 3-way switching, 4-way switching, or a greater number of switches in a switching arrangement for example.

Each of the power adapters is coupled to a plurality of signal lines 10710 comprising a first signal line having a traveler (TR) line 10712 coupled between at least two power adapters, and more particularly between the power adapter 10702 and the power adapter 10704. The traveler line 10712 may also be coupled to any other power adapter 10705 in a multiway switching arrangement. The plurality of signal lines 10710 may also comprise signal lines coupled to the line, neutral and ground voltages, including for example a signal line 10714 adapted to receive a line voltage, a neutral voltage line 10716 and a ground voltage line 10718. The plurality of signal lines 10710 may comprise wires between junction boxes and accessible from a junction box as described in FIG. 1 and coupled to contact elements of the electrical interface 606 of a power adapter for example. While a particular set of signal lines is shown for the plurality of signal lines 10710, it should be understood that the requirements for signal lines may be regulated by local and national codes, where line, neutral and ground may be required to be routed to each junction box having a switch for example, or other signal lines may be required.

Each power adapter of the system 10700 is coupled to receive the line (LN) voltage by way of the signal line 10714 to enable powering the power adapter or a control module attached to the power adapter. Each of the power adapters of the system 10700 may be coupled to the neutral voltage by way of the neutral voltage line 10716 and the ground voltage by way of the ground voltage line 10718. Each of the power adapters is also configured to be coupled to the traveler line 10712 to transmit and/or receive control signals. Communication signals placed on the traveler line 10712 and communicated to control modules may comprise control signals that may be generated by one or both of a toggle switch 10706 (i.e., an on/off switch) or a dimmer actuator 10708 (i.e., one or more switches to control the level of dimming for the load). While power control and dimming actuators are shown, it should be understood that other user interface elements could be implemented on any of the power adapters 10702 or 10704 (or any additional power adapter 10705 shown in FIG. 107 as implementing a 4-way circuit). It should be noted that any number of additional power adapters 10705 could be implemented, and that the power adapters may be implemented without dimming actuators, where any dimming could be controlled by a dimmer circuit in a control module, as will be described in more detail below in reference to FIGS. 110 and 111.

Figure 107:
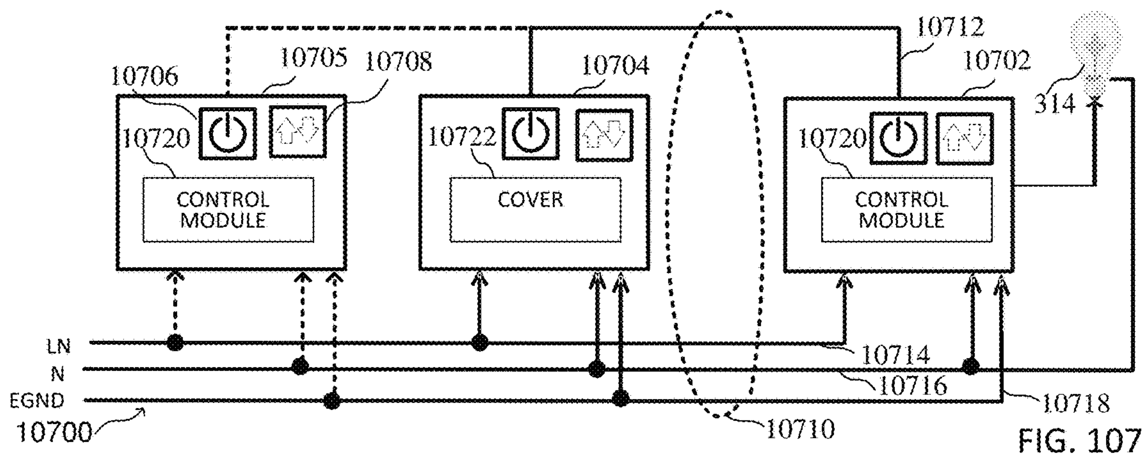
FIG. 107 is a block diagram of a multi-way power adapter configuration having a load-side power adapter and one or more companion power adapters.

The power adapters of the system 10700 may also comprise control modules. As shown in FIG. 107, the power adapter 10702 comprises a control module 10720, the power adapter 10704 comprises a cover 10722, and the power adapter 10705 comprises a control module 10720. As will be described in more detail below, the power adapters may operate without any control module, and therefore just have a cover 10722. However, each of the power adapters of the system 10700 may be coupled to a control module. Dashed lines are shown to the power adapter 10705 to show that a 3-way switching arrangement can be implemented having only power adapter 10702 and power adapter 10704 or may include any number of additional power adapters 10705. That is, because the communication to the power adapter 10702 is provided on a traveler line, the signals from multiple remote power adapters, such as 10704 and 10705 as shown, could provide signals on the same traveler line that is coupled to the power adapter 10702.

Figure 108:
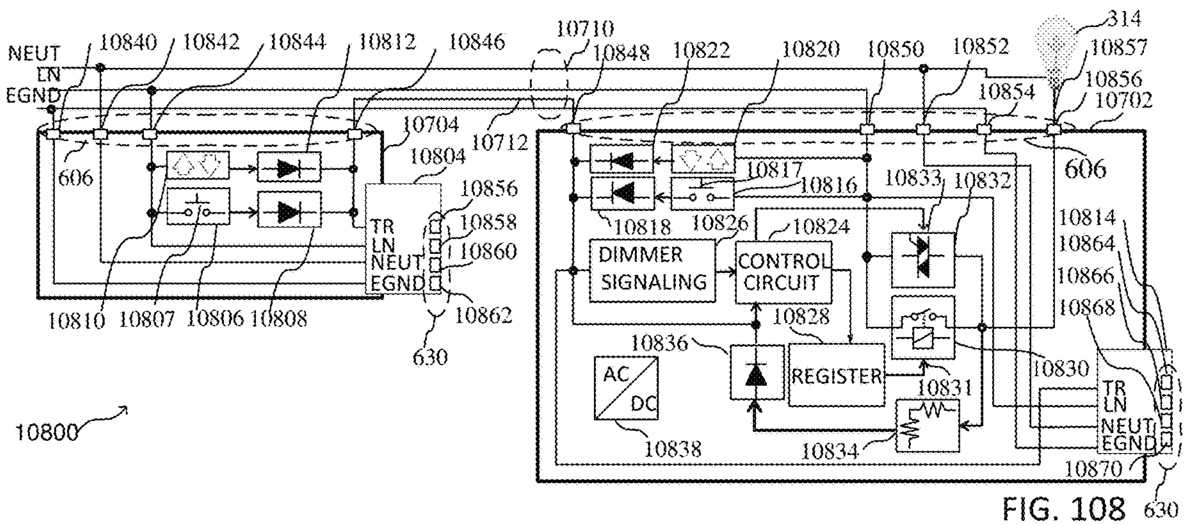
FIG. 108 is a block diagram of a multi-way switching configuration having a load-side power adapter and a companion power adapter.

Turning now to FIG. 108, a block diagram of a multi-way switching configuration 10800 having a power adapter 10702 (i.e., a load-side power adapter) and a power adapter 10704 (i.e., a companion power adapter) is shown. According to the configuration of the system of FIG. 108, the power adapter 10704, which would be implemented at a location other than the location providing power to a load, comprises a plurality of contact elements 10804, including contact elements for line, neutral and ground for providing reference voltages to a control module coupled to the power adapter 10704 and a contact element for receiving control signals from a control module coupled to the power adapter 10704 or from some other device by way of the traveler line 10712.

More particularly, the plurality of contact elements 10804 associated with the electrical interface 630 comprises a first contact element 10856 associated with the traveler line, a second contact element 10858 associated with the line voltage, a third contact element 10860 associated with the neutral voltage, and a fourth contact element 10862 associated with a ground voltage.

The electrical interface 606 of the power adapter 10704 comprises a contact element 10840 adapted to receive a ground voltage, a contact element 10842 adapted to receive a neutral voltage, a contact element 10844 adapted receive a line voltage, and a contact element 10846 adapted to be coupled to a traveler, and particularly traveler 10712 1s shown.

The electrical interface 606 of the power adapter 10702 comprises a contact element 10848 adapted to be coupled to a traveler, a contact element 10850 adapted to receive a line voltage, a contact element 10852 adapted to receive a neutral voltage, and a contact element 10854 adapted to receive a ground voltage. A lines 10857 is provided as a part of wiring from the power adapter 10702 to provide power to the load 314.

The power adapter 10704 may also comprise actuators adapted to enable a user to control the application of power to a load. According to the implementation of FIG. 108, the power adapter 10704 comprises a switch 10806, which may be a momentary switch or contact switch (i.e., enabling movement from a resting state and returned to a resting state after actuation) coupled to the line voltage for generating a pulse at the output of a signal generator 10808, which may be a diode rectifier or some other circuit for generating a pulse or some other signal indicating an actuation of the switch 10806 by a user engaging an actuator 10807 for example. The power adapter may optionally include a dimmer actuator 10810 coupled to the line voltage and adapted to generate a dimming signal at the output of a second signal generator 10812, which may also be a diode rectifier. The outputs of the signal generators 10808 and 10812 are coupled to the traveler line 10712 to apply any control signals on the traveler line, where the control signals can be processed by the power adapter 10702 or a control module attached to the power adapter 10702 or on a control module coupled to the power adapter 10704, as will be described in more detail below.

The power adapter 10702 comprises a plurality of contact elements 10814 that also comprise contact elements for receiving the line, neutral and ground voltages, and a contact element for receiving control signals on the traveler line. More particularly, the plurality of contact elements 10814 comprises a first contact element 10864 adapted to receive a traveler signal from the traveler line, a contact element 10866 adapted to receive the line voltage, a contact element 10868 adapted to receive the neutral voltage, and a contact element 10870 adapted to receive the ground voltage. It should be understood that the plurality of contact elements 10804 could be implemented on a PCB or other type of circuit board, or could comprise connectors having contact elements, such as a piece of formed metal that couples a contact element of the electrical interface 606 or a signal generator 10808 or 10812 to a contact element of the plurality of contact elements 10804. Similarly, the plurality of contact elements 10814 could be implemented as formed metal parts, or on a printed circuit board having other components of the power adapter 10702.

The power adapter 10702 may also comprise actuators for generating control signals that may be placed on the traveler line and routed to circuits of the power adapter 10702, including an actuator for one or both on/off control and dimming control. More particularly, a switch 10816 having an actuator element 10817 accessible by a user is coupled to a signal generator 10818, which may also be a diode rectifier or some other device for generating a pulse or some other signal for example, to generate a toggle control signal. A dimming actuator 10820 is coupled to the line voltage and adapted to generate a dimming signal at the output of a second signal generator 10822, which may also be a diode rectifier or some other device for generating a pulse or some other signal for example. According to one implementation, the signal generators 10818 and 10822 may comprise different devices to generate different signals that are detected by a control circuit 10824 of the power adapter 10702 or a control module coupled to the power adapter 10702. While a single dimming actuator 10820 is shown, it should be understood that separate dimming actuators and signal generators could be provided for both the increase (i.e., up) and decrease (i.e., down) functionalities associated with dimming.

Figure 110:
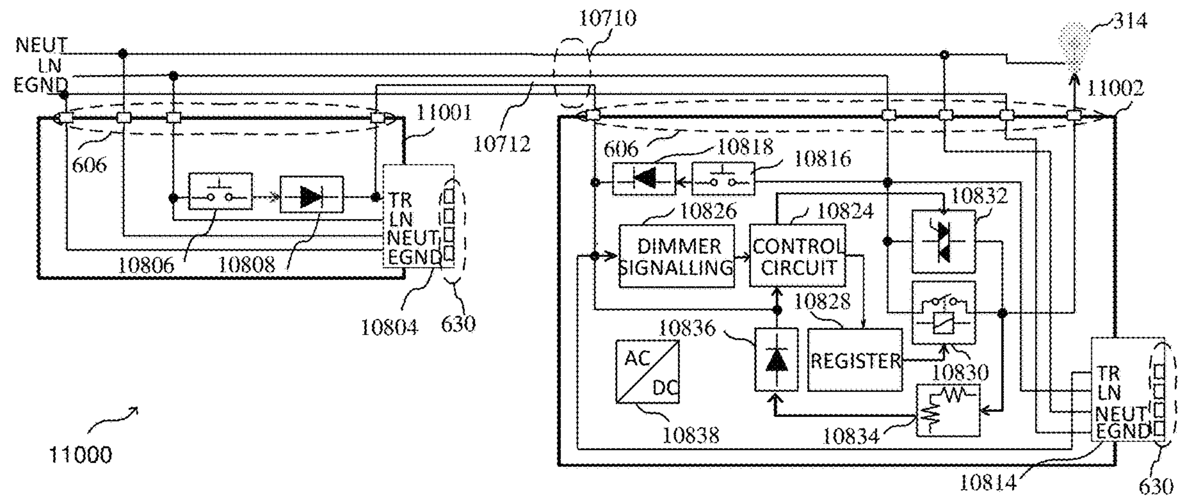
FIG. 110 is a block diagram showing the operation of the load side power adapter generating a switching signal.
Figure 111:
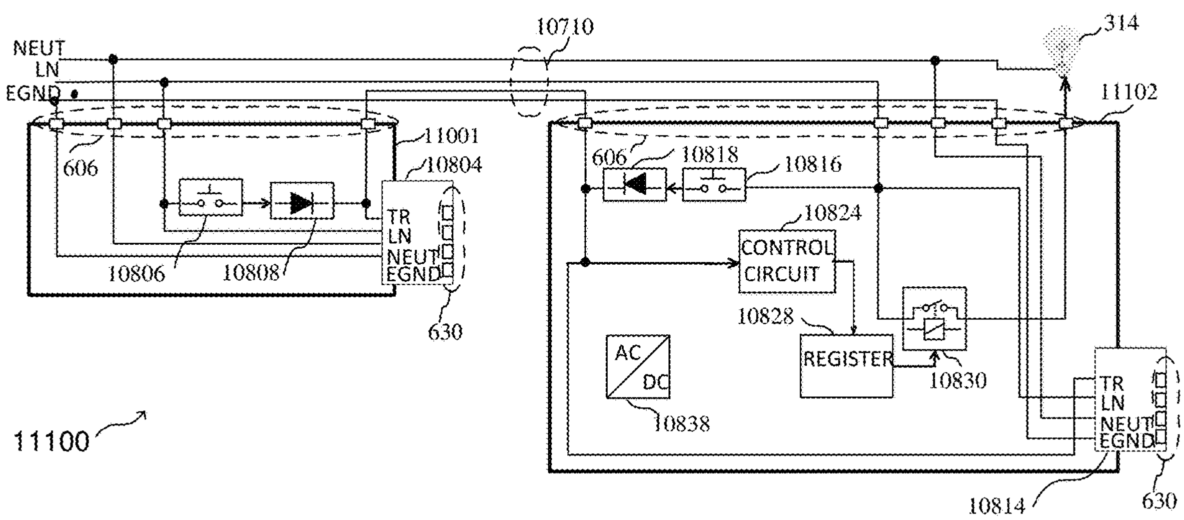
FIG. 111 is a block diagram showing a power adapter that eliminates the need for a control module.

A control circuit 10824 is coupled to the traveler line to receive signals from the power adapter 10704, the switch 10816, the dimming actuator 10820, or from a control module attached to either of the power adapters 10704 or 10702. A dimmer signaling circuit 10826 may be coupled between the traveler line 10712 and the control circuit 10824 to provide decoded dimming signals to the control circuit. The contact element 10822 is also directly coupled to the control circuit 10824 as shown. It should be noted that the dimmer signaling circuit 10826 and the dimmer actuator and dimmer signal generators are optionally included and could be eliminated from both power adapters 10702 and 10704 of FIG. 108 without additional changes to FIG. 108, where dimming functionality could be implemented by a dimmer actuator and dimmer signal generator implemented in a control module. That is, the dimming control signals could be provided to the traveler line by a control module attached to one or both of power adapters 10702 and 10704 as shown in FIGS. 110 and 111.

Figure 109:
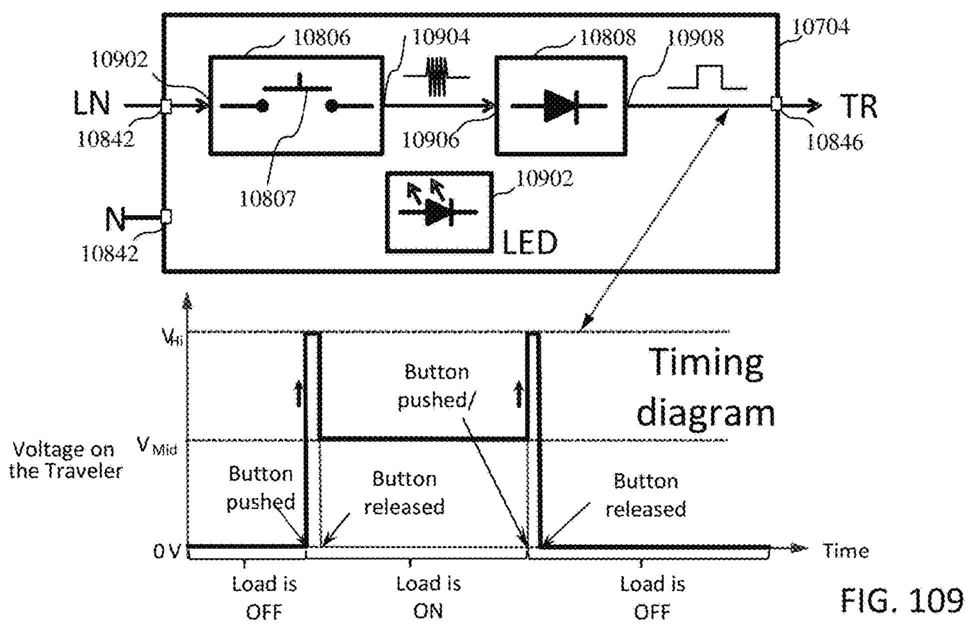
FIG. 109 is a block diagram showing the operation of the companion power adapter for sending a switching signal to the load side power adapter.

The control circuit 10824 may provide a control signal to a register 10828, which may be a flip-flop for example for storing a state signal to control the state of the switch 10830. The register controls the application of power to the load when the power adapter is not operating as a dimmer, in which case the dimmer would be turned off, such as by using a control signal from the control circuit to a control signal input 10833 of the dimmer to block any current path through the dimmer. The control circuit 10824 may also provide control signals to the dimmer circuit 10832 to control the application of power to the load when the power adapter is operating as a dimmer, in which case the switch 10830 would be off or disabled (i.e., an open circuit) such as by using a control signal to a control signal input 10831. A voltage divider 10834 is also provided at the output of a rectifier 10836 to generate the reference voltage $V_{Mid}$ shown in FIG. 109. The reference voltage $V_{Mid}$ enables the detection of whether power is applied to a load in response to the generation of a toggle signal, as shown in FIG. 109. An AC/DC circuit 10838 is provided to generate a DC signal for circuits of the power adapter.

In order to achieve interchangeability for the power adapter arrangements of FIGS. 107-120, the power adapters are able to receive contact elements of a control module even if the power adapter does not include a corresponding contact element for receiving a contact element that may be present in the control module. Therefore, in order to implement either of the power adapters 10702 and 10704 used in a multi-way switching arrangement or a single pole, single throw (SPST) switch as described in FIGS. 111 and 112, locations for receiving six contact elements may be provided in the power adapters 10702 and 10704 even if not all of the contact elements of control module make an electrical connection to the power adapter. As will be described in more detail below, only three contact elements are required in the electrical interface 630 of a power adapter having an outlet, four contact elements are required in the electrical interface 630 of the power adapters 10702 and 10704 used in a multi-way switching arrangement, and six contact elements are required in the electrical interface 630 for a single pole, single throw (SPST) switch as described in FIGS. 111 and 112. Therefore, all of the power adapters associated with the implementation of FIGS. 107-120 may be adapted to receive six contact elements of a control module to ensure interchangeability.

Turning now to FIG. 109, a block diagram shows one example of the operation of the power adapter 10704 for sending a switching signal on the traveler line, such as to the load side power adapter on the traveler line. A line voltage received at the contact element 10842 is provided to an input 10902 of the switch 10806, an output of which generated an output 10904 is coupled to an input 10906 of the signal generator 10808. A pulse is generated in output 10908 of the rectifier and provided to the traveler contact element 10846. As can be seen, a pulse is detected when a $V_{HI}$ signal is generated based upon a closing of the switch 10806 by a user pressing actuator 10807. The voltage on the traveler line will be at 0 V when power is not applied to the load, or at $V_{Mid}$ when power is applied to the load, where the voltage $V_{Mid}$ is generated by the voltage divider 10834. The voltage $V_{Hi}$ is generated at the output of the signal generator 10808 in response to the actuation of the switch, and then the voltage on the traveler line remains at $V_{Mid}$ while power is applied to the load (i.e., the light is on). When the switch 10806 is actuated again to turn off the load, another pulse is generated having the voltage $V_{Hi}$, and the voltage on the traveler line then returns to 0V as shown. It should be noted that the operation described in reference to FIG. 109 could apply to any of the contact switches, such as switch 10806 and 10816) of the power adapters of FIG. 108.

Turning now to FIG. 110, a system 11000 having a pair of power adapter arrangements comprising a remote power adapter 11001 and a power adapter 11002 without dimming control and no control modules attached to the power adapters is shown. According to the implementation of FIG. 110, the dimmer actuator 10810 and signal generator 10812 of the power adapter 10704 and the dimming actuator 10820 and signal generator 10822 of the power adapter 10702 are eliminated, and any dimmer signaling (i.e., the generation of dimmer signals) would be provided by signal provided on the traveler line by a control module having dimmer circuits, as will be a described for example in FIG. 116. The operation of the system 11000 is the same as described above in reference to FIG. 108 except that any dimming signal detected by the dimmer signaling circuit 10826 is generated by a control module attached to one of the power adapters, where the control circuit controls the dimming to the light using the dimmer circuit 10832 as described above.

While the system 11000 of FIG. 110 provides a simplification over the multi-way switching configuration 10800, the system 11100 of FIG. 111 provides a further simplification and eliminates the dimming functionality from the power adapter 11002. As shown in FIG. 111, a system having a pair of power adapter arrangements without dimming control and control modules attached is shown. The arrangement of FIG. 111 is beneficial because in many cases, a user may not desire to have dimming functionality. Accordingly, the power adapter 11102 has reduced components (i.e., no longer has dimmer signaling circuit 10826 and dimmer circuit 10832) and only provides switching functionality. The voltage divider 10834 and the rectifier 10836, which may be included to provide an indication of the state of the power to a load, may also be eliminated. That is, the power adapter 11002 may be modified to enable a control module to control the application of the power to the load using a dimmer circuit of the control module as will be described in more detail below in reference to FIG. 116.

Figure 112:
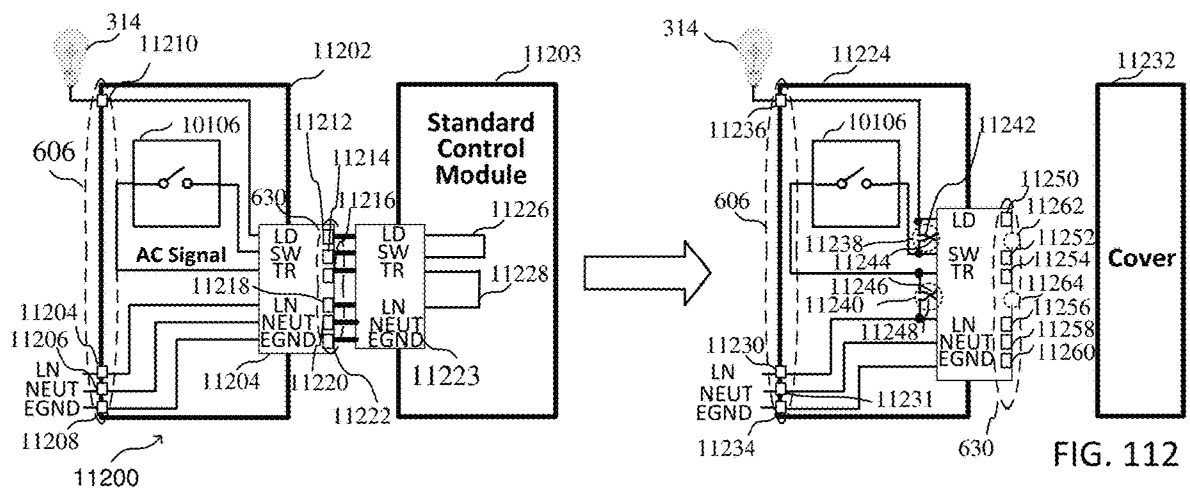
FIG. 112 is a block diagram showing a modification of a power adapter 11202 having a switch and a control module.

Additional modifications to power adapters having switches may eliminate the need for a control module for a single switch or provide additional functionality related to dimming control using control modules, as will be described in more detail in reference to FIGS. 112-120. Turning first to FIG. 112, a block diagram shows a modification of a power adapter 11202 having a switch and a control module 11203. According to one implementation, by providing connectors which have contact elements that break a connection within the power adapter or by providing switches within the power adapter, it is possible to eliminate the need for the control module 11203 for the power adapter 11202, and also reduce the number of locations of contact elements required for the group of power adapters to 6. That is, the T2 contact element of the power adapter 10102 may be eliminated, and the TR contact element may be used for routing both AC signals and DC signals, based upon the type of control module that is attached to the power adapter, as described in reference to FIGS. 113-120.

Describing first the arrangement of the power adapter arrangement 11200, the electrical interface 606 comprises a contact element 11204 for receiving a line voltage, a contact element 11206 for receiving a neutral voltage, a contact element 11208 for receiving a ground voltage, and a contact element 11210 for providing power to a load. The electrical interface 630 comprises a contact element 11212 for providing a signal to the load 314, a contact element 11214 for receiving a signal from the switch 10106, a contact element 11216 for providing a signal to the switch 10106, which may comprise an AC signal or a DC signal, a contact element 11218 for receiving a line voltage, a contact element 11220 for receiving a neutral voltage, and a contact element 11222 for receiving the ground voltage. The control module 11203 comprises a corresponding plurality of contact elements 11223 in the electrical interface 630, and also comprises a conductor element 11226 adapted to route signal between contact element 11214 and the contact element 11216. A conductor element 11228 is adapted to route a line voltage signal from the contact element 11218 to the contact element 11216. It should be noted the power adapter 11202 could be used with control modules receiving line, neutral and ground voltages, or control modules that control dimming and switching, such as control modules 10502 and 10602.

The electrical interface 606 of a power adapter 11224, which includes modifications to the power adapter 11202, comprises a contact element 11230 adapted to receive a line voltage, a contact element 11231 adapted to receive a neutral voltage, a contact element 11234 adapted to receive a ground voltage, and a contact element 11236 adapted to provide power to a load. The electrical interface 630 comprises a plurality of contact elements adapted to receive corresponding contact elements of a control module, including a contact element 11250 adapted to provide power to a load, a contact element 11252 adapted to provide a signal to the switch 10106, a contact element 11254 adapted to receive a signal from the switch 10106, a contact element 11256 adapted to receive a line voltage, a contact element 11258 adapted to receive a neutral voltage, and a contact element 11260 adapted to receive a ground voltage.

However, the power adapter 11202 can be modified according to some implementations as shown to eliminate the need for the control module 11203. More particularly, the power adapter 11224 is a modified power adapter based upon power adapter 11202 but includes connectors 11238 and 11240 to eliminate the need for a standard control module, allowing a cover 11232 to be optionally used in its place. The connector 11238 comprises a first contact element 11242 and a second contact element 11244 that are electrically connected to enable the transfer of voltage and current from a terminal of the switch 10106 to which the contact element 11244 is connected to the contact element 11236 to which the contact element 11242 is connected. The connector 11240 comprises a first contact element 11246 and a second contact element 11248 that are electrically connected to enable the transfer of voltage and current from the line contact element 11230 to which the contact element 11248 is connected to the other terminal of the switch to which the contact element 11246 is connected. Accordingly, the connectors 11238 and 11240 enable the routing of current from the contact element 11230 to the load by way of the switch 10106 without the use of a control module.

Figure 113:
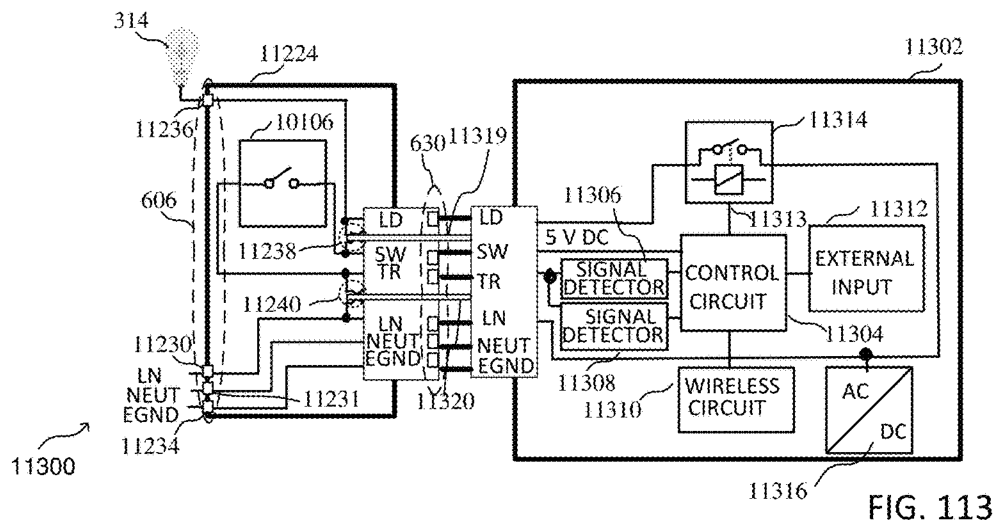
FIG. 113 is a block diagram of a power adapter arrangement having a switch and a control module having a switch and wireless control.
Figure 114:
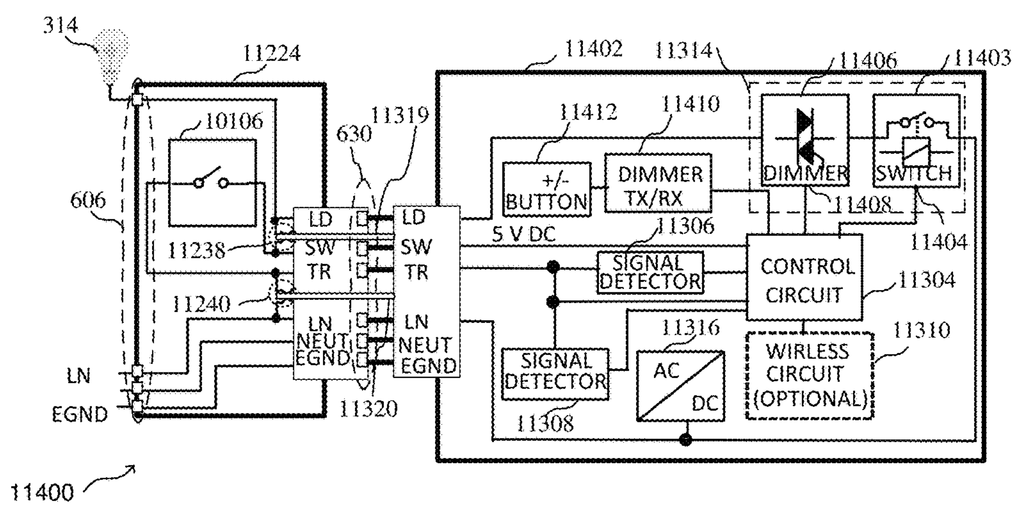
FIG. 114 is a block diagram of a power adapter arrangement having a switch and a control module having a dimmer circuit with wireless control.

For each of the connectors 11238 and 11240, the contact elements of the connectors can be separated by an actuator of a control module to enable the routing of the line voltage through the control module to the load, as described above in reference to FIGS. 95 and 96 and in more detail in reference to FIGS. 113 and 114. The power adapter 11224 also comprises a plurality of openings, such as openings in a housing as will be described in more detail below, for receiving actuators of a control module. The power adapter 11224 may comprise a first opening 11262 coupled to receive an actuator for breaking an electrical connection between the contact elements 11242 and 11244, and a second opening 11264 for receiving an actuator for breaking an electrical connection between to the contact elements 11246 and 11248. While only two openings are shown by way of example, it should be understood that additional openings could be provided, such as three openings as described in reference to FIG. 116.

Turning now to FIG. 113, a block diagram of a power adapter arrangement 11300 having a switch and a module having a switching circuit and wireless control is shown. When a control module providing switching functionality, such as a switch that may be wirelessly controlled or a switch having a motion sensor for example, is coupled to the power adapter, an actuator element 11319 is used to open the connector 11238 and an actuator element 11320 is used to open the connector 11240 (i.e., break the electrical connections between the contact elements of connectors) as shown, allowing the control module to control the application of power from the line contact to the load contact. The switch 10106 is now used to route a DC signal to detect an actuation of the switch 10106 by a user engaging an actuator on the power adapter 11224. A control circuit 11304 is coupled to a signal detector 11306, which may be a voltage detector for example, to detect a switching of the switch 10106. A signal detector 11308, which may be a pulse detector for example, is used to detect a signal on the traveler (TR) contact element of the electrical interface 630 when the control module 11302 is used in a power adapter 11224 for example. The operation of the signal detector 11308 enables the use of the control module 11302 with a power adapter associated with a multi-way power adapter arrangement by detecting a signal such as a pulse on a traveler line, as will be described in more detail in reference to FIGS. 115-120. According to the implementation of FIG. 113, the control circuit 11304 controls the switch 11314 by a control signal provided to a control input 11313 of the switch 11314 to control the path of the line voltage received at an input of the switch 11314 to an output of the switch coupled to the LD contact element of the electrical interface 630 coupled to a load through the power adapter 11224 as shown. The switch 11314 may comprise a relay or a solid-state switching device for example. An optional wireless communication circuit 11310 or a circuit 11312 for receiving an external input (e.g., a signal from a motion sensor or an input by a user on a user interface of the power adapter) may be coupled to the control circuit 11304 to control the application of power to the load by way of the switch 11314. An AC/DC circuit 11316 is also provided to provide a DC signal for the control module.

Turning now to FIG. 114, a block diagram of a power adapter arrangement 11400 having a switch and a control module having a dimmer circuit with wireless control is shown. The control module 11402 of FIG. 114 is similar to the control module 11302, except that the switch 11314 also provides dimming functionality. More particularly, the switch 11314 comprises a switch 11403 coupled to receive a switching control signal at an input 11404 and a dimmer circuit 11406 coupled to receive a dimming control signal at an input 11407. While both a dimmer circuit and a switch are shown, it should be understood that the switch could be eliminated by using a dimmer circuit that can operate as a switch to enable an on/off function of the control module. A dimmer transmitter and receiver circuit 11410 is coupled to the control circuit 11304 to receive a dimming control signal from a dimmer actuator 11412 generated in response to an actuation by a user. It should be noted that the power adapter 11224 could be implemented with any control module that does not control switching of the power to a load, but only receives the line, neutral and ground voltages as will be described in more detail below.

Figure 120:
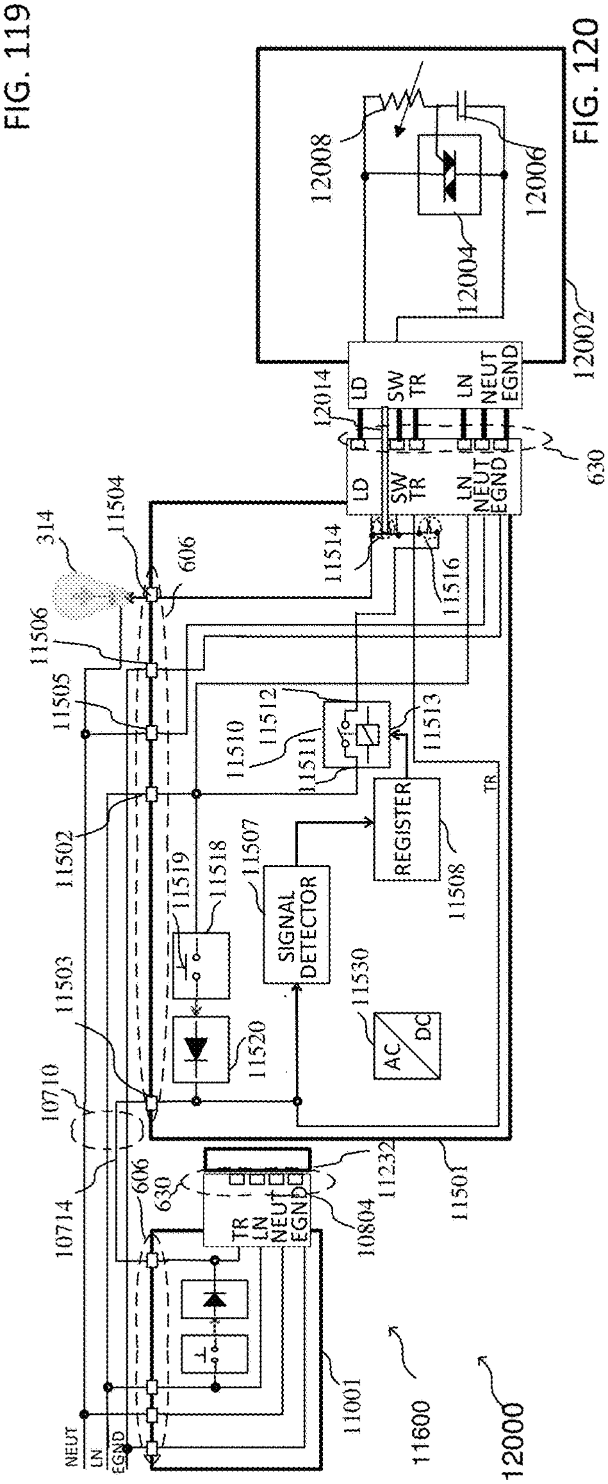

While examples of switching in FIGS. 113 and 114 are provided by way of example, it should be understood that control modules having other functionality related to switching, such as motion detection, or other functionality associated with DC circuits could also be implemented. For example, a control module 12002 of FIG. 120 could be implemented with the power adapter 11224, where only a single actuator would break the connection for the connector 11238, and the line power would be routed from the line contact element through the switch 10106 to the control module 12002, as shown in FIG. 120. That is, the line power would be provided to the control module 12002 and the output dimmed signal would be provided to the load contact element and the load.

As described above in reference to FIGS. 112-114, a power adapter that is configured to be used in a power adapter arrangement that can operate as a switch without a control module, as will be described in reference to FIGS.

Figure 115:
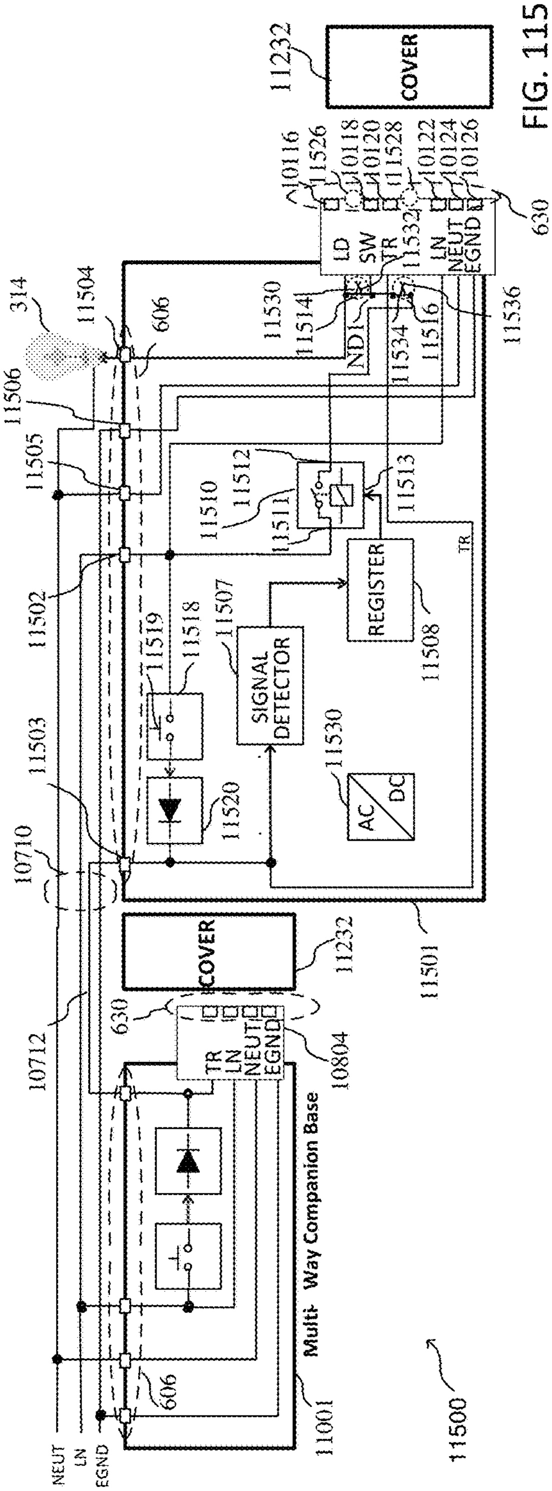
FIG. 115 is a block diagram of a power adapter in a 3-way switching arrangement.

115-120. That is, a power adapter such as the power adapter 10702 of FIG. 110 for example could be modified to include connectors that allow the power adapter to be used without a control module, but may include a cover. Turning first to FIG. 115, a block diagram of a power adapter 11501 in a multi-way switching arrangement 11500, provided here by way of example as a 3-way switching arrangement is shown. The electrical interface 606 comprises a first contact element 11502 that may be coupled to receive a line voltage, a second contact element 11503 adapted to be coupled to a traveler line, a third contact element 11504 adapted to be coupled to a load, a fourth contact element 11505 adapted to receive a neutral voltage, and a fifth contact element 11506 adapted to receive a ground voltage. As shown in the implementation of FIG. 115, neither power adapter 11001 nor power adapter 11501 is coupled to a control module. A signal detector 11507 of the power adapter 11501 (which may be a pulse detector for example) will detect the actuation of the actuator 10807 of the switch 10806 of the power adapter 11001 or actuator 11519 of the power adapter 11501 to control the state of the switch 11510 and therefore the power to the load.

According to the implementation of FIG. 115, a signal detector 11507 is coupled to the traveler line by way of the contact element 11503 and may receive a signal from the switch of the power adapter 11001, from a control module attached to the power adapter 11001 and providing a signal on the traveler line by way of the electrical interface 630, from the switch 11520 of the power adapter 11501, or from a control module attached to the power adapter 11501. The signal detector 11507 provides a signal to the register 11508, which stores the signaled to control the state of the switch 11510, and particularly for routing the line voltage received at the contact element 11502 from an input 11511 to an output 11512 of the switch 11510 in response to a control signal received at a control input 11513. The power adapter may also include openings 11526 and 11528.

The electrical interface 630 comprises a contact element 10116 coupled to the load contact element 11504 (and the contact element 11530 of the connector 11514), a contact element 10118 coupled to the node ND1 (and both the second connector of the contact element 11514 and the output 11512 of the switch 11510), a contact element 10120 coupled to the traveler contact element 11503, a contact element 10122 coupled to the line contact element 11502, a contact element 10124 coupled to the neutral contact element 10505, and a contact element 10126 coupled to the ground contact element 11506. When no control module is attached to the electrical interface 630, the output 11512 of the switch 11510 is coupled directly to load contact element 11504 without making an electrical connection to any other element. The traveler contact element 11503 is coupled to the traveler contact element 10120, but does not make an electrical connect to any other contact element of the electrical interface 630.

In a similar manner as discussed above in reference to FIG. 110, the power adapter 11202 can be modified according to some implementations to eliminate the need for the control module 11203. More particularly, portions of the electrical interface 630 of the power adapter 11501 are modified to include connectors 11514 and 11516 to eliminate the need for a standard control module, allowing a cover 11232 to be optionally used in its place.

The connector 11514 comprises a first contact element 11530 and a second contact element 11532 that are electrically connected to enable the transfer of voltage and current from a node (ND1) coupled to the SW contact element 10118 (i.e., a node where the contact element 11532, contact element 11534 and the SW contact element 10118 are all electrically connected) to which the contact element 11532 is connected to the contact element 11504 to which the contact element 11530 is connected.

The connector 11516 comprises a first contact element 11534 and a second contact element 11536 that are electrically connected to enable the transfer of voltage and current from the output 11512 of the switch 11510 to which the contact element 11536 is connected to the node ND1 to which the contact element 11534 is connected. Accordingly, the connectors 11514 and 11516 enable the routing of current from the switch 11510 to the load without the use of a control module.

For each of the connectors 11514 and 11516, the contact elements of the connectors can be separated by an actuator, such as an actuator of a control module, to enable the routing of the line voltage through the control module to the load, as described above in reference to FIGS. 95 and 96 and FIGS. 113 and 114. The power adapter 11501 also comprises a plurality of openings 11526 and 11528, such as openings in a housing as will be described in more detail below, for receiving actuators of a control module. That is, the power adapter 11501 comprises a first opening 11526 coupled to receive an actuator for breaking an electrical connection between the contact elements 11530 and 11532, and a second opening 11528 for receiving an actuator for breaking an electrical connection between contact elements 11534 and 11536. While only two openings are shown by way of example, it should be understood that additional openings could be provided, such as three openings as described in reference to FIG. 116.

Figure 116:
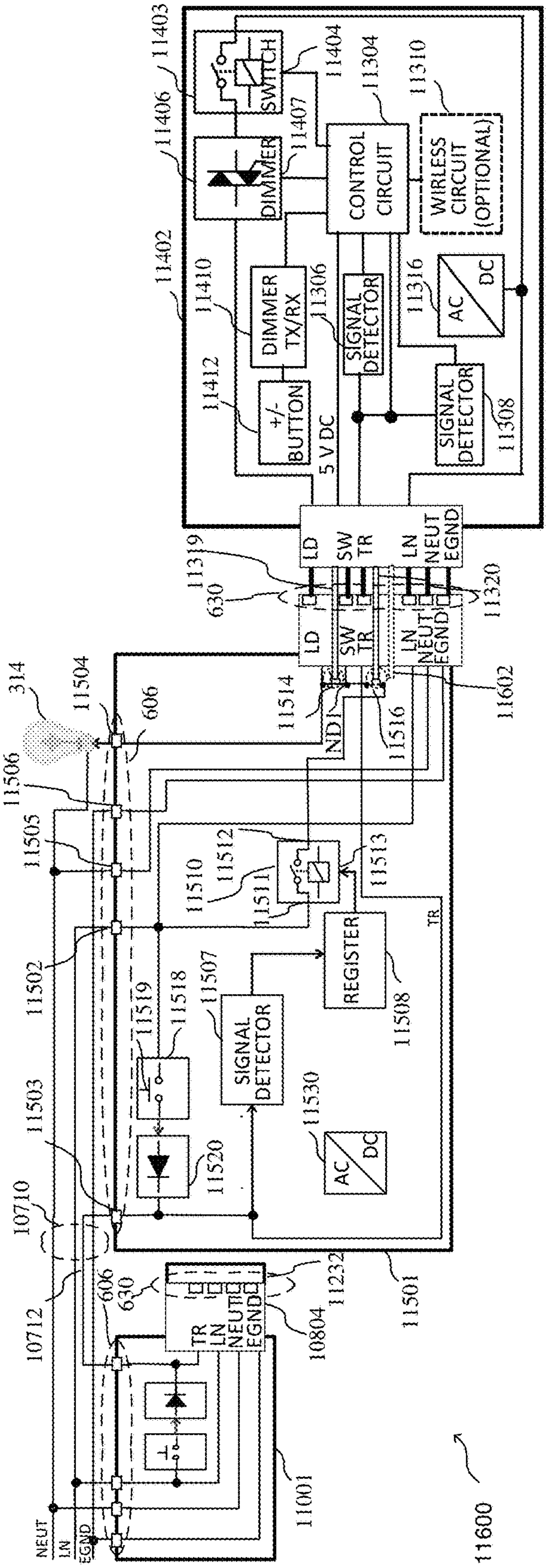
FIG. 116 is a block diagram of a power adapter having a dimming module in a 3-way switching arrangement.

Turning now to FIG. 116, a block diagram of a power adapter having a dimming module in a 3-way switching arrangement 11600 is shown. The dimming control module is used with the power adapter 11501 that is attached to the load to control the application of the power to the load. As can be seen, the actuator element 11319 opens the connector 11514 and the actuator element 11320 opens the connector 11516. Accordingly, the power adapter arrangement comprising the power adapter 11501 and the control module 11402 operates similar to the power adapter arrangement of FIG. 113. More particularly, when both connectors 11514 and 11516 are open, the switch 11510 does not operate in the power adapter arrangement, and the application of power applied to the load is controlled by the control module which receives the line voltage at the LN contact element of the electrical interface 630 and the switch 11403 is controlled to provide power to the LD contact element of the electrical interface and applied to the load at contact element 11504. That is, the output 11512 of the switch is completely isolated from the contact element 11504. The control module 11402 will receive the line voltage, and the load voltage, and will receive signals on the traveler contact element TR of the electrical interface 630. Therefore, the control module will respond to any toggling of the switch 11518 of the power adapter 11501 or a toggling of the switch 10806 of the power adapter 11001. However, as will be described in reference to FIG. 120, only the connector 11514 is open when a different type of dimmer circuit is used.

It should be noted that a third actuator 11602 may be implemented to enable compatibility with power adapter 11224 implementing a single switch, such as the power adapter shown in FIG. 112. That is, it may be beneficial to implement the control modules where the opening 11528 of the power adapter 11501 does not align with the opening 11264 of the power adapter 11224.

Figure 117:
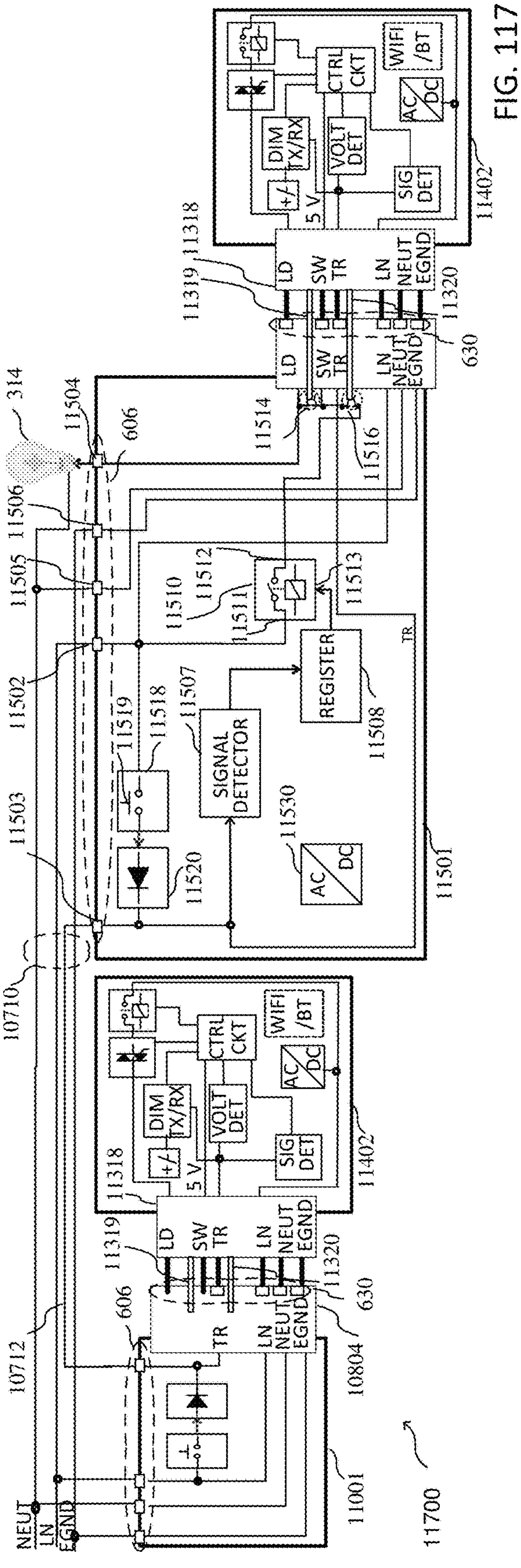
FIG. 117 is a block diagram of a 3-way switching arrangement having a dimmer module on both a companion power adapter and the load side power adapter.
Figure 118:
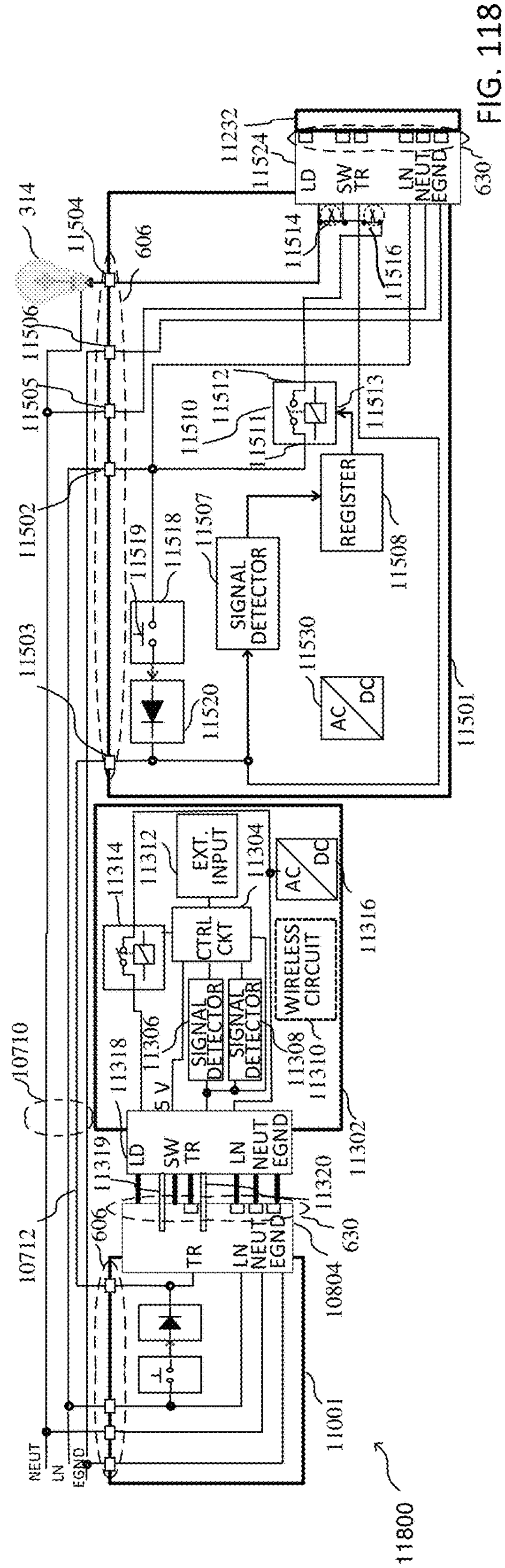
FIG. 118 is a block diagram of a 3-way switching arrangement having a wirelessly controlled switch module on a companion power adapter.

Turning now to FIG. 117, a block diagram of a 3-way switching arrangement 11700 having a dimmer module on both a companion power adapter and the load side power adapter is shown. It should be noted that the control module 11402 coupled to the power adapter 11501 will control the power to the load, while the control module 11402 coupled to the power adapter 11001 will only transmit dimming signals on the traveler that are detected and processed by the control module 11402 coupled to the power adapter 11501.

Turning now to 118, a block diagram of a 3-way switching arrangement 11800 having a wirelessly controlled switch module on a companion power adapter is shown. The control module 11302, does not operate to control the application of power to load, but rather for purposes of sending signals on the traveler line, such as an actuation signal received by a user selecting an actuator of power adapter 11001 or 11501, or some other signal, such as a signal received by the wireless communication circuit. It should be noted that any signal generated on the traveler line 10710 by the control module 11302 is detected by the signal detector. Because a control module is not attached to the power adapter 11501, only an actuation associated with toggling the switch 11510 will be performed by the power adapter 11501.

Figure 119:
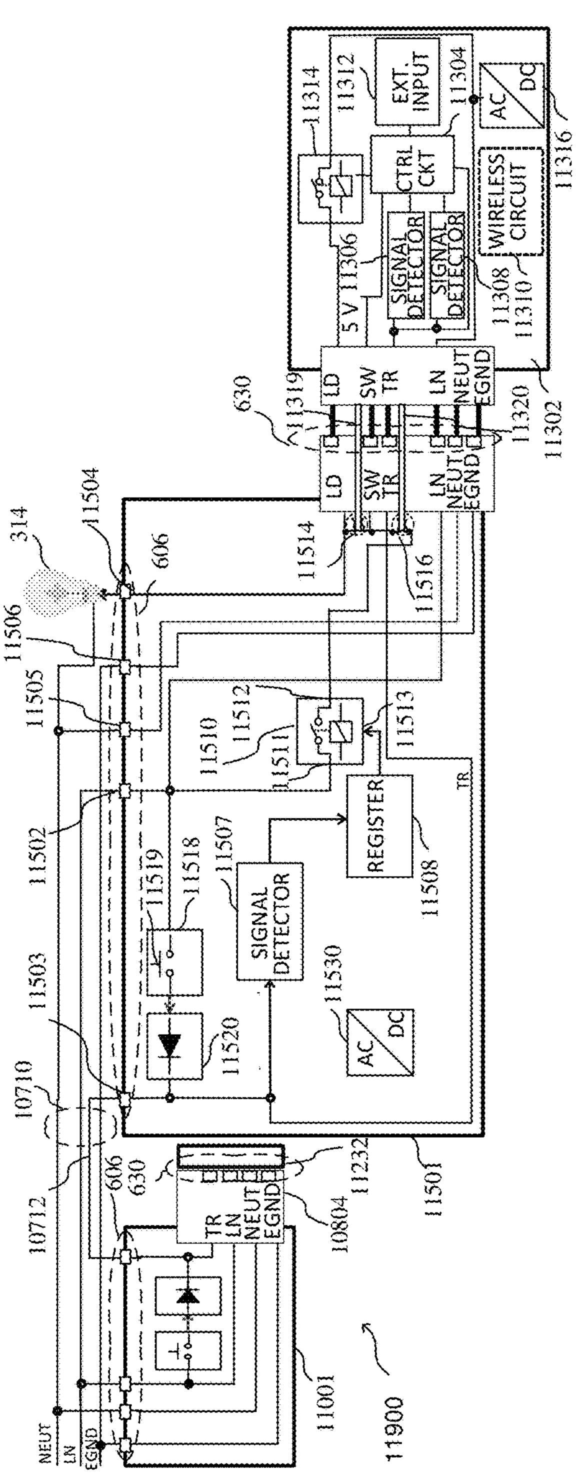
FIG. 119 is a block diagram of a 3-way switching arrangement having a wirelessly controlled switch module on a companion power adapter.

Turning now to FIG. 119, a block diagram of a 3-way switching arrangement 11900 having a wirelessly controlled switch module on a companion power adapter is shown. When the control module 11302 is coupled the power adapter 11501, the switch 11314 of the control module 11302 controls the application of the power to the load. The switching control module 11302 may be a control module having wireless connectivity or a motion sensor for example as an external input. Control signals for controlling the application of power to the load can be detected by a signal detector, such as the signal detector 11306 which may be adapted to detect a pulse associated with an actuation of a switch (e.g., a togging of a switch of the power adapters 11001 and 11501) or signal detector 11308 which may detect a dimming signal or some other signal. While two signal detectors are shown, such as one for detecting a pulse associated with a togging of a switch of the power adapters 11001 and 11501, it should be understood that a single detector could be used, or signals could be detected directly by the control circuit. That is, as in the implementation of FIG. 119, the output 11512 of the switch 11510 is isolated from the LD contact element 11504.

Turning now to FIG. 120, a block diagram of a 3-way switching arrangement 12000 having control module 12002 on a load side power adapter is shown. The control module 12002 controls the dimming functionality directly to the load. The control module 12002 comprises a dimmer not requiring an AC/DC circuit, and therefore does not require the line voltage. The dimmer circuit comprises a TRIAC 12004, a capacitor 12006, and a variable resistor 12008 as described above. A single actuator 12014 is provided to break the electrical connection of the contact elements of the connector 11514. Therefore, the output of the switch 11510 is not provided to the LD contact element 11504, but rather provided to the control module 12002 by way of the SWC contact element of the electrical interface 630. While the switch 11510 controls the application of power to the control module 12002, the control module 12002 controls application of the dimmed power signal to the LD contact element of the electrical interface 630.

As with any manufactured product, it is beneficial to minimize the amount of materials used during the manufacture of the product, minimize the amount of wasted materials used during the manufacture of the product, and minimize the amount of material that may eventually end up on a landfill if the product is discarded. For some consumer products, the effect of the overall volume of the product can depend on the environment in which the product is used. For example, if the product is installed, any effect of the volume and shape of the product during the installation process may depend upon the volume of the junction box used and the number of wires in the junction box. The design of power adapters and the control modules, individually and in combination, reduce the amount of material required, both from the standpoint of material required during the manufacture of power adapters and control modules and the amount of room of the junction box that it occupied by the power adapter. As will be described in more detail below, the power adapter arrangements minimize the volume of the junction box occupied by the power adapter arrangement, making the installation process of the power adapter arrangement easier for an electrician.

Turning now to FIG. 121, a power adapter arrangement having a power adapter and a control module comprising an outlet is shown with a wall plate. The expanded view 12100 of the power adapter arrangement and wall plate of FIG. 121 comprises a standard outlet control module 12102 having an outlet and a power adapter 12104 having an outlet, and a wall plate 12106. Rather than receiving a control module, the power adapter may instead receive a cover, as will be described in more detail in reference to FIG. 126. The standard outlet control module 12102 comprises a front surface 12108 having openings of the outlet for receiving prongs of a plug and enabling the electrical connection of the prongs to contact elements of the control module, as will be described in more detail in reference to FIG. 122. More particularly, the openings may comprise an opening 12110 for receiving a neutral contact of a plug which provides power to a load, an opening 12112 for receiving a power contact of a plug that receives a line voltage, and an opening 12114 for receiving a ground contact of a plug that receives a ground voltage.

The standard outlet control module 12102 may also comprise a latch. According to one implementation, a latch 12115 may comprise a planar surface 12116, an end 12117 which can be pushed to allow the latch to rotate and allow the opposite end 12118 and a grip portion 12120 of the latch to be exposed. The grip portion 12120 enables a user to grip the latch and remove the control module by pulling the standard outlet control module 12102 from the power adapter 12104. The latch 12115 also comprises an opening 12122 that leads to a guide 12124 for receiving a corresponding latch element of the power adapter 12104 (shown as latch element 12561 in FIG. 125 or latch element 12810 of FIG. 128 for example) to retain the control module in the power adapter. The guide may be implemented as a channel, having walls on two sides for receiving an attachment element of the power adapter as show, or may be a guide having a single wall as will be described in more detail below.

Figure 122:
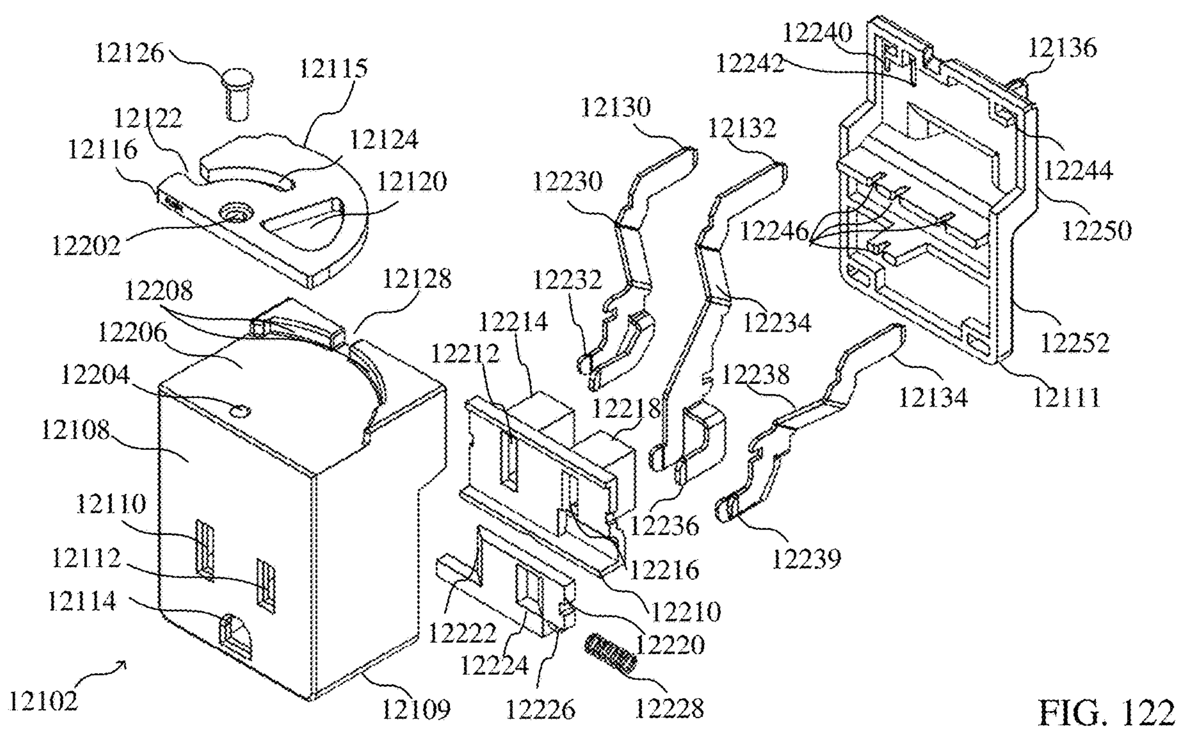

The latch 12115 is movably coupled to a body portion including a front housing 12109 of the control module by an attachment element 12126, such as a screw or rivet for example, which may comprise a metal or plastic material. The body portion may also comprise a rear housing 12111. The rear housing 12111 comprises a top portion 12250 and a bottom portion 12252 (as shown in FIG. 122) that creates an indented portion 12186 that reduces the volume of the control module. That is, the depth $D_2$ of the lower portion is less than the depth $D_1$ of the upper portion because the standard outlet control module 12102 does not require the additional space. However, control modules may require the additional space as will be described in more detail below, and $D_2$ will be greater than $D_1$.

Figure 123:
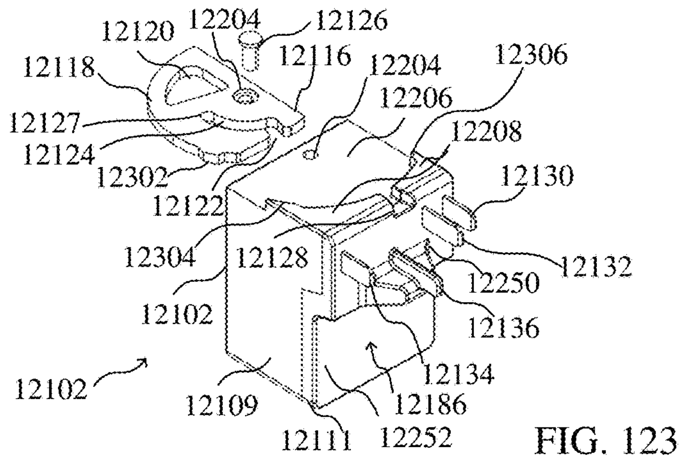

When the latch 12115 is rotated (e.g., clockwise as shown in FIG. 123), the opening 12122 is aligned with a corresponding guide 12128 of the body portion. The guide may comprise a channel, and lead to an opening of a corresponding guide of the latch. That is, the opening 12122 aligns with the guide 12128 so that a latch element (shown as latch element 12561 in FIG. 125 or latch element 12810 of FIG. 10 for example) of the power adapter may extend through the guide 12128 of the front and rear housing and the opening 12122 and into the guide 12124. When the latch 12115 is rotated back counterclockwise, the latch element of the power adapter travels through the guide to the end 12127 of the guide opposite the opening 12122, causing the control module to be secured to the power adapter. While the latch 12115 is one type of latch that is shown by way of example, it should be understood that other types of latches could be implemented to attach the control module to the power adapter. The control module has a height H1 and a width W1, which is the same width as the housing portion 12150. When the control module is inserted into the power adapter, the control module and the housing portion 12150 occupy the opening 12184 of the wall plate. The control module extends from the top of the latch 12115 to the bottom 12169 of the control module.

Various control modules may also comprise contact elements for establishing electrical connections, and actuator elements, as will be described in more detail below in reference to FIGS. 135 and 136. The actuator elements may comprise elements for breaking a connection between contact elements of a power adapter or engaging a corresponding actuator element of a tamper resistance element associated with a power adapter to enable electrical connections between contact elements of the control module and the power adapter, as will be described in more detail below in reference to FIGS. 135 and 136. The standard outlet control module 12102 comprises an outlet for example and may not require any actuator elements for breaking a connection between contact elements of a power adapter. For example, if the control module is not used for controlling the application of power to a load in a power adapter having a switch, actuator elements for breaking a connection between contact elements of a power adapter may not be required. That is, some control modules may be passive control modules that do not affect switching of a load controlled by a power adapter having a switch.

An actuator element for breaking a connection may comprise projections, such as a non-conductive projection for engaging with contact elements of the power adapter to break an electrical connection between two contact elements of the power adapter. More particularly, the contact elements of the control module enable an electrical connection to a contact element of the power adapter, while the actuator elements may comprise projections or prongs, which may be formed of a plastic material or some other insulating material, which break connections between contact elements of the power adapter. Alternatively, the actuator element may engage a switch of the power adapter to change a state of the switch, such as a mechanical or electrical switch, and change the electrical circuit configuration, such as by breaking an electrical connection of the power adapter. An actuator element that is used to change an electrical circuit configuration of a power adapter may comprise any element that engages a corresponding element of the power adapter to change the electrical circuit configuration.

According to some implementations, an actuator element for engaging a tamper resistance element associated with a power adapter may move the tamper resistance element of the power adapter (e.g., a shutter element having openings for receiving contact elements of the control module) that is used to cover contact elements of the power adapter to prevent any inadvertent contact with a contact element coupled to a line contact element or a neutral contact element that provides a return current path or a high voltage contact element, such as a contact element receiving a 120 V AC power signal, as will be described in more detail below.

As shown in FIG. 121, the standard outlet control module 12102 comprises a contact element 12130 for receiving a neutral voltage (e.g., a contact element coupled to a contact element of the power adapter receiving the neutral voltage from the junction box), a contact element 12132 for receiving a ground voltage (e.g., a contact element coupled to the ground contact element of the power adapter that receives a ground voltage of the junction box), and a contact element 12134 for receiving a power voltage (e.g., a contact element coupled to a contact element receiving the AC power line voltage from a power line of the junction box).

The standard outlet control module 12102 also comprises an actuator 12136 that is adapted to engage a tamper resistance element of the power adapter 12104 and move the tamper resistance element to enable the contact elements 12130, 12132 and 12134 of the control module to engage corresponding contact elements of the power adapter. That is, a tamper resistance element is designed to prevent inadvertent contact with one or more power contact elements of the power adapter (e.g., line and neutral contact elements) when the control module is removed but enable connections between contact elements of the control module and contact elements of the power adapter when the control module is attached to the power adapter. Additional details related to the contact elements and actuator elements of the standard outlet control module 12102 will be provided below in reference to FIGS. 135 and 136.

The power adapter 12104 comprises a yoke 12140, also known as a strap, which enables the power adapter to be secured to a junction box in a wall for example. The yoke comprises flanges 12141 on the top and bottom as shown as having threaded portions 12144 for receiving screws for securing a wall plate to the power adapter and openings 12146 for receiving screws for securing the power adapter to a junction box. The yoke 12140 is generally positioned between a rear housing 12148 and a front housing portion 12150 that may comprise openings for receiving prongs of the plug that make an electrical connection to corresponding contact elements of the power adapter. More particularly, the front housing portion 12150 may comprise a first opening 12152 for receiving a neutral prong of a plug and opening 12154 for receiving a power prong (e.g., line voltage prong) of the plug, and an opening 12156 for receiving a ground prong of the plug.

As also shown in FIG. 121, the wall plate 12106 comprises an inner wall portion 12182 that will extend around the front housing portion 12150 and the control module when the control module is attached to the power adapter and will be generally adjacent to the yoke 12140 when the wall plate is attached to the yoke, such as by way of screws that may extend through screw openings 12183. The wall plate extends from side portions 12180 to the inner wall portion 12182 associated with the opening 12184, where the inner wall portion is adjacent to the sides of the front housing portion 12150 and the standard outlet control module 12102. According to some implementations, the front housing portion 12150 and the standard outlet control module 12102 may extend through the opening 12184, such as by approximately 1.0 mm to 1.5 mm. While a wall plate having holes for receiving a screw is shown, it should be understood that a screwless wall plate could be implemented. The control module will also be able to be removed or inserted through and opening 12184 of the wall plate when the wall plate is attached to the yoke, as will be described in more detail below in reference to the operation of the latch 12115.

The rear housing 12148 comprises vents 12158, shown here by way of example on the side of the power adapter, which enable the transfer of air through the power adapter, including for example the release of air above an ambient temperature from the control module and the power adapter. Vents may also be included in other locations, such as vents 12160 shown on the top of the power adapter. As is shown in FIG. 121, a planar surface 12149 of the rear housing is below the vents 12160. That is, the rear housing 12148 may be formed to provide enough room for the outlet behind the housing portion 12150, while minimizing the amount of volume of the junction box that is occupied by the power adapter by forming the planar surface 12149 below the surface having the vents 12160.

The outer surface of the power adapter may also comprise contact elements, such as a contact element 12162, which may be threaded to receive a screw adapted to be coupled to a ground line in the junction box. The contact elements 12164 and 12166, also shown here by way of example as receiving screw contacts, enable a connection to a line power wire of the junction box. As will be described in more detail below, the contact elements 12164 and 12166 also comprise threaded portions to receive a screw contact and are connected by a tab 12168. The contact elements 12164 and 12166 can be separated (i.e., electrically isolated) by cutting the tab 12168 for separately wiring the outlet associated with the front housing portion 12150 to make that outlet a switched outlet which can be controlled by a switch on the wall for example. Another pair of contact elements for providing a neutral connection to the outlet is also provided (e.g., on the opposite side of the power adapter having contact elements 12164 and 12166 for example) as shown by connector 12510 in the expanded view of the power adapter 12104 of FIG. 125. While contact elements 12162, 12164, and 12166 having screws are shown by way of example, it should be understood that the contact elements adapted to be coupled to the wires of the junction box may also comprise wires, such as wires extending from a printed circuit board (PCB) for example.

A recess 12170 is adapted to receive the standard outlet control module 12102, where vents 12172 (which may be similar to and opposite to the vents 12158) can be seen from the inside of the recess. Because the recess 12170 is accessible to a user of the power adapter when the control module is removed from the power adapter, the vents 12158 and 12172 are designed to prevent any objects which may make contact with one or more live electrical parts (e.g., neutral and line voltages) in the junction box from being inserted through the vents. By way of example, the vents may be designed to prevent a probe from extending through the vent and into the junction box. The vents could be designed according to any standard of safety to prevent an object inserted in the recess 12170 from extending through the vents. For example, a probe could be approximately 2 inches long and have a diameter of approximately 0.031 inches with a 0.002 inch radius on the end of probe. The probe could be made of a metal material such as steel and could have an appropriate stiffness to prevent bending, such as a Rockwell hardness value between C58 to C60.

Referring to a power adapter having an outlet as shown in FIG. 121, the length of the prongs of a plug (i.e., how far the prongs extend past the front of the portion of the housing portion 12150 receiving the prongs of the plug) determine a minimum depth that the portion having the outlet would have to be to receive a plug, and where the planar surface 12149 in placed. That is, in order to receive the prongs of a plug in an outlet, the portion of the rear housing 12148 would have to extend at least a minimum distance from the front of the housing portion 12150. In order for the control modules to be compatible with both power adapters having outlets and power adapters having switches, the electrical interface within the recess for receiving control modules of the power adapters having outlets and power adapters having switches are provided at the same location. Provided that there is enough volume to retain all of the elements of a power adapter having a switch (i.e., the elements for switching power to a load or sending a signal on a traveler line for example), the portion of power adapter having a switch can also have a reduced amount of material, as will be described in reference to FIG. 131 for example.

In addition to a reduced volume of the power adapter, the volume of a control module, such as the standard outlet control module 12102 as shown, may be reduced by providing a depth $D_2$ of the control module extending to a minimum depth required to receive prongs of a plug. That is, while a portion of the control module extends to a depth $D_1$ to allow for the contact elements of the control module to make an electrical connection to corresponding contact elements of the power adapter, the overall volume of the control module can be reduced by reducing the depth of the control module behind the outlet of the control module. As will be described in more detail below in reference to FIGS. 135 and 136, the overall volume of the power adapter arrangement is reduced by providing the contacts at a depth $D_1$, where the depth of the recess 12170 is greater than $D_1$.

Turning now to FIG. 122, an expanded view of the standard outlet control module 12102 having an outlet is shown. As can be seen in the expanded view of FIG. 122 where the latch 12115 is separated from the front housing 12109, an opening 12202 enables the attachment element 12126 to be received by a corresponding opening 12204 on a top planar surface 12206 of the front housing 12109. The attachment element 12126 enables the latch 12115 to be movably attached to the front housing 12109, where the latch 12115 is adapted to rotate along walls 12208 to enable the opening 12122 of the latch to align with the guide 12128 of standard outlet control module 12102.

The various internal components and the inside of the rear housing 12111 of the control module are also shown in more detail in the expanded view of FIG. 122. A housing portion 12210 is adapted to receive contact elements of connectors that are adapted to receive the prongs of a plug. More particularly, the housing portion 12210 comprises an opening 12212 that extends to a cavity 12214 for receiving a contact element 12232 associated with the neutral voltage. An opening 12216 extends to a cavity 12218 for receiving a contact element 12239 associated with the line voltage. A contact element 12236 is positioned below the housing portion 12210 when the standard outlet control module 12102 is assembled.

A tamper resistance element 12220 is adapted to be placed over the openings 12212 and 12216 to prevent inadvertent contact with a line or neutral voltage coupled to the control module. The tamper resistance element 12220 comprises a ramp portion 12222 that is adapted to make contact with a prong of a plug as the plug is inserted into the opening 12110, causing the tamper resistance element 12220 to be moved and the prongs of a plug to be inserted into the openings 12212 and 12216 of the housing portion 12210. That is, when the tamper resistance element is moved, the ramp portion 12222 will be positioned to expose the opening 12212 to allow the neutral prong of a plug to make an electrical connection with a neutral contact element 12232 of a connector of the control module, and an opening 12224 will align with the opening 12216 to allow the power prong of the plug to be inserted into the opening 12216 and make an electrical connection with a power contact element 12239 of a connector of the control module.

The tamper resistance element 12220 may comprise a projection 12226 for receiving a spring element 12228. The tamper resistance element 12220 may be held in place in a resting state and allowed to move by the spring element 12228. While a coil spring is shown by way of example, any type of element that retains the tamper resistance element 12220 in a resting state and allows the tamper resistance element to be moved as the control module is plugged in to be used. While the tamper resistance element 12220 is shown by way of example as a single piece shutter element, it should be understood that other types of shutter arrangements could be employed. For example, any type of tamper resistance element could be employed where it is necessary for one element, such as a prong of a plug to be inserted, to be used to enable another element, such as another prong of a plug, to make an electrical connection with a contact element of the control module.

The connectors for providing an electrical connection between contact elements that are accessible on the front surface 12108 of the control module and corresponding contact elements of the power adapter 12104 are also shown. More particularly, a connector 12230 comprises a contact element 12232, which is adapted to make electrical connection to a contact element of a plug, and the contact element 12130 for making an electrical connection to a corresponding contact element of the power adapter and to receive the neutral voltage when the standard outlet control module 12102 is inserted into a power adapter. Similarly, a connector 12234 comprises a contact element 12236, which is adapted to make an electrical connection to a second contact element of a plug, and the contact element 12132 for making an electrical connection to a corresponding contact element of the power adapter and to receive a ground voltage when the standard outlet control module 12102 is inserted into a power adapter. A connector 12238 comprises a contact element 12239, which is adapted to make electrical connection to a third contact element of a plug, and the contact element 12134 for making an electrical connection to a corresponding contact element of the power adapter and to receive a line voltage when the standard outlet control module 12102 is inserted into a power adapter.

The rear housing 12111 of the control module is formed to retain the connectors 12230, 12234, and 12238. More particularly, the rear housing 12111 comprises an opening 12240 receiving the contact element 12130, an opening 12242 for receiving the contact element 12132, and an opening 12244 for receiving the contact element 12134. The rear housing 12111 also comprises support structures, shown here by way of example as ridges 12246 for receiving the connectors 12230, 12234, and 12238 to aid in holding the connectors in place during and after assembly of the control module. The internal components and the formation of the inside of the housings are shown by way of example, and it should be understood that the components and the formation of the housings could be implemented differently.

Turning now to FIG. 123, a first expanded view shows the back of the standard outlet control module 12102, where a latch 12115 of the module is separated from the housing module. As can be seen in FIG. 123, the latch is in a rotated position, where the opening 12122 is aligned with the guide 12128 (which extends through both the front housing 12109 and the rear housing 12111). When the latch 12115 is in this position, a corresponding latch element of the power adapter (shown for example as latch element 12561 of FIG. 125 or latch element 12810 of FIG. 128) is allowed to enter the guide 12128 and the opening 12122 and move through the guide 12124 as the latch is rotated in a counterclockwise direction in the figure as shown and the body of the control module is inserted into the recess of the power adapter. A projection 12302 on the latch is intended to engage a corresponding projection 12304 to prevent the latch 12115 from being rotated too far in the clockwise direction (as shown looking at the top of the standard outlet control module 12102), while a second projection 12306 of the front housing 12109 is intended to prevent the latch from being rotated too far in the counterclockwise direction. When the latch is rotated as far as possible in the clockwise direction (i.e., when the projection 12302 engages the projection 12304, the guide 12128 will be able to receive a corresponding latch element of the power adapter (e.g., the latch element 12561 or the latch element 12810) to start the latching process. As the control module is moved into the recess of the power adapter, the latch element of the power adapter (e.g., latch element 12561 of FIG. 125 or the latch element 12810 of FIG. 128) will advance through the guide 12124, where the latch element will be at the end 12127 of the guide 12124 when the planar surface 12116 is flush with the front surface 12108 and the control module will be retained within the recess of the power adapter.

Figure 124:
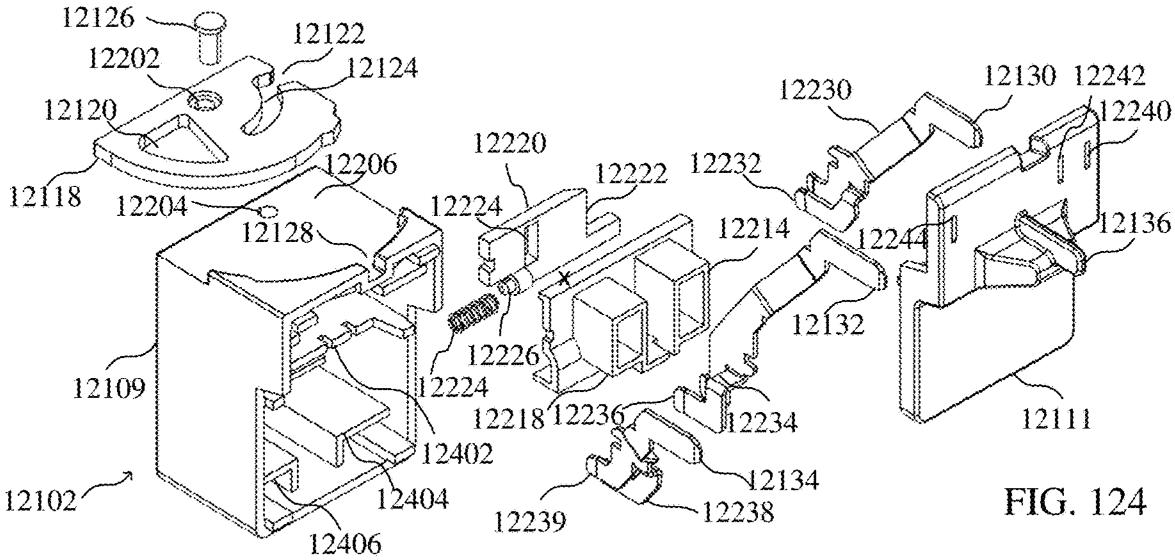

Turning now to FIG. 124, a second expanded view shows additional details of the backs of components of the standard outlet control module 12102. As is apparent in FIG. 124, the contact elements 12130, 12132, and 12134, extend through the openings 12240, 12242, and 12244, respectively. The front housing 12109 also comprises ridges 12402 to align with ridges 12246 and retain the connectors 12230, 12234 and 12238. Support structures 12404 are provided in the front housing to provide support of the housing portion 12210. A support structure 12406 may also be provided to provide additional support the actuator 12136 to enable the actuator 12136 move a tamper resistance element, such as tamper resistance element 12220.

Figure 125:
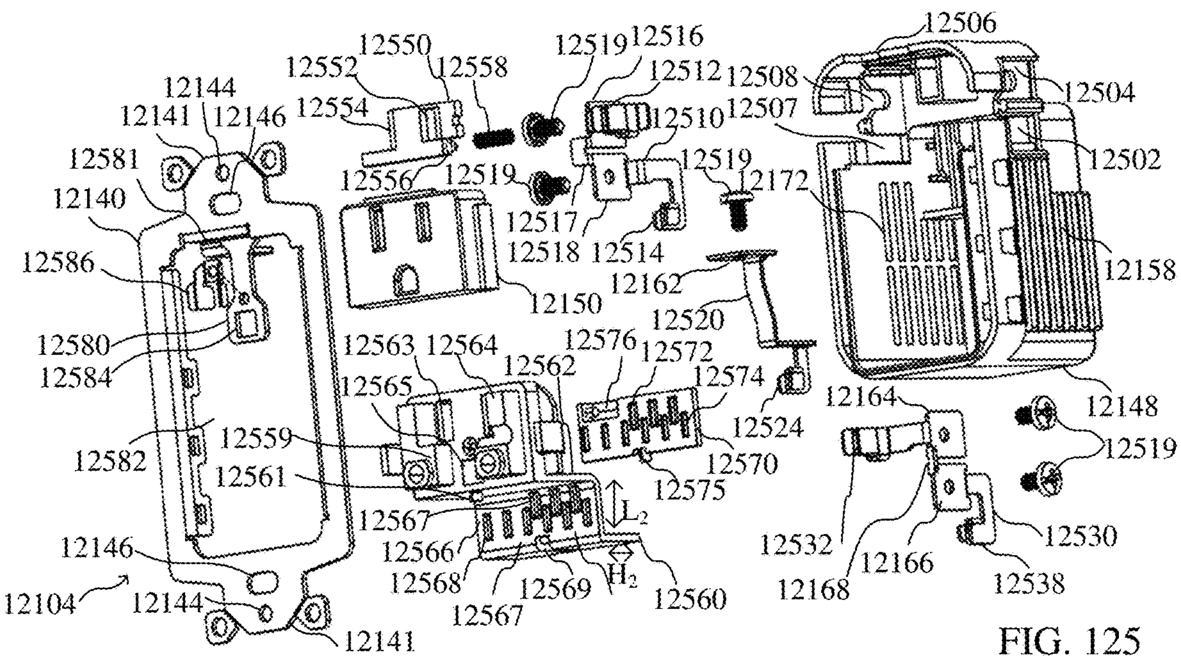

Turning now to FIG. 125, an expanded view of the power adapter 12104 having an outlet shows various elements of the power adapter. More particularly, the expanded view of FIG. 125 shows various elements of the rear housing 12148, including openings 12502 and 12504 for receiving contact elements, such as contact elements having threaded portions for receiving screws. As will be described in more detail below, the openings 12502 and 12504 are adapted to receive the contact elements 12164 and 12166 that are electrically connected by the tab 12168, and can be separated (i.e., electrically isolated) by severing the tab 12168 between the contact elements. Another opening 12506 is provided to receive another contact element, such as a ground contact element. Openings 12507 and 12508 are also provided in the rear housing 12148 and may be opposite the openings 12502 and 12504 to provide access to contact elements associated with the connector 12510.

Connectors adapted to be inserted in the rear housing 12148 enable the connection between contact elements adapted to be electrically coupled to wires in the junction box and other contact elements of the power adapter. The contact elements of a power adapter having an outlet may be placed in certain locations for an efficient layout, where the neutral contact elements that are adapted to receive a neutral voltage of a wire of a junction box may be placed near the location of the neutral contact element of a conventional outlet, the line contact elements that are adapted to receive a line voltage from a wire of a junction box are placed near the location of the line contact element of a conventional outlet, and the ground contact element that is adapted to receive a ground voltage from a wire of a junction box is placed near the location of the ground contact element of a conventional outlet (i.e. the standard locations for line, neutral and ground contact elements of an outlet commonly used in North America as shown in FIG. 121 for example).

The connector 12510, which may be adapted to provide a neutral voltage from a wire of the junction box to the power adapter, may comprise two contact elements that can be adapted to receive screws, and that can be separated by severing a tab between the contact elements to enable separate wiring of the outlet of the power adapter and a control module, as will be described in more detail below. The connector 12510 comprises a contact element 12512 adapted to receive a prong of a plug and extends to the pair of contact elements 12516 and 12518, each of which is adapted to receive a screw 12519. The contact elements are electrically connected by a tab 12517 that can be separated to enable the outlet of the power adapter to be separately wired (i.e., such as a switched outlet controlled by a switch on the wall). The connector 12510 also comprises a contact element 12514 that is adapted to receive a corresponding contact element of a control module.

Another connector 12520 comprises the contact element 12162 which is threaded to receive a screw 12519, and also a contact element 12524 which is adapted to receive a corresponding contact element of a control module. The contact element 12524 may be adapted to receive a ground contact element of the control module for example. The contact element may also be adapted to be electrically coupled to yoke 12140 to provide the ground voltage to the yoke.

A connector 12530 also comprises a pair of contact elements that can be adapted receive a screw and can be severed to enable separate wiring of the outlet and the control module. The connector 12530 may be adapted to receive a line voltage from a wire of the junction box. A tab 12168 is adapted to electrically couple a contact element 12164 and a contact element 12166, each of which are adapted receive a screw 12519. The tab 12168 can also be severed to provide electrical isolation between the contact elements and to enable independently wiring the outlet of the power adapter. The connector 12530 also comprises a contact element 12532 that is adapted to receive a prong of a plug, and a contact element 12538 that is adapted to receive a corresponding contact element of a control module. The connector 12530 may be coupled to receive a line voltage for example.

Various insulating elements are also provided to allow an electrical connection of contact elements comprising prongs of a plug to the outlet of the power adapter. More particularly, a tamper resistance element 12550 comprising an opening 12552 and the ramp 12554 is movable behind the openings of the outlet on the front housing portion 12150. That is, the neutral prong of a plug will engage the ramp 12554 and move the tamper resistance element 12550 to allow the plug to be inserted into the outlet. According to one implementation, a projection 12556 may receive a spring 12558 to retain the tamper resistance element 12550 in place to cover the openings to the contact elements (i.e., openings 12563 and 12564) when the plug is not inserted into the outlet. An opening 12565 is also provided to receive the contact element 12524 associated with connector 12520 receiving a ground voltage.

The power adapter 12104 also comprises a housing portion 12560 for receiving the contact element 12512 of the connector 12510, contact element 12524 of the connector 12520, and the contact element 12538 of the connector 12530. The housing portion 12560 comprises a latch element 12561 on a horizontal surface 12562, where the latch element 12561 is adapted to be received in the guide 12124 of the latch 12115. The latch element 12561 may comprise a projection, such as a cylindrical projection, and may be a part of the housing portion 12560 (i.e., formed on the housing portion during the formation of the housing portion) or attached to the housing portion 12560. A vertical surface 12559 below the front housing portion 12150 comprises an opening 12563 for receiving a neutral prong of a plug and an opening 12564 receiving a line prong of a plug. Another vertical projection 12566 extending from the bottom of the horizontal surface 12562 comprises a first set of openings 12567 for receiving actuator elements of a control module, and a second set of openings 12568 for receiving contact elements of the control module.

The electrical interface (i.e., the contact elements accessible through the second set of opening 12568) for receiving contact elements of the control module is also tamper resistant. An opening 12569 is provided to receive an actuator element (e.g., actuator 12136 that engages actuator 12575 of tamper resistance element 12570) for moving the tamper resistance element 12570 so that the contact elements of the power adapter that are adapted to receive the corresponding contact elements of the control module. The tamper resistance element 12570 comprises a set of openings 12572 for receiving the actuators of a control module, and a set of openings 12574 for receiving contact elements of the control module, where the contact elements of the control module are adapted to be electrically coupled to corresponding contact elements of the power adapter. The tamper resistance element 12570 also comprises a recess 12576 for receiving a spring, which may be similar to spring 12558 for example. The tamper resistance element 12570 may be movable to enable electrical connections between contact elements of a control module and contact elements of the power adapter when the control module is inserted into the recess. That is, the spring element retains the tamper resistance element 12570 in a resting position to cover contact elements in the recess of the power adapter when the control module is removed. The openings of the sets of openings 12567 and 12568 will be described in more detail in reference to FIG. 129.

Additional details related to the yoke 12140 are also as shown in FIG. 125. More particularly, a projection 12580 enables a grounding of the yoke 12140. By way of example, the projection 12580 may be coupled to a connector of the power adapter that receives the ground voltage, such as the connector 12520. The projection 12580 is electrically coupled to a projection 12581, which may be perpendicular to projection 12580 and which extends into a recess 12582 of the yoke. The projection 12580 comprises an opening 12584 adapted to receive a ground prong of a plug. A contact element 12586 may be riveted to the projection 12580, where the contact element 12586 provides an improved electrical connection to the ground prong of the plug. The contact element 12586 may comprise a brass element that is riveted to the projection 12580. That is, the yoke may be made of steel and an additional brass contact element 12586 may be secured to the yoke to provide an improved electrical connection.

As with any product where it is beneficial to reduce the volume of a material in the product, it is beneficial to reduce the amount of metal associated with connectors in a power adapter or a control module for a variety of reasons, including at least the ability to provide simple bent metal parts that function as connectors (e.g., easier to form, fewer bends, and less metal). The arrangement of elements of the power adapter having an outlet and a control module provide significant benefits in reducing the amount of material required and the volume of a junction box occupied by the power adapter.

Considering the power adapter 12104 having an outlet, the location and order of the connectors reduces the amount of material in the power adapter, including reducing the lengths of connectors of both power adapters and control modules. For example, for a power adapter having an outlet, it is beneficial to place the neutral contact element on the side of the power adapter having the contact element of the outlet for receiving a neutral contact element of a plug, and the line contact element on the side of the power adapter having the contact element of the outlet for receiving a line contact element of a plug.

The location of the contact elements of the connectors outside of the power adapter and within the power adapter may also reduce the amount of metal required for the power adapter and a control module. For example, the locations of contact elements of bent metal connectors having contact elements that comprise screw terminals exposed on one or more outer surfaces of the power adapter, can influence the amount of metal and the complexity of the connector (i.e., the number of bends required in the connector). Further, the location and order of the connectors of a control module having an outlet, such as standard outlet control module 12102 also reduces the amount of material in the control module. The various connections and contact elements of FIGS. 124 and 125 may be formed metal parts that may be stamped, laser etched, pressed or formed in some other suitable way from a conductive material, including an appropriate metal material such as copper, aluminum, or so other that meets the necessary specifications for a particular application.

Figure 126:
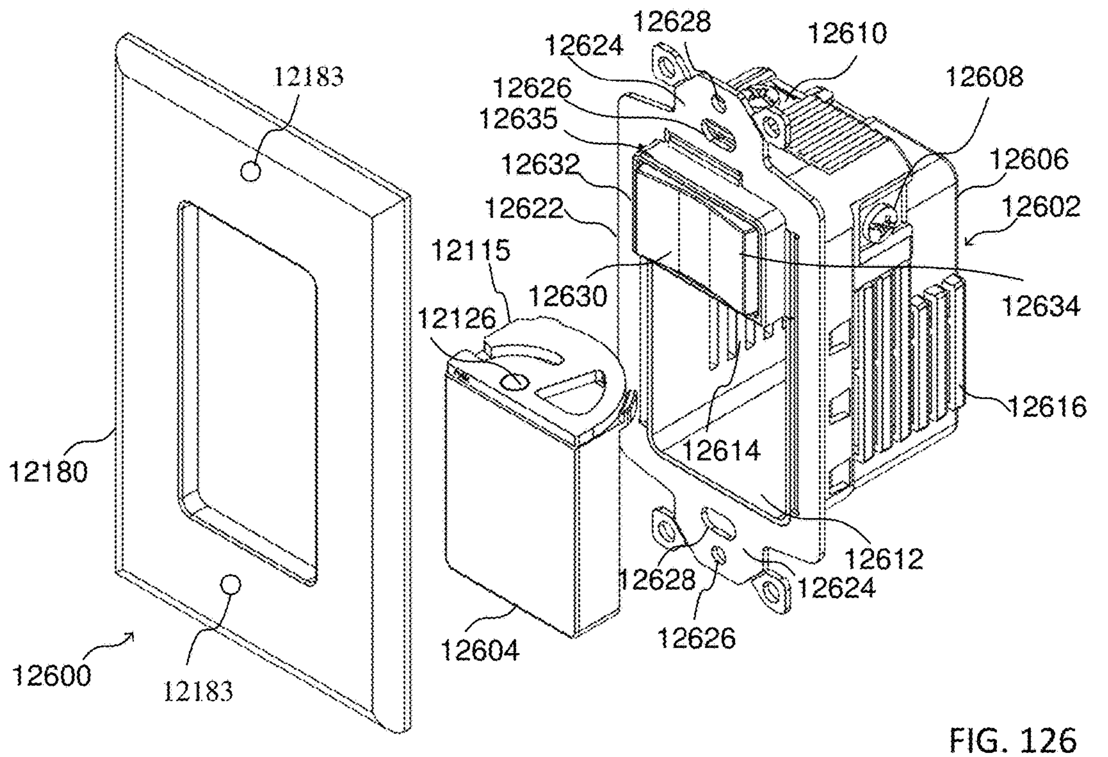

Turning now to FIG. 126, an expanded view 12600 shows a power adapter arrangement having a switch and a cover portion, and a wall plate for the power adapter arrangement. More particularly, a power adapter 12602 is adapted to receive a control module or a cover, shown here by way of example as a cover 12604. The cover has the function of covering the recess, which may help protect the contact elements of the electrical interface in the recess of the power adapter but does not route electrical signals. The power adapter 12602 comprises a rear housing 12606 having openings for receiving contact elements that are adapted to be coupled to wires of a junction box, as described above in reference to the power adapter 12104 having an outlet of FIG. 121. A contact element 12608 associated with a first connector may comprise a threaded portion for receiving a screw as shown and may be adapted to receive a line voltage from a wire in the junction box for example. A second contact element 12610 may be adapted to receive a ground voltage from a wire of the junction box for example. As will be described in more detail below, the ground voltage may be coupled to a yoke of the power adapter 12602. While the contact elements are shown by way of example as having threaded portions for receiving screws, the contact elements 12608 and 12610 could be wires or some other form of electrical connector, such as a contact element that is adapted to receive a free end of a wire and retains the free end of the wire by a friction fit.

A recess 12612 is adapted to receive the cover 12604, or a control module. The vents 12614 on the inside of the recess are similar to the corresponding vents 12616 shown on the outside of the housing. The vents 12614 and 12616 may be designed to prevent an object from being placed into the recess and through an opening in a vent, thus avoiding any contact with a high voltage power line within the junction box.

The yoke 12622 for the power adapter 12602 is similar to the yoke for the power adapter 12104 of FIG. 121. The yoke 12622 also comprises flange portions 12624 having openings 12626 for receiving a screw to secure the power adapter to a junction box, and threaded portions 12628 receiving screws to secure a wall plate to the junction box.

A switch actuator 12630 is shown. According to one implementation, the switch actuator 12630 comprises a first end 12632 that can be depressed for changing the state of the switch, and a second end 12634 that can also be depressed for changing the state of the switch. For example, the switch actuator 12630 is movable to turn on or off a light or other load controlled by the switch. While the switch actuator 12630 is shown by way of example as a switch actuator that returns to a resting position in the center as shown, it should be understood that the switch actuator could be implemented as being retained in a resting state on one side or the other. That is, the switch actuator may be retained in a first state when the first end 12632 is pressed, such as to turn off the light controlled by the switch, or in a second state when the second end 12634 Is pressed, such as to turn on the light. The switch actuator 12630 is retained in a recess of a housing portion 12635, as will be described in more detail below.

Figure 127:
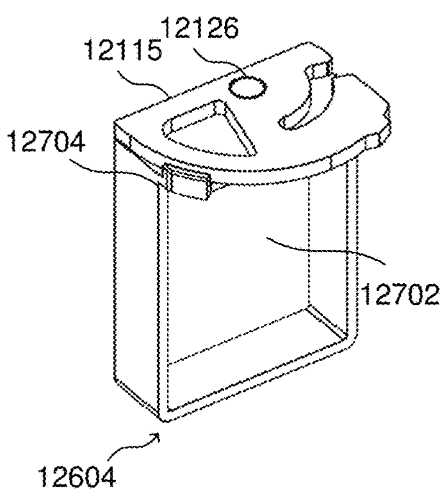

Turning now to FIG. 127, a rear view of the cover of FIG. 126 is shown. As can be seen in FIG. 127, the inside of the cover is hollow to reduce the amount of material used to form the cover, while providing sufficient surface area to implement the latch and maintain the proper positioning of the cover within the recess. More particularly, a recess 12702 is provided to minimize the amount of material in the cover. The cover also comprises projections, such as projection 12704, for limiting the amount that the latch 12115 can rotate, as described above in reference to the projections 12304 and 12306. It should be noted that all elements of the cover could be made of recyclable materials. As a result, unlike with the installation of conventional switches and outlets, all of the components are recyclable when a switch is upgraded to replace the cover with a control module that has a certain functionality. Similarly, many outlet modules that operate as passive outlet modules may comprise components, such as plastic and metal components, that can be easily recycled.

Figure 128:
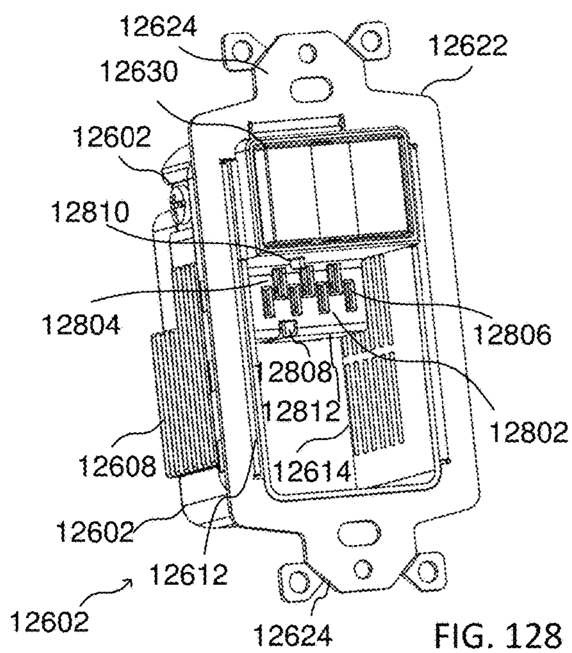

Turning now to FIG. 128, a front perspective view of the power adapter 12602 having a switch of FIG. 126 is shown. As can be seen in the front perspective view of FIG. 128, a housing portion 12802 comprises a first set of openings 12804 adapted to receive one or more actuators of a control module, and a second set of openings 12806 adapted to receive contact elements of a control module. The housing portion 12802 also comprises an opening 12808 that is adapted to receive an actuator for moving a tamper resistance element, as will be described in more detail in reference to FIG. 129. A latch element 12810 on an interior wall 12812 of the recess 12612, shown here by way of example as being on the wall of a housing portion perpendicular to the housing portion 12802, is provided to enable latching the cover (or a control module) to the power adapter to cover the recess in the power adapter. The latch 12115 of the cover, when rotated as described above, will secure the cover to the power adapter when the latch element 12810 is advanced through the guide 12124 of the latch 12115, as described above.

Various elements of the power adapters and the control modules, as well as the relationship between the power adapters and the control modules, reduce the volume of materials in both the power adapters and control modules. For example, by placing the electrical interface comprising connectors in the recess of the control module and the connector interface of power adapter toward the middle of the power adapter (as shown for example in FIG. 128) rather than further back in the recess, such as on a rear surface of the recess of the power adapter, less material is required for both the power adapter and the control module. Further, the power adapter (and the power adapter arrangement comprising a power adapter and a control module or cover) occupies less volume of the junction box.

As shown for example in FIG. 128, by providing an electrical interface having connectors of the power adapter that is above the rear surface of the recess as shown (i.e., not as deep into the recess as other elements of a control module of FIG. 135 may extend when the control module is inserted into the recess), the connectors of the power adapter that receive corresponding connectors of the control module do not need to protrude from the back of the power adapter, which would decrease the available volume of a given junction box that receives the power adapter. That is, positioning the electrical interface as shown in FIG. 128 creates a two-level recess that reduces the material required by the power adapter arrangement and the volume of the junction box occupied by the power adapter arrangement. The two-level recess may also reduce the length of contact elements of both the power adapter and a control module, as will be described in more detail below.

Figure 129:
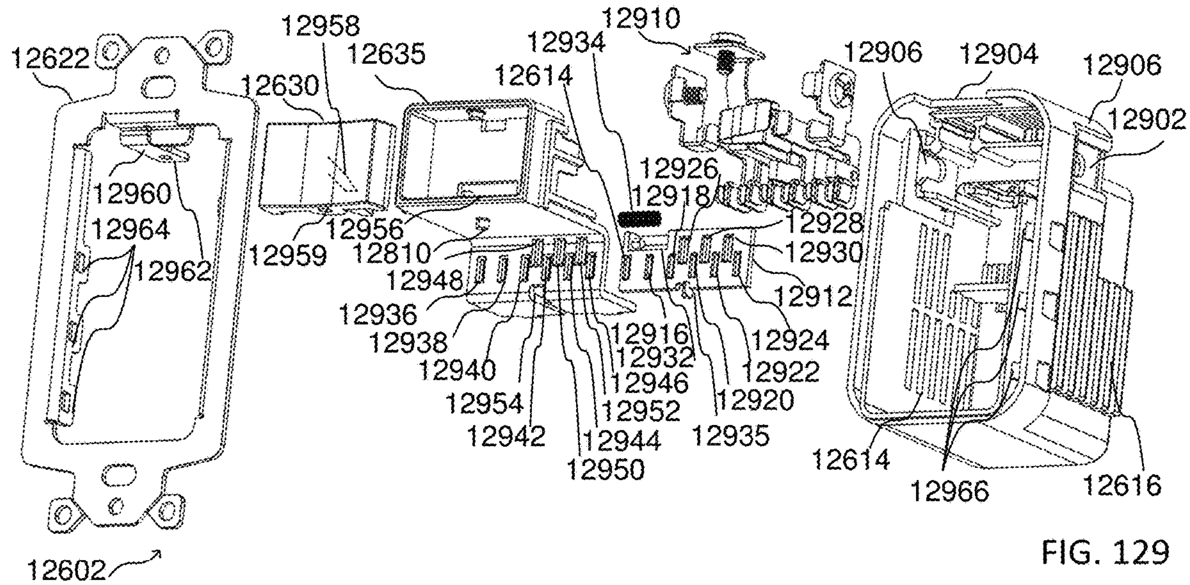

Turning now to FIG. 129, an expanded view of the power adapter 12602 is shown. Openings for receiving the contact elements adapted to be coupled to a wire of the junction box can be seen. An opening 12902 above the vents 12616 is adapted to receive a contact element associated with a first connector and opening 12904 on the top of the rear housing of the power adapter is adapted to receive a contact element associated with a second connector, and an opening 12906 on the side opposite the opening 12902 is adapted to receive a contact element associated with a third connector. An opening adapted to receive a fourth contact element may be provided on the end of the power adapter having the opening 12904, as will be described in more detail below in reference to FIG. 130.

A contact arrangement 12910 comprises a plurality of connectors that are configured to make electrical connections between contact elements that are exposed on an outer surface of the power adapter (i.e., contact elements accessible through openings 12902, 12904 and 12906) and contact elements that are accessible through the housing portion 12802. Some of the connectors make electrical connection between certain other connectors, where those connections may be broken by an actuator of a control module, as will be described in more detail below.

A tamper resistance element 12912 comprises openings for receiving actuator elements or contact elements is also shown. The tamper resistance element may be an insulating element having openings that align with openings of the housing portion 12635. A first set of openings tamper resistance element 12912 comprises a first opening 12914, a second opening 12916, a third opening 12918, a fourth opening 12920, a fifth opening 12922, and a sixth opening 12924. The tamper resistance element 12912 also comprises openings for receiving actuator elements for breaking connections between contact elements of the contact arrangement 12910, including a first opening 12926, a second opening 12928, and a third opening 12930. The tamper resistance element 12912 also comprises a cavity 12932 for receiving a spring element 12934 that retains or returns the tamper resistance element to a resting state after a control module is removed from the recess 12612. The tamper resistance element also comprises an actuator 12935 that is provided to engage a corresponding actuator of the control module. That is, when the control module is inserted into the recess 12612, the actuator of the control module (e.g., actuator 12136 of a control module) will engage the actuator 12575 or 12935 for example to move the tamper resistance element and to enable the contact elements of the control module to engage with corresponding contact elements accessible on the housing portion 12802 (or enable actuators to break electrical contacts of the contact arrangement 12910).

The housing portion 12635 also comprises a first set of openings for receiving contact elements of the control module, including a first opening 12936, a second opening 12938, a third opening 12940, a fourth opening 12942, a fifth opening 12944, and a sixth opening 12946, and a second set of openings for receiving actuators of the control module, including a first opening 12948, a second opening 12950, and a third opening 12952. The housing portion 12635 also comprises an opening 12954 for receiving an actuator of the control module to engage the actuator 12935 and move the tamper resistance element 12912 so that the openings of the housing portion and the tamper resistance element align (i.e. the six openings of the set of openings of the housing portion 12635 align with the six openings of the first set of openings of the tamper resistance element 12912, and the three openings of the second set of openings of the housing portion align with the three openings of the second set of openings of the tamper resistance element).

The openings of the housing portion and the openings of the tamper resistance element are not aligned unless the tamper resistance element is moved by an actuator element of the control module to enable the contact elements to make an electrical connection to corresponding contact elements of the power adapter. That is, in a resting state, the tamper resistance element is intended to block the openings of the housing portion 12635 to prevent any inadvertent contact with a contact element of the electrical interface in the recess.

The housing portion 12635 also comprises an opening 12956 for receiving an actuator element 12958 (shown in dashed lines and behind the front surface of the switch actuator 12630). When the switch actuator 12630 is moved from one state to another, the actuator element 12958 is moved to engage a switch associated with the contact arrangement 12910, as will be described in more detail in reference to FIG. 130. An attachment element 12959 is provided to engage a corresponding attachment element of the housing portion 12635, as will be described in more detail in reference to FIG. 131.

The yoke 12622 of the power adapter 12602 comprises a projection 12960 that extends to a threaded portion 12962, which is adapted to receive a screw for receiving a reference voltage, such as a ground voltage for example. According to one implementation, the yoke is adapted to be coupled to a connector of the contact arrangement 12910 that receives the ground voltage to also ground the yoke. The yoke 12622 also comprises recesses 12964 in a portion extending down from the yoke. The recesses 12964 are adapted to engage the projections 12966 and secure the yoke to the rear housing.

Assuming that all of the switch elements of a power adapter having a switch can occupy the area defined by an outlet of a power adapter having an outlet, as described for example in reference to FIGS. 121-125, the volume of a power adapter having a switch can be approximately the same as the volume of a power adapter having an outlet, where the differences in volume may relate to different numbers of contact elements required for a power adapter having a switch compared to a power adapter having an outlet.

Figure 130:
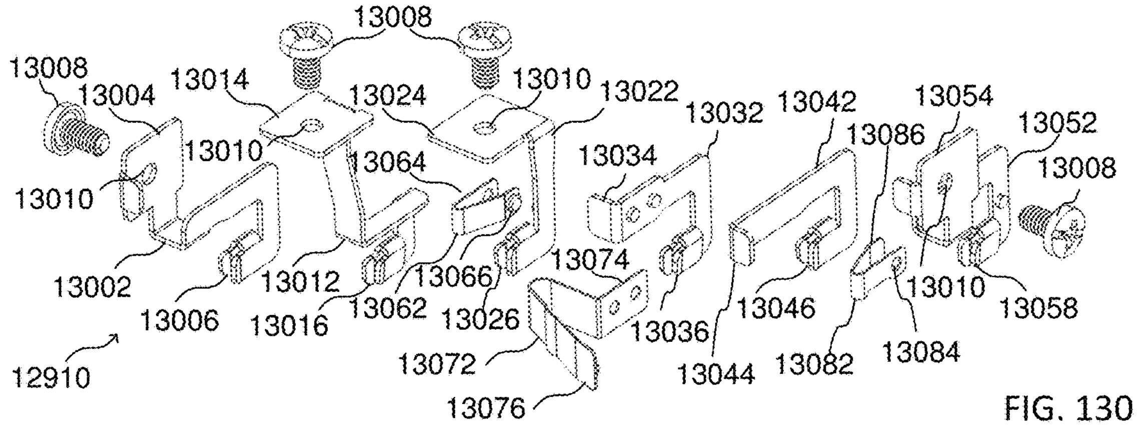

Turning now to FIG. 130, an expanded view of the contact arrangement 12910 of FIG. 129 is shown. The contact arrangement 12910 comprises a plurality of connectors that extend between contact elements. In some cases, the connector may extend between in contact element that is adapted to make an electrical connection to a wire of the junction box on one end and a contact element that receives a corresponding contact element of a control module on the other end. In other cases, the connector may be internal to the power adapter, and provide an electrical connection between other connectors (where the electrical connection may be broken by an actuator of the control module as will be described in more detail below).

The contact arrangement 12910 of FIG. 129 could be implemented to provide the electrical connections of a single pole switch of the power adapter 11202 of FIG. 112, for example. Each of the four contact elements having a threaded portion to receive a screw on an external surface of the power adapter is configured to be coupled to one of the line, ground, neutral or load lines of the junction box. More particularly, a connector 13002 extends from a contact element 13004 to a contact element 13006 that is adapted to receive a corresponding contact element of a control module. The contact element 13004 is adapted to receive a screw 13008 at a threaded portion 13010. The connector 13002 may be used to receive a neutral voltage by way of a wire of the junction box, for example.

A connector 13012 extends from a contact element 13014 to a contact element 13016 that is adapted to receive a corresponding contact element of a control module. The contact element 13014 comprises a threaded portion and is adapted to receive a screw 13008 for securing a wire of the junction box to the contact element. The connector 13012 may be used to receive a ground (GND) voltage by way of a wire of the junction box, for example.

A connector 13022 extends from a contact element 13024 to a contact element 13026 that is adapted to receive a corresponding contact element of a control module. The contact element 13024 is adapted to receive a screw 13008 at a threaded portion 13010. The connector 13022 may be coupled to the load by way of a wire of the junction box, for example.

A connector 13032 extends from a contact element 13034 to a contact element 13036 that is adapted to receive a corresponding contact element of a control module. The connector 13032 may be used to electrically connect the connector 13022 associated with the load and may operate as a part of the switch of the single pole switch, for example.

A connector 13042 extends from a contact element 13044 to a contact element 13046 that is adapted to receive a corresponding contact element of a control module. The connector 13042 may be used to receive a signal on a traveler contact element of the single pole switch and may operate as a part of the switch of the single pole switch, for example.

A connector 13052 extends from a contact element 13054 and extends to a contact element 13058 that is adapted to receive a corresponding contact element of a control module. The contact element 13054 is adapted to receive a screw 13008 at a threaded portion 13010. The connector 13052 may be used to receive a line voltage, for example a 120V AC signal, by way of a wire of the junction box.

A connector 13062 extends from a contact element 13064 and extends to a contact element 13066. The connector 13062 may be used to break a connection between a load contact element and a switch contact element, for example.

A connector 13072 extends from a contact element 13074 and extends to a contact element 13076 that is adapted to function as part of a switch. The connector 13072 may operate as a switch element between the switch contact element and a traveler contact element, for example.

The connector 13082 extends from a contact element 13084 to a contact element 13086. The connector may be used to enable a break in a connection between the connector 13042 associated with the traveler contact element and the connector 13052 associated with the line voltage.

The connectors may be formed of metal elements, such as steel or aluminum as is known in the art. It should be understood that the contact arrangement 12910 provides one example of a contact arrangement that could be used to enable the appropriate electrical connections for the control module, but other suitable contact arrangements could be employed. For example, the contact elements that are adapted to be connected to a wire could be implemented as screw terminal components or wires soldered to a printed circuit board (PCB), the contact elements adapted to receive corresponding contact elements of a control module may be implemented as contact elements soldered to a printed circuit board, and connections between the various contact elements could be electrically coupled by traces on a printed circuit board.

Turning now to FIG. 131, an expanded view of another power adapter arrangement 13100 comprising a power adapter having a switch and a cover is shown. The power adapter arrangement may be adapted to be implemented as a primary power adapter that performs switching of power to a load in a 3-way connection and may provide the functionality of the power adapter 11501 of FIG. 115 for example. The rear housing 13102 of the power adapter may comprise vents 13104, shown here by way of example at the top of the housing. The vents 13104 could be implemented in a different location, or additional venting could be implemented as shown in the power adapter 12602. The rear housing 13102 may comprise a top portion 13106 that is shaped to accommodate the elements of a switching circuit 13112, including a switching element 13114, which may be a relay or a TRIAC for example, and other components on a PCB 13116. The PCB may also be electrically coupled to wires 13118 for connecting circuits of the printed circuit board to wires of the junction box. According to one implementation, the wires 13118 may comprise a first wire 13120, a second wire 13122, a third wire 13124, a fourth wire 13126, and a fifth wire 13128. The wires 13118 may be implemented to provide electrical connections to a line voltage, a ground voltage, a neutral voltage, a load controlled by the power adapter, and a traveler line, as shown for the power adapter 11501 in FIG. 115 for example. A connector arrangement 13130 may be implemented, as for example in FIGS. 131 and 132. The power adapter also comprises a yoke 13108 and may receive a cover 13110. The remaining portions of the power adapter of FIG. 131, such as the switch 12630, the housing portion 12635 and the tamper resistance element 12912, may be similar to the power adapter 12602.

Turning now to FIGS. 132 and 133, perspective views of the connector arrangement 13130 of the power adapter of FIG. 131 are shown. FIG. 132 shows the contact arrangement as implemented when soldered to a PCB for example, while FIG. 133 shows the connectors being separated to describe the various contact elements of the connectors. It should be noted that some connectors of the connector arrangement 13130 comprise contact elements that are adapted to receive a contact element of a control module. Other connectors may be soldered to a PCB and make an electrical connection between circuit elements on the PCB and are adapted to receive actuators of a control module that break connections between circuit elements on the PCB. Other connectors comprise contact elements that are used to electrically couple two connectors, where an electrical connection provided by these connectors may be broken (i.e., electrically disconnected) by an actuator of a control module.

More particularly, a first connector 13202 comprises a contact element 13204 that is adapted to be soldered to a printed circuit board and a contact element 13206 that is adapted to receive a corresponding contact element of a control module. According to one implementation, the connector 13202 may be used to receive a neutral voltage.

A second connector 13212 comprises a contact element 13214 that is adapted to be soldered to a printed circuit board and a contact element 13216 that is adapted to receive a corresponding contact element of a control module. According to one implementation, the connector 13212 may be used to receive a ground voltage.

A third connector 13222 comprises a contact element 13224 that is adapted to be soldered to a printed circuit board and a contact element 13226 that is adapted to receive a corresponding contact element of a control module. According to one implementation, the connector 13222 may be used to provide an electrical connection to a load contact element.

A fourth connector 13232 comprises a contact element 13234 that is adapted to be soldered to a printed circuit board and a contact element 13236 that is adapted to receive a corresponding contact element of a control module. According to one implementation, the connector 13232 may be used to provide an electrical connection to a contact element associated with a switch.

A fifth connector 13242 comprises a contact element 13244 that is adapted to be soldered to a printed circuit board and a contact element 13246 that is adapted to receive a corresponding contact element of a control module. According to one implementation, the connector 13242 may be used to provide an electrical connection to a contact element associated with a traveler line.

A sixth connector 13252 comprises a contact element 13254 that is adapted to be soldered to a printed circuit board and a contact element 13256 that is adapted to receive a corresponding contact element of a control module. According to one implementation, the connector 13252 may be used to provide an electrical connection to a line voltage.

A seventh connector 13262 comprises contact elements 13264 that are adapted to be soldered to a printed circuit board and a contact element 13266 that is adapted to make an electrical connection to another connector of the power adapter. According to one implementation, the connector 13262 may be used to provide an electrical connection between the load and the switch.

An eighth connector 13272 and a ninth connector 13282 are adapted to enable an actuator of a control module to break a connection between a switch contact element and a load contact element, as shown for example in the power adapter 11501 of FIG. 115 for example. The eighth connector 13272 comprises a contact element 13274 that is adapted to be soldered to a printed circuit board and a contact element 13276. The ninth connector 13282 comprises a contact element 13284 that is adapted to be soldered to a printed circuit board and a contact element 13286. The contact elements 13276 and 13286 are adapted to receive an actuator of a control module to break an electrical connection, such as a connection between an output of a switch to a load as shown in the power adapter 11501 of FIG. 115.

Turning now to FIG. 134, an expanded view shows another power adapter arrangement having a cover. The power adapter arrangement comprises a power adapter having a rear housing 13402 that is adapted to receive a switching circuit 13404 that sends a switching signal and has components for enabling a remote switching operation in a 3-way wiring circuit, such as described in reference to power adapter 11001 of FIG. 115 for example. The switching circuit 13404 may comprise a set of contact elements 13406 coupled to a printed circuit board 13408 having components for enabling the generation and transmission of switching signals, shown by way of example as component 13410. The printed circuit board may also be adapted receive wires 13412.

According to one implementation the wires 13412 may comprise four wires, including a first wire 13414, a second wire 13416, a third wire 13418, and a fourth wire 13420. The wires 13412 may be configured to receive a line voltage, a ground voltage, a neutral voltage, and a wire for transmitting signals over a traveler line, as described above in reference to the power adapter 10704 of FIG. 115 for example. It should be noted that the power adapter of the power adapter arrangement of FIG. 134 is shown having contact elements that are stand-alone contact elements associated with a printed circuit board having wires but could be implemented with contact elements providing electrical connections on an external surface of the power adapter having screw terminals in place of the wires.

The remaining elements of the power adapter of FIG. 134 may be implemented in a similar manner as the power adapter 12602. That is, the power adapter will also include a yoke 12622, a switch actuator 12630 having an attachment element 13424 adapted to be attached to a corresponding attachment element of the housing portion 12635, a housing portion 12635 and a tamper resistance element 12912. The power adapter 13400 having a switch may be implemented as a remote switch in a 3-way switching configuration as set forth in FIG. 115 and may receive a cover 13426 having a flange 13428 adapted to be moved by an actuator 13430 or a control module as described above.

Turning now to FIGS. 135 and 136, a perspective view of the fronts of 3 different types of control modules having different contact arrangements are shown in FIG. 135 and the rear sides of the 3 different types of control modules are shown in FIG. 136. The figures are provided to show examples of different arrangements of contact elements and actuators that enable different control modules to be implemented in different power adapters as described above. Depending upon the functionality of the control module, different contact elements may be provided for making an electrical connection to a corresponding contact element of a power adapter. Similarly, depending upon the functionality of a control module, different actuators may be used to break an electrical connection between contact elements of a power adapter. While three examples are shown, it should be understood that additional arrangements of contact elements and actuators could be implemented according to various implementations of the power adapters. As is apparent from the description of the three control modules, the three arrangements of contact elements and actuators are provided not only to show how the three arrangements may be used in a given power adapter, but how a given control module may be used in different power adapters.

A first control module 13502 is a control module having electrical connections on a front surface 13503, shown here by way of example with an outlet, such as an outlet for receiving a standard plug for 120 Volt AC signal as commonly used in North America for example, and two USB connectors, such as a USB-A connector and a USB-C connector as shown. According to the implementation of the control module 13502, a first contact element 13504, a second contact element 13506, and a third contact element 13508 are provided. The contact elements of the control module 13502 may be configured to receive a power signal, a ground voltage, and a neutral voltage. Because the control module does not perform any switching when used with a power adapter that enables switching of power to a load, but rather acts as a passive control module for providing power to an outlet of a control module or a circuit of the control module (e.g., the USB connectors), only three contact elements are needed. While actuator 13510 is provided to move a tamper resistance element, for example by engaging an actuator 12575 of a tamper resistance element 12570 or an actuator 12935 of a tamper resistance element 12912 to enable the control module to be electrically coupled to the electrical interface of a power adapter, it should be understood that a contact element of the control module could also be used to engage a tamper resistance element and enable the contact elements of the control module to be coupled to corresponding contact elements of the power adapter. For example, one of the contact elements could be used not only make an electrical connection with a corresponding contact element of the power adapter but provide the function of the actuator 12136 for example to make contact to a ramp and move a tamper resistance element. It should be understood that the control module 13502 could be used in any power adapter having an outlet or any power adapter having a switch.

Other power adapters act as switching control modules that enable the switching of power to a load in a switch. For example, a second control module 13512 comprises a simple dimmer. The control module 13512 comprises a different arrangement of contact elements and includes an actuator for breaking an electrical connection between contact elements of the power adapter. More particularly, the control module 13512 comprises a first contact element 13514, a second contact element 13516, a third contact element 13518, a fourth contact element 13520, and a fifth contact element 13522, and an actuator 13524 for breaking an electrical connection between contact elements of a power adapter. A sixth contact element 13602 can also be seen in FIG. 136. An actuator 13517 is provided to engage a tamper resistance element of a power adapter, where the actuator 13517 causes a tamper resistance element, such as tamper resistance element 12912, to move and expose contact elements when the control module is inserted into a power adapter. The control module 13512 also comprises a dimmer control element 13526. It should be understood that the control module 13512 could be used in any one of the power adapters having a switch.

Similarly, a third control module 13532 is adapted to provide electronic control of switching and may include a motion sensor or dimmer control for example, where the dimmer functionality is digitally controlled. The control module 13532 comprises a first contact element 13534, a second contact element 13536, a third contact element 13538. Three additional contact elements can be seen in the rear view of control module 13532 of FIG. 136, including a contact element 13604, a contact element 13606, and a contact element 13608. The control module 13532 also comprises three actuators, including a first actuator 13540, a second actuator 13542, and a third actuator 13544, for breaking electrical connections within the power adapter. The control module 13532 also comprises an interface 13546 associated with an electronic control of the load and may be a dimmer control actuator or may be a motion sensor for example.

While there are different ways of forming connectors in electronic devices, the bent metal connectors for power adapters provide a number of benefits, including benefits for a power adapter having an outlet and a power adapter having a switch, and particularly the single pole switch as described above in reference to FIGS. 126-130. Considering first a power adapter having an outlet as described above for example in FIGS. 121-125, the connectors of the power adapter comprise contact elements facilitating three electrical connections, and therefore eliminate the need for a printed circuit board. For example, each of the connectors 12510, 12520 and 12530 comprise a contact element having a threaded portion for receiving screw to retain a wire in the junction box, a contact element for receiving a prong of a plug, and a contact element for receiving a corresponding contact element of a control module. Such an arrangement provides a simplified design that eliminates materials required in the power adapter, including eliminating at least a printed circuit board and any elements that may be required on the printed circuit board.

Similarly, for a single pole switch shown for example in FIG. 129, the use of bent metal connectors of the contact arrangement 12910 also eliminates the need for a PCB, solder or other material that may not be able to be easily recycled and may end up in a landfill and possibly introduce contaminants into the ground.

Turning now to FIG. 137, a perspective view of a power adapter arrangement 13700 having a thermal connection between the power adapter and the control module. More particularly, a control module 13702 comprises a front housing 13703 and a rear housing 13704. Attached to or extending from the rear housing is a thermal conductive element 13706 that is used to dissipate heat from the control module 13702. As will be described in more detail in reference to FIG. 138, the thermal conductive element 13706 may be attached to or part of a heat sink. The thermal conductive element 13706 could be any type of conductive element that would allow heat to be transferred from the control module, such as to a corresponding conductive element of the power adapter.

As shown in FIG. 137, the power adapter 13708 comprises contact elements 13523 and a yoke 13710 having a side yoke portion 13712 that extends into a recess 13716 for receiving the control module 13702 and a rear yoke portion 13714 along a rear surface of the recess. When the control module 13702 is inserted into the recess, the thermal conductive element 13706 makes a physical connection with the rear yoke portion 13714, which extends from the side yoke portion 13712 in the recess 13716, allowing heat to be dissipated by the body 13715 of the yoke 13710. More particularly, the recess 13716 comprises a side portion 13718 and a rear portion 13720. The side yoke portion 13712 can be integrated into the side portion 13718 (i.e., embedded with side portion to create a flush surface within the recess) or can be on top of the side portion, and the rear yoke portion 13714 can be integrated into the rear portion 13720 (i.e., embedded with side portion to create a flush surface within the recess) or can be on top of the rear portion. As can be seen in FIG. 137, because the yoke provides surface area outside of the control module and is exposed to the air, and some portions of the yoke may be in locations where any heat that dissipates off the yoke can escape from the junction box, the arrangement of the control module and the yoke having corresponding thermal conductive elements provides greater heat dissipation for a control module, such as a control module providing dimming functionality that may generate heat that may need to be dissipated.

While one example of a power adapter and a control module having corresponding thermal conductive elements to enable heat dissipation is shown in FIG. 137, it should be understood that other arrangements for providing a thermal interface between the control module and the power adapter could be implemented. For example, the entire rear housing 13704 could comprise a conductive element for enabling thermal conduction to a portion of the yoke. Similarly, a portion of the housing of the power adapter could comprise a conductive material to enable thermal conduction. The thermal conductive elements could comprise any thermally conductive material, such as a metal material, or thermally conductive pads that may be attached a thermal conductive material. According to some implementations, a thermal pad having an adhesive could be coupled to a thermal conductive material of one or both of the power adapter and the control module.

Turning now to FIG. 138, an expanded view 13800 of the control module 13702 as seen from the rear of the control module is shown. When the rear housing 13704 is removed, openings 13802 for receiving the contact elements 12523 are visible. Also shown are elements associated with controlling power in the control module. According to some implementations, the control module may comprise a TRIAC and associated elements for enabling heatsinking. The control module may comprise a heat sink 13804, shown here by way of example as a heat sink having fins 13806. A TRIAC 13807 may comprise a heat sinking portion 13808 for enabling the TRIAC to be attached to the heat sink and conduct heat from the heat sinking portion 13808 to the heat sink 13804, and a semiconductor material 13810 which enables the switching operation of the TRIAC and generates the heat to be conducted away from the control module. A printed circuit board 13812 comprises circuit elements for controlling the switching of the TRIAC to control power applied to a load in response to external inputs to the control module, such as actuators on a front surface of the control module that is accessible to a user or a wireless input received by a wireless control circuit of the control module.

Turning now to FIG. 139, an expanded view of another control module 13900 from the front is shown. The control module of FIG. 139 also comprises a dimmer circuit and is similar to the control module 13702. However, the control module of FIG. 139 comprises a different arrangement of elements, including contact elements for example. While the arrangement of contact elements of the control module 13702 could also be implemented in FIG. 139, the contact elements of FIG. 139 provide another example of how to implement contact elements of a control module that make an electrical connection to corresponding contact elements of a power adapter.

The control module of FIG. 139 comprises a front housing 13902 and a rear housing 13904. The front housing comprises a slot 13906 in a recessed area 13908 for receiving a dimmer actuator 13910. The dimmer actuator 13910 is adapted to be attached to a movable dimming element 13912 of a dimmer circuit 13914. The rear housing 13904 comprises openings 13916 adapted to receive contact elements 13918, shown here by way of example as horizontal contact elements. The contact elements 13918 may be attached to circuit elements of the control module, such as a printed circuit board 13920. The PCB 13920 may be connected to one or more other PCBs in the control module, such as PCB 13922 and 13924.

The control module also comprises other elements associated with a dimmer circuit for controlling the application of power to a load. For example, the control module comprises a heat sink 13926 having fins 13927. The heat sink 13926 is coupled to a TRIAC 13928 having a heat sinking portion 13929 and a semiconductor portion 13930 for enabling operation of the TRIAC. Another PCB 13932 may be coupled to the other PCBs and include circuitry for enabling the operation of the dimmer.

Turning now to FIG. 140, a perspective view of a power adapter arrangement 14000 having a control module that allows venting of heat to the front face of the control module is shown. Because the power adapter arrangement is installed in a junction box and portions of the power adapter arrangement are covered with a wall plate, it may be challenging to dissipate heat when a significant portion of the heat would enter the junction box. According to the implementation of the control module 14002, heat can be released through the front of the control module by way of a recess adjacent to the wall plate when the control module is inserted into the power adapter and the wall plate is attached. More particularly, the control module 14002 comprises a heat sink 14004 which is adjacent to a wall 14006 of front housing. The side of the heat sink 14004 is visible through the front and rear housings of the control module and the wall 14006 and defines a recess 14008 to allow heat from the heat sink to radiate out of the front of the control module. That is, the recess 14008 will not be blocked by the wall plate when the wall plate is placed over the yoke, allowing heat to escape out the front of the control module. An angled portion 14007 of the front housing allows heat that may be accumulating in the recess adjacent to the wall 14006 and the side of the heat sink 14004 to be released from the recess because the heat will rise. That is, heat in the recess will rise along the angled portion 14007 and released out of the front of the control module. The control module may also comprise indicator lights 14010, which may be used to indicate a dimming value of the dimmer, and a switch actuator 14011 comprising an on actuator 14012 and an off actuator 14014 for turning power to a load on and off.

Turning now to FIG. 141, an expanded view of the control module 14002 is shown. The relationship of the heat sink

14004 and the wall 14006 is apparent, where heat dissipating from the heat sink 14004 will extend into the recess 14008 associated with a housing portion 14009. The heat in the recess 14008 may be released out the front of the control module. That is, the recess 14008 between the wall 14006 and the side of the heat sink 14004 receives heat dissipating from the heat sink, which may be released out the front surface. According to some implementations, the rear housing may comprise vents 12616 that also allow heat to be released into the junction box. Also visible in the expanded view are attachment elements 14102 for receiving corresponding attachment elements 14103 of a switch actuator 14011. Contact elements 14104 and 14106, which may be attached to printed circuit boards of the control module, are adapted to extend through openings 14108 of the rear housing 14003.

When using power adapters having an outlet, it is necessary to know the rating of the outlet, and particularly how much current in Amperes (A), also known as Amps, the outlet can draw when a load is attached to the outlet. Outlets can often be rated as 15 A outlets or 20 A outlets for example and are easily identified by a user as a 15 A outlet or a 20 A outlet, as will be described in more detail below. As is commonly known in the industry, an outlet that is rated for 15 A has two parallel openings providing neutral and line voltages (as shown for example in FIG. 142), while an outlet that is rated for 20 A has a "T-shaped" opening for providing neutral (as shown for example in FIG. 143). While it is important to be able to determine whether a power adapter having an outlet is rated at 15 amps or 20 amps in order to prevent a user from drawing current that is greater than the current rating of the outlet (which may cause a circuit breaker to trip), it is also beneficial to prevent a user from inserting a control module having an outlet with a current rating greater than the current rating of the power adapter in which it is inserted. For example, a control module having an outlet with a 20 A rating should not be inserted in a power adapter having an outlet that is only rated for 15 A. That is, because the circuit breaker in a load box and the wiring provided between the circuit breaker and the power adapter having an outlet may only have a certain rating (i.e., a rating for the power adapter to which the circuit breaker and wiring provide power), it is beneficial to prevent a control module having an outlet with a rating greater than the rating of the power adapter from being inserted into the power adapter. For example, it is beneficial to prevent a control module having an outlet with 20 A from being inserted into a power adapter rated at 15 A, which may cause the circuit breaker for the power adapter to trip if a load drawing more than 15 A is coupled to the outlet of the control module.

According to one implementation, a power adapter having an outlet can be configured such that only a control module having an outlet rated at 15 A can be used in a power adapter having an outlet or power adapter having a switch that is rated at 15 A. Similarly, a power adapter having an outlet that is rated at 20 A can be configured such that only a control module having an outlet rated at 20 A can be used with the power adapter having an outlet that is rated at 20 A.

According to another implementation, as described in reference to FIGS. 142-143, a control module that appears to be rated for 15 A (i.e., does not have a "T-slot") can be rated for 20 A and received by a power adapter having an outlet rated for 20 A. That is, because both the power adapter having an outlet would be wired to a circuit breaker rated at 20 A with wire rated at 20 A and the control module having an outlet which appears to be rated at 15 A is actually rated at 20 A, the outlet which appears to be rated at 15 A can be used in a power adapter having an outlet rated at 20 A. However, it is important that a power adapter having an outlet rated at 15 A or a power adapter having a switch cannot receive a control module that is rated at 20 A. That is, a power adapter having an outlet rated at 15 A or a power adapter having a switch may not be wired to a 20 A circuit breaker or with wiring that is rated for 20 A.

Turning first to FIG. 142, a front perspective view of a power adapter arrangement 14200 comprising a power adapter having an outlet and a control module having an outlet is shown. The power adapter arrangement 14200 comprises a control module 14202 having attachment elements 14203 that are adapted to be coupled to corresponding attachment elements 14204. The control module having an outlet comprises openings for receiving products of a plug, including a line opening 14206 for receiving a first prong of a plug, a neutral opening 14207 for receiving a second prong of a plug, and a ground opening 14208 for receiving a third prong of a plug.

The power adapter 14210 comprises an outlet portion 14212 also having openings for receiving prongs of a plug, and particularly a neutral opening 14214 for receiving a first prong of a plug, a line opening 14216 for receiving a second prong of a plug, and a ground opening 14218 for receiving a third prong of a plug. It should be noted that the arrangement of openings for the outlet in FIG. 142 generally designate a 15 amp outlet. The power adapter 14210 also comprises a recess 14220 for receiving the control module 14202. The recess 14220 comprises a housing portion 14222 having a first plurality of openings 14224 for receiving contact elements of the control module 14202 and a second plurality of openings 14226 for receiving actuators of the control module 14202. It should be understood that the power adapters and control modules of FIGS. 142-147 are provided to show interoperability of the control modules and the power adapters and could be implemented to include all of the features of the power adapter arrangements as described above, such as the power adapter arrangement as described above in reference to FIGS. 121-125 for example.

Turning now to FIG. 143, a front perspective view of a power adapter arrangement 14300 comprising a power adapter having a 20 A outlet is shown. As can be seen in FIG. 143, the outlets for both the power adapter and the control module comprise different neutral openings for receiving a prong that designate that the power adapter is rated for 20 A. More particularly, the control module 14302 comprises a neutral opening 14304, a line power opening 14306, and a ground opening 14308. The neutral opening 14304 as shown has a T-shaped opening, indicating that the outlet of the control module is rated for 20 amps. Additional features associated with the housing element 14321 for receiving the plurality of actuators are also shown in FIG. 143. The control module 14302 also comprises a projection 14310, shown in dashed lines to indicate that the projection 14310 extends from a rear surface of the control module. As will be described in more detail below, the projection 14310 is adapted to enable the control module 14302 to be inserted into a corresponding power adapter 14312 that is rated for 20 amps, but not be inserted to a power adapter that is not rated for 20 amps, such as the power adapter 14210.

The power adapter 14312 also comprises an outlet portion 14314 having a neutral opening 14316 for receiving a first prong of a plug, a line power opening 14318 for receiving a second prong of a plug, and a ground opening 14320 for receiving a third prong of a plug. The power adapter 14312 also comprises a housing portion 14321 having an opening 14322 receiving the corresponding projection 14310. While the control module 14202 does not comprise a projection such as the projection 14310 and would be allowed to be inserted in the recess of either power adapter 14210 or power adapter 14312, the projection 14310 of the control module 14302 would prevent the control module 14302 from being inserted into the recess 14220 of the power adapter 14210.

While the implementations of FIGS. 142-143 prevent one type of control module from being used in a certain type of power adapter, a keying feature could also be used. That is, a keying feature comprises elements in each of the power adapters and control modules that enable certain control modules to be used in certain power adapters. As described in reference to FIGS. 144-147, keying features are used to enable or prevent the insertion of certain control modules in certain power adapters.

Turning first to FIGS. 144-145, a front perspective view of power adapter arrangement 14400 having a keying function is shown. The power adapter 14402 is adapted to receive a control module 14401 and comprises rails 14403 that are adapted to be inserted in corresponding guides 14404 of the control module 14401 which are allowed to receive the rails as the power adapter is inserted into the recess of the control module. As can be seen in the power adapter arrangement 14500 of FIG. 145, the power adapter 14502 comprises rails 14503 then are offset compared to the rails 14403. That is, the rails 14503 are lower in the recess of the power adapter 14502 as shown. The control module 14504 also comprises guides 14506 that align with the rails 14503 when the control module 14504 is inserted into the recess of the power adapter 14502. However, the guides 14506 would not align with the rails 14403 of the power adapter 14402. Therefore, the control module 14504, which may be rated at 20 A for example, would not be allowed to be inserted in the power adapter 14402.

In contrast, the guides 14406, as shown in the front plan view of the power adapter arrangement 14400 of FIG. 144 and the power adapter arrangement of FIG. 145, are generally taller than the guides 14506 of the control module 14504. As can be seen, the guides 14406 would allow the control module to be inserted in either the power adapter 14402 or the power adapter 14502, provided that the control module is also rated for 20 amps. In contrast, if the control module were not rated for 20 amps, the guides 14404 could be implemented so that they only receive the rails 14403 of the power adapter 14402, but not the rails 14503 of the power adapter 14502.

Turning now to FIGS. 146-147, a front perspective view of power adapter arrangements 14600 and 14700 having a keying function is shown. Rather than having rails that may be in overlapping areas to receive different guides in different control modules, single rails of the power adapters of FIGS. 146-147 are in different locations. More particularly, the power adapter 14602 comprises a rail 14603 which is adapted to be inserted into the guide 14606 of the control module 14604. The control module 14604 also comprises a guide 14608 to enable the control module 14604 to be inserted into the recess of the power adapter 14702. The power adapter 14702 comprises a rail 14703 adapted to be received by the guide 14706 of the control module 14704. Because the control module 14704 does not include a corresponding guide that would receive the rail 14603, the control module 14704 could not be inserted into the power adapter 14602.

In contrast, the control module 14604 comprises the guide 14608, allowing the control module 14604 to be inserted into the power adapter 14702, assuming that the control module 14604 is rated for 20 amps. However, the control module 14604 could be implemented without the guide 14608, and therefore prevent the control module 14604 from being inserted into the power adapter 14702. While the examples of keying in FIGS. 144-147 provide just two examples of keying, it should be understood that a variety of other implementations of keying could be used, such as projections extending from the rear surface of the control modules that are adapted to extend into corresponding openings in the back of the recess, and may be selectively placed to receive a control module in a recess of a power adapter or block a control module from being inserted into a recess of a power adapter.

Turning now to FIG. 148, a perspective view of a power adapter arrangement 14800 having a ground fault circuit interrupter (GFCI) circuit in the power adapter is shown. The power adapter arrangement comprises a control module 14802 having an outlet 14803 and is adapted to be received by a power adapter 14804. The power adapter comprises a plurality of contact elements 14806, including a first contact element 14808, a second contact element 14810, a third contact element 14812, a fourth contact element 14814, and a fifth contact element 14816, as will be described in more detail below. While the plurality of contact elements 14806 are shown together on one side of the power adapter, if should be understood that the contact elements could be arranged in different locations as described above, including where the ground contact element is associated with the yoke of the power adapter.

The power adapter also comprises a housing portion 14820 having openings, including a first plurality of openings 14822 for receiving contact elements of a control module, and a second plurality of openings 14824 for receiving actuators of a power adapter. The power adapter comprises a raised portion 14826 comprising an outlet 14828, and a recess 14829. The raised portion 14826 extends through an opening of a wall plate when the wall plate is attached to the power adapter. The power adapter also comprises a test button 14830 and a reset button 14832. The test button and the reset button comprise buttons that could be actuated by a user to provide a test or reset function of the power adapter. According to some implementations, the test and reset buttons could be associated with a GFCI circuit, for example, as will be described in more detail in reference to FIG. 149. The power adapter may also comprise flanges 14834 for enabling the power adapter to be attached to a junction box and may be associated with a yoke for example.

Turning now to FIG. 149, a block diagram of the power adapter arrangement 14900, which corresponds to the power adapter arrangement 14800 of FIG. 148, is shown. The power adapter 14804 comprises an AC/DC circuit 14904 for generating a DC signal for providing DC power to the components of a GFCI circuit 14905. More particularly, the GFCI circuit comprises a control circuit 14906 that is adapted to control line power received by a contact element 14808 and coupled to a switch 14910. Ground faults most often occur when equipment is damaged or defective, such that live electrical parts are no longer adequately protected from unintended contact by a user. According to the National Electrical Code, a "ground fault" is a conducting connection between any electric conductor and any conducting material that is grounded or that may become grounded. In a ground fault, electricity has found a path to ground, but it is a path the electricity was never intended to be on, such as through a person's body. A ground fault circuit interrupter (GFCI) can help prevent electrocution. GFCI's are designed to sense an imbalance in current flow over the normal path. The GFCI will "sense" the difference in the amount of electricity flowing into the circuit to that flowing out, even in amounts of current as small as 4 or 5 milliamps. The GFCI reacts quickly (less than one-tenth of a second) to trip or shut off the circuit. If your body provides a path to the ground for this current, a person could be shocked or electrocuted, the GFCI senses this condition and cuts off the power before a person can be injured.

The GFCI circuit is configured to detect the abnormal changes in current, where the control circuit 14906 is coupled to a first current detector 14912 that detects current flowing through the switch 14910 and a second current detector 14914 that detects a current flowing through the neutral contact element 14810 and a switch 14915. If the control circuit detects an abnormal amount of current in the current detector 14912 and 14914, it may determine that a ground fault has occurred, and will open the switch 14910 and the switch 14915 so their current cannot continue the flow in the power adapter.

As shown in FIG. 149, the line power provided to the control module 14802 is also provided by way of the switch 14910. That is, the outlet 14803 of the control module 14802 will not receive line power in the event of a detection of a ground fault. Also, the current detector 14914 will detect current from both the neutral line of the power adapter 14804 and the neutral line of the control module. The abnormal currents in both the current detectors will detect current provided to both of the outlets of the power adapter arrangement 14900 and the current that is returned by way of the neutral contact element 14810 to detect a ground fault that may be occurring in either of the outlets of the power adapter arrangement 14900. That is, the current detector 14912 will detect the current drawn by both outlets by detecting the current through the switch 14910, and the current returning through the current detector 14914 represents the return current on the neutral lines of both outlets of the power adapter arrangement 14900. The second switch 14915 is provided in the path from the neutral contact element to the current detector 14914. When the control circuit disables the path of the line current by opening the switch 14910, it will also disable the path to the neutral contact element 14810 by opening the switch 14910.

The plurality of openings 14822 comprises a first opening 14916, a second opening 14918, a third opening 14920, a fourth opening 14922, a fifth opening 14924, and a sixth opening 14926. The openings 14916-14920 are adapted to receive contact elements of a power adapter, but do not provide any electrical connection. That is, the openings 14916-14920 accommodate contact elements of a control module that may have functionality used in other power adapters, but not used by the power adapter 14804 having an outlet. The openings 14922, 14924, and 14926 or associated with contact elements accessible through the openings that make electrical connection to a corresponding line contact elements 14928, a neutral contact element 14930, and a ground contact element 14932. That is, while the openings 14922, 14924, and 14926 are adapted received contact elements that make electrical contacts with the contact elements 14928, 14930, and 14932, respectively, the openings 14916, 14918, and 14920 are only adapted to receive a contact element but may not enable an electrical connection to any contact elements of the power adapter. The control circuit 14906 also responds to a test signal to perform an internal test to determine if the GFCI circuit is functioning properly. The control circuit 14906 also responds to a reset signal to allow the power adapter to operate again after a ground fault is detected and the condition that caused the ground fault condition and triggered the control circuit has been eliminated.

While the power adapter 14804 as shown receives the control module 14802, it should be understood that any type of control module other than a control module having an outlet could be implemented with the power adapter 14804. For example, some power adapters may include contact elements for additional features that would not be used when that control module is used in the power adapter having an outlet but may still have functionality that is beneficial. For example, a control module comprising a smart speaker may also control the state of a switch when used in a power adapter having a switch. However, while the control module having a smart speaker may not control power to the outlet when installed in a power adapter having an outlet, the control module having a smart speaker may have other functionality that makes it beneficial to use the control module having a smart speaker in a power adapter having an outlet.

Turning now to FIG. 150, a perspective view of a power adapter arrangement 15000 having a control module that comprises a GFCI circuit is shown. Unlike the implementation of a GFCI circuit in FIGS. 148 and 149, the GFCI circuit is provided in the control module, and provides GFCI protection for the outlet of both the control module and the power adapter. More particularly, the power adapter arrangement comprises a control module 15002 that is adapted to be inserted into a power adapter 15004. The power adapter comprises a plurality of contact elements 15006, comprising a first contact element 15008, a second contact element 15010, a third contact element 15012, a fourth contact element 15014, and the fifth contact element 15016. The power adapter also comprises a recess 15018 for receiving the control module having a GFCI circuit. The power adapter also comprises a housing portion 15020 having a plurality of openings 15022 for receiving contact elements of the control module 15002, and a second plurality of openings 15024 for receiving actuator elements of the control module 15002. The power adapter also comprises a raised housing portion 15026 having an outlet 15028 extending from a rear housing 15032. As will be described in more detail in reference to FIG. 151, the control module 15002 having a GFCI circuit will also provide GFCI protection for the outlet 15028 and any outlet that is wired downstream of the power adapter. As shown in FIG. 149, a neutral out contact element 14816 and a line out contact element 14819 are provided to allow for downstream connections to other power adapters and provide GFCI protection to the downstream power adapters. The power adapter may also comprise flanges 14834 for enabling the power adapter to be attached to a junction box and may be associated with a yoke for example.

Turning now to FIG. 151, an example of a block diagram of the power adapter arrangement 15100 of FIG. 150 is shown. According to the implementation of FIG. 151, the "neutral out" contact element 15014 and the "line out" contact element 15016 enable the connection to downstream power adapters, while providing GFCI protection to the downstream power adapters. That is, the neutral out and line out contact elements are provided by way of the control module 15002, and therefore provide GFCI protection to any downstream power adapters, such as power adapters having outlets, which have a neutral contact element connected to the neutral contact element 15014 and a line contact element connected to the line out contact element 15016. More particularly, the control module 15002 comprises a GFCI circuit 15121 for detecting any abnormal currents and disabling the line power to the outlet of the power adapter 15004 and to the outlet of the control module 15002.

The power adapter 15004 comprises a first opening 15102, a second opening 15104, a third opening 15106, a fourth opening 15108, a fifth opening 15110, and a sixth opening 15111 of the plurality of openings 15022. It should be noted that the first opening 15102 does not comprise a contact element for making an electrical connection to a corresponding contact element of a control module, while the remaining openings 15104-15111 comprise contact elements that make electrical connections to corresponding contact elements of the control module 15002, including a first contact element 15112, a second contact element 15114, a third contact element 15116, a fourth contact element 15118, and a fifth contact element 15120.

The GFCI circuit 15121 comprises an AC/DC circuit 15122 to generate a DC signal to provide power to elements of the GFCI circuit. The GFCI circuit also provides a switch 15124 coupled to the line in contact element 15008. A second switch 15125 is also provided between the neutral contact element 15010 and the current detector 15130. A GFCI control circuit 15126 is adapted to control the switches 15124 and 15125 in response to currents detected by a first current detector 15128 and a second current detector 15130. The GFCI control circuit 15126 will disconnect the line power provided to the outlet 15028 or outlet 15003 if an improper current is detected in the current detectors 15128 and 15130. The GFCI control circuit 15126 will also disconnect the neutral connection using the switch 15125 if an improper current is detected. The GFCI control circuit 15126 will also provide any necessary reset and test functions in response to actuations of the reset button 15030 and the test button 15034.

Turning now to FIG. 152, a block diagram of a power adapter arrangement having a standard outlet in the power adapter of FIG. 151 is shown. The power control module 15202 comprises an outlet 15204 and a pair of connections that enable the line and neutral voltages to be routed to the line and neutral contact elements of the outlet 15028 and the neutral out contact element 15014 and line out contact element 15016. More particularly, a first connection 15206 is provided between the power contact element of the outlet 15204 and the contact element 15112, and a second connection 15208 is provided between the neutral contact element of the outlet 15204 and the contact element 15114 as shown.

Turning now to FIG. 153, a block diagram of a power adapter arrangement 15300 having an arc fault detection circuit is shown. The power adapter 15301 comprises an AFCI circuit 15302 for detecting an arc fault condition. An arc fault is a powerful electrical discharge between two or more than two conductors and may generate enough heat to break the insulation and cause an electrical fire. The arc can also generate waveforms that can disrupt or destroy sensitive electronics equipment. The arc fault can occur as a series arc fault in the same conductor in series with the load due to damage or loose connection between them or as a parallel arc fault. An Arc Fault Circuit Interrupter also known as an arc fault detection device, is a protective device used for protection against fire hazards caused by arc faults. An Arc Fault Circuit Interrupter can detect arcs in the circuit and break the supply of electricity to the circuit. AFCI also provides protection against overloading and short circuit current using thermal and magnetic protection as used in a normal circuit breaker.

A control circuit 15304 provides a similar function as the control circuit in the GFCI circuit, but is coupled to three current detectors, including a first current detector 15306 coupled to the line contact element 15307, a second current detector 15308 coupled to the neutral contact element 15309, and a third current detector 15310 coupled to the ground contact element 15311. The control circuit 15304 is coupled to control a switch 15312 and opens the switch to prevent line current from being provided to either of the outlets of the power adapter arrangement. An AC/DC circuit 15314 is also provided to generate a DC signal that may be used by the power adapter. The power adapter 15301 comprises a plurality of openings, including a first opening 15322, a second opening 15324, a third opening 15326, a fourth opening 15328, and a fifth opening 15330, and a sixth opening 15332.

A control module 15319 has an outlet 15320 and comprises a first contact element 15334, a second contact element 15336, and a third contact element 15338. The openings 15328-15332 comprise contact elements for making an electrical connection to corresponding contact elements 15334-15338, respectively. As shown in FIG. 153, the switch 15312 prevents the line current from being provided to either the first outlet 15341 or the second outlet 15320, while a second switch 15313 prevents the neutral contact element from being connected to either of the first outlet 15341 and the second outlet 15320. The control circuit is also coupled to receive a signal by way of the test button 15340 or the test button 15342. A contact element 15344 is provided to provide a line out signal and a second contact element 15346 is provided to provide a neutral out signal that may be routed to downstream power adapters to provide arc fault protection to the downstream power adapters.

Turning now to FIG. 154, a bock diagram of a power adapter arrangement 15400 where the control module has in arc fault circuit interrupter is shown. According to the implementation of FIG. 154, the arc fault detection circuit is implemented in a control module, where the external appearance of the power adapter 15402 would be similar to the power adapter 15004, but have different functionality as shown in FIG. 154. The power adapter 15402 is adapted to receive a control module 15404. The power adapter comprises a plurality of contact elements that are adapted to be coupled to wires of a junction box, including a line contact element 15406, a neutral contact element 15408, a ground contact element 15410, a neutral out contact element 15412, and a line out contact element 15414. As will be described in more detail below, the connections to the line out and neutral out contact elements are controlled by a pair of switches, and therefore can safely provide a source of power to downstream power adapters as described above. The power adapter also comprises outlet 15415.

The control module 15404 comprises a plurality of openings 15420 including a first opening 15422, a second opening 15424, a third opening 15426, a fourth opening 15428, a fifth opening 15430, and a sixth opening 15432. As shown in FIG. 154, each of the openings of the plurality of openings 15420 comprises a contact element for making an electrical connection to a corresponding contact element of the control module 15404. More particularly, a first contact element 15434 is coupled to a contact element associated with the first opening 15422, a second contact element 15436 is coupled to a contact associated with the opening 15424, a third contact element 15438 is coupled to a contact element of the opening 15426, a fourth contact element 15440 is coupled to a contact element associated with the opening 15428, a fifth contact element 15442 is coupled to a contact element associated with the opening 15430, and a sixth contact element 15444 is coupled to a contact element associated with the opening 15432. An AFCI circuit 15450 comprises an AC/DC circuit 15452 that is coupled to the line voltage and adapted to generate a DC voltage to be used by circuits of the AFCI circuit. A control circuit 15454 of the AFCI circuit is coupled to a plurality of current detectors, including a first current detector 15456, a second current detector 15458, and a third current detector 15460. The current detectors are adapted to detect currents in each of the line contact element 15406, the neutral contact element 15408, and ground contact element 15410. If an arc fault condition is detected by the control circuit 15454, a switch 15462 prevents the line voltage from being provided to either the first outlet 15415 or the second outlet 15468, while a second switch 15463 prevents the neutral contact element 15408 from being electrically connected to either the first outlet 15415 or the second outlet 15468. A test button 15464 and a reset button 15466 are provided on a front surface of the control module.

Turning now to FIG. 155, a perspective view of a power adapter arrangement having a control module comprising a data connection is shown. The power adapter arrangement 15500 comprises a control module 15502 having data ports, and a power adapter adapted to receive the control module and having corresponding data ports. That is, the power adapter arrangement enables a data connection that is provided to the power adapter to be routed through the recess of the power adapter and to a front surface of the control module. More particularly, the control module 15502 comprises a first connector 15506 that is configured to route data by way of a communication link 15508 to another connector 15510. The control module 15502 may also comprise a second data port 15512 that is configured to route data by way of a second communication link 15514 to a corresponding connector 15516. The communication links may comprise for example a plurality of wires of a flex strip or wiring harness, or traces on a circuit board. According to one implementation, the first data port may be configured to route data by way of an Ethernet protocol, and the second data port may be implemented to route data by way of a USB protocol. However, it should be understood that any number of data connections could be provided which may implement any number of different data protocols.

The power adapter 15504 comprises a raised portion 15517 comprising an outlet 15518. The power adapter also comprises a plurality of contact elements 15520 that are adapted to be coupled two wires of a junction box, and include a first contact element 15522, a second contact element 15524, and a third contact element 15525. A recess 15526 is also provided to receive the control module 15502 and comprises a housing portion 15528 having a first plurality of openings 15530 adapted to receive contact elements of a control module, and a second plurality of openings adapted to receive actuators of a control module as described above.

The power adapter 15504 also comprises data ports for enabling the control module to provide access to a data port on an outer surface of the power adapter arrangement, such as on the front surface of the control module as shown. That is, the power adapter 15504 comprises a first connector 15532 that is adapted to make an electrical connection to the connector 15510 when the control module 15502 is inserted into the recess 15526. By way of example, the connector 15510 may be a male connector adapted to mate with a female connector 15532. The connector 15532 is electrically connected by a communication link to a corresponding connector 15538. A second data connection is also provided in the power adapter 15504 to enable a connection to the connector 15516. More particularly, a connector 15540 is adapted to make an electrical connection to the connector 15516 when the control module 15502 is inserted into the recess. The connector 15540 is coupled by a communication link 15542 to a corresponding connector 15544. The connectors 15538 and 15544 enable a wired connection to another location during the installation of the power adapter arrangement. That is, the connectors 15538 and 15544 are accessible within the junction box, where wires can be routed out of the junction box to a remote location. The power adapter may also comprise flanges 15550, which may be associated with a yoke for example, which enable the power adapter to be attached to a junction box.

Turning now to FIG. 156, a perspective view of a power adapter 15600 having an outlet and comprising a data connection is shown. Unlike the power adapter arrangement of FIG. 155 having a data connection that is provided through the control module, the power adapter 15602 provides one or more data connectors on a front surface of the power adapter that is accessible through a wall plate when a wall plate is attached to the power adapter arrangement. The power adapter 15602 comprises a raised portion 15604 having an outlet 15606 and a recess 15608. The power adapter also comprises a housing portion 15610 having a first plurality of openings 15612 adapted to receive contact elements of a control module and a second plurality of openings 15614 adapted to receive actuators of a control module. The power adapter also comprises a plurality of contact elements 15616, including a first contact element 15618, a second contact element 15620, and a third contact element 15622 that are adapted to receive wires of a junction box, such as a ground, neutral and line wire for example.

The power adapter also comprises a connector 15624 coupled to a communication link 15626 that is routed to a corresponding connector 15628. A second data connection may also be provided and comprises a connector 15630 coupled to a communication link 15632 and a second connector 15634. The function of the connectors 15628 and 15634 are similar to the connectors 15532 and 15440 by enabling the routing of data to the power adapter through the junction box. The connectors 15624 and 15630, which are accessible on a front surface of the power adapter when the wall plate is attached to the power adapter, may implement any data communication protocol, such as an Ethernet protocol for connector 15624 and a USB protocol for connector 15630, for example. However, it should also be understood that any data communication protocols could be implemented in any number of data connectors on the raised portion 15604. Flange 15636 are provided to enable attaching the power adapter to the junction box.

Turning now to FIG. 157, a perspective view of a system 15700 controlled by a power adapter having a control module comprising a plurality of actuators for controlling a plurality of loads is shown. According to the implementation of FIG. 157, a power adapter 15701 comprises a switch actuator 15702 and a control module 15703 having a plurality of buttons, shown here by way of example as a first switch actuator 15704, a second switch actuator 15706, and a third switch actuator 15708. The control module 15703 is adapted to be inserted into a recess of the power adapter 15701 and removably coupled to the power adapter. The control module 15703 is adapted to receive power for enabling one or more wireless connections to a plurality of power adapter arrangements or other switching devices controlling a plurality of loads. More particularly, the switch actuator 15702 is configured to control the application of the power to the load 15710.

The control module 15703 comprises one or more wireless communication circuits for enabling a wireless connection to communicate with control modules in other power adapters. For example, the switch actuator 15704 is adapted to control a power adapter 15712 having a control module 15713 comprising a wireless communication circuit. The power adapter 15712 controls the application of the power to the load 15714 in response to a wireless signal transmitted on a communication link 15716 and received by the control module 15713. The switch actuator 15706 is adapted to control a power adapter 15718 having a control module 15719 comprising a wireless communication circuit. The power adapter 15718 controls the application of the power to the load 15720 in response to a wireless signal transmitted on a communication link 15722 and received by the control module 15719. The switch actuator 15708 is adapted to control a power adapter 15724 having a control module 15725 comprising a wireless communication circuit. The power adapter 15724 controls the application of the power to the load 15726 in response to a wireless signal transmitted on a communication link 15728 and received by the control module 15725.

The system may also comprise a portable device 15730, such as a mobile phone or a computer such as a table computer for example, for programming and controlling the control module 15703 by way of a communication link 15732. The portable device 15730 may also control individual power adapter arrangements, such as the control module 15713 by way of a wireless connection 15734. Such an application of a control module is beneficial in an arrangement having different lighting groups such as in a kitchen or family room for example.

FIGS. 158-160 are now shown to provide examples of how the various power adapter arrangements can help reduce the wiring requirements for implementing a 3-way switching arrangement or a switched outlet. Turning first to FIG. 158, a plan view of a switched outlet arrangement 15800 shows an elimination of wiring associated with a switched outlet. More particularly, a switch 15802 shown inserted in a junction box 15804 is coupled to control an outlet 15806 in a junction box 15808 by way of wiring 15812, which may be routed for example through conduit between the junction boxes 15804 and 15808 on opposite sides of a door 15814. By providing a wireless connection 15810 between the switch 15802 and the outlet 15806, it is possible to eliminate the wiring 15812, which comprises material costs associated with both the conduit and wiring, and labor costs for installing the conduit and routing the wire between the junction boxes. According to one implementation, the switch 15802 can be installed in a multi-gang junction box that may comprise a switch controlling a different load or a receptacle. According to another implementation, the switch 15802 could be attached to a wall without the use of a junction box.

According to the implementation of FIG. 159, the switch 15902 can receive electrical power from the wiring in the junction box 15804 in a system arrangement 15900. That is, even though the switch 15902 provides a wireless control of the outlet 15806 and it is not necessary to route conduit on opposite sides of a door 15914, the switch 15902 receives power by way of a line wire provided to the junction box 15804, eliminating the need for battery power of the switch 15902 to enable the wireless connection 15810 between the switch 15902 and the outlet 15806. Such an arrangement is particularly beneficial when a multi-gang junction box is used because there will be minimal cost associated with providing the power to the switch 15902, while still allowing the elimination of wiring 15812 between the junction box 15804 and the junction box 15808.

FIG. 160 shows a similar arrangement 16000 of switches having a wireless connection which enabled the elimination of wiring between the switches of a 3-way switching arrangement. The 3-way switching arrangement of FIG. 160 comprises a junction box 16002 having a switch 16004 and a junction box 16006 having a switch 16008. According to the configuration of the 3-way switch of FIG. 160, the wiring 16010 between the junction boxes can be eliminated, where the control of the load 16012 is controlled by the wireless connection 16013. The amount of wiring in conduit necessary between junction boxes of a 3-way switching arrangement is apparent in FIG. 160, where the conduit may be required to be routed around a door 16014, windows 16016 and 16018, and another door 16020. Therefore, the ability to eliminate the wiring can lead to substantial cost reductions in the implementation of the system. According to one implementation, the switch 16004 may receive power from a line wire in the junction box 16002 as shown, enabling the switch 16004 to be implemented without a battery.

Turning now to FIG. 161, a block diagram of a system 16100 comprising a dimmer having an extended dimming range for controlling a load is shown. A power adapter 16102 comprises a control module having a dimmer actuator 16104 for controlling power to a load 16112. A control circuit 16106 is adapted to control a relay 16108 and a TRIAC 16110. The control circuit will selectively enable the relay 16108 or the TRIAC 16110, depending upon the dimming level. That is, when no dimming is needed, the relay is used. However, when dimming is required, the TRIAC is used, where the highest dimming level of the TRIAC is lower than the maximum power provided to the load by way of the relay.

Turning now to FIG. 162, a block diagram of a receiver circuit that could be used in a power adapter having a switch is shown. The receiver circuit 16200 comprises a plurality of resistors in series, including a first resistor 16202 and a second resistor 16204. A capacitor 16206 is coupled to a node between the resistors and a ground node. A low voltage signal generated at the node between the two resistors is provided to a voltage regulator 16208 to generate a stable internal output voltage for the latch 16210. A pulse detector 16212 is provided to receive a signal from a traveler line, where the output of the pulse detector is coupled to the latch 16210 to enable a change of the state of the latch. The latch is provided to control the relay 16214, and particularly to switch the relay. That is, the relay 16214 receives the line voltage and generates a line output signal in response to an output of the latch 16210.

Turning now to FIG. 163, another block diagram of a receiver circuit 16300 that could be implemented in a power adapter having a switch is shown. A multiway power adapter may need to identify when the traveler line is connected to the line voltage, and then switch a switch on or off when that occurs. The high-level operation used to achieve this within the master power adapter can be implemented using the circuit of FIG. 163. Generally, a signal from the traveler line passes through a peak detector circuit, which determines if a latch should be set, or reset. Based on the output of the latch, an H-Bridge is then used to control the relay and toggle it on or off. As shown in FIG. 162, there may be a need for a linear regulator circuit to generate a DC voltage. Generating a DC voltage may present a challenge, as conventional methods of AC/DC conversion impact size and cost. The circuit of FIG. 163 may be implemented to achieve a cheaper and smaller circuit for generating a DC voltage.

More particularly, a voltage regulator 16302 receives a line input signal, and generates a first output voltage, shown here by way of example as a 24 Volt DC output voltage, and a second output voltage, shown here by way of example is a 5 Volt DC output voltage for providing DC signals to a control circuit 16304 and a relay circuit 16305. The peak detector 16306 is coupled to the traveler line and generates an output provided to the latch 16308. Outputs of the latch are coupled to an H bridge 16312 which controls a relay 16314 for routing the line voltage to an output of the relay.

Turning now to FIG. 164, a block diagram of a voltage regulator that could be implemented in a power adapter having a switch is shown. More particularly, the voltage regulator 16302 comprises a rectifier 16402 coupled to receive the line voltage. A resistor 16404 is coupled between an output of the rectifier 16402 and another rectifier 16406. The output of the rectifier 16406 is coupled to a voltage regular 16410. A capacitor 16408 is coupled between the node at the output of the rectifier 16406 and the input of the voltage regulator. The voltage regulator generates a first fixed DC voltage, shown here by way of example is a 24 Volt DC signal. A resistor 16412 coupled to the output of the voltage regulator and in series with another resistor 16414, which enables generating a second DC voltage at a node between the resistors, shown here by way of example is a 5 Volt DC signal. The line voltage (120 VAC) charges 16408 which may then be used to supply the input voltage for the voltage regulator. The voltage regulator then controls both the relay and is also divided via resistors to create a 5V rail for the logic in the circuit.

Turning now to FIG. 165, a block diagram of circuit 16500 comprising a control circuit and a relay circuit that could be implemented in a power adapter having a switch is shown. More particularly, the control circuit 16304 comprises a resistor 16502 coupled to the traveler line to receive a signal over the traveler line. A second resistor 16504 is a coupled in series with the resistor 16502 at a node at an input of a rectifier 16506. The rectifier is coupled to a latch 16512, shown here by way of example of it as a D flip flop. A capacitor 16508 and a resistor 16510 are coupled in parallel between the input of the latch and ground. An enable input of the latch is also coupled to the input of the latch 16512. The traveler line voltage passes through the peak detector circuit comprising the circuit elements coupled to the D input of the latch, such that the relay is toggled on/off upon detecting a peak on the traveler line. The relay circuit 16310 may comprise a pair of transistors 16514 and 16516 at one terminal of a relay 16518, and a second pair of transistors 16520 and 16522 couple to another terminal of the relay.

Turning now to FIG. 166, a block diagram of another power supply circuit 16600 is shown. The power supply circuit comprises a rectifier 16602 coupled to receive the line voltage at an input, an output of which is provided to a transistor circuit 16604. The transistor circuit generates a reference voltage, shown here by way of example as a 24 V DC circuit. The voltage regulator 16606 generates a 3.3V DC signal. The main difference between the power supply of FIG. 165 and the linear regulator solution of FIG. 166 is the location of the voltage regulator. The transistor circuit divides the voltage down to a value between 12V and 24V, and then uses a regulator to create the lower voltage rail, whereas the implementation of FIG. 165 places the regulator right after the line voltage (after rectifying and averaging the 120 VAC), and a lower voltage rail is created via resistors.

Turning now to FIG. 167, a circuit diagram of the transistor circuit and voltage regulator of FIG. 166 is shown. The transistor circuit 16604 comprises a rectifier 16702 coupled to receive a line voltage, and an output of the rectifier is provided to a first node associated with three parallel paths. A first path comprises a resistor 16704 coupled between the first node and a rectifier 16706. A second rectifier 16708 is coupled between a ground node and the input of the rectifier 16706. A resistor 16710 is coupled between a neutral terminal and the ground node. A second path comprises a transistor 16712 having a collector coupled to the first node and a base coupled to the output of the rectifier 16706. An emitter of the transistor 16712 is coupled to an input of the rectifier 16714. An output of the rectifier 16714 is a DC regulator voltage, shown by way of example as a 24 Volt DC signal. A capacitor 16715 is coupled between the rectifier 16714 and the ground terminal. A third path comprises a resistor 16716 coupled between the first node and a resistor 16722 coupled to the ground node. A resistor 16718 is coupled between a 3.3 Volt DC signal and the collector of a transistor 16720 having an emitter coupled to ground and a base coupled to the node between the resistors 16716 and 16722.

Turning now to FIG. 168, a block diagram of a transmitter circuit is shown. The transmitter 16800 comprises a transistor 16804 having a gate to receive data and a drain coupled to a resistor 16802. A signal generated at the resistor 16802, shown here by way of example as a sine signal, is routed on a traveler line and an output of the capacitor 16806 as shown. Accordingly, the sine wave signal is transmitted when the transistor 16804 is turned on.

Certain control modules may require the ability to communicate with one another during their operation when connected in a multiway configuration. The ability to communicate presents a challenge, as the control modules may be limited to six connections (Line, Neutral, Ground, Load, Traveler, and Switch). According to one implementation, Powerline Communication (PLC) could be used. Specifically, the control module would make use of the traveler line, and couple a high frequency signal with embedded data, which may comprise any digital protocol (e.g., Serial data, pulse width modulated (PWM) data, etc.) to communicate with the other control modules on the traveler line. According to the circuit of FIG. 168, a data signal controls the gate of a transistor 16804, which couples a high frequency sine wave to the traveler line as shown in the timing diagram of FIG. 169.

Turning now to FIG. 169, a timing diagram shows a signal transmitted by the transmitter circuit of FIG. 168. The above signal alternates between a high frequency sine wave and 0V. A receiver circuit of the receiving control module, such as the receiver circuit of FIG. 170 will be able to record the waveform and decode the original data.

Turning now to FIG. 170, a block diagram of a receiver circuit 17000 for receiving a signal is shown. The receiver circuit 17000 comprises an input for receiving data at a terminal of a capacitor 17022, where a second terminal of the capacitor is coupled to a first bias resistor 17024 that is coupled between the capacitor and receives a voltage bias signal V bias. The capacitor 17022 is also coupled to a terminal of a second capacitor 17026, where a second terminal of the capacitor 17022 is coupled to a second bias resistor 17028 that receives the voltage bias signal and an input of an operational amplifier 17029. An output of the operational amplifier 17029 is coupled to the other input terminal of the operational amplifier by way of a feedback path having a resistor 17032 coupled to the input. A voltage bias is also provided by way of a resistor 17030. An output of the operational amplifier 17029 is coupled to a diode 17034, which may be a Zener diode for example, an output of which is coupled to an input of the second operational amplifier 17044. A capacitor 17036 and a resistor 17038 are coupled between the output of the diode 17034 and ground. A resistor divider network comprising a first resistor 17040 and a second resistor 17042 provide a voltage to the second input of the operational amplifier 17044, which generates an output of the receiver circuit.

Turning now to FIG. 171, a timing diagram showing a signal received by the receiver circuit of FIG. 170 is shown. Despite a slight phase shift, the information is reconstructed in its entirety. It should be understood that this data could be transmitted using any protocol, such as a serial or a pulse width modulated signal. While examples of circuits for implementing power supplies to generate reference voltages and transmitter and receiver circuits are shown by way of example, it should be understood that other power supply circuits and transmitter and receiver circuits could be implemented.

Turning now to FIG. 172, a perspective view of a latch is shown. A latch 17202 comprises a surface 17204 that enables a user to press to rotate the latch to access a grip element 17206, as will be described in more detail in reference to FIG. 173. When the latch 17202 is rotated, a finger grip 17208 is accessible by a user to enable a user to remove the control module from the recess. An opening 17210 is provided to enable the latch to be attached to a control module. A guide 17212 is also shown and described above in reference to other latch. A beveled edge 17214 is also provided with the latch. The beveled edge enables the control module to be inserted into the recess of the power adapter regardless of the state of rotation of the latch 17202. That is, a corresponding latch of the power adapter may be spring loaded to enable the latch to ride over the beveled edge 17214 and the surface 17216, and drop down into the guide 17212, as will be described in more detail in reference to FIG. 173.

Turning now to FIG. 173, a perspective view of a power adapter arrangement 17300 having the latch of FIG. 172 is shown. A control module 17302 comprises an attachment element 17304, which may be for example a screw or rivet made of any suitable material such as plastic or metal, for attaching the latch 17202 to the control module 17302 and enabling the latch to rotate to unlatch the control module. The control module 17302 comprises a guide 17306 that is adapted to receive a corresponding latch element 17308 of the power adapter 17310. That is, as the control module is inserted into the recess of the power adapter and the latch element 17308 advances in the guide 17306, it will reach the end of the guide and be ready to enter the corresponding guide 17212. However, if the opening of the guide 17212 is not aligned with the end of the guide 17306, the latch element 17308 can ride over the beveled edge 17214 and the surface 17216 to drop into the guide 17212. For example, the control module can be inserted when the latch is in the state as shown in FIG. 173, which is a locked state. However, the latch will need to be rotated to allow the corresponding latch element 17308 to exit the guide 17212 when removing the control module.

Turning now to FIG. 174, a perspective view of a latch is shown. A latch 17402 is also a modified version of a previous latch such as latch 12115, and also allows the control module to be inserted into the power adapter regardless of the state of the latch. The latch 17402 also comprises a surface 17404 to enable rotating the latch so that a grip element 17406 is accessible and the latch can be rotated. The latch also comprises an opening 17408 to enable the latch to rotate to expose a finger grip 17410. An inner portion of a guide 17414 enables a corresponding latch element of the power adapter to advance along an inner portion of the guide and end up in a recessed portion 17412 when the latch is in a latched state. A surface 17416 enables the control module to be inserted into the recess even when the latch is in the closed position (i.e., when the control module would be latched), where the latch 17402 will rotate slightly when a corresponding latch element of the power adapter engages the surface 17416, as will be described in reference to FIG. 175.

Turning now to FIG. 175, a perspective view of power adapter arrangement 17500 having the latch element of FIG. 174 is shown. A control module 17502 comprises attachment element 17504 that is adapted to attach the latch 17402 to the control module. A guide 17506 also enables a corresponding latch element to be received by the latch 17402. More particularly, the power adapter 17508 comprises a corresponding latch element 17510 that is adapted to enter the guide 17506 and be latched in the recessed portion 17412. As the control module 17502 is advanced and the latch element 17510 moves through the guide 17506, the latch 17402 will be rotated as the latch element 17510 advances along the surface 17416. The control module can be latched by returning the latch 17402 to the latched state, where the latch element 17510 is in the recessed portion 17412.

Turning now to FIG. 176, a perspective view of a latch element is shown. A latch 17602 comprises a pivot point that is placed towards a lever element to enable a user to remove a control module using a lever force associated with the latch. More particularly, the latch 17602 comprises a surface 17604 that enables a user to rotate the latch, where a grip element 17606 is exposed and enables a user to continue to advance the latch and access a finger grip 17608. The latch 17602 also comprises a lever surface 17610 that is adapted to engage a corresponding lever surface of the power adapter, as will be described in more detail in reference to FIG. 177. The latch 17602 comprises an opening 17612 to enable the latch to rotate and function as a lever. A guide 17614 Is provided for receiving a corresponding latch of a power adapter. A beveled edge 17616 is also provided to allow the control module to be inserted while the latch is in the position associated with the latched state, as described above in reference to FIG. 172.

Turning now to FIG. 177, a perspective view of power adapter arrangement 17700 having the latch of FIG. 176 is shown. The power adapter arrangement 17700 shows elements of the control module 17702 that enable the control module to be inserted into a power adapter. More particularly, a projection 17704 creates a guide 17706 for receiving a corresponding rail of the power adapter. A second guide 17708 is adapted to receive a corresponding latch element 17716 of the power adapter. The power adapter 17710 comprises a rail 17712 that is adapted to mate with the corresponding guide 17706. When the control module is inserted into the power adapter, a corresponding latch element 17716 is adapted to enter the guide 17708 and be received by the guide 17614 to latch the control module. According to one implementation, the latch element 17716 may be spring loaded to enable passing over the beveled edge 17616 and enter the guide 17614. That is, a spring-loaded latch element may be any latch having a latching element, such as a flange at an end of a flexure as shown in FIG. 177, the operation of which may be affected by a spring. A spring force necessary may be a portion that is integral to the latch (e.g., a flexure affecting the motion of a flange as shown in FIG. 177, or a separate spring (such as a coil spring) associated with a housing. According to the implementation of FIG. 176, the spring functionality for the latch element 17716 is provided by a flexure 17718 as shown. That is, the flexure allows the latch element 17716 to move upward and over the beveled edge. While latch elements having a flange at the end of a flexure in a number of implementations, it should be understood that a latch element having any type of spring action could be implemented.

In addition to helping align the control module with the power adapter as the control module is inserted into the recess, the latch 17602 also provides a lever function for helping extract the control module from the power adapter. More particularly, the lever surface 17610 is adapted to abut with the end 17714 of the rail 17712. When the surface 17604 is pushed and the grip element 17606 can be accessed, the lever surface 17610 abuts the end 17714. As the latch 17602 is rotated, the lever force of the latch 17602 helps extract the control module from the recess.

Turning now to FIG. 178, a perspective view of a latch element is shown. The implementation of a latch 17802 of FIG. 178 also operates on the principle of a lever and has a longer lever arm relative to the latch 17602 of FIG. 176. The latch 17802 comprises a projection 17806 that can be used to cause the latch 17802 to be rotated to provide access to a finger grip 17808. The latch 17802 also comprises an opening 17810 for receiving an attachment element, such as a screw or rivet that enables the latch element to rotate with respect to the control module. The end 17812 of the surface 17804 comprises a surface 17814 that is adapted to engage a corresponding surface of the power adapter to enable the control module to be extracted from the recess using, at least in part, a lever force. The latch 17802 also comprises a recess 17816 for receiving a corresponding latch element of the power adapter.

Turning now to FIG. 179, a perspective view of power adapter arrangement 17900 having the latch of FIG. 178 is shown. A control module 17902 is adapted receive the latch 17802, which is adapted to rotate with respect to the control module using an attachment element 17903. The control module comprises a guide 17904 created by a projection 17906. The guide 17904 is adapted to receive a rail 17908. The projection 17906 also creates a second guide 17909 that is adapted to receive a latch element 17910. The rail 17908 abuts the surface 17814 on the end 17812 to enable a lever function for extracting the control module from the recess. When the latch 17802 is rotated, such as to approximately 90 degrees or less, the recess 17816 aligns with the latch element 17910 to receive the latch element and enable latching the control module to the power adapter.

Turning now to FIG. 180, a perspective view of a latch is shown. A latch 18002 comprises a handle element 18004 between a pair of support elements 18006 and 18008. A release element 18012 creates an opening 18014. As will be described in more detail in reference to FIG. 181, when the handle element is pulled, an edge 18016 will advance along a latch and cause the control module to be released from the power adapter.

Turning now to FIG. 181, a perspective view of power adapter arrangement 18100 having the latch of FIG. 180 is shown. The control module 18102 comprises a rear portion 18104 to act as a stop for the latch 18002 when the latch element is in the latched position. A projection 18108 at the end of a flexible portion 18110 is accessible by way of a recess 18112 is adapted to be received by a corresponding latch 18114 of the power adapter 18116. That is, as the handle element is advanced away from the rear portion 18104, the edge 18016 advances over the flexible portion 18110, causing the projection 18108 to move downward and be released from the latch 18114.

Turning now to 182, a perspective view of a power adapter arrangement 18200 is shown. The power adapter arrangement comprises a power adapter 18202 having a control module 18204 comprising a latch 18206. In the latched position, the latch surrounds an outlet 18208.

Turning now to FIG. 183, a perspective view showing a control module separated from a power adapter of the power adapter arrangement 18200 of FIG. 182 is shown. The latch comprises recesses 18302 that are adapted to latch to corresponding latch 18304. The latch 18304 are released from the recesses 18302 when the latch element 18206 is rotated.

Turning now to FIG. 184, a perspective view of a power adapter arrangement 18400 is shown. The implementation the power adapter arrangement of FIG. 184 is similar to the power adapter arrangement of FIG. 182, except that the latch surrounds an outlet of the control module 18405 when the control module is latched to the power adapter. More particularly, the power adapter arrangement comprises a power adapter 18402 having an outlet 18404. The control module comprises a latch 18408 that surrounds the outlet 18406. The latch 18408 comprises recesses on either side to engage with corresponding latch elements of the power adapter.

Turning now to FIG. 185, a perspective view shows a control module separated from a power adapter of the power adapter arrangement 18400 of FIG. 184. The control module 18405 comprises recesses 18502 (i.e., one on each side of the latch element) associated with the latch 18405 that are adapted to engage corresponding latch elements 18504. That is, the latch elements 18504 may comprise prongs that extend from side walls of the recess and occupy the recesses 18510 when the latch element 18504 is moved to the closed position as shown in FIG. 185.

Turning now to FIG. 186, a perspective view of a power adapter arrangement comprising a power adapter having a projection for receiving contact elements of the power adapter is shown. A power adapter arrangement 18600 comprises a power adapter 18602 having an extended region 18604 associated with a rear housing 18605 that is adapted to accommodate contact elements, such as contact elements 18607, shown here by way of example as wires. However, it should be understood that the contact elements 18607, which are adapted to be coupled to wires of a junction box, could comprise screw contacts or other contacts for receiving a wire of a junction box. The power adapter also comprises a front housing 18606 that is coupled to the rear housing and a flange 18608. The power adapter also comprises a switch 18612 and is coupled to a control module 18614. The control module comprises latch elements 18616 and guides 18615 adapted to receive corresponding guides of the power adapter, as will be described in more detail in reference to FIG. 187. The latch elements 18616 are in an open state as shown and can be moved upward into latch elements 18617 to secure the control module 18614 to the power adapter 18602.

Turning now to FIG. 187, another perspective view of the power adapter arrangement of FIG. 186 is shown. A recess adapted to receive the control module comprises sidewalls 18702, and a rear surface 18703. A conductor element 18704 is adapted to provide access to contact elements by way of openings 18706. The conductor element 18704 may comprise a printed circuit board for example. According to some implementations, the conductor element 18704 may comprise a tamper resistance element to prevent contact elements of the control module from being coupled to contact elements that are exposed by the openings 18706. As can be seen, guides 18615 are adapted to receive rails 18705. The perspective view of FIG. 188 shows the rear of the power adapter arrangement 18600.

Turning now to FIG. 189, a perspective view shows the rear of the power adapter arrangement of FIG. 186 with the rear housing removed. As can be seen, a housing 18902 is adapted to receive the conductor element 18704. Contact elements 18908 are shown extending from the back of the conductor element 18704. A switch block 18910 is also shown. The switch block comprises elements for enabling the operation of the switch 18612.

Turning now to FIG. 190, a perspective view of a power adapter arrangement having a control module with a removable control element is shown. The power adapter arrangement 19000 of FIG. 190 comprises a control module 19002 that is received by any power adapter, such as the power adapter 18602 for example. The control module 19002 comprises a removable control element 19004 having an up button 19006 and a down button 19008 and adapted to be attached to a control module base 19005. The removable control element 19004 also comprises a display element 19010, shown by way of example here as a plurality of LED lights. The removable control element may be a dimmer controller as shown for example. However, it should be understood that the removable control element may comprise any type of interface for controlling the application of a power to the load.

Turning now to FIG. 191, a perspective view of a power adapter arrangement 19100 having a control module with a removable control element removed from the control module base 19005 of the control module is shown. The control module base 19005 comprises a recessed portion 19102 having contact elements 19104 adapted to mate with corresponding contact elements 19108 of the removable control element 19004. The control module 19002 may comprise circuits 19106 associated with the base to enable the transfer of signals by way of contact elements to corresponding contact elements of the power adapter 18602. It should be understood that latch elements may be provided to secure the removable control element to the control module base, and additional latch elements to secure the control module base to the power adapter as described above.

Wireless control of a control module with an outlet is beneficial because it eliminates the need to wire the outlet to be a switched outlet. Providing a switched outlet not only requires a junction box at a switch location, but adds time and expense associated with labor for installing conduit and wiring between the junction box at the switch location, such as near a door for example, and the switched outlet. Therefore, eliminating wiring associated with a switched outlet is beneficial. Similarly, eliminating the conduit and wiring between a remote switch and the load switch of a 3-way switch is also beneficial. However, the elimination of the wiring also has disadvantages. The remote switch in either case requires a battery that must be replaced at some point by the homeowner. Further, the homeowner loses a location to place a control module. That is, every time a line-powered junction box is eliminated, the homeowner loses a location to place a control module according to the systems of implementing power adapters having control modules. According to one implementation, a wired junction box may be provided for a remote switch (i.e., a remote switch for a 3-way switch or a switched outlet). Wherever a 3-way switch is desired, a junction box receiving line, neutral and ground will be provided. However, no wiring between that junction box having the remote switch and the junction box having the switched outlet or the junction box having the load side switch of the 3-way switch is provided. This arrangement provides the benefits that a homeowner never has to replace a battery, and will have additional locations for placing control modules.

Turning now to FIG. 192, a perspective view of a cover having a spring-loaded latch element associated with a cover 19202 is shown. The cover 19202 comprises a front surface 19204 and supporting structures 19206 and 19208 to allow the cover to be seated properly within the recess of a power adapter. The cover 19202 also comprises a latch element 19209 having a flexure 19210 that leads to a flange 19211 that is adapted to be received by a recess of the power adapter to retain the cover 19202 in the power adapter. The latching actuator 19212 comprises a terminal portion 19214 which is adapted to be pressed to release the cover from the power adapter. The latching actuator 19212 is movable on a hinge portion 19218. When the latching actuator 19212 is pressed inward towards the surface 19220, the latching actuator will cause the flange 19211 to be released from the recess of the power adapter, allowing the cover 19202 to be removed.

Turning now to FIG. 193, a perspective view showing components of the cover of FIG. 192 is shown. A flange actuator 19302 comprises an opening 19304 enabling the flange actuator to be attached to the cover using a projection 19306. The flange actuator is adapted to be coupled to a spring element 19308 extending from a first terminal end 19310 to a second terminal end 19312. A ramped edge 19314 engages the flexure 19210 to move the flange 19211 downward. The spring element 19308 enables the latching actuator 19212 and the flange actuator 19302 to be returned to a resting state after the latch actuator is released. While the spring-loaded latch element is shown by way of example on a cover, it should be understood that the latch element could be implemented on any device that may be inserted into the recess of the power adapter.

Turning now to FIG. 194, a perspective view of another cover having another latch element is shown. The cover 19402 of FIG. 194 comprises a movable latch element that does not require a spring. The cover also comprises supporting structures 19404 and 19406 to maintain the cover within the recess but reducing the amount of plastic required by creating a cavity 19407. A latch actuator 19408 comprises a surface 19410 that can be pressed into a gap 19412 in the housing to enable the latch actuator 19408 to be released, allowing a user to fully release the cover from the power adapter. The cover 19402 also comprises a surface 19414 comprising a latch element 19416 having a flexure 19418 that leads to a flange 19420 that is adapted to be received by a recess of the power adapter to retain the cover 19402 in the power adapter. That is, after the surface 19410 is pressed, a portion of the latch actuator 19408 is exposed, allowing a user to further rotate the latch actuator and release the flange 19420 from the recess.

Turning now to FIG. 195, a perspective view shows the components of the cover of FIG. 194. The latch actuator 19408 comprises a base portion 19502 having a guide 19504. A bottom portion of the guide 19505 may comprise a beveled edge that engages with a flange 19602 of the on the bottom portion of the flexure 19418. That is, the guide engages a corresponding flange 19602 that can be seen through an opening 19604. As the latch actuator 19408 is rotated, the beveled edge engages the flange 19602 and causes the flange 19420 to move downward, causing the flange 19420 to be released from an opening of the power adapter adapted to receive the flange 19420.

Turning now to FIG. 197, a perspective view of a power adapter arrangement having a rotating latch element is shown. The power adapter arrangement 19700 comprises a power adapter 19702 having a yoke 19704 and an outlet portion 19706. The control module 19708 comprises a latch 19710 having a recess 19712 for enabling a user to move the latch element along a hinge 19714.

Turning now to FIG. 198, a perspective view of the power adapter arrangement of FIG. 197 having the control module removed is shown. The latch 19710 comprises a recess 19802 adapted to be coupled to a corresponding attachment element 19806 and 19809 of the recess of the power adapter 19702. The module 19708 also comprises guides 19804 for attaching to corresponding rails 19809 and 19810 of a recess 19808 of the power adapter. A housing portion 19812 comprises openings 19814 adapted to expose contact elements of the power adapter 19702 when a tamper resistance element is moved, as described above.

Turning now to FIG. 199, a perspective view of a power adapter arrangement having a sliding latch element is shown. A power adapter arrangement 19900 comprises a power adapter 19902 having a yoke 19904 and an outlet portion 19906. A latch 19910 and a latch 19912 are positioned on the sides of the module 19908. The latches can be pulled outward using the finger recess 19914 to enable releasing the control module 19908 from the power adapter as will be described in more detail in reference to FIG. 200.

Turning now to FIG. 200, a perspective view of the power adapter arrangement of FIG. 199 having the control module removed is shown. More particularly, the latch element 19910 comprises a base portion 20002 extending to a wall 20004. A side portion 20006 creates an opening as shown. As the latch element 19910 is pulled forward, the wall engages a corresponding wall 20008 of the housing. A similar arrangement is provided for the latch element 19912, which comprises a base portion 20009 extending to a wall 20010 of an opening 20012. A side portion 20011 creates an opening 20012. As the latch element 19912 is pulled forward, the wall 20010 engages a corresponding wall 20008 of the housing. Similarly, the wall 20010 engages the corresponding wall 20014. In operation, as the latch element 19912 is pulled forward, a leading edge 20016 of the base portion 20009 advances along a flexure 20018, causing a flange 20020 to be moved inward and out of a recess of the power adapter, such as recess 20021 as shown, allowing the control module to be removed. Guides 20022 are positioned on either side of a recess 20024 of the control module 19908 and are adapted to engage corresponding rails 20026. The guides and rails help align the control module with the power adapter. A housing portion 20030 comprises openings 20032 to expose contact elements of the power adapter 19902 when a tamper resistance element is moved, as described above.

Turning now to FIG. 201, a perspective view of a power adapter arrangement having a spring-loaded latch element is shown. The power adapter arrangement 20100 comprises a power adapter 20102 having a flange 20104 and an outlet 20106. Openings 20108 and 20110 expose portions of a latch 20112 that enable a user to press the latch 20112 down, to release the control module 20114 from the power adapter, as will be described in more detail in reference to FIG. 201.

Turning now to FIG. 202, a perspective view of the power adapter arrangement of FIG. 201 having the control module removed is shown. The latch 20112 is a spring-loaded element and comprises a surface 20202 at the end of a side rail 20204 extending from a hinge 20206 to a flange 20208. The latch 20112 also comprises a surface 20210 of a side portion 20212 extending from a hinge 20214 to a flange 20216. When the surface 20202 and the surface 20210 are pressed, the flanges are released from corresponding recesses of the power adapter, as will be described in more detail in reference to FIG. 204. The control module 20114 also comprises guides 20218 on either side of the control module that are adapted to receive corresponding rails 20222 in a recess 20220 of the power adapter.

Turning now to FIG. 203, a perspective view of the back of the control module of FIG. 201 is shown. As can be seen in FIG. 203, contact elements 20302 extend from a first rear portion 20306 and above a second rear portion 20308, which is adapted to abut a corresponding rear portion of the power adapter.

Turning now to FIG. 204, a perspective view of the power adapter of FIG. 201 is shown. As can be seen in the perspective view of FIG. 204, sidewalls 20402 comprise the rails 20222, and also a rear portion 20404 is adapted to abut the rear portion 20308 of the control module. As can be seen in the perspective view of FIG. 204, recesses 20406 and 20408 are adapted to receive the flanges 20208 and 20216 of the latch 20112. A housing portion 20410 comprises openings 20412 to receive the contact elements 20302. It should be understood that appropriate tamper resistance for contact elements of the power adapter could be provided as described above.

Turning now to FIG. 205, a perspective view of connectors of the power adapter of FIG. 204 is shown. According to one implementation, a power adapter adapted to receive the control module of FIG. 203 may comprise connectors that are flexible when contact is made with the contact elements 20302. Six connectors are shown, each of which extends from a terminal portion which enables an electrical connection to a portion of the power adapter to a contact element that enables a connection to a contact element 20302. More particularly, a first connector extends from a terminal portion 20502 to a contact element 20504, a second connector extends from a terminal portion 20506 to a contact element 20508, a third connector extends from a terminal portion 20510 to a contact element 20512, a fourth connector extends from a terminal portion 20514 to a contact element 20516, a fifth connector extends from a terminal portion 20518 to a contact element 20520, and a sixth connector extends from a terminal portion 20522 to a contact element 20524.

Turning now to FIG. 206, a perspective view of back of a control module having contact pads is shown. According to the implementation of FIG. 206, rather than having contact elements 20302 extending from a rear surface, contact elements 20602 are provided on the rear portion 20306, and are adapted to make contact with corresponding contact elements that may extend from the power adapter, such as contact elements of FIG. 207 for example.

Turning now to FIG. 207, a perspective view of contact elements of a power adapter that are adapted to make an electrical connection to the contact pads of FIG. 206 is shown. According to one implementation, the power adapter of FIG. 204 comprises connectors that are flexible when contact is made with the contact elements 20302. Six connectors are shown, each of which extends from a terminal portion which enables an electrical connection to a portion of the power adapter to a contact element that enables a connection to a contact element 20602. More particularly, a first connector extends from a terminal portion 20702 to a contact element 20704, a second connector extends from a terminal portion 20706 to a contact element 20708, a third connector extends from a terminal portion 20710 to a contact element 20712, a fourth connector extends from a terminal portion 20714 to a contact element 20716, a fifth connector extends from a terminal portion 20718 to a contact element 20720, and a sixth connector extends from a terminal portion 20722 to a contact element 20724. A tamper resistance element of the power adapter would be moved as a control module is inserted into a recess of a power adapter to enable the connectors of FIG. 207 to extend from openings of the power adapter and make contact with contact elements 20602.

Turning now to FIG. 208, a perspective view of a power adapter arrangement 20800 having a pair of spring-loaded latch elements placed near the top of the control module is shown. Power adapter arrangement 20800 comprises a power adapter 20802 having a flange 20804 and an outlet 20806. A power adapter 20810 comprises latches 20812 and 20814. A recess 20816 adapted to enable a user to engage the latch 20814 is also shown.

Turning now to FIG. 209, a perspective view of the control module of the power adapter arrangement of FIG. 208 is shown. The latch element 20814 comprises a hinge 20906 extending to a beveled edge 20908 of a flange 20910. Similarly, the latches 20812 comprises a hinge portion 20912 extending to a beveled edge 20914 of a flange 20916. The latches 20812 and 20814 comprise spring-loaded latch elements that are movable to release the flanges from corresponding recesses of the power adapter and return to their resting position after the control module is released. The beveled edges enable the power adapter 20810 to be pushed into and secured to the power adapter. The control module also comprises contact elements 20918 that are adapted to be coupled to corresponding contact elements of the power adapter. Guides 20920 are also provided and adapted to engage with corresponding rails 21008 and 21010 as described in reference to FIG. 210.

Turning now to FIG. 210, a perspective view of the power adapter of the power adapter arrangement of FIG. 208 is shown. The power adapter as shown in FIG. 210 comprises a housing portion 21002 having sidewalls 21004 that comprise the rails 21008 and 21010 in a recess 21006. Recesses 21012 are provided on either side to receive the flanges 20910 and 20916. Openings 21014 are provided to receive contact elements 20918.

Turning now to FIG. 211, a perspective view of a power adapter arrangement having a pair of spring-loaded latches placed near the bottom of the control module is shown. The power adapter arrangement 21100 comprises a power adapter 21102 having a yoke 21104 and an outlet 21106. The latches of the power adapter arrangement 21100 are similar to the latch elements of the power adapter 20810, except that the latch elements are near the bottom of a module 21108. The module 21108 comprises a latch 21112 and a latch 21114, which has a recess 21116 for enabling a user to move the latch 21114.

Turning now to FIG. 212, a perspective view of the power adapter arrangement of FIG. 211 having the control module removed is shown. The power adapter arrangement 21100 comprises a power adapter 21102 having a yoke 21104, an outlet 21106, and a control module 21108 having a top surface 21210. The latches 21112 and 21114 comprise spring-loaded latches that are movable to release the flanges from corresponding recesses of the power adapter and return to their resting position after the control module is released. The latch 21114 extends from a hinge 21202 to a beveled edge 21204 of a flange 21206 enable the module 21108 to be pushed into and secured to the power adapter. The control module also comprises contact elements 21212 that are adapted to be coupled to corresponding contact elements of the power adapter. Guides 21208 are also provided and adapted to engage with corresponding rails 21216 and 21217. The control module as shown in FIG. 212 comprises guides 21208 on either side that are adapted to receive the rails 21216 and 21217. Recesses 21218 are provided on either side to receive the flanges 21206.

Turning now to FIG. 213, a perspective view of another power adapter arrangement having a pair of spring-loaded latch elements placed near the bottom of the control module is shown. The latch elements of control module 21308 are similar to the latch elements of control module 21108, except that the latch elements are moved upward to release the flange from a corresponding recess of the power adapter, as will be described in more detail in reference to FIG. 214. The power adapter arrangement 21300 comprises a power adapter 21302 having a yoke 21304 and an outlet 21306. A module 21308 comprises latches 21310 and 21312. The latches are spring loaded and are movable upward to release the control module 21308. FIGS. 203, 206, 208, 211 and 213 are examples latches associated with a control module that may comprise a separate spring to enable the latch to return to its normal resting position.

Turning now to FIG. 214, a perspective view of the power adapter arrangement of FIG. 211 having the control module removed is shown. The latch element of the control module 21308 comprises a hinge 21406 that extends to a beveled edge 21408 of a flange 21410. The latch also comprises a hinge 21416 extending to a beveled edge 21418 of a flange 21420. The control module also comprises contact elements 21422, and guides 21424 that are adapted to engage corresponding rails of the power adapter. The power adapter comprises recesses 21430 and 21432 that are adapted to receive the flanges 21410 and 21420. Rails 21426 and 21428 are provided on the side walls of the recess to receive the guides 21424 on either side of the module 21308. Recesses 21430 and 21432 are adapted to receive flanges 21410 and 21420. A housing portion 21434 comprises openings 21436 for receiving the contact elements 21422. The latches 21310 and 21312 comprise ridges 21402 and 21414 to enable a user to more easily move the latches upward.

Turning now to FIG. 215, a perspective view of a power adapter arrangement having a power adapter comprising an outlet is shown. The power adapter arrangement 21500 comprises a control module 21502 having contact elements 21504, 21506, and 21508. The control module 21502 also comprises in actuator 21509 engaging a tamper resistant element of the power adapter 21510. The actuator 21509 may be received in an opening 21522 to move a tamper resistant element of the power adapter. A yoke 21511 of the power adapter is also provided, and surrounds an outlet 21512. A latch element 21516 is adapted to be coupled to latch 12115. A housing portion 21517 comprises openings 21520 for receiving the contact elements of a control module, and openings 21518 for receiving actuators of a control module.

Turning now to FIG. 216, a rear perspective view of a power adapter 21510 of the power adapter arrangement of FIG. 215 is shown. The power adapter comprises screws 21602, 21604, 21608 and 21610 that are attached to contact elements as will be described in more detail in reference to FIG. 217.

Turning now to FIG. 217, a perspective view of contact elements in a housing having an outlet is shown. Housing 21702 is adapted to receive connectors having the contact elements 21504, 21506, and 21508. More particularly the connector 21704 comprises the contact element 21504. The connector 21706 comprises the contact element 21506 and the connector 21708 comprises the contact element 21508. Additional details related to the housing 21702 and connectors are shown in FIG. 218.

Turning now to FIG. 218, an expanded view of the elements of FIG. 217 is shown. The housing 21702 comprises openings 21802, 21804, and 21806 for receiving prongs of a plug. The connector 21704 comprises a terminal portion 21808 adapted to receive a contact element 21504 and extends to a contact element 21810 adapted to receive a terminal of a plug. The connector 21706 comprises a terminal portion 21812 adapted to receive a contact element 21506 and extends to a contact element 21814 adapted to receive a terminal of a plug. The connector 21708 comprises a terminal portion 21816 adapted to receive the contact element 21508 and extends to a contact element 21818 adapter receiver terminal plug. A tamper resistance element 21820 comprises a beveled edge 21822 adapted to receive a prong of a plug to move the tamper resistance element, and an opening 21824 adapted to receive a terminal will plug when the shutter is moved to the open position. A spring 21826 is adapted to retain the tamper resistance element in place until it is moved by a prong of a plug when the plug is inserted into the outlet. A housing 21827 comprises openings 21828 and 21830 for receiving the contact element 21810 and 21818, respectively.

Turning now to FIG. 219, a perspective view of elements associated with an outlet of the power adapter of FIG. 216 is shown. A housing portion 21901 is adapted to receive contact elements associated with the outlet 21512. A contact element 21902 and a contact element 21904 are associated with the contact element 21906 adapted to receive a prong of a plug, such as a line prong. The contact elements 21902 and 21904 are coupled by a tab 21905 that can be severed to decouple the contact elements 21902 and 21904 to provide for a switched outlet. A contact element 21908 and a contact element 21910 are also coupled by a tab that is adapted to be separated. The contact elements 21908 and 21910 are adapted to be coupled to contact element 21911 that is adapted to receive a prong of a plug, such as a prong that is adapted to receive a neutral voltage for example. A contact element 21912 is coupled to a terminal end 21913 and may be coupled to a contact element adapted to receive a prong of a plug, such as a prong adapted to receive a ground contact. A connector 21916 extends from a terminal end 21914 that is coupled to the contact element 21904 and extends to a contact element 21918. A connector 21920 extends from a terminal end 21922 to a contact element 21924 and is coupled to the contact element 21910. A connector 21926 extends from a terminal end 21928 to a contact element 21930.

Turning now to FIG. 220, an expanded view of the elements associated with an outlet of FIG. 219 is shown. Openings 22002 that correspond to the openings 21934 of the tamper resistance element 21932 and openings 22004 that correspond to the openings 21936 are shown in FIG. 220. A contact element 22005 is adapted to receive a prong of a plug, such as a ground prong and is electrically coupled to the terminal end 22012. A recess 22006 is adapted to receive a spring 22008 to enable the tamper resistance element 21932 to move and return to a resting state. A terminal end 22210 coupled to the contact element 21904 enables the terminal end 21914 to be electrically coupled to the contact element 21904. A terminal end 22012 that is coupled to the terminal end 21928 enables the terminal end 21928 to be coupled to the contact element 21912. A terminal end 22214 coupled to the contact element 21910 enables the terminal end 21922 to be coupled to the contact element 21910.

Turning now to FIG. 221, a perspective view of a power adapter arrangement having a power adapter comprising a switch is shown. A power adapter arrangement 22100 comprises a control module 22102 having a plurality of actuators 22104 and a plurality of contact elements 22106. The control module 22102 also comprises an actuator 22108 for engaging a tamper resistance element associated with a power adapter, such as power adapter 22110. The power adapter 21110 comprises a flange 22111 and a switch 22112 associated with a housing 22113. A housing portion 22114 below the switch comprises openings 22116 for receiving the actuators 22104 and openings 22118 for receiving the contact elements 22106. The housing portion 22114 also comprises an opening 22120 for receiving the actuator 22108.

Turning now to FIG. 222, a rear perspective view of the power adapter of the power adapter arrangement of FIG. 221 is shown. The power adapter includes a rear housing 22201, and a plurality of screw terminals coupled to contact elements of the power adapter, including a first screw 22202, a second screw 22204, a third screw 22206, and a fourth screw 22208.

Turning now to FIG. 223, a perspective view of elements of a switch of the power adapter of the power adapter arrangement of FIG. 221 is shown. The switch 22112 comprises both housing elements and various conductive elements. A first contact element 22302 is adapted to receive the screw 22202. A second contact element 22304 is adapted to receive the screw 22004, a third contact element 22306 is adapted to receive screw 22206, and a fourth contact element 22308 is adapted to receive screw 22208. A switch contact element 22310 and a plurality of contact elements 22312 are shown. Additional disclosure related to the various electrical components are described in more detail in reference to FIG. 224.

Turning now to FIG. 224, an expanded view of the elements of a switch of the power adapter of the power adapter arrangement of FIG. 221 is shown. A switch actuator 22401 comprises an actuator 22402 that is adapted to engage the switch contact element 22310. The housing portion 22213 comprises a raised portion 22404 having a plurality of openings 22406 that are adapted to align with the openings 22412 of the tamper resistant element 22410. The raised portion 22404 also comprises a plurality of openings 22408 that are adapted to align with the openings 22414 of the tamper resistant element 22410. The tamper resistant element also comprises an actuator 22416 adapted to engage with the actuator 22108. A wall 22418 defines a cavity for receiving a spring 22420. A connector 24222 extends from the contact element 22302 to a terminal end 22424. A connector 22426 extends from a terminal end 22428 that is adapted to be coupled to the terminal end 22424 and comprises a contact element 22430 of the plurality of contact elements 22312. A connector 22432 comprises a terminal end 22434 and a contact element 22436. The switch contact element 22310 comprises a contact element 22438 and extends to a contact element 22430. A connector 22442 comprises a terminal end 22444 and a contact element 22446. A connector 22448 comprises a terminal portion 22450 and a contact element 22452. A connector 22454 extends from a terminal end 22456 to a contact element 22458. A connector 22460 comprises a terminal end 22462 extending to a contact element 22464. A connector 22466 comprises the contact element 22308 and includes a terminal end 22468. A connector 22470 comprises a terminal 22472 and extends to a contact element 22474. A connector 22476 comprises the contact element 22304 and extends to a terminal portion 22478. A connector 22480 comprises the contact element 22306 and extends to a terminal end 22482. The connector 22454 is coupled to the connector 22476, the connector 22460 is coupled to the connector 22476, and the connector 22470 is coupled to the connector 22480.

Various methods are described in more detail below and may correspond to various implementations of power adapters, control module, power adapter arrangements, and systems as set forth above. It should be understood that the various methods of a given method may include additional blocks, and additional details related to the methods may be found in reference to figures above that describe various implementations of power adapters, control module, power adapter arrangements, and systems. While some examples of figures describing power adapters, control module, power adapter arrangements, and systems that may implement a given method are provided, it should be understood that a give method may be implemented using other power adapters, control module, power adapter arrangements, and systems.

Turning now to FIG. 225, a flow chart shows a method of detecting a change in a value provided by a remote control module in a 3-way switching operation. A system for controlling power adapters enabling a 3-way switching operation is provided at a block 22502. A change in a value from a remote control module in a power adapter in a multi-way switching arrangement is detected at a block 22504. It is then determined whether the change determined to be valid at a block 22506. If so, the master changes the dimming value at a block 22508. If not, the master communicates previous value to all of the remote control modules at a block 22510.

Turning now to FIG. 226, a flow chart shows a method of changing values associated with the operation of a power adapter arrangement. An initialization is performed at a block 22602. A control module inserted in a power adapter is configured as a master or a remote at a block 22604. It is then determined whether a change is valid at a block 22606. The remote control module may enter an idle state at a block 22608. A new dimming value may be received from a traveler line at a block 22610. A new dimming level may be set in memory at a block 22612. The remote control module may return to idle at a block 22614. An up or down button of the remote control module may be pressed at a block 22616. A new dimming level may then be set in memory and new value may be communicated to other control modules at a block 22617. The remote control module may then return to idle at a block 22618.

An initialization of the master control module may be performed at a block 22619. The master control module may then enter an idle state at a block 22620. A dimming value may be received from a remote control module at the master control module at a block 22621. It is then determined whether the value received is valid at a block 22622. A dimming value to a load may be changed via a TRIAC at a block 22624. A previous value may be communicated to remotes at a block 22626. The master control module may be returned to idle at a block 22628.

Up or down button of the master control module may be pressed at a block 22634. A new dimming value may be set level in memory, and the new value may be communicated to other control modules at a block 22636. The dimming value to the load may be changed via TRIAC at a block 22638. The master control module may return to idle at a block 22640.

A dimming command may be received via wireless connection at a block 22642. A new dimming level may be set in memory, and the new value may be communicated to other control modules at a block 22644. The dimming value to the load may be changed via TRIAC at a block 22646. The master control module may be returned to idle at a block 22648.

Turning now to FIG. 227, a flow chart shows a method of implementing a control module in a power adapter arrangement having a power adapter comprising a switch. A power adapter having a switch and having a user accessible switch actuator is provided at a block 22702, wherein the power adapter is adapted to receive a control module. A first contact element enabling a control module to break an electrical connection between a first terminal of a switch and a contact element adapted to receive a line voltage is provided at a block 22704. A second contact element enabling a control module to break an electrical connection between a second terminal of a switch and a contact element adapted to be coupled to a load is provided at a block 22706. It is then determined whether a control module is adapted to control an operation of the power adapter (having a switch) coupled to the power adapter at a block 22710. If so, an electrical connection between first contact element and the contact element adapted to receive a line voltage is maintained, and an electrical connection between the second contact element and the contact element adapted to be coupled to a load is maintained at a block 22712. If so, the method is ended.

Turning now to 228 a flow chart shows the routing of electrical signals having different voltages through a switch of a power adapter. A power adapter having a switch and having a user accessible switch actuator is provided at a block 22802, wherein the power adapter is adapted to receive a control module. An electrical signal having a first voltage when a control module is inserted into the power adapter having a switch is routed at a block 22804. It is then determined whether the control module is removed from the power adapter having a switch at a block 22806. If so, an electrical signal having a second voltage is routed at a block 22808.

Turning now to FIG. 229, a flow chart shows a method of implementing actuators of a control module to break electrical connections in different types of power adapters. A power adapter arrangement having a first type of a power adapter comprising a switch for switching power to a load and a second type of a power adapter comprising a switch for switching power to a load is implemented at a block 22902. A control module having plurality of actuators for breaking electrical connections in both the first type of a power adapter and the second type of a power adapter is provided at a block 22904. A first set of the plurality of actuators are used for breaking electrical connections in the first type of a power adapter at a block 22906. A second set of the plurality of actuators are used for breaking electrical connections in the second type of a power adapter at a block 22908.

Turning now to FIG. 230, a flow chart show a method of breaking electrical connections associated with a power adapter based upon a type of power adapter arrangement. A power adapter having a switch and having contact elements adapted to receive an actuator for breaking electrical connections associated with the power adapter is provided at a block 23002. A control module having a first actuator of a plurality of actuators for breaking an electrical connection between two contact elements of a plurality of contact elements adapted to make electrical connections to a contact element of the control module is provided at a block 23004. A control module having a second actuator of the plurality of actuators for breaking an electrical connection between contact elements internal to the power adapter is provided at a block 23006. It is then determined whether the control module controls a switching operation of the power adapter arrangement at a block 23008. If not, an electrical connection is maintained between the contact elements internal to the power adapter at a block 23010. If so, an electrical connection between first contact element and the contact element adapted to receive a line voltage is broken, and an electrical connection between the second contact element and the contact element adapted to be coupled to a load is broken at a block 23012.

Turning now to FIG. 231, a flow chart shows a method of bypassing a switch of a power adapter when using a control module that controls the switching of power to a load. A power adapter having a user accessible actuator for controlling a switch of the power adapter is provided at a block 23102. A control module is received by the power adapter at a block 23104, wherein the control module comprises actuators for breaking an electrical connection between contact elements of the power adapter. It is then determined whether the control module controls the switching of power to the load at a block 23106. If so, the switch in the power adapter is bypassed at a block 23108.

Turning now to FIG. 232, a flow chart shows a method of implementing active and passive control modules. A system for controlling power adapters comprising outlets, power adapters enabling a single switching operation, and power adapters enabling a 3-way switching operation is provided at a block 23202. Passive control modules that operate independent of controlling power to a load and active control modules that are adapted to control power to a load are provided at a block 23204. It is then determined whether the control module is an active control module at a block 23206. If not, power is provided to the active control module and enables control of the application of power to a load at a block 23208. If so, power is provided to the passive control module at a block 23210.

Turning now to FIG. 233, a flow chart shows a method of dimming power to a load in a multi-way dimming arrangement. A system for controlling power adapters comprising outlets, power adapters enabling a single switching operation, and power adapters enabling a multi-way switching operation are provided at a block 23302. A control module is used to enable the dimming of power to a load in single switch at a block 23304. A control module is used to enable the dimming of power to a load in a multi-way arrangement at a block 23306. If so, the control module is used to enable dimming in a load side of a multi-way at a block 23308. If not, a second control module may be optionally used to enable dimming in another location of the multi-way arrangement at a block 23310.

Turning now to FIG. 234, a flow chart shows a method of providing tamper resistance in a power adapter arrangement. A power adapter having a recess for receiving a control module is provided at a block 23402. Contact elements in the power adapter for receiving the control module are provided at a block 23404. A movable tamper resistance element over the contact elements is provided at a block 23406. The control module enables moving the tamper resistant element using a projection of the control module at a block 23408.

Turning now to FIG. 235, a flow chart shows a method of providing an electrical interface in a power adapter arrangement. A first plurality of contact elements comprising a first contact element adapted to receive a voltage, a second contact element adapted to receive a neutral voltage, a third contact element adapted to receive a ground voltage, and a fourth contact element adapted to receive a communication signal is provided at a block 23502. A recess adapted to receive a control module is provided at a block 23504. A first terminal of a switch is coupled to receive the voltage at a block 23506. A communication signal is received at a fifth contact of a second plurality of contact elements associated with the recess at a block 23508.

Turning now to FIG. 236, another flow chart shows a method of providing an electrical interface in a power adapter arrangement. A first plurality of contact elements comprising a first contact element adapted to receive a line voltage, a second contact element adapted to receive a neutral voltage, a third contact element adapted to receive a ground voltage, and a fourth contact element adapted to a load is provided at a block 23602. A recess adapted to receive a control module is provided at a block 23604. A second plurality of contact elements associated with the recess and comprising a fifth contact element coupled to the first contact element, a sixth contact element coupled to the second contact element is provided at a block 23606. A first terminal of a switch is coupled to receive a second voltage by way of a sixth contact element of the second plurality of contact elements at a block 23608. A second terminal of the switch is coupled to provide the voltage to a seventh contact element of the second plurality of contact elements at a block 23610.

Turning now to FIG. 237, a flow chart shows a method of providing an electrical interface in a power adapter arrangement comprising a power adapter having a switch. A first plurality of contact elements comprising a first contact element adapted to receive a voltage and a second contact element adapted to be coupled to a load is provided at a block 23702. A recess adapted to receive a control module is provided at a block 23704. A second plurality of contact elements associated with the recess is provided at a block 23706. A third contact element is coupled to the first contact element at a block 23708. A fourth contact element is coupled to receive a voltage by way of a control module at a block 23710. A switch is coupled to receive the voltage at a first terminal by way of the fourth contact element at a block 23712.

Turning now to FIG. 238, another flow chart shows a method of providing an electrical interface in a power adapter arrangement comprising a power adapter having a switch. A first plurality of contact elements comprising a first contact element adapted to receive a line voltage, a second contact element adapted to be received a neutral voltage, and a third contact element adapted to receive a communication signal is provided at a block 23802. A recess adapted to receive a control module is provided at a block 23804. A fourth contact element of a second plurality of contact elements associated with the recess is coupled to the first contact element at a block 23806. A fifth contact element of a second plurality of contact elements is coupled to the second contact element at a block 23808. A sixth contact element of a second plurality of contact elements is coupled to the third contact element at a block 23810. A switch is coupled to receive the line voltage at a first terminal by way of the first contract element at a block 23812. An output of the switch is coupled to provide a voltage to a seventh contact element of the second plurality of contact elements at a block 23814.

Turning now to FIG. 239, a flow chart shows a method of coupling elements of a power adapter arrangement. A first plurality of contact elements comprising a first contact element configured to receive a line voltage and a second contact element configured to receive a neutral voltage is provided at a block 23902. A recess for receiving a control module is provided at a block 23904. A second plurality of contact elements adapted to receive contact elements of the control module and accessible by way of the recess is provided at a block 23906. A rear housing portion comprising a shape adapted to receive the second plurality of contact elements is provided at a block 23908.

Turning now to FIG. 240, another flow chart shows a method of coupling elements of a power adapter arrangement. A first plurality of contact elements including a first contact element adapted to receive a line voltage, a second contact element adapted to receive a neutral voltage, and third contact element adapted to receive a ground voltage is provided at a block 24002. A second plurality of contact elements coupled to one or more of the first plurality of contact elements is provided at a block 24004. A conductor is coupled to a fourth contact element of second plurality of contact elements, wherein the conductor is adapted to route power within the control module at a block 24006. An actuator adapted to engage a tamper resistant element of a power adapter and move the actuator to enable the first plurality of contact elements to make an electrical connection to corresponding contact elements of the power adapter is provided at a block 24008.

Turning now to FIG. 241, a flow chart shows a method of implementing a power adapter arrangement comprising an actuator. A first plurality of contact elements comprising a first contact element configured to receive a line voltage and a second contact element configured to receive a neutral voltage is provided at a block 24102. The line voltage is converted to a second signal at a block 24104. An actuator adapted to engage with a power adapter is provided at a block 24106. The routing of signals between the power adapter is enabled, by the actuator, at a block 24108. The power signal is routed to the power adapter by way a third contact element of the first plurality of contact elements at a block 24110.

Turning now to FIG. 242, another flow chart shows a method of providing an electrical interface in a power adapter arrangement comprising a power adapter having a switch. A first plurality of contact elements of a first contact element a first plurality of contact elements configured to receive a first voltage is provided at a block 24202. A second contact element of the first contact element a first plurality of contact elements configured to receive a neutral voltage is provided at a block 24204. A power transmission circuit is coupled to receive the first voltage at a block 24206. A second voltage is routed to a switch of a power adapter by way of a third contact element at a block 24208.

Turning now to FIG. 243, a flow chart shows a method of attaching power adapter elements to create an electrical interface. A first plurality of contact elements associated with a power adapter is provided at a block 24302. A second plurality of contact elements of a control module, wherein the first plurality of contact elements is adapted to be electrically coupled to the second plurality of contact elements is provided at a block 24304. A housing of the control module and the power adapter that enable the control module and the power adapter and to be attached to one another and create an electrical interface is provided at a block 24306. Attachment elements to enable the control module to be secured to the power adapter are provided at a block 24308.

Turning now to FIG. 244, a flow chart shows a method of implementing first and second power adapter arrangements. A first power adapter arrangement comprising a first power adapter having a first switch is provided at a block 24402. A second power adapter arrangement comprising a second power adapter having a second switch is provided at a block 24404. The first power adapter is coupled to the second power adapter at a block 24406. The application of power to a load is controlled by way of a switch of one of the power adapter arrangements at a block 24408.

Turning now to FIG. 245, a flow chart shows a method of implementing an in-wall power adapter having a switch and a recess adapted to receive a control module. A first plurality of contact elements comprising a first contact element adapted to receive a line voltage, a second contact element adapted to receive a neutral voltage, a third contact element adapted to receive a ground voltage, and a fourth contact element adapted to receive a communication signal are provided at a block 24502. A recess adapted to receive a control module is provide at a block 24504. A first terminal of a switch is coupled to the line voltage at a block 24506. A second plurality of contact elements associated with the recess and comprising a fifth contact element adapted to receive the communication signal is provided at a block 24508.

The method may further comprise providing a sixth contact element of the first plurality of contact element adapted to be coupled to a load, wherein the first plurality of contact elements further comprises a sixth contact element adapted to be coupled to a load. The method may further comprise providing a second switch adapted to route the line voltage received at a first terminal by way of the first contact element to a load by way of the sixth contact element. The method may further comprise providing a sixth contact element of the second plurality of contact elements adapted to be coupled to receive a ground voltage and a seventh contact element of the second plurality of contact elements adapted to be coupled to receive a neutral voltage. The method may further comprise providing a sixth contact element the second plurality of contact elements adapted to be coupled to a load. The method may further comprise receiving a control module in the recess. The method of FIG. 245 may be performed by at least some or all of the various implementations of power adapters, control module, power adapter arrangements, and systems as set forth in FIGS. 107-120, for example. Additional support for the various blocks may be found in the description of these figures.

Turning now to FIG. 246, a flow chart shows a method of implementing an in-wall power adapter adapted to receive a voltage. A first plurality of contact elements comprising a first contact element adapted to receive a line voltage and a second contact element adapted to be coupled to a load are provided at a block 24602. A recess adapted to receive a control module wherein a second plurality of contact elements is associated with the recess is provided at a block 24604. A third contact element is coupled to the first contact element and a fourth contact element is coupled to the second contact element at a block 24606. A switch coupled to receive the line voltage at a first terminal by way of the first contact element is provided at a block 24608. A connector is coupled between a second terminal of the switch and the second contact element, wherein the connector is in a closed position when no control module is in the recess at a block 24610.

The method may further comprise coupling a second connector between the first contact element and the first terminal of the switch. The method may further comprise receiving a control module in the recess. The connector may be opened to prevent the line voltage from passing through the connector when the control module is inserted into the recess. The method may further comprise opening a second connector coupled between the second terminal of the switch and a first contact element of the connector when the control module is inserted into the recess. The method may further comprise receiving a control module coupled to the recess, wherein the control module is adapted to prevent the line voltage from passing through the connector when the control module is received in the recess. The method of FIG. 246 may be performed by at least some or all of the various implementations of power adapters, control module, power adapter arrangements, and systems as set forth in FIGS. 117-120, for example. Additional support for the various blocks may be found in the description of these figures.

Turning now to FIG. 247, a flow chart shows a method of configuring an in-wall power adapter to apply a voltage to a load. A recess adapted to receive a control module is provided at a block 24702. A line voltage is routed to a first plurality of contact elements by way of a first connector having a first contact element adapted to receive a first prong of a plug, a second contact element adapted to receive a contact element of a control module, and a third contact element adapted to receive a wire of a junction box at a block 24704. A neutral voltage is routed to a second plurality of contact elements by way of a second connector having a fourth contact element adapted to receive a second prong of a plug, a fifth contact element adapted to receive a contact element of a control module, and a sixth contact element adapted to receive a wire of a junction box at a block 24706. A ground voltage is routed to a third plurality of contact elements by way of a third connector having a seventh contact element adapted to receive a third prong of a plug, an eighth contact element adapted to receive a contact element of a control module, and a ninth contact element adapted to receive a wire of a junction box at a block 24708.

Routing a line voltage to a first plurality of contact elements by way of a first connector may comprise providing a formed metal connector. The formed metal connector may comprise a single piece of metal. The formed metal connector may comprise a first formed metal portion and a second formed metal portion that are electrically connected. Routing a line voltage to a first plurality of contact elements by way of a first connector may comprise providing the first connector having a tenth contact element adapted to receive a wire of a junction box. Routing a line voltage to a first plurality of contact elements by way of a first connector may comprise providing the first connector having a tab coupled between the third contact element and the tenth contact element, wherein the tab is adapted to be severed to provide electrical isolation between the third contact element and the tenth contact element. Routing a neutral voltage to a second plurality of contact elements by way of a second connector may comprise providing the second connector comprises an eleventh contact element to receive a wire of a junction box, and a second tab coupled between the sixth contact element and the eleventh contact element, wherein the tab is adapted to be severed to provide electrical isolation between the sixth contact element and the eleventh contact element. The method of FIG. 247 may be performed by at least some or all of the various implementations of power adapters, control module, power adapter arrangements, and systems as set forth in FIGS. 107-136, for example. Additional support for the various blocks may be found in the description of these figures.

Turning now to FIG. 248, a flow chart shows a method of implementing a control module adapted to be attached to a power adapter. A plurality of contact elements including a first contact element adapted to receive a line voltage and a second contact element adapted to receive a reference voltage are provided at a block 24802. A switch is coupled to receive the line voltage at a block 24804. A third contact element is coupled to the switch, wherein the third contact element is adapted to provide the line voltage to a power adapter at a block 24806. A control circuit is coupled to the switch, wherein the control circuit is adapted to control the state of the switch at a block 24808. A fourth contact element is coupled to the control circuit at a block 24810. A signal adapted to be routed to the power adapter by way of the fourth contact element is generated at a block 24812.

The control module may further comprise a signal detector coupled to a fifth contact element and adapted to receive a signal from the power adapter. A change in the signal received from the power adapter may indicate a change in a state of a switch of the power adapter. The reference voltage may comprise one of a ground voltage or a neutral voltage. The control module may further comprise providing an actuator associated with a housing of the control module, wherein the actuator is adapted to engage with a tamper resistance element of the power adapter. The plurality of contact elements further comprises a ground voltage, and the actuator comprises one the plurality of contact elements. The control module may further comprise providing an actuator associated with a housing of the control module, wherein the actuator is adapted to engage with a connector of a power adapter. The method of FIG. 248 may be performed by at least some or all of the various implementations of power adapters, control module, power adapter arrangements, and systems as set forth in FIGS. 5-89 and 104-120, for example. Additional support for the various blocks may be found in the description of these figures.

Turning now to FIG. 249, a flow chart shows another method of implementing a control module adapted to be attached to a power adapter. A plurality of contact elements including a first contact element adapted to receive a line voltage and a second contact element adapted to receive a reference voltage is provided at a block 24902. A first actuator extending from a housing of the control module and adapted to engage with a connector of a power adapter is provided at a block 24904. A tamper resistance element of a power adapter is engaged by way of a second actuator extending from the housing of the control module when the control module is inserted into a power adapter at a block 24906. A control circuit adapted to generate a signal is provided at a block 24908. A third contact element to the control circuit is coupled at a block 24910. A signal adapted to be routed to a power adapter by way of the third contact element is generated at a block 24912. A change in a state of a switch of a power adapter is detected at a block 24914.

The method may further comprise providing a third actuator associated with the housing of the control module, wherein the third actuator is adapted to engage with a second connector of the power adapter. The method may further comprise coupling a signal detector to a fourth contact element to receive the signal from the power adapter. The reference voltage may comprise one of a ground voltage and a neutral voltage. The plurality of contact elements may further comprise a fourth contact element adapted to receive a ground voltage, wherein providing the second actuator comprises providing one the plurality of contact elements. The method may further comprise a switch coupled to receive the line voltage. The method further comprise a fourth contact element coupled to the switch and adapted to provide the line voltage to a power adapter. The method of FIG. 249 may be performed by at least some or all of the various implementations of power adapters, control module, power adapter arrangements, and systems as set forth in FIGS. 122-124, 135-195, 141-147, 172-224, for example. Additional support for the various blocks may be found in the description of these figures.

Turning now to FIG. 250, a flow chart show a method of attaching a control module to a power adapter. A front housing is provided at a block 25002. A latch element is moveably coupled to the front housing, wherein the latch element is adapted to rotate with respect to the front housing at a block 25004. A rear housing is coupled to the front housing at a block 25006. Contact elements that extend from the rear housing are provided at a block 25008.

The method may further comprise providing an opening of the latch element that aligns with an opening of the front housing to receive a corresponding latch element of the power adapter. The method may further comprise providing a guide for the latch element for receiving the corresponding latch element of the power adapter. The method may further comprise providing a grip portion that is exposed when the latch element is rotated with respect to the housing. The method may further comprise providing an actuator on the rear housing for engaging a tamper resistant element of a power adapter. The method may further comprise providing a rear housing comprising an actuator for engaging a connector of a power adapter. The method may further comprise coupling the latch element of the control module to a corresponding latch element of the power adapter. The method of FIG. 250 may be performed by at least some or all of the various implementations of power adapters, control module, power adapter arrangements, and systems as set forth in FIGS. 121-125 and 172-224, for example. Additional support for the various blocks may be found in the description of these figures.

Turning now to FIG. 251, a flow chart shows a method of routing signal in a 3-way power adapter arrangement. A first power adapter adapted to receive a first control module is provided at a block 25102, the first power adapter having a first contact element and a first switch. A second power adapter adapted to receive a second control module is provided at a block 25104, the second power adapter having a second contact element and a second switch. A plurality of signal lines is coupled between the first control module and the second control module at a block 25106. Communication signals are transferred from the first contact element of the first power adapter to the second contact element of the second power adapter by way of a traveler line of the plurality of signal lines at a block 25108.

The first power adapter comprises a first plurality of contact elements for receiving a line voltage, a neutral voltage and a ground voltage. The first power adapter further comprises a recess for receiving the first control module having a second plurality of contact elements adapted to receive the line voltage, the neutral voltage and the ground signal. The method may further comprise a first switch adapted to provide a signal on the traveler line. The method may further comprise a signal detector coupled to the traveler line. The method may further comprise a second switch coupled to receive the line voltage at a third contact element and route the line voltage to a second contact element. The second power adapter may further comprise an AC/DC circuit adapted to receive the line voltage and generate a DC signal. The method of FIG. 251 may be performed by at least some or all of the various implementations of power adapters, control module, power adapter arrangements, and systems as set forth in FIGS. 107-120, for example. Additional support for the various blocks may be found in the description of these figures.

Turning now to FIG. 252, a flow chart shows another method of routing signal in a 3-way power adapter arrangement. A first power adapter adapted to receive a first control module is provided at a block 25202, the first power adapter having a first contact element and a first switch. A second power adapter adapted to receive a second control module is provided at a block 25204, the second power adapter having a second contact element and a second switch. A plurality of signal lines is coupled between the first control module and the second control module at a block 25206. A line voltage is transferred from the first contact element of the first power adapter to the second contact element of the second power adapter by way of a traveler line of the plurality of signal lines at a block 25208.

The first power adapter may comprise a first plurality of contact elements for receiving a line voltage, a neutral voltage and a ground voltage. The first power adapter may further comprise a recess for receiving the first control module having a second plurality of contact elements adapted to receive a line voltage, a neutral voltage and a ground voltage. The first switch may be adapted to switch the line voltage on the traveler line. The first switch may be adapted to switch the line voltage on the traveler line. The first power adapter may comprise an indicator element indicating when the first power adapter is coupled to receive the line voltage. The first switch and the second switch may comprise single pole, double throw switches. The method of FIG. 252 may be performed by at least some or all of the various implementations of power adapters, control module, power adapter arrangements, and systems as set forth in FIGS. 18-77, for example. Additional support for the various blocks may be found in the description of these figures.

We claim:

1. An in-wall power adapter adapted to receive a voltage, the in-wall power adapter comprising:

- a first plurality of contact elements comprising a first contact element adapted to receive a line voltage, a second contact element adapted to receive a neutral voltage, a third contact element adapted to receive a ground voltage, a fourth contact element adapted to receive a communication signal, and a fifth contact element adapted to be coupled to a load;
- a recess adapted to receive a control module;
- a switch having a first terminal coupled to receive the line voltage;
- a second switch adapted to route the line voltage received at a first terminal of the second switch by way of the first contact element to a load by way of the fifth contact element; and
- a second plurality of contact elements associated with the recess and comprising a sixth contact element adapted to receive the communication signal.

2. The in-wall power adapter of claim 1, wherein the in-wall power adapter is adapted to be coupled to a second in-wall power adapter by way of the first plurality of contact elements.

3. The in-wall power adapter of claim 1, wherein the fourth contact element is adapted to receive the communication signal from a second in-wall power adapter.

4. The in-wall power adapter of claim 1, wherein the second plurality of contact elements comprises a seventh contact element adapted to be coupled to receive the ground voltage and an eighth contact element adapted to be coupled to receive the neutral voltage.

5. The in-wall power adapter of claim 1, wherein the fourth contact element comprises a traveler contact element that is adapted to receive the communication signal from a second in-wall power adapter.

6. The in-wall power adapter of claim 1, wherein the switch is adapted to provide a communication signal to the fourth contact element in response to an actuation of the switch.

7. The in-wall power adapter of claim 1, further comprising a control module having a third plurality of contact elements coupled to the second plurality of contact elements.

8. An in-wall power adapter adapted to receive a voltage, the in-wall power adapter comprising:

a first plurality of contact elements comprising a first contact element adapted to receive a line voltage, a second contact element adapted to receive a neutral voltage, a third contact element adapted to receive a ground voltage, and a fourth contact element adapted to be coupled to a load;

a recess adapted to receive a control module;

a second plurality of contact elements associated with the recess and comprising a fifth contact element coupled to the first contact element, a sixth contact element coupled to the second contact element; and a switch having a first terminal coupled to receive a second voltage by way of a seventh contact element of the second plurality of contact elements and a second terminal coupled to provide the second voltage to an eighth contact element of the second plurality of contact elements.

9. The in-wall power adapter of claim 8, wherein the second voltage is the same as the line voltage.

10. The in-wall power adapter of claim 8, wherein the second voltage comprises a voltage associated with a DC signal.

11. The in-wall power adapter of claim 8, wherein the switch is adapted to route an AC signal or a DC signal.

12. The in-wall power adapter of claim 8, wherein the switch is adapted to route a signal received from a control module back to the control module.

13. The in-wall power adapter of claim 8, wherein the second plurality of contact elements comprises a traveler contact element for transmitting communication signals to a control module.

14. The in-wall power adapter of claim 8, further comprising a control module having a third plurality of contact elements coupled to the second plurality of contact elements.

15. A method of implementing an in-wall power adapter, the method comprising:

providing a first plurality of contact elements comprising a first contact element adapted to receive a line voltage, a second contact element adapted to receive a neutral voltage, a third contact element adapted to receive a ground voltage, a fourth contact element adapted to receive a communication signal, and a fifth contact element adapted to be coupled to a load;

providing a recess adapted to receive a control module;

coupling a first terminal of a switch to the line voltage;

providing a second switch adapted to route the line voltage received at a first terminal of the second switch by way of the first contact element to a load by way of the fifth contact element; and providing a second plurality of contact elements associated with the recess and comprising a sixth contact element adapted to receive the communication signal.

16. The method of claim 15, further comprising providing a second in-wall power adapter adapted to be coupled to the in-wall power adapter.

17. The method of claim 16, wherein the fourth contact element is adapted to receive the communication signal from the second in-wall power adapter.

18. The method of claim 15, further comprising providing a seventh contact element of the second plurality of contact elements adapted to be coupled to receive the ground voltage and an eighth contact element of the second plurality of contact elements adapted to be coupled to receive the neutral voltage.

19. The method of claim 15, further comprising providing a second in-wall power adapter, wherein the fourth contact element comprises a traveler contact element that is adapted to receive the communication signal from the second in-wall power adapter.

20. The method of claim 15, further comprising receiving a control module in the recess.

* * * * *